US007689931B2

(12) United States Patent
Koga et al.

(10) Patent No.: US 7,689,931 B2
(45) Date of Patent: Mar. 30, 2010

(54) DISPLAY CONTROL DEVICE

(75) Inventors: Naoya Koga, Tokyo (JP); Hiroyoshi Endo, Tokyo (JP)

(73) Assignee: Clarion Co., Ltd., Tokyo (JP)

(*) Notice: Subject to any disclaimer, the term of this patent is extended or adjusted under 35 U.S.C. 154(b) by 1134 days.

(21) Appl. No.: 10/606,333

(22) Filed: Jun. 26, 2003

(65) Prior Publication Data

US 2004/0056837 A1 Mar. 25, 2004

(30) Foreign Application Priority Data

Jun. 28, 2002 (JP) .......................... P2002-225367

(51) Int. Cl.
*G06F 3/00* (2006.01)

(52) U.S. Cl. ...................................... 715/812; 715/822

(58) Field of Classification Search ................ 715/812, 715/821, 822, 823, 840, 828, 773, 826
See application file for complete search history.

(56) References Cited

U.S. PATENT DOCUMENTS

| | | | | |
|---|---|---|---|---|
| 5,625,763 | A * | 4/1997 | Cirne | 715/767 |
| 5,963,671 | A * | 10/1999 | Comerford et al. | 382/230 |
| 6,075,515 | A | 6/2000 | Keyson | |
| 6,211,921 | B1 | 4/2001 | Cherian et al. | |
| 6,417,869 | B1 * | 7/2002 | Do | 715/718 |
| 6,573,844 | B1 * | 6/2003 | Venolia et al. | 341/22 |
| 7,093,201 | B2 * | 8/2006 | Duarte | 715/853 |
| 2005/0210402 | A1 * | 9/2005 | Gunn et al. | 715/773 |

FOREIGN PATENT DOCUMENTS

| | | |
|---|---|---|
| JP | 02-135516 | 5/1990 |
| JP | 10-214172 | 8/1998 |
| JP | 11-203015 | 7/1999 |
| JP | 2000-506714 | 5/2000 |
| JP | 2000-508102 | 6/2000 |
| JP | 2000-284879 | 10/2000 |
| JP | 2002-116857 | 4/2002 |

OTHER PUBLICATIONS

Japanese Office Action dated Feb. 5, 2008, with English translation.

* cited by examiner

*Primary Examiner*—Dennis Bonshock
(74) *Attorney, Agent, or Firm*—McGinn I.P. Law Group, PLLC

(57) ABSTRACT

The display control device includes: display control means for displaying a plurality of button groups each having at least one button in a monitor and for focusing and displaying any of the buttons displayed in the monitor; and button changing means including an in-group button changing operation unit for changing the button to be focused, from one button to another in a button group, and an inter-group button changing operation unit for changing the button to be focused, from a button of one button group to a button of another button group. In case the button to be focused is changed by the inter-group button changing unit from the button of one button group to the button of another button group, the display control means focus and display a specific button of the button group changed.

41 Claims, 123 Drawing Sheets

DISPLAY CONTROL DEVICE

BACKGROUND OF THE INVENTION

1. Field of the Invention

The present invention relates to a display control device. In particular, the present invention relates to the display device mounted on a vehicle to display various kinds of information to a driver of the vehicle.

2. Description of the Related Art

In recent years, chances of mounting monitors of liquid crystal or the like are increasing with the background that vehicle is made intelligent, as represented by the spread of a vehicle navigation system. The monitor displays such various kinds of images in an interchanging manner as includes not only the map images for the vehicle navigation but also TV programs, information related to audio device, traffic information, telephone number information or images taken by a vehicle-mounted camera. A driver performs driving and other operations by grasping the various kinds of information, which are collected from the monitor.

In case the aforementioned various images are interchanged and displayed in the monitor, it cannot be said that the display is given coordination over the sources or objects of the images. Especially in case the image displayed in the monitor requires the driver for some operation, the driver is troubled by the operations, unless the driver is familiar to the operating method intrinsic to that image, so that the operation may not be able to be performed after all.

The monitor is desired to have the coordination in the display for applications, especially in case the monitor is used in a common display device having a function such as a navigation device or an audio device but is used as a general-purpose computer display device having not only a navigation function but also an audio function.

SUMMARY OF THE INVENTION

The present invention has been conceived in view of the background thus far described and it is an object thereof to provide a display control device that gives operational and apparent feasibility and familiarity to image display method for a monitor to display various kinds of information.

In order to achieve the above object, according to a first aspect of the invention, there is provided display control device including: a display control section adapted to display a plurality of button groups each having at least one button in a monitor connected thereto and to display any of the buttons displayed in the monitor in focused state; and a button change section including an in-group button changing operation unit adapted to change the button to be focused from one button to another within the button group, and an inter-group button changing operation unit adapted to change the button to be focused from a button of one button group to a button of another button group, wherein, when the button to be focused is changed by the inter-group button changing operation unit from the button of one button group to the button of another button group, the display control section displays a specific button of the button group changed in focused state.

In order to achieve the above object, according to a second aspect of the invention, there is provided a display control device including: a display control section adapted to display in a monitor connected thereto ten keys composed of a plurality of buttons for inputting a telephone number and a communication button for starting a telephone communication, and to display any of the ten keys and the communication button displayed in the monitor in focused state; and a button change section adapted to change the button to be focused from one button to another, wherein the display control section displays a specific button of the ten keys in focused state when the ten keys previously not displayed are displayed in the monitor.

In order to achieve the above object, according to a third aspect of the invention, there is provided a display control device including: a display control section adapted to display in a monitor connected thereto a plurality of buttons for inputting a telephone number and a communication button for starting a communication, and to display any of the ten keys and the communication button displayed in the monitor in focused state; and a button change section adapted to change the button to be displayed in focused state from one button to another, wherein when the communication button is displayed in focused state and when the button to be displayed in focused state is changed by the button change section from the communication button to the button of the ten keys, the display control section displays a specific button of the ten keys in focused state.

BRIEF DESCRIPTION OF THE DRAWINGS

The above objects and advantages of the present invention will become more apparent by describing preferred exemplary embodiment thereof in detail with reference to the accompanying drawings, wherein:

Of FIGS. 3A to 3D showing a remote control unit of the display control device according to the embodiment.

Of FIGS. 6A and 6B showing start menu screens displayed in the display unit of the display control device according to the embodiment.

FIG. 119 is an explanatory diagram showing an example, in which a cursor is moved by a controller on a control panel screen of the display control device according to the embodiment;

FIG. 120 is an explanatory diagram showing an example, in which the cursor is moved by a controller on a telephone screen of the display control device according to the embodiment;

FIG. 121 is an explanatory diagram showing another example, in which the cursor is moved by a controller on a control panel screen of the display control device according to the embodiment; and FIG. 122 is an explanatory diagram showing another example, in which the cursor is moved by a controller on a telephone screen of the display control device according to the embodiment.

DETAILED DESCRIPTION OF THE PREFERRED EMBODIMENTS

Referring now to the accompanying drawings, a description will be given in detail of a preferred embodiment of the invention.

Figure 1:
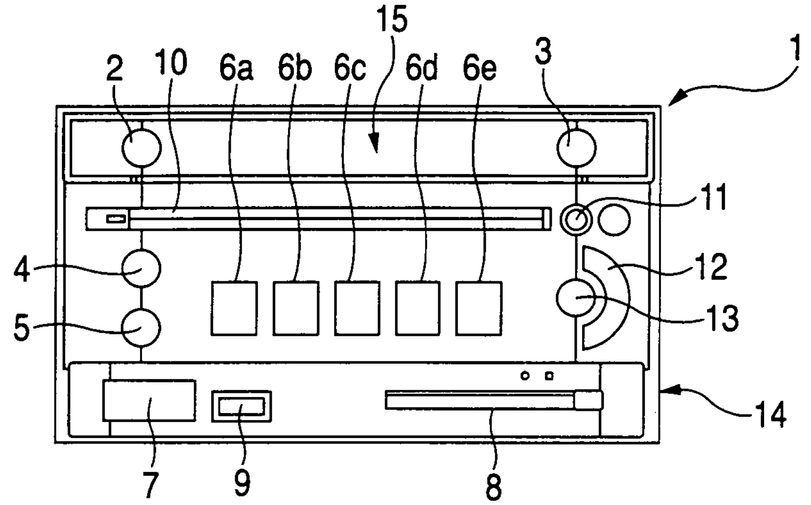
FIG. 1 is a front elevation showing a display control device according to one aspect of the invention.

FIG. 1 shows a vehicle-mounted type personal computer as a display control device according to the invention. The computer 1 has a size of 2 DIN and can be mounted in the dashboard of a vehicle. The computer is provided on its front face with: an open/close key 2; a display key 3; a tilt key 4; a standby key 5; control buttons 6*a* to 6*e*; a connector 7; a card slot 8; a USB port 9; a disk insert slot 10 for inserting a digital disk such as a CD or DVD; a disk eject button 11; a sound volume adjusting knob 12; and a mute button 13.

Figure 2:
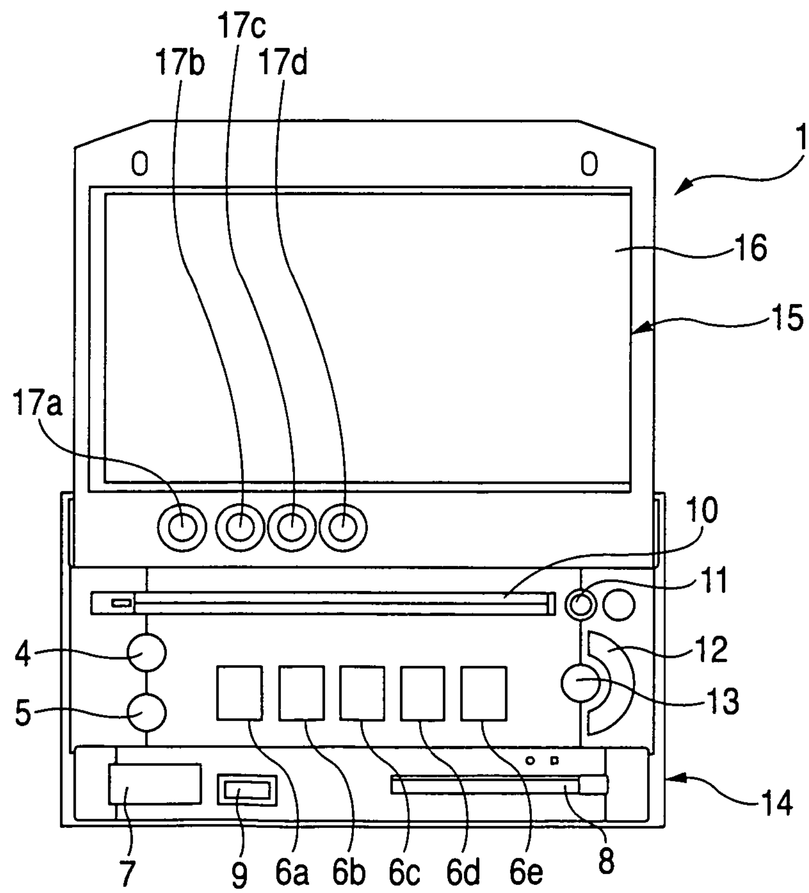
FIG. 2 is a front elevation showing a body unit and a display unit of the display control device according to the embodiment.
Figure 3A:
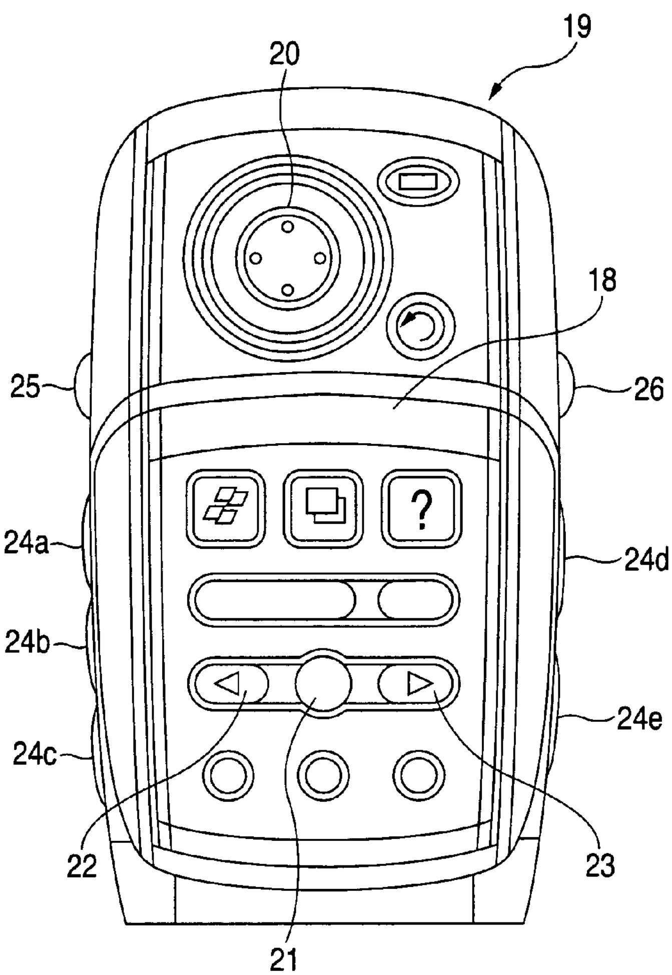
FIG. 3A is a front elevation.
Figure 3B:
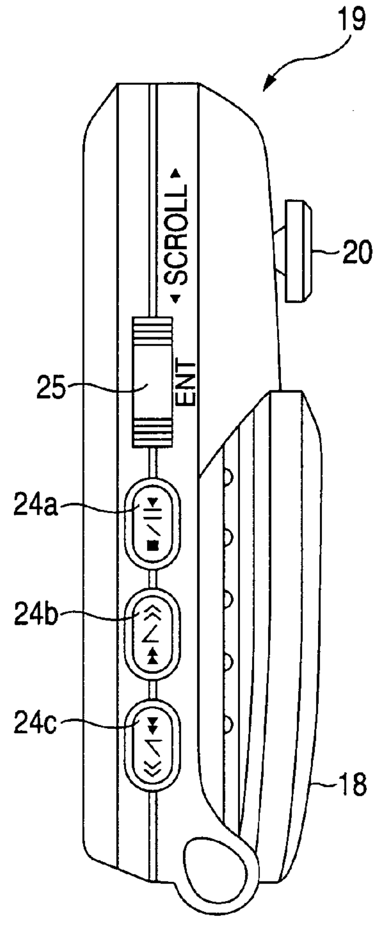
FIG. 3B is a right side elevation.
Figure 3C:
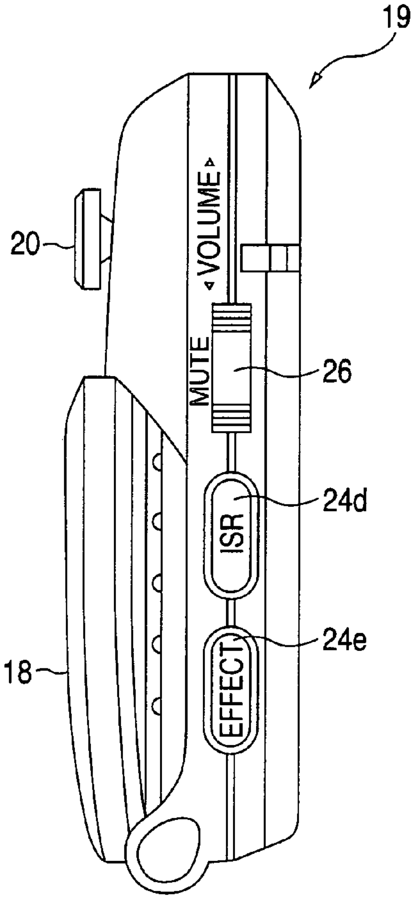
FIG. 3C is a left side elevation.
Figure 3D:
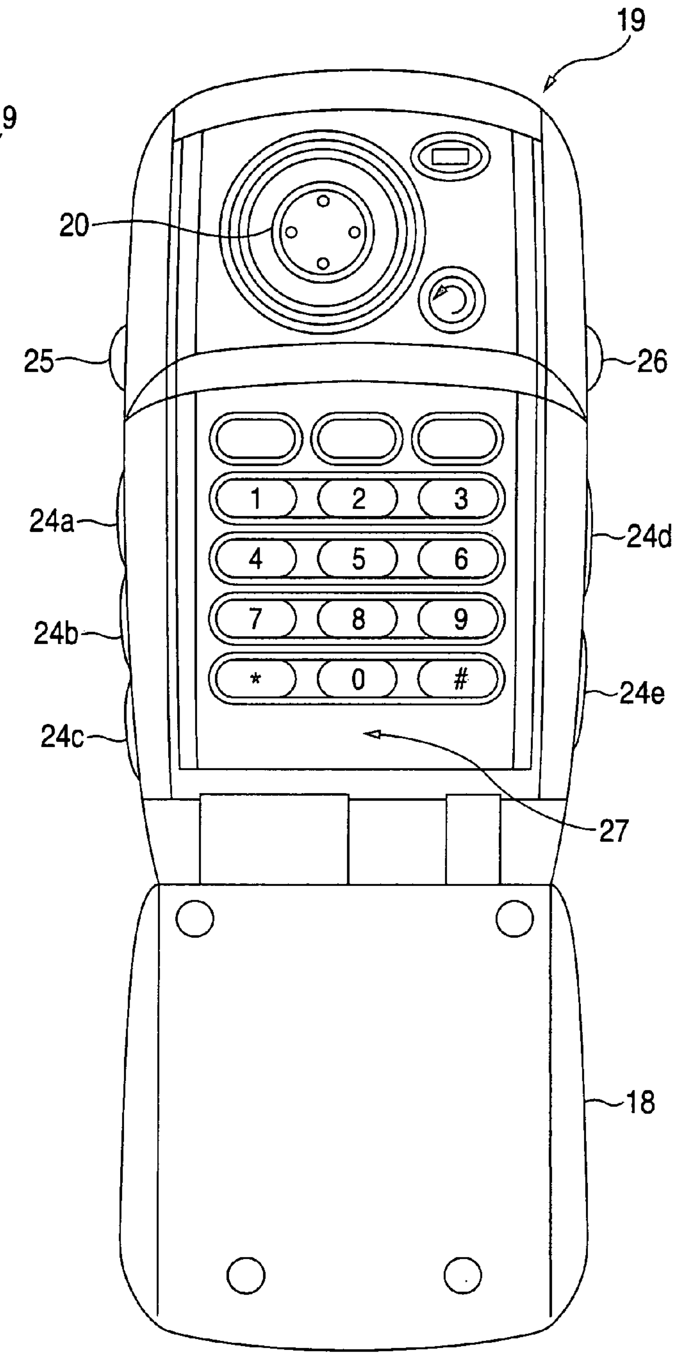
FIG. 3D is a front elevation with cover thereof being opened.

When the open/close key 2 is operated, a display unit 15 housed in a body unit 14 slides forward and then rises so that a liquid crystal monitor 16 appears, as shown in FIG. 2. The tiling angle of the monitor 16 can be adjusted by the tilt key 4, and operation buttons 17*a* to 17*d* are disposed below the monitor 16. When the open/close key 2 is operated in this state, moreover, the display unit 15 is housed in the body unit 14 in the course reversed from the aforementioned one. Various application programs are installed in the computer 1, as will be described hereinafter, so that various images are displayed in the monitor 16. The display key 3 is used to switch the wide/normal sizes of the screen, when a DVD video reproducing application and a TV broadcasting application is employed, and to switch the display of the monitor 16 to a screen saver when another application is employed. (However, the operation of the open/close key 2 is invalid when a vehicle navigation application is employed.)

For the operations of the computer 1, it is possible to employ a remote control unit 19 having an openable cover 18, as shown in FIG. 3. The remote control unit 19 is provided on its front face with: a controller 20, which can be operated upward, downward, leftward and rightward and depressed; a list button 21 positioned below the controller 20 with the cover 18 being closed; and a left button 22 and a right button 23 positioned on the left and right sides of the list button 21. Moreover, the remote control unit 19 is further provided on the left and right side faces with operation buttons 24*a* to 24*e* for audio relations and a scroll dial 25 and a volume dial 26 and in the cover 18 with a ten key button 27. Here, the scroll dial 25 and the volume dial 26 are constructed to rock up and down but may also be constructed to turn.

Figure 4:
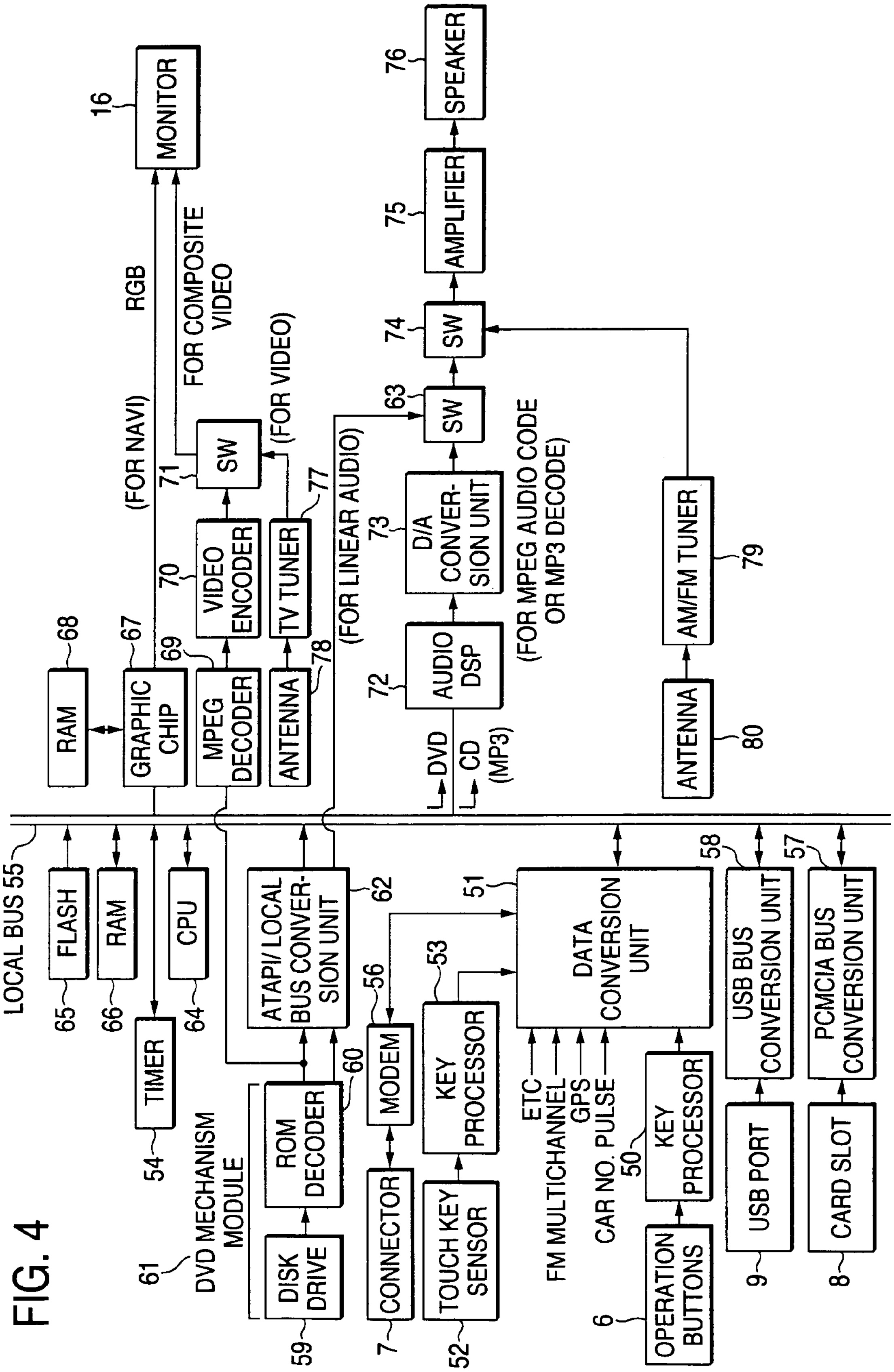
FIG. 4 is a block diagram showing an internal circuit of the display control device according to the embodiment.

The computer 1 has an internal circuit, which is so schematically constructed as is shown in FIG. 4. The operation information of the operation buttons 6*a* to 6*e* (as shown as the "operation button 6" in FIG. 4) is inputted through a key processor 50 for deciding the state of the button operation to a data conversion unit 51. The operation information of the remaining buttons such as the operation buttons 17*a* to 17*d*, the tilt key 4 or the standby key 5 is not shown in FIG. 4, although it is also inputted through the key processor 50 to the data conversion unit 51.

The monitor 16 is provided with a touch key sensor 52 for detecting the depression at a predetermined position on the screen, and its depression information is inputted through a key processor 53 to the data conversion unit 51. The touch sensor 52 may use any type if it can detect the contact position (or touch position) of a finger on the screen, and may be exemplified either by a resistive film type touch panel generally used or by a touch panel of the ultrasonic type, optical type, electrostatic capacity type or electromagnetic induction type. The time period (or touch time period), for which the screen to be detected by the touch key sensor is being touched, can be counted by a timer 54.

The data conversion unit 51 is fed with the information necessary for realizing the ITS (Intelligent Transport Systems), such as the ETC (Electronic Toll Collection System) signal, the GPS signal necessary for realizing the navigation function, the vehicle speed pulses, and the FM multi-channel signals for the VICS (Vehicle Information and Communication System), and performs the data conversions necessary for transferring those input signals to a local bus 55. In case the data communications are done by connecting the connector 7 for the data communications with the data conversion unit 51 through a modem 56 and by connecting the connector 7 with a mobile telephone and a PHS, the data conversion unit 51 executes the conversions of the data to be sent/received.

The card slot 8 is connected with a PCMCIA bus conversion unit 57, which performs a data conversion for transferring the data, as recorded in a recording medium such as a PC card inserted into the card slot 8, to the local bus 55. The card slot 8 may also be constructed to insert a communication card thereinto.

The USB port 9 is connected with a USB bus conversion unit 58, which converts data transferred from the USB port 9, to the local bus 55.

The digital disk inserted into the disk insert slot 10 has its data read by a disk drive 59 of a disk mechanism module 61, which is composed of the disk drive 59 and a ROM decoder 60, and the read data are decoded in the ROM decoder 60. With the ROM decoder 60, there is connected an ATAPI/local bus conversion unit 62, which is connected with the local bus 55 and a switch unit 63. The ATAPI/local bus conversion unit 62 converts the output of the ATAPI outputted from the ROM decoder 60, into a local bus format.

A CPU 64 for integrating and controlling the circuit executes the OS (e.g., Windows CE (registered trade mark) of Microsoft) and various applications for vehicle navigations, DVD video reproductions, music reproductions, electronic mails and so on. The various application programs are stored in the flash memory 65 by setting the disk mechanical module 61 with the disk recorded with the programs, and a RAM 66 is provided as the work memory in the present circuit separately of that flash memory 65. In another construction, the flash memory 65 may be stored with only the boot loader, and the RAM 66 may be stored with the OS and the applications. Here, the flash memory 65 and the RAM 66 may be replaced by a hard disk drive or the like.

When the CPU 64 executes the aforementioned applications for the vehicle navigations, the map data are read from the DVDROM disk loaded in the disk mechanical module 61, and the vehicle location and the routes to follow are computed by the CPU 64 so that their data are fed either through the ATAPI/local bus conversion unit 62 or directly to the local bus 55 and transferred to a graphic chip 67 connected with the local bus 55. The graphic chip 67 processes the fed data together with an image processing RAM 68 and outputs the processed data as RGB signals to the monitor 16 so that the monitor 16 displays the map, the vehicle location, the route to follow and so on.

When the CPU 64 executes the applications for the DVD video reproductions, the data signals, as read at the disk drive 59, of the DVD video disk are outputted through the ROM decoder 60, and their video signals are outputted as motion images through an MPEG decoder 69, a video encoder 70 and a switch unit 71 to the monitor 16. On the other hand, the voice signals are outputted through the ATAPI/local bus conversion unit 62, the local bus 55, an audio DSP 72, a D/A conversion unit 73, the switch units 63 and 74 and an amplifier 75 from a speaker 76. Here, a TV tuner 77 and an antenna 78 are connected with the switch unit 71, and the input of the monitor 16 on the composite side is switched by the switch unit 71 from the video encoder 70 to the TV tuber 71 when TV programs are to be projected on the monitor 16. Moreover, an AM/FM tuber 79 and a TV tuber 80 are connected with the switch unit 74, and the input of the amplifier 75 is switched by the switch unit 74 from the switch unit 63 to the AM/FM tuber 79 when radio programs are to be fed to the speaker 76. When the voices of the TV programs are to be fed to the speaker 76, the input of the amplifier 75 is switched by the switch unit 74 to the TV tuber 77. Here, the speaker 76 and the amplifier 75 may be disposed outside of the computer 1.

When the CPU 64 executes the applications (e.g., Windows Media Player of Microsoft) for the music reproductions, either the audio compressed file (e.g., MP3) recorded in the DVD disk or the CD disk or the music data recorded in the DVD disk are sent through the ATAPI/local bus conversion unit 62 and the local bus 55 to the audio DSP 72. In the audio DSP 72, the data are suitably processed or expanded, and these data are outputted further through the D/A conversion unit 73, the switch units 63 and 74 and the amplifier 75 from the speaker 76. When the music data recorded in the CD disk are reproduced, on the other hand, the switch unit 63 is switched from the D/A conversion unit 73 to the ATAPI/local bus conversion unit 62 so that the output of the ATAPI/local bus conversion unit 62 is outputted through the switch units 63 and 74 and the amplifier 75 from the speaker 76.

Hereinafter, the displays of the monitor 16 of the computer 1 will be described. The individual displays to be described are controlled mainly by the CPU 64, the flash memory 65, the RAM 66, the graphic chip 67 and the RAM 68.

In the following case, moreover, a portion (including an icon) of the frame can be clicked. The "clicking" means that the user operates the controller 20 of the remote control unit 19 upward, downward, leftward or downward either to move the cursor on the screen to a portion of the same screen and then pushes the controller 20 or to touch that portion of the screen directly with the finger of the user (when the latter meaning is especially excluded, however, the expression is changed to "click with the controller 20"). Here, the "cursor" can be recognized when the color of the portion of the screen changes or when the letter or symbol of the portion of the screen is inverted or enlarged. The portion of the screen, where the cursor is located, is expressed as "focused", and the movement of the cursor to the portion of the screen is expressed as "focusing".

Figure 5:
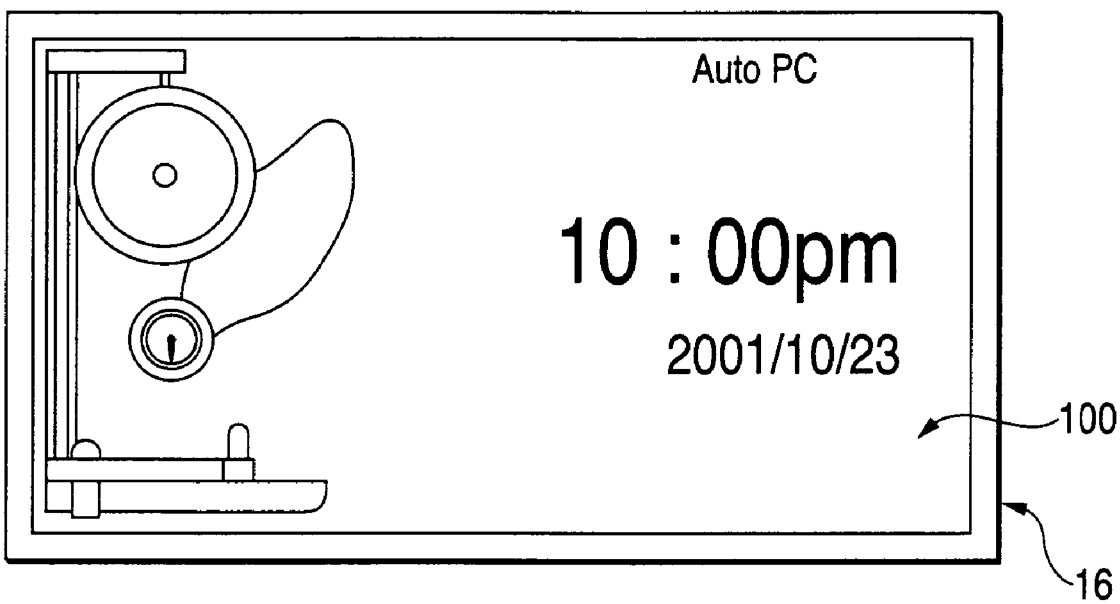
FIG. 5 is a diagram showing a watch display screen displayed in the display unit of the display control device according to the embodiment.
Figure 6A:
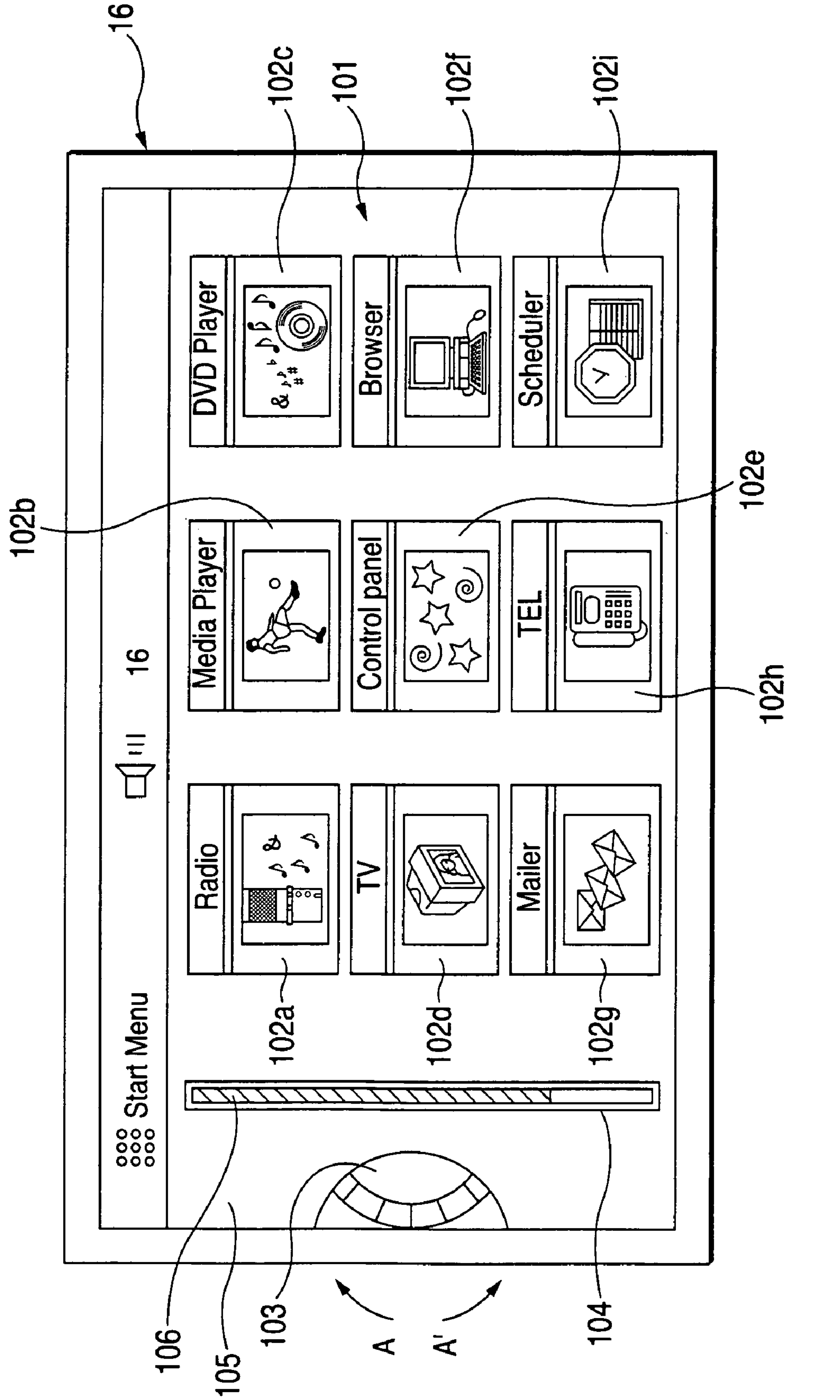
FIG. 6A is a diagram showing icons positioned on the upper side of the start menu screen.

The open/close key 2 is operated to bring the display unit 15 into a usable state. When the computer 1 is thus started, a clock screen 100, as shown in FIG. 5, appears at first on the monitor 16 of the display unit 15 thereby to display the present time and the calendar. When the standby key 5 is pushed in this state, a start menu screen 101 shown in FIG. 6 is displayed in the monitor 16. From now on, the display of the clock screen 100 and the display of the start menu screen 101 are repeated each time the standby key 5 is operated.

The start menu screen 101 is one for selecting the functions owned by the computer 1. The start menu screen 101 is provided with icons 102*a* to 102*l* for starting the applications corresponding to the individual functions, a scroll dial 103 located on the left end of the screen, and a position bar 104 located on the right side of the scroll dial 103.

Figure 6B:
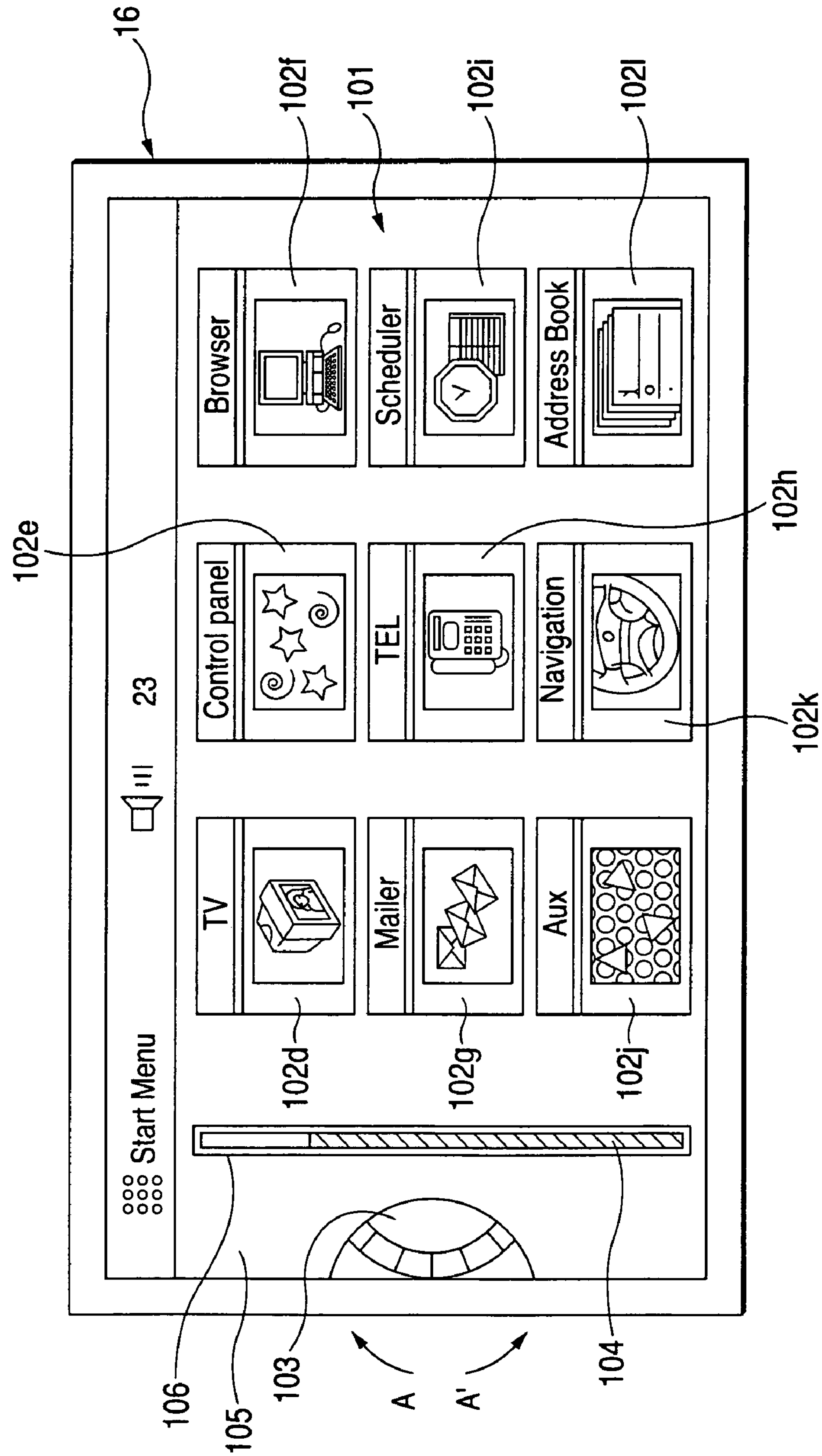
FIG. 6B is a diagram showing icons positioned on the lower side of the start menu screen.

The scroll dial 103 has a disc shape or an annular shape, and its left portion is exclusively exposed to the outside but its other portion is hidden by the ground region 105 of the screen 101. When the scroll dial 103 is touched on the monitor 16 at its upper or lower portion with the finger or when the scroll dial 103 is rubbed upward or downward as if it were turned, it is turned upward (in the direction of arrow A) or downward (in the direction of arrow A') on the screen. In accordance with this, the contents of the start menu screen 101 are scrolled upward or downward. In the state shown in FIG. 6A, more specifically, the scroll dial 103 is turned downward, and the start menu screen 101 is scrolled downward, for example. Then, the indicator 106 of the position member 104 indicating the present scroll position in the scrolling range moves downward, as shown in FIG. 6B, so that the icons 102*a* to 102*c* displayed in the upper portion of the screen disappear but the new icons 102*j* to 102*l* are displayed in the lower portion of the screen. These operations are also performed even when the upper portion or lower portion of the scroll dial 103 is clicked with the controller 20 or when the scroll dial 25 of the remote control unit 19 is operated.

Figure 7:
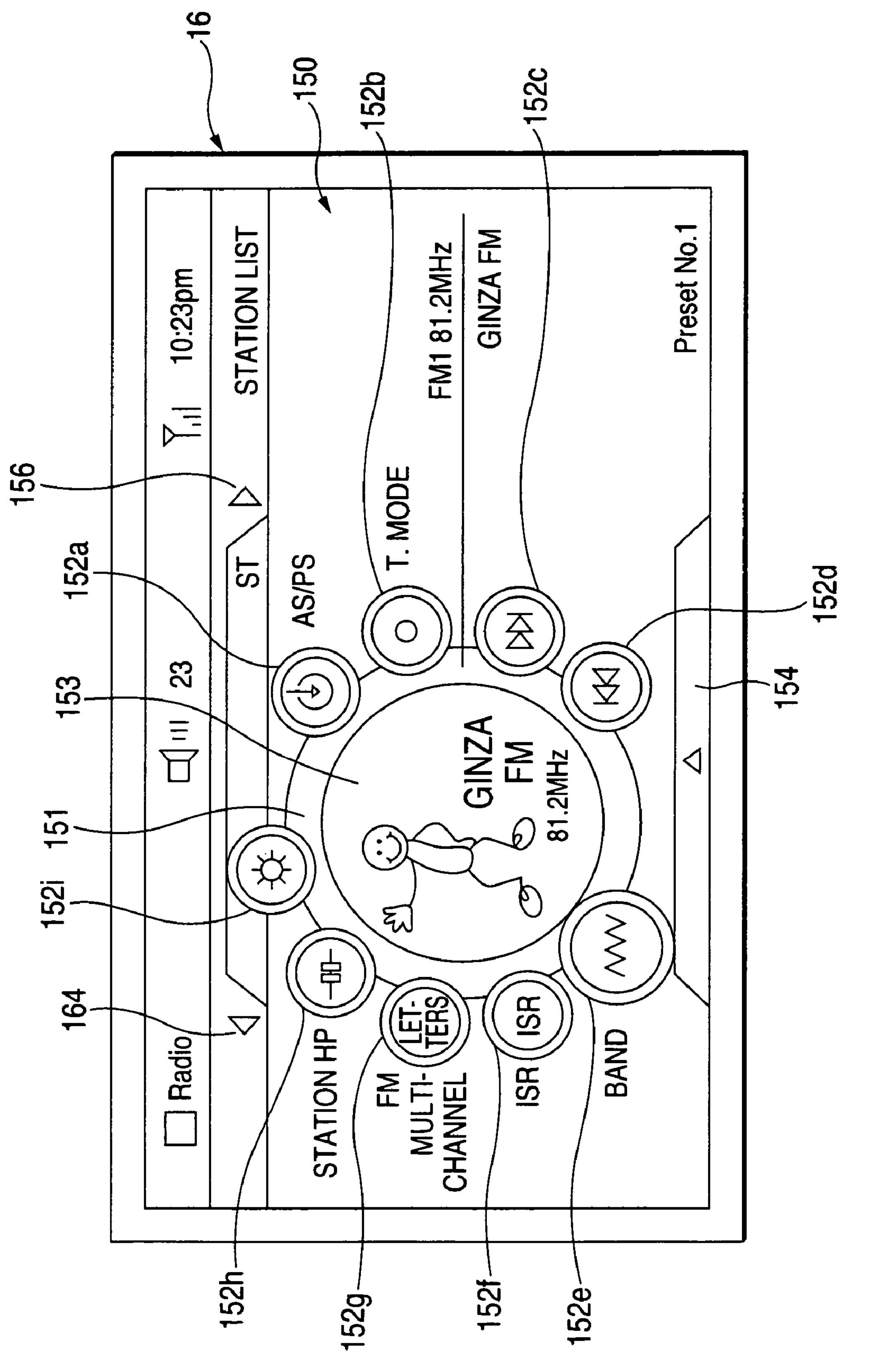
FIG. 7 is a diagram showing a radio screen displayed in the display unit according to the embodiment.

When the icon 102*a* is clicked on the start menu screen 101, a radio screen 150 shown in FIG. 7 is displayed in the monitor 16. In the radio screen 150, there are displayed an annular base ring 151, which is arranged on the left side rather than the screen center, and satellite buttons 152*a* to 152*i*, which are disposed along and around the base ring 151. When the radio screen 150 is displayed, a radio program is broadcast, and the received station and frequency are displayed on the right space of the screen.

The base ring 151 is provided therein with an information display portion 153 for displaying a still picture or a motion picture of the radio station received or images changing with the voice. In FIG. 7, the mascot character of the received station is displayed in the information display portion 153. The information display portion 153 may also be formed into an elliptical or rectangular shape extending in the longitudinal direction (or in the transverse direction). In the modification, the base ring 151 may be formed to contour the information display portion 153. The shape of the base ring should not be limited to the annulus as in the later-described individual screens.

The satellite buttons 152*a* to 152*i* indicate the possible operations in the radio screen 150 with the icons and are separately arranged on the two sides for the individual functions. The satellite button group on the right side collects tuning buttons including: the auto-storing or preset scanning satellite button 152*a* (or AS/PS button); the tuning mode switching satellite button 152*b* (T.MODE button); and the channel changing satellite buttons 152*c* and 152*d* (channel change buttons). On the other hand, the satellite button group on the left side collects other function buttons including: the FM/AM band switching satellite button 152*e* (band change button); the satellite button 152*f* (ISR button) for tuning the received frequency to the road traffic information; the satellite button 152*g* (or character button) for displaying the FM character multi-channel broadcasting; the satellite button 152*h* (station HP button) for displaying the home page address list of the radio stations; and the satellite button 152*i* (image change button) for changing the images to be displayed on the information display portion 153.

Figure 8:
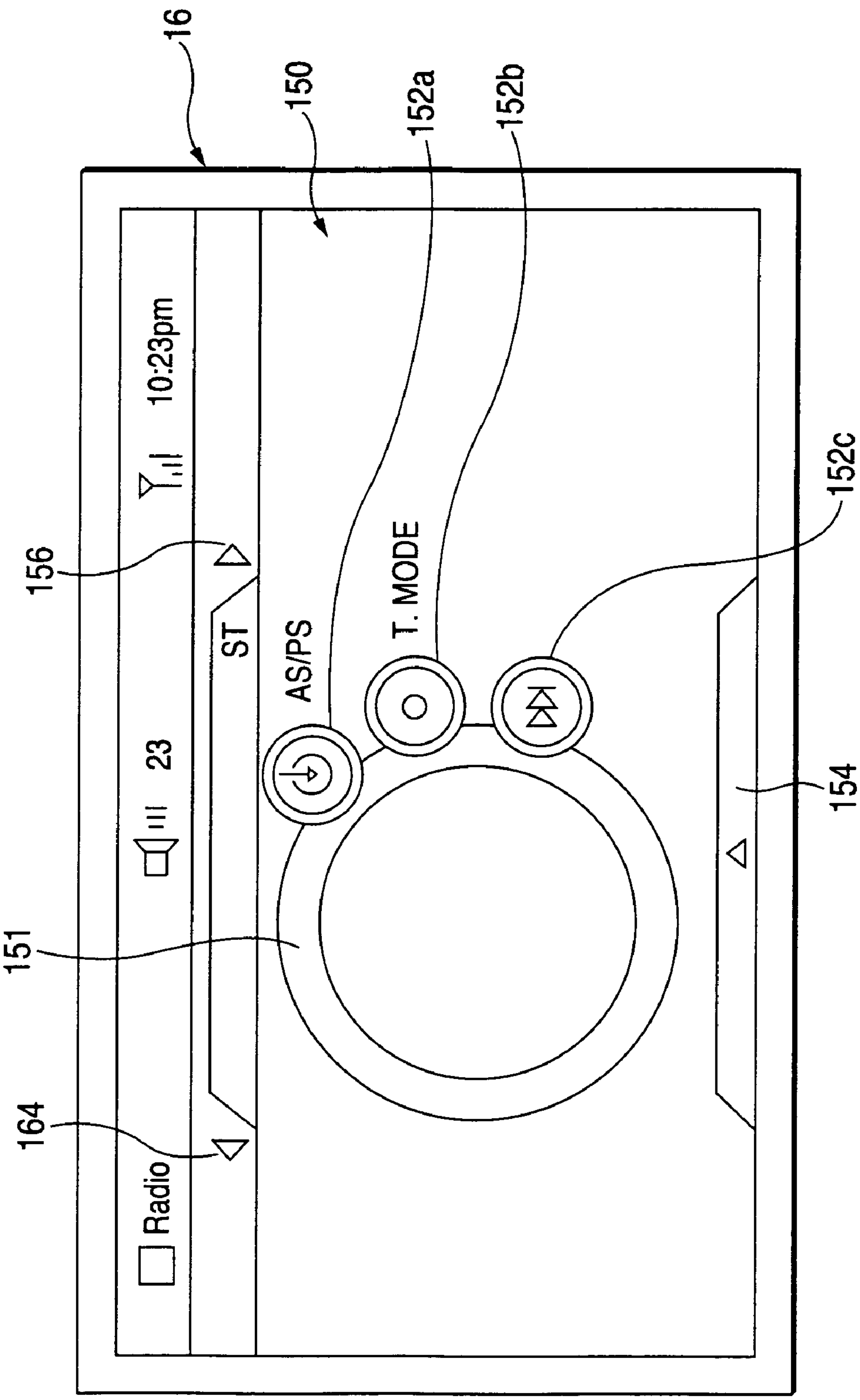
FIG. 8 is a diagram showing behavior, in which satellite buttons are sequentially displayed along a base ring on the radio screen displayed in the display unit of the display control device according to the embodiment.

At the starting time (or drawing time) of the radio screen 150, the satellite buttons 152*a* to 152*i* are displayed clockwise sequentially from the satellite button 152*a* (FIG. 8) after the base ring 151 was displayed, and a character row (e.g., the "AS.PS" for the satellite button 152*a*) for explaining the satellite button is displayed adjacent to that button. The character row may be displayed clockwise sequentially either simultaneously as the corresponding satellite button is displayed (or immediately after the corresponding satellite button was displayed) or after all the satellite buttons 102*a* to 102*i* were displayed. These methods for displaying the base ring, the satellite buttons and the character rows are similar at the starting time of the later-described individual screens.

The satellite buttons 152*a* to 152*i* can be focused by moving the cursor with the controller 20, and each satellite button is inverted and displayed, when focused, in an enlarged scale. The cursor is moved between the satellite buttons and between the satellite button groups by operating the controller 20 upward and downward, and leftward and rightward. When the controller 20 is operated upward while the satellite button 152*b* is being focused, for example, the satellite button 152*a* is focused. When the controller 20 is operated downward, the satellite button 152*c* is focused. When operated leftward, the cursor is moved to the satellite button group on the left side. When the cursor is thus moved between the satellite button groups, the uppermost satellite button (e.g., the satellite button 152*i* in the satellite button group on the left side) in the reached satellite button group is focused first of all. In case the cursor was moved from the satellite button group to the other satellite button group and is returned again to that satellite button group, however, the satellite button having been focused just before the movement may be stored in the RAM 66 or the like so that the cursor may be returned to that satellite button. Specifically, the cursor is located at the satellite button 152*f* just before moved to the satellite button group on the right side and is moved to the satellite button group on the right side by the rightward operation of the controller 20 so that the satellite button 152*f* may be focused at first when the cursor is returned again to the satellite button group on the left side. Here, the cursor at the satellite button can also be moved either by the left button 22 or the right button 23 of the remote control unit 19 or by a list change button, as will be described hereinafter. In the latter case, the cursor is moved clockwise or counter-clockwise around the base ring independently of the satellite button group.

Figure 9:
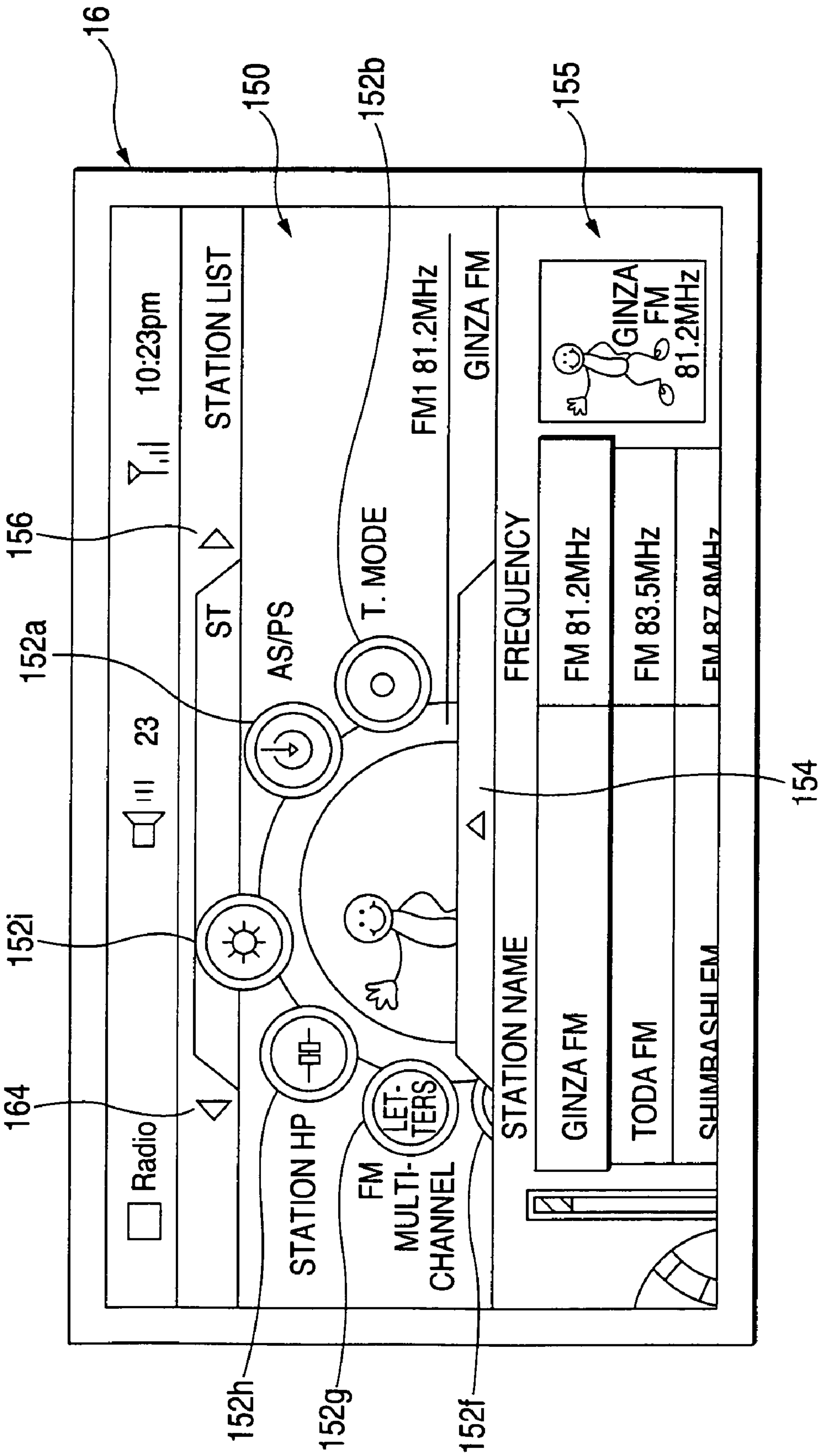
FIG. 9 is a diagram showing the behavior, in which display screens are so sequentially exposed and displayed that they are pulled up on the radio screen displayed in the display unit of the display control device according to the embodiment.
Figure 10:
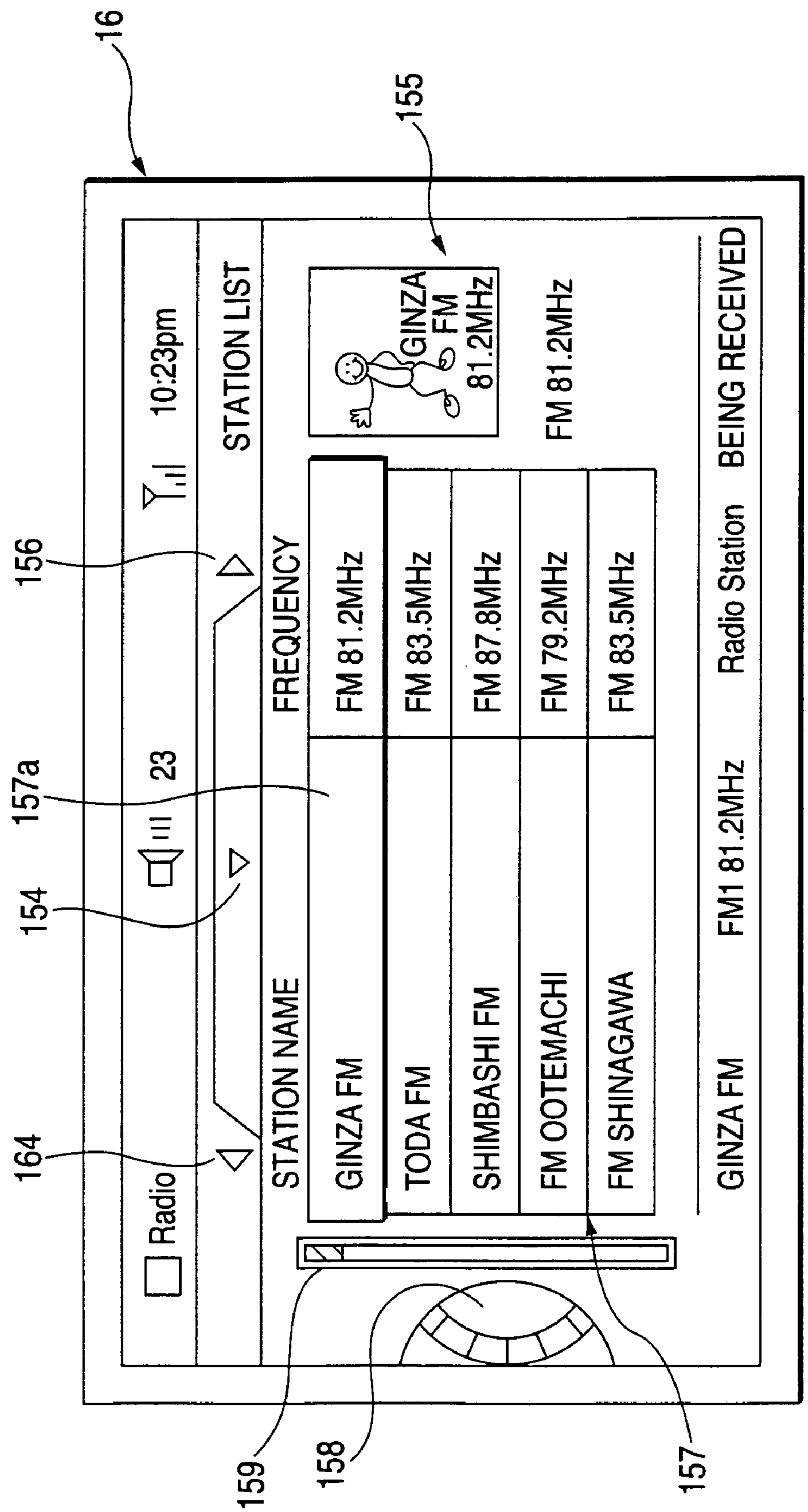
FIG. 10 is a diagram showing a screen, on which a display screen indicating a radio station list is displayed on the radio screen displayed in the display unit of the display control device according to the embodiment.

In the lower portion of the radio screen 150, there is displayed a list button 154 as a first tab. When the list button 154 is touched with the finger or when the list button 21 of the remote control unit 19 is pushed, the list button 154 moves toward the upper portion of the screen, as shown in FIG. 9, and a display screen 155 subsequent to the list button 154 is pulled up and sequentially exposed to the outside. Finally, the display screen 155 is completely displayed, as shown in FIG. 10. When the list button 154 is touched with the finger or the list button 21 is pushed with the display screen 155 being thus completely displayed, the display screen 155 is pulled down and is retracted and erased to the lower portion of the screen so that the screen shown in FIG. 7 is displayed again in the monitor 16.

In the upper portion of the radio screen, there is displayed a list change button 156 as a second tab. In FIG. 7, the "STATION LIST" is displayed at the list change button 156. When the list button 154 is touched with the finger or the list button 21 is pushed with the "STATION LIST" being displayed, a list 157 of broadcasting stations is displayed in the display screen 155. In the list 157, the station names and their frequencies stored in the flash memory 65 or the like are displayed longitudinally in pairs. In FIG. 10, a list item button 157*a* in the highest row constructing the list 157 is focused. A scroll dial 158 is displayed on the left end of the display screen 155, and a position bar 159 is displayed on the right side. These functions are omitted in their description because they are similar to those of the scroll dial 103 and the position bar 104 in the aforementioned start menu screen 101 of FIG. 6.

Figure 11:
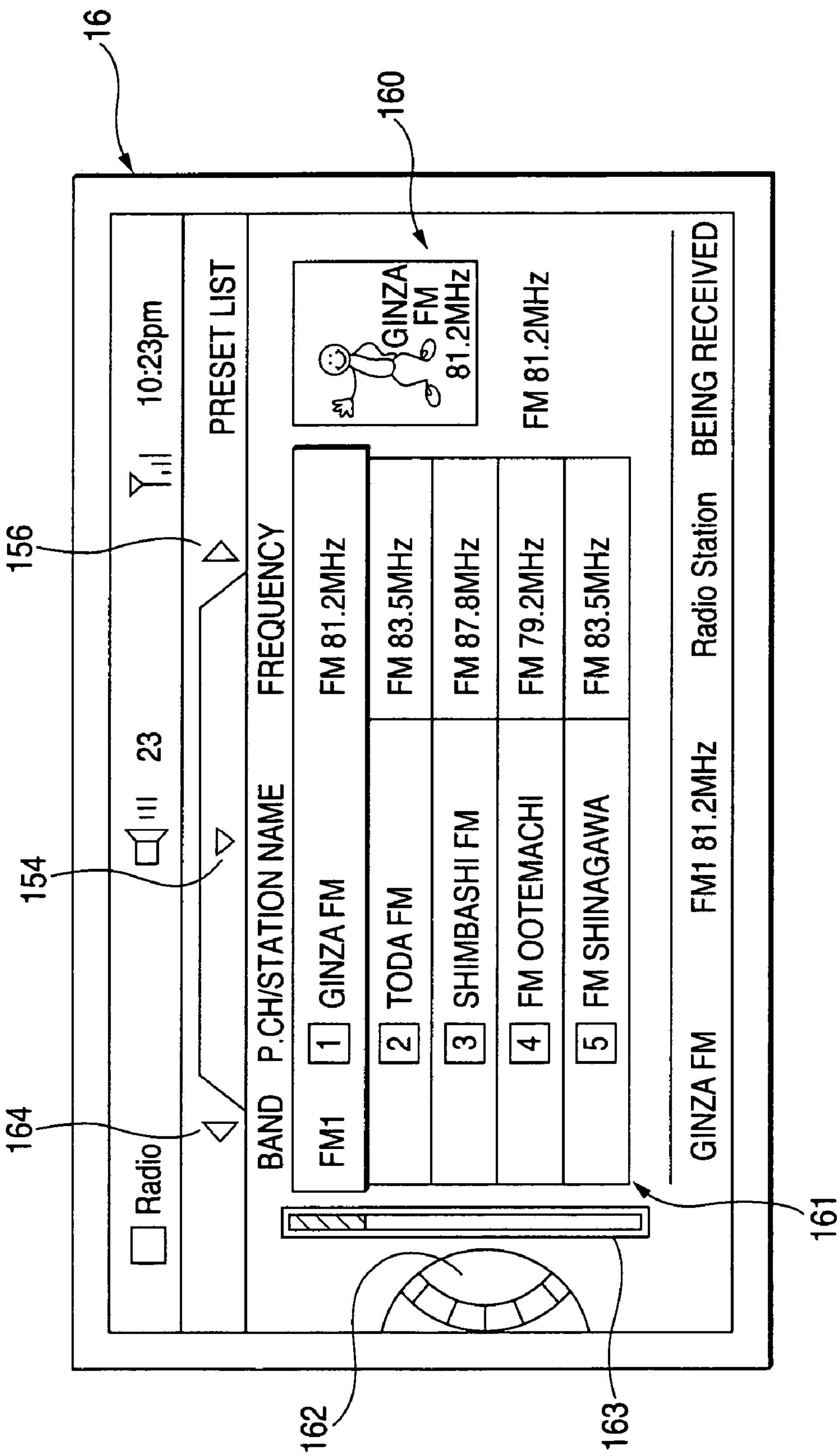
FIG. 11 is a diagram showing a screen, on which a display screen showing a preset list is displayed on the radio screen displayed in the display unit of the display control device according to the embodiment.

When the list change button 156 is touched with the finger or the left button 22 or the right button 23 of the remote control unit 19 is pushed with the display screen 155 being displayed, the display of the list change button 156 is changed from "STATION LIST" to "PRESET LIST". Then, the list button 154 is moved toward the lower portion of the screen, and the display screen 155 is so sequentially retracted and erased that it is pulled down. When the list button 154 reached the lower portion of the screen, moreover, the list button 154 then moves again toward the upper portion of the screen, and a new display screen 160 shown in FIG. 11 is so sequentially exposed and displayed that it is pulled up. In the display screen 160, there is displayed a list 161 indicating the broadcasting stations corresponding to the preset channels, and the assignments of the stations and frequencies to the preset channels can be arbitrarily done by the user and are stored in the flash memory 65 or the like. In the display screen 160, moreover, there are displayed a scroll dial 162 and a position bar 163, which are similar to the scroll dial 158 and the position bar 159.

Here in the state shown in FIG. 7, when the list change button 156 is touched with the finger or when the left button 22 or the right button 23, the display at the list change button 156 is changed from "STATION LIST" TO "PRESET LIST". When the list button 154 is touched with the finger in this state or when the list button 21 is pushed, the display can come directly to that (i.e., the display screen 160) of FIG. 11 not through the display screen 155. Here, a list change button 164 is prepared not only on the right side of the screen upper portion but also on the left side of the screen upper portion, so that a result similar to that obtained by operating the list change button 156 can be obtained by operating the list change button 164.

Figure 12:
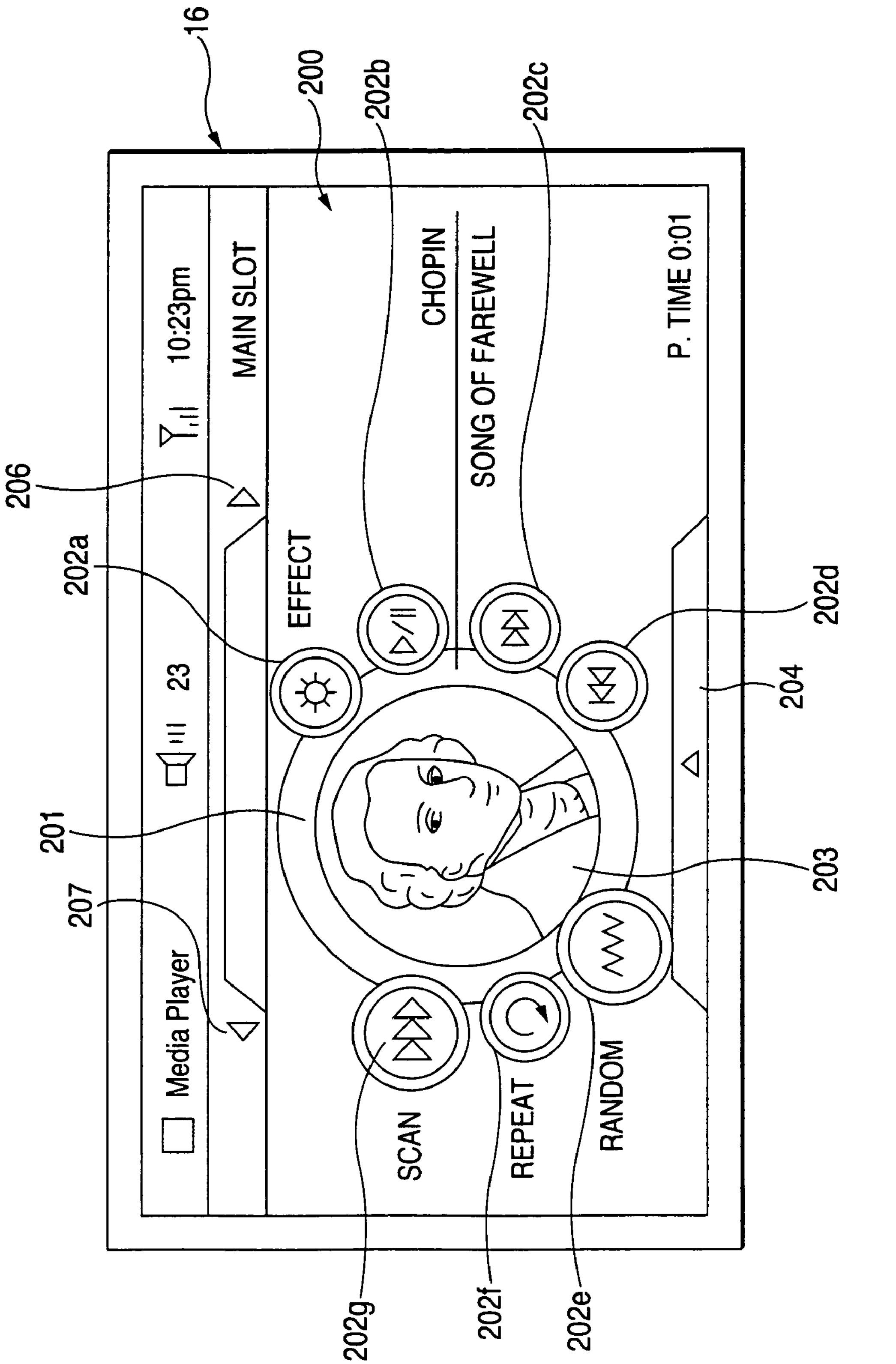
FIG. 12 is a diagram showing a media player screen (MAIN SLOT) displayed in the display unit of the display control device according to the embodiment.

Here, the display of the monitor 16 is returned to the preceding screen, when the operation button 17*c* (i.e., return button) of the display unit 15 is operated, and to the start menu screen 101, when the operation button 17*a* (i.e., start button) is operated. When the icon 102*b* is clicked with the start menu screen 101 being thus restored, a media player screen 200, as shown in FIG. 12, is displayed in the monitor 16.

The media player screen 200 is one for reproducing music by the aforementioned Windows Media Player. The media player screen 200 displays a base ring 201, which is arranged on the left side rather than the screen center, and satellite buttons 202*a* to 202*g*, which are arranged along and around the base ring 201. A number being reproduced (or to be reproduced) is displayed in the right space of the media player screen 200, and a play time (or an elapsed time) is displayed at the lower right corner of the screen.

An information display portion 203 in the base ring 201 displays an image of an album jacket or a promotion image on the number being produced (or to be reproduced). The satellite buttons 202*a* to 202*g* are divided into and arranged as the left and right satellite button groups. The right satellite button group collects the buttons on the fundamental operations and the image effects, and the left satellite button group collects the buttons on the special reproductions. Specifically, the right satellite button group includes: the satellite button 202*a* (image change button) for changing the images to be displayed on the information display portion 203; the play/pause satellite button 202*b*; the heading (fast forward) satellite button 202*c*; and the heading (rewind) satellite button 202*d*. On the other hand, the left satellite button group includes: the random play satellite button 202*e*; and the repeat play satellite button 202*f*; and the scan playing satellite button 202*g*.

Figure 13:
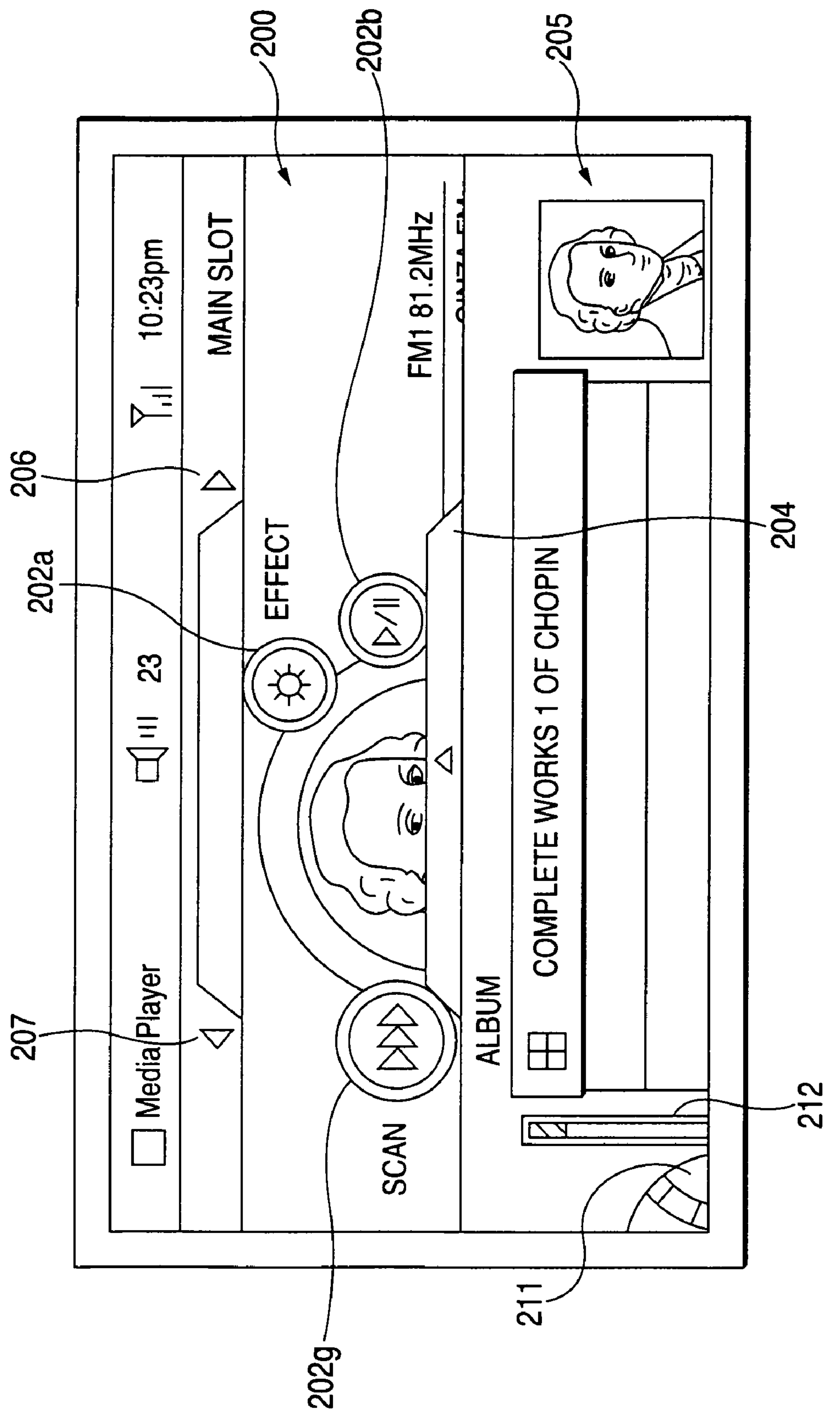
FIG. 13 is a diagram showing the behavior, in which the display screens are so sequentially exposed and displayed that they are pulled up on the media player screen displayed in the display unit of the display control device according to the embodiment.
Figure 14:
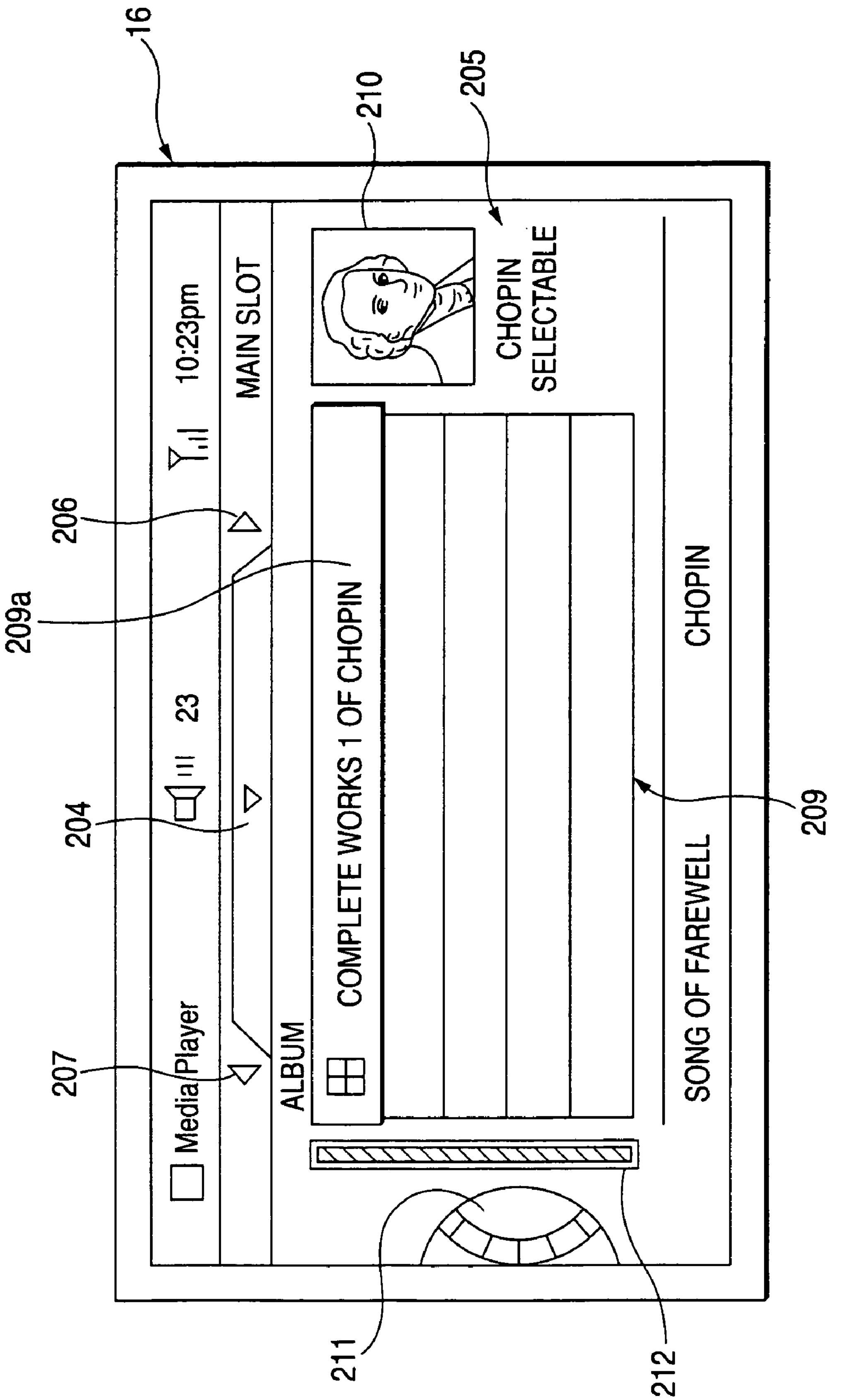
FIG. 14 is a diagram showing a screen, on which a display screen indicating the information (e.g., an album title) of the MAIN SLOT is displayed on the media player screen displayed in the display unit of the display control device according to the embodiment.
Figure 15:
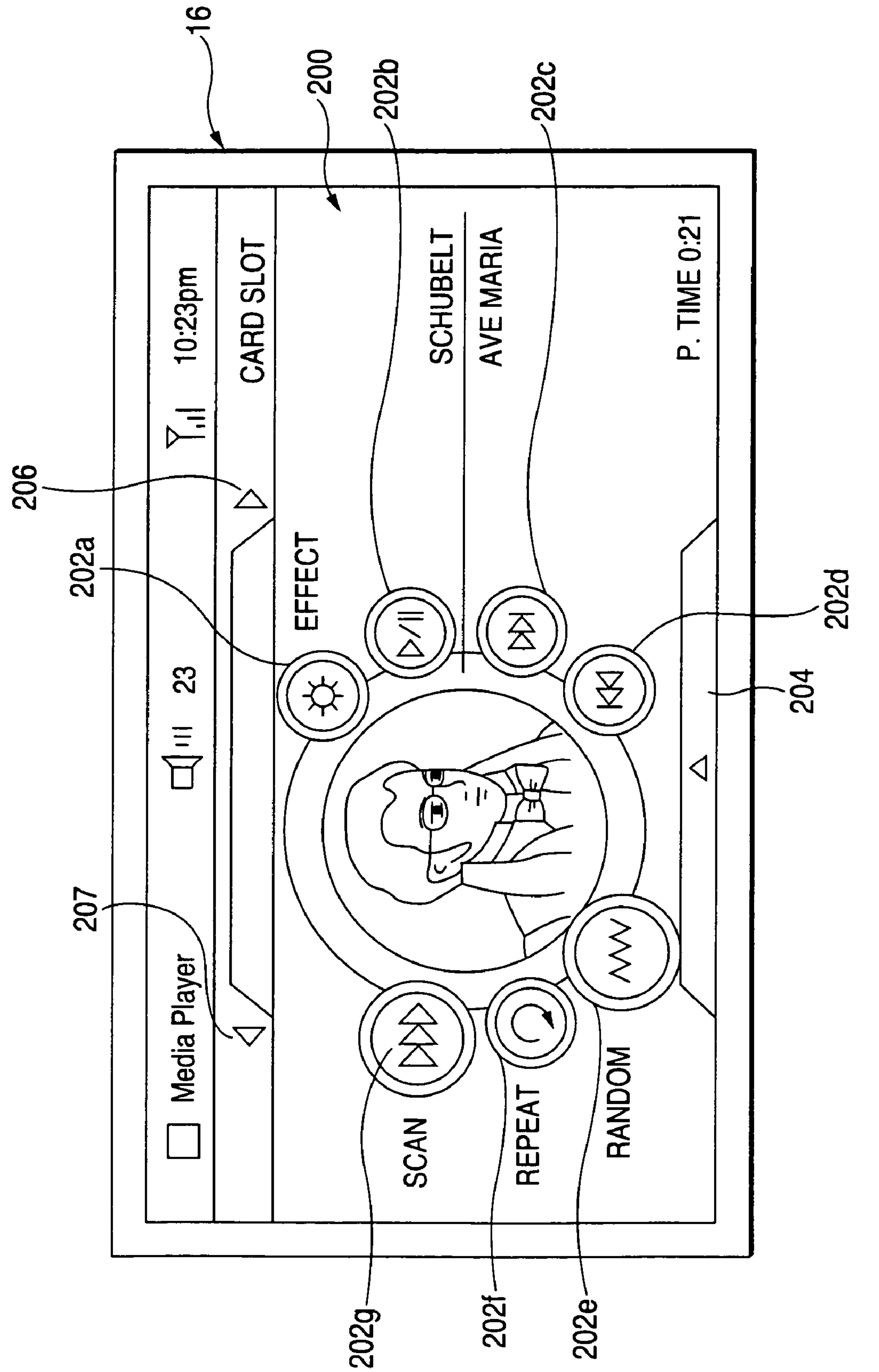
FIG. 15 is a diagram showing a media player screen (CARD SLOT) displayed in the display unit of the display control device according to the embodiment.
Figure 16:
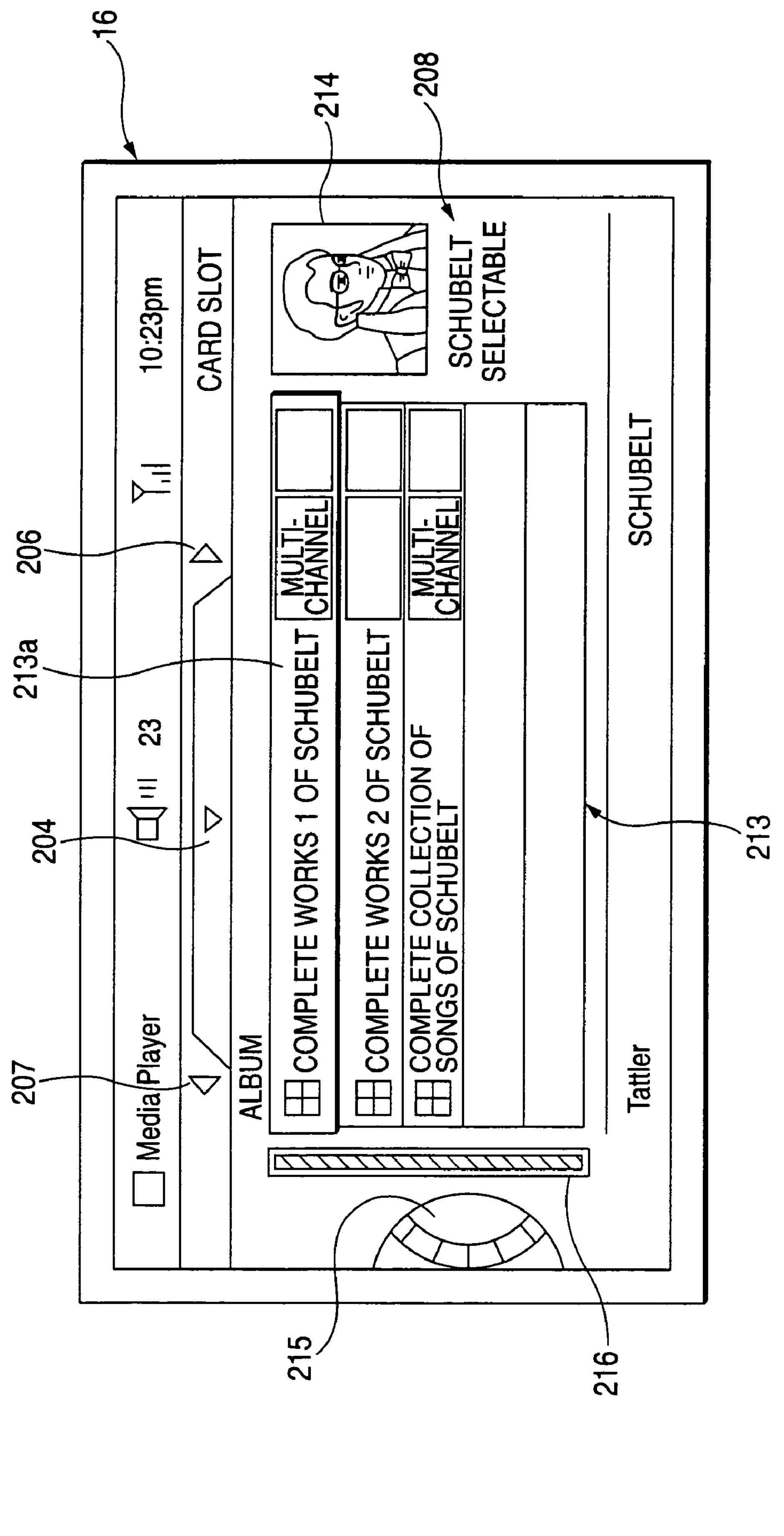
FIG. 16 is a diagram showing a screen, on which a display screen indicating the information (e.g., the album title) of the CARD SLOT is displayed on the medial player screen displayed in the display unit of the display control device according to the embodiment.

In the lower portion of the media player screen 200, there is displayed a list button 204. When the list button 21 is touched with the finger or pushed, the list button 204 moves toward the upper portion of the screen, and a display screen 205 succeeding the list button 204 is so sequentially exposed and displayed that it is pulled up (FIG. 13 and FIG. 14). On the left and right of the upper portion of the media player screen 200, there are displayed list change buttons 206 and 207. When these list change buttons 206 and 207 are touched with the finger or when the left button 22 or the right button 23 is pushed, the display at the list change button 206 is changed from "MAIN SLOT" to "CARD SLOT". When the display at the list change button 206 is changed in the state shown in FIG. 12 to "CARD SLOT", for example, the screen shown in FIG. 15 is displayed in the monitor 16. When the display at the list change button 206 is changed in the state shown in FIG. 14 to "CARD SLOT", the display screen 205 is retracted and erased from the monitor 16, and a new display screen 208 is exposed and displayed in the monitor 16 to display a screen shown in FIG. 16.

Here, the displays "MAIN SLOT" and "CARD SLOT" in the list change button 206 discriminate whether the information belongs to either information of the disk inserted into the disk insert slot 10 or the PC card inserted into the card slot 8. Here, in addition to the "MAIN SLOT" and "CARD SLOT", the music data stored in the RAM 66 and the music disk of a CD changer connected through the USB port 9 can also be selected by the list change buttons 206 and 207.

In the display screen 205, there are displayed: a list 209 indicating the title of an album recorded in the disk; a window 210 for displaying an image assigned to the focused one (a list item button. 209*a* in FIG. 14) of the list item buttons composing the list 209; a scroll dial 211; and a position bar 212. In the display screen 208, on the other hand, there are displayed: a list 213 indicating the title of the album recorded in the PC card; a window 214 indicating the image assigned to the focused one (a list item button 213*a* in FIG. 16) of the list item buttons composing the list 213; a scroll dial 215; and a position bar 216.

Figure 17:
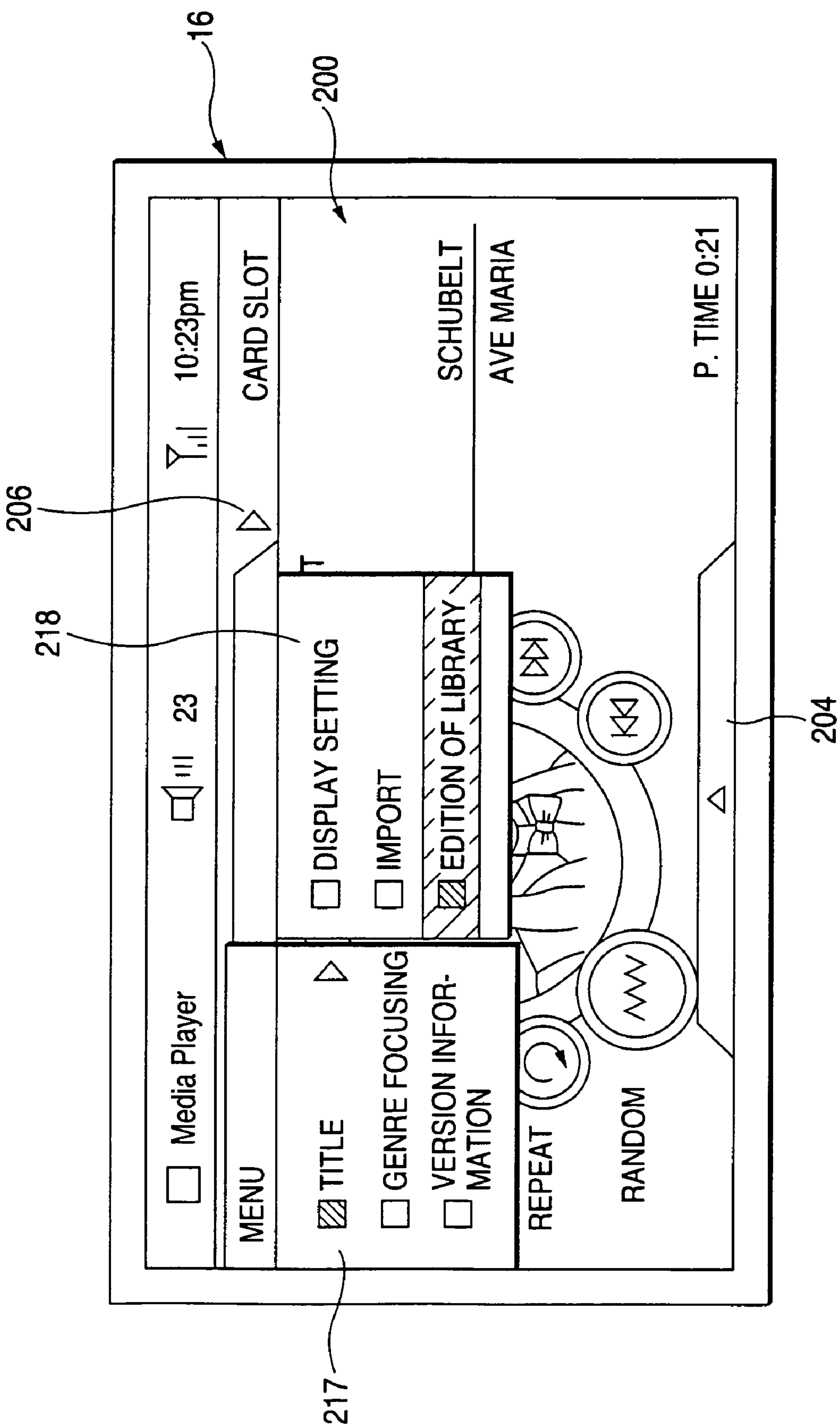
FIG. 17 is a diagram showing a screen for selecting a library edition in a pull-down menu of the media player screen displayed in the display unit of the display control device according to the embodiment.
Figure 18:
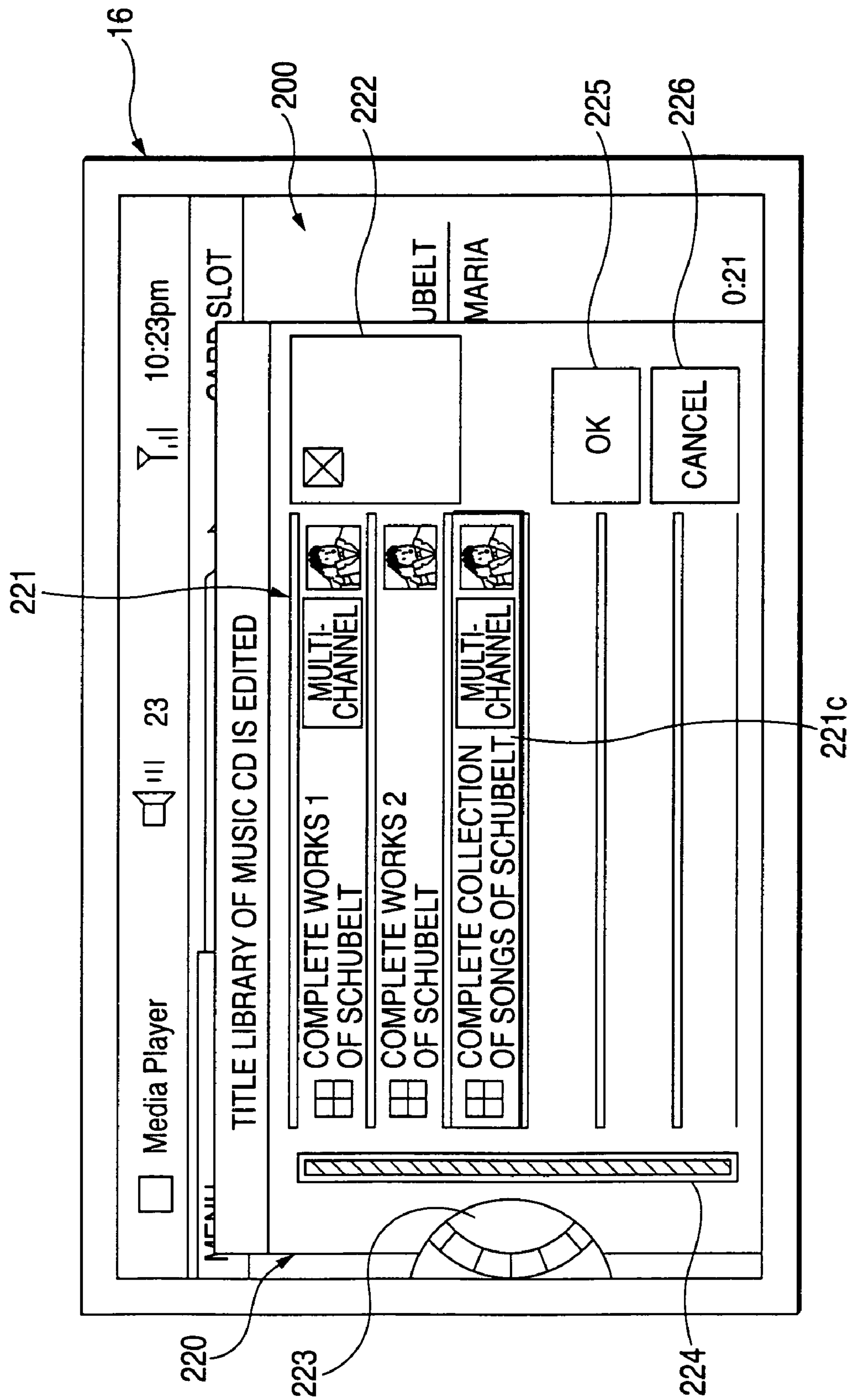
FIG. 18 is a diagram showing a screen, on which a window for editing the title library of a music CD is displayed on the media player screen displayed in the display unit of the display control device according to the embodiment.

When the operation button 17*b* (menu button) is operated with the screen of FIG. 15 being displayed, a pull-down menu 217 shown in FIG. 17 is displayed in the monitor 16. When the "EDITION OF LIBRARY" is clicked in a pull-down menu 218 in which the pull-down menu 217 is displayed hierarchically from the "TITLE", a window 220 shown in FIG. 18 is displayed over the screen of FIG. 15 in the monitor 16.

Figure 19:
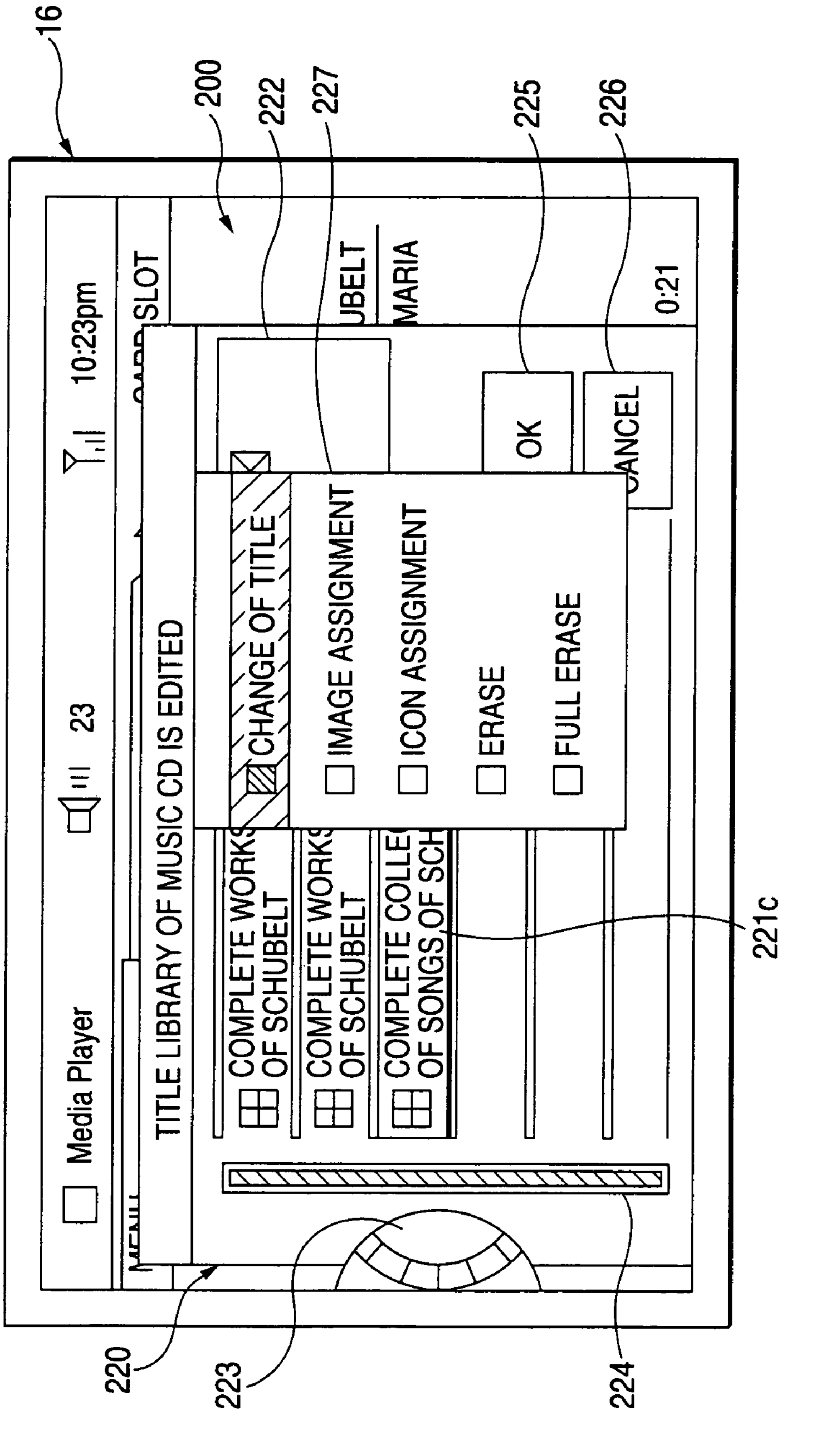
FIG. 19 is a diagram showing a media player screen displayed in the display unit of the display control device according to the embodiment, that is, a screen, on which a pop-up menu is displayed in a window for editing the title library of the music CD shown in FIG. 18.

In the window 220, there are displayed: a list 221 of the album to be edited on title; a window 222 displaying an image assigned to the focused one of the list item buttons composing the list 221; a scroll dial 223; a position bar 224; an OK button 225; and a cancel button 226. When a predetermined or longer time elapses after a list item button 221*c* was touched with the finger, a pop-up menu 227 shown in FIG. 19 is displayed in that window 220.

Figure 20:
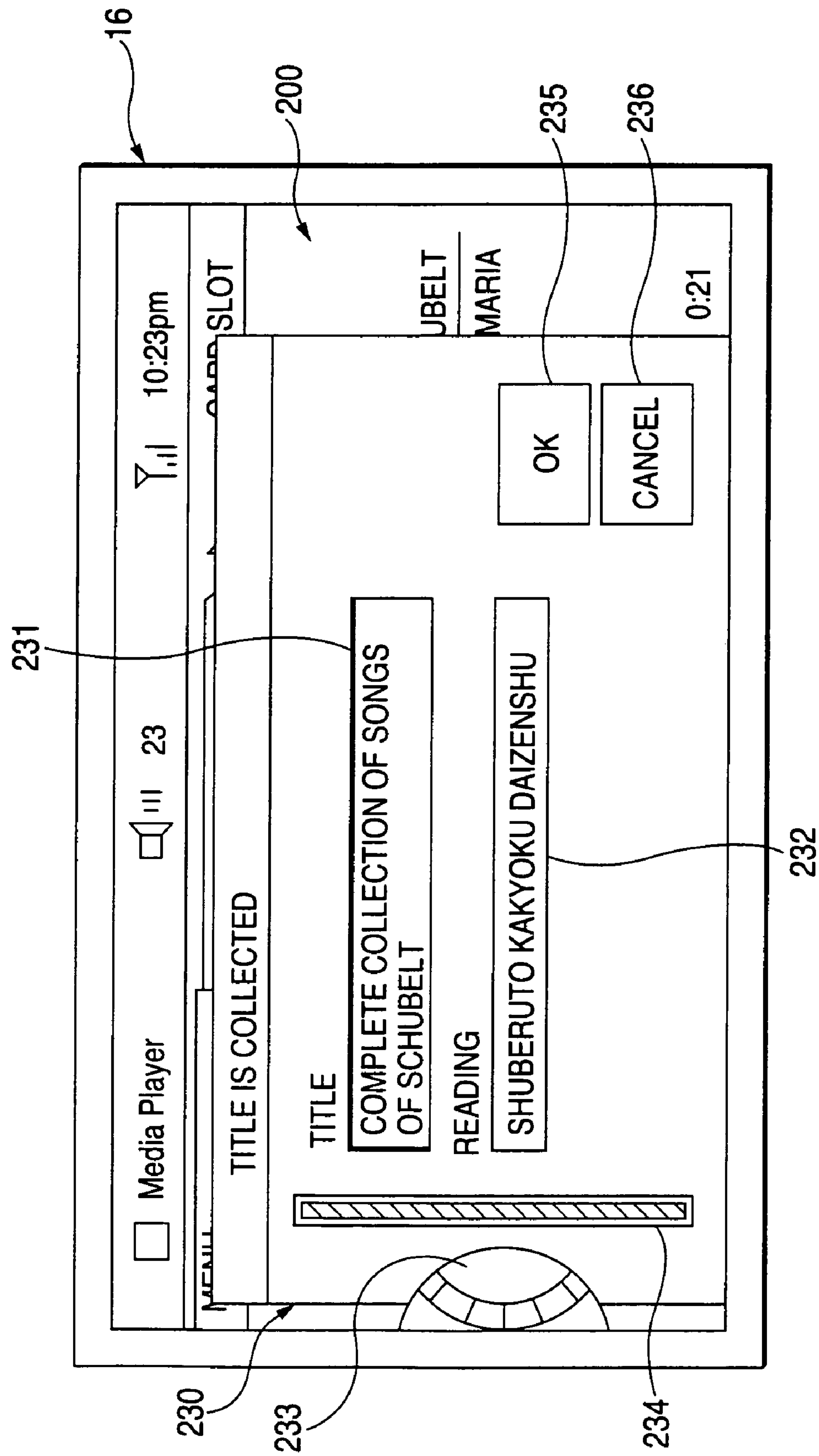
FIG. 20 is a diagram showing a media player screen displayed in the display unit of the display control device according to the embodiment, that is, a screen, on which a window for changing the title of the title library of the music CD shown in FIG. 18.
Figure 21:
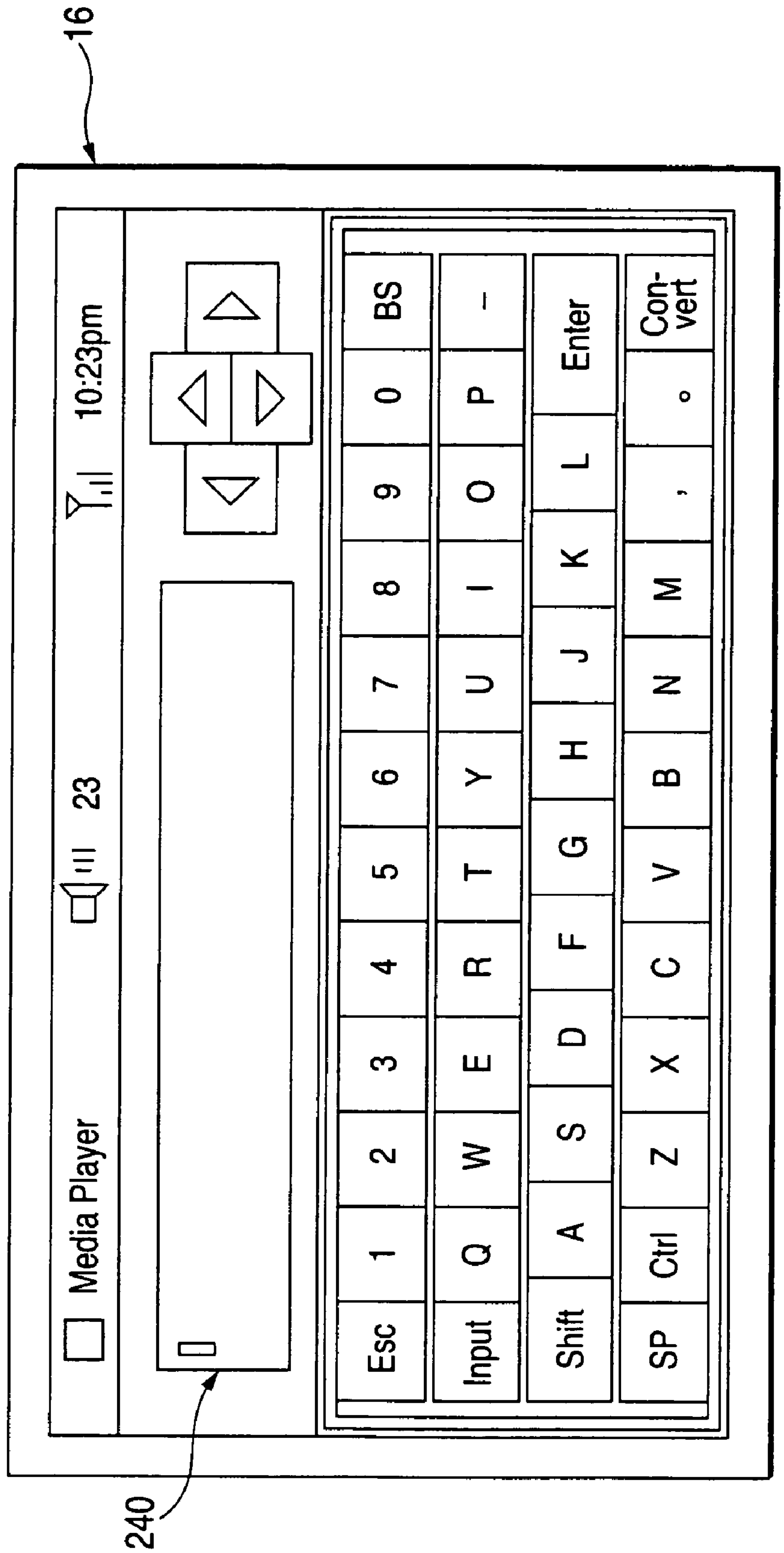
FIG. 21 is a diagram showing a keyboard screen displayed in the display unit of the display control device according to the embodiment.

When the "CHANGE OF TITLE" is selected in the pop-up menu 227, a window 230 is displayed in the monitor 16, as shown in FIG. 20, in place of the window 220. In the window 230, there are displayed: a title input column 231; a reading input column 232; a scroll dial 233; a position bar 234; an OK button 235; and a cancel button 236. When the title input column 231 or the reading input column 232 is clicked, a keyboard screen 240 shown in FIG. 21 is displayed in the monitor 16. The user is enabled to input/edit the title of the album by clicking keys in the keyboard screen 240 to input the characters.

Figure 22:
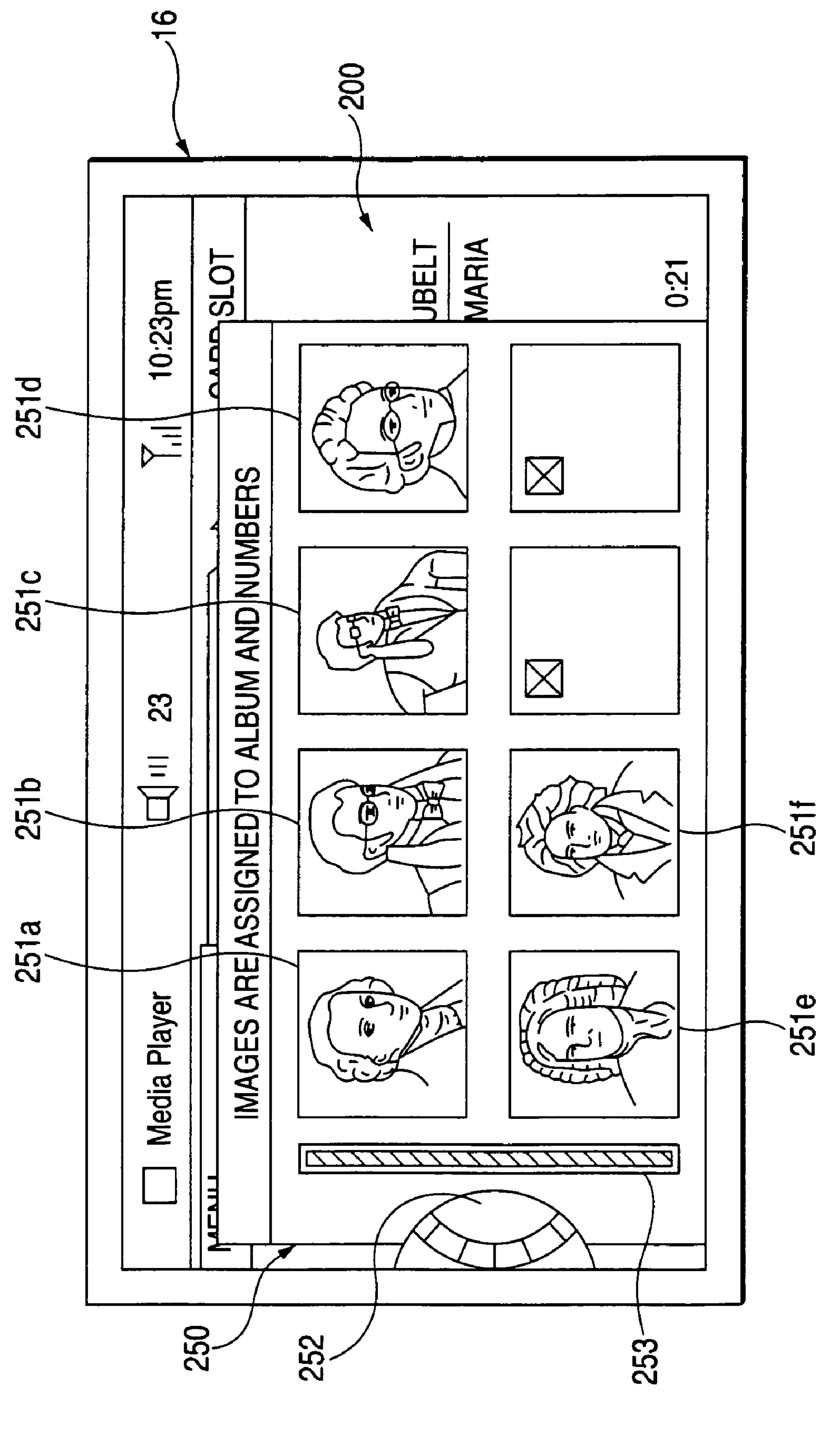
FIG. 22 is a diagram showing a media player screen displayed in the display unit of the display control device according to the embodiment, that is, a screen, on which a window for doing an image assignment of the title library of the music CD shown in FIG. 18.

When the "ASSIGNMENT OF IMAGE" is selected in the pop-up menu 227, a window 250 shown in FIG. 22 is displayed in the monitor 16. In the window 250, there are displayed: images 251*a* through 251*f* stored in advance in the flash memory 65 or the like; a scroll dial 252; and a position bar 253. When any of the images 251*a* through 251*f* is clicked, the image clicked is assigned to the selected album and is displayed in the information display portion 203, the window 22 or the like.

Figure 23:
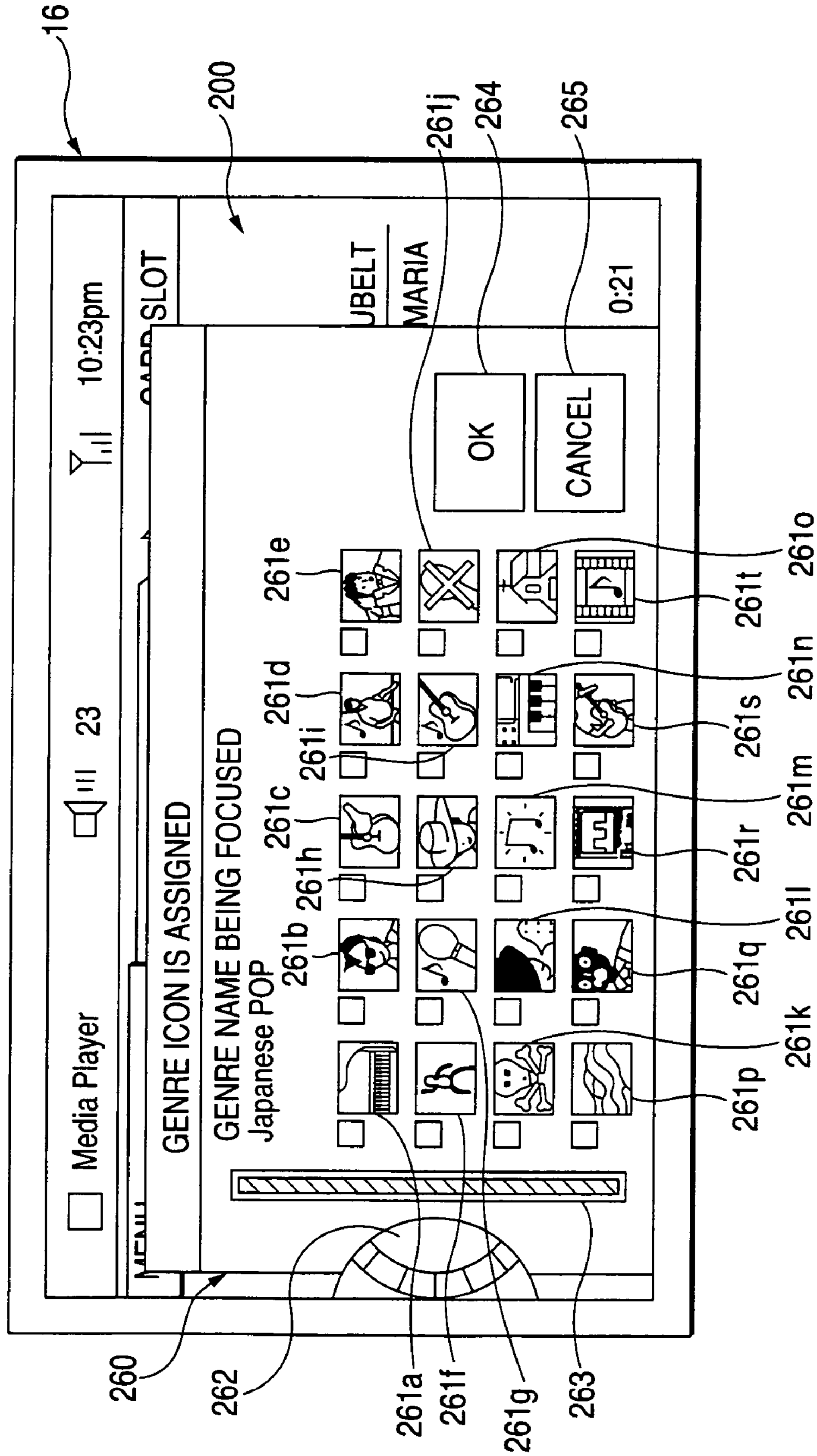
FIG. 23 is a diagram showing a media player screen displayed in the display unit of the display control device according to the embodiment, that is, a screen, on which a window for doing an icon assignment of the title library of the music CD shown in FIG. 18.

When the "ASSIGNMENT OF ICON" is selected in the pop-up menu 227, a window 260 shown in FIG. 23 is displayed in the monitor 16. In the window 260, there are displayed: genre icons 261*a* through 261*t*; a scroll dial 262; a position bar 263; an OK button 264; and a cancel button 265. When one or more of the genre icons 261*a* through 261*t* are clicked and when the OK button 264 is pushed (Each Square on the left side of the genre icon indicates whether or not the genre icon is selected.), the icon is assigned to the selected album and is displayed at the list item button or the like in the list 213.

Figure 24:
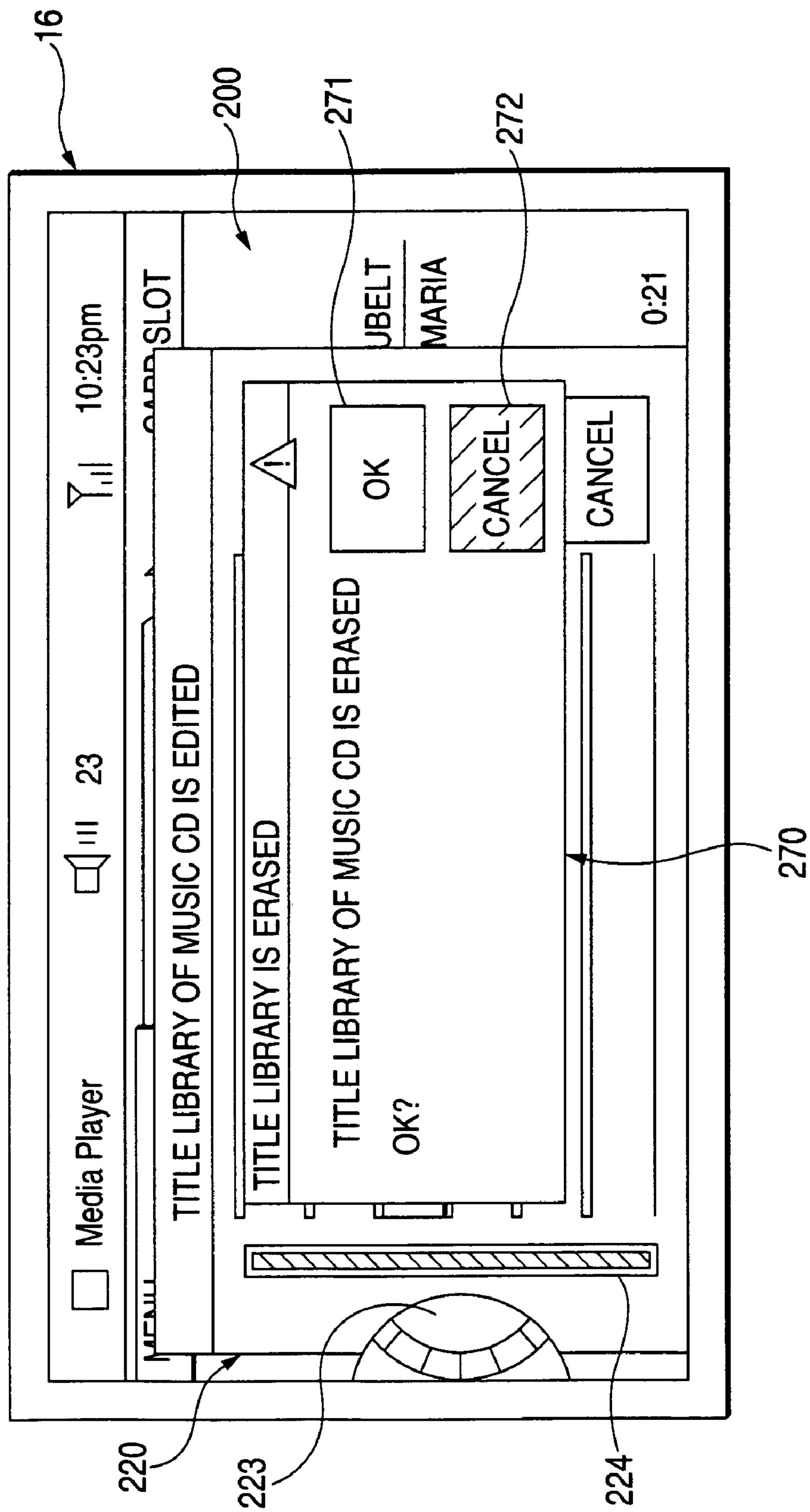
FIG. 24 is a diagram showing a media player screen displayed in the display unit of the display control device according to the embodiment, that is, a screen, on which a window for confirming whether or not the title library of the music CD shown in FIG. 18 is to be wholly erased.

When the "DELETE" is selected in the pop-up menu 227, a window 270 shown in FIG. 24 is displayed over the window 220 in the monitor 16. In the window 270, there are displayed:

the propriety for erasing the title information of the album selected; an OK button 271; and a cancel button 272. When the OK button 271 is clicked, the title information is deleted.

Figure 25:
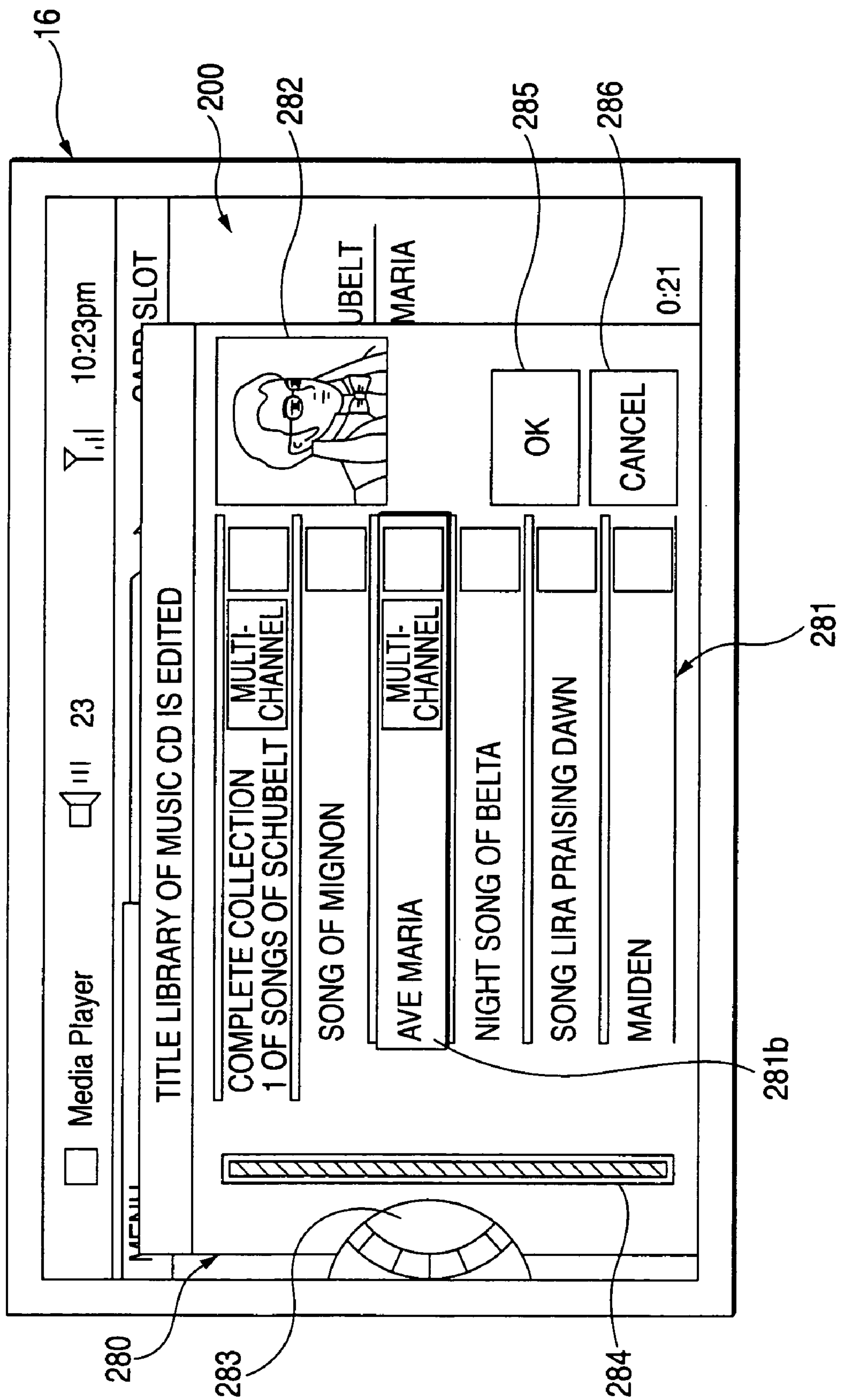
FIG. 25 is a diagram showing a media player screen displayed in the display unit of the display control device according to the embodiment, that is, a screen, on which numbers in an album are displayed in a window for editing the title library of the music CD.
Figure 26:
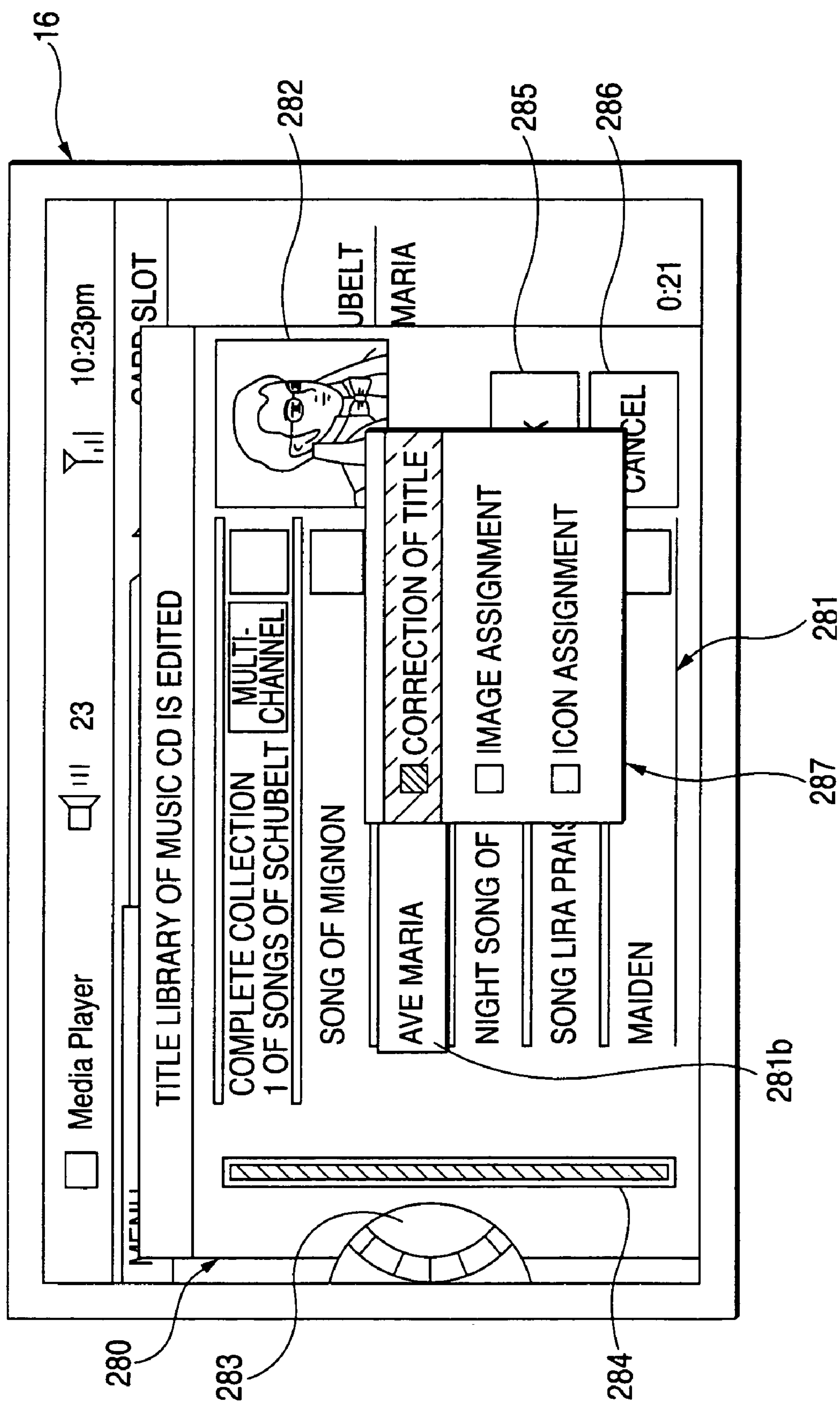
FIG. 26 is a diagram showing a media player screen displayed in the display unit of the display control device according to the embodiment, that is, a screen, on which a pop-up menu is displayed in a window for editing the title library of the music CD, i.e., in a window displaying numbers in an album.

When the list item button 221*c* is either touched with the finger within the range of the aforementioned predetermined or shorter time in the window 220 or clicked by the controller 20, on the other hand, a window 280 shown in FIG. 25 is displayed in the monitor 16. In the window 280, there are displayed: a list 281 of specific number names contained in the selected album; a window 282 indicating the image assigned to the focused one of the list item buttons composing the list 281; a scroll dial 283; a position bar 284; an OK button 285; and a cancel button 286. When a list item button 281*b*, for example, is either touched with the finger within the range of the aforementioned predetermined or shorter time in the window 280 or clicked by the controller 20, the screen of FIG. 15 is displayed in the monitor 16, and the selected number is reproduced. When a predetermined or longer time elapses after the list item button 281*b* was touched with the finger, on the other hand, a pop-up menu 287 shown in FIG. 26 is displayed. However, the detail of the pop-up menu 287 will not be described because it is similar to that of the aforementioned pop-up menu 227.

Figure 27:
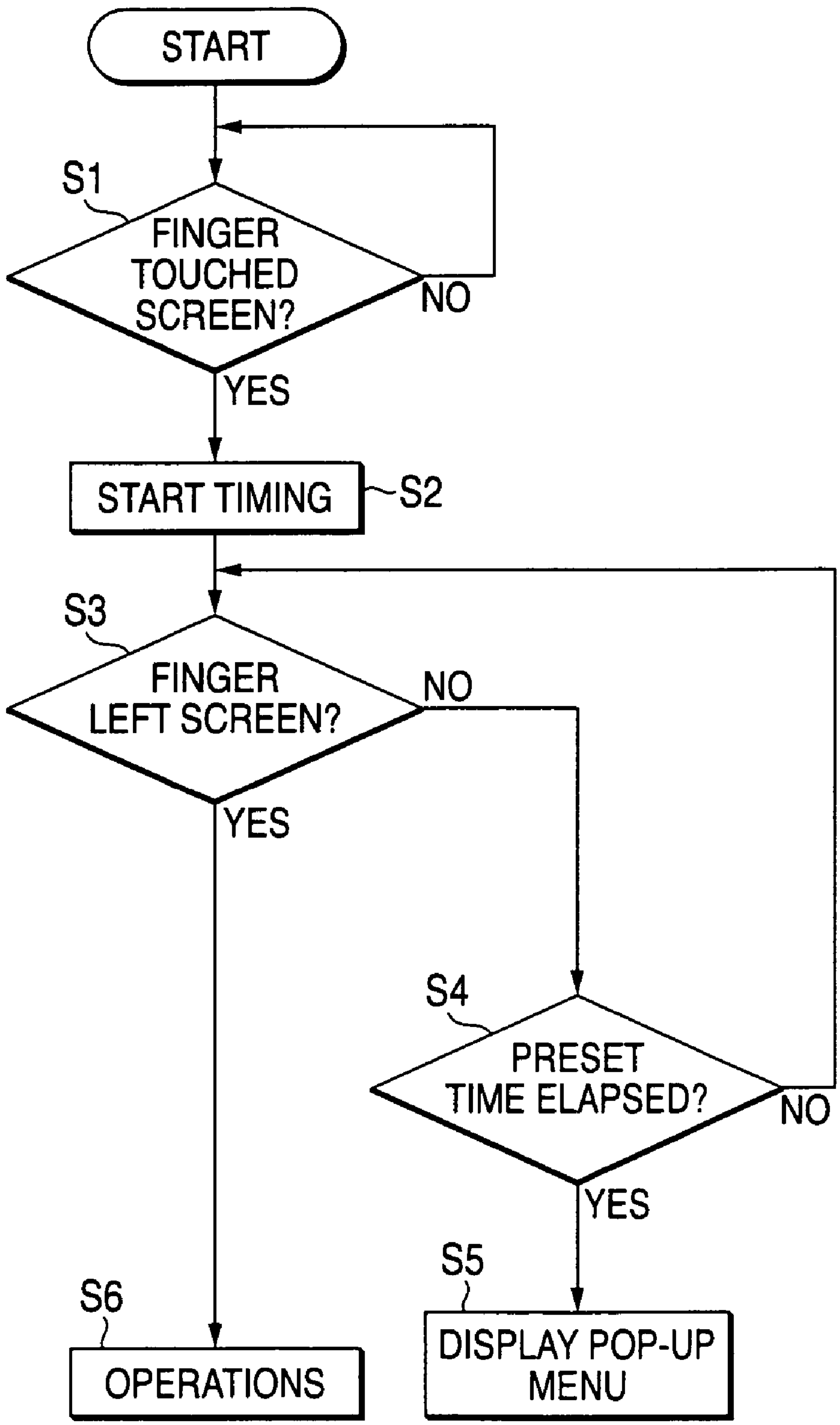
FIG. 27 is a flow chart showing a procedure for displaying a pop-up menu on a monitor screen in the display control device according to the embodiment.

Here, in case the display changes with the time period for which the finger touches, as described above, the CPU 64 performs the procedure shown in FIG. 27. Specifically, it is judged first of all (at Step S1) by the touch key sensor 52 whether or not the screen is touched with the finger. If the answer is YES, the timing is started by the timer 54 (at Step S2). Then, it is judged by the touch key sensor 52 (at Step S3) whether or not the finger has left the screen. If the answer is NO, it is judged by the timer 54 (at Step S4) whether or not the aforementioned predetermined time (e.g., about 1 second) elapses. If the answer is YES, the pop-up menu is displayed in the monitor 16 (at Step S5). If the predetermined time does not elapse, on the other hand, the routine returns again to Step 3, at which it is judged whether or not the finger has left the screen. If the finger has left the screen before lapse of the predetermined time, there is executed the intrinsic operation (at Step S6), which is done when that portion of the screen is clicked.

Figure 28:
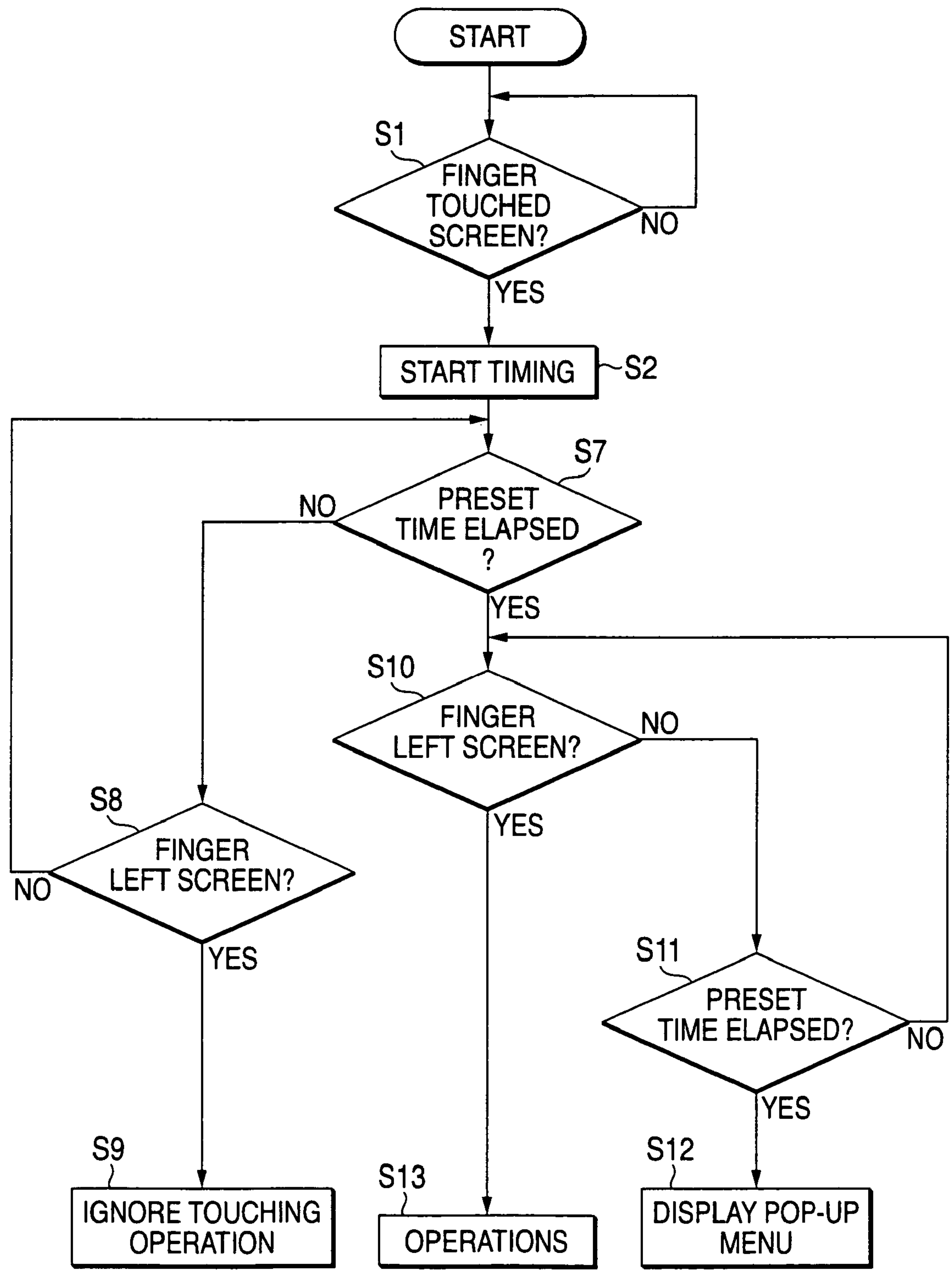
FIG. 28 is another flow chart showing a procedure for displaying the pop-up menu on a monitor screen in the display control device according to the embodiment.

In order to prevent an erroneous action by the touch, moreover, the CPU 64 may perform the procedure shown in FIG. 28. In the procedure, after Step S1 and Step S2 of FIG. 27, it is judged by the timer 54 (at Step S7) whether or not a shorter predetermined time (e.g., about 0.1 seconds for judging whether or not the touch is intentional. If the touch is shorter than that time, the CPU 64 judges that the touch is not intentional. The time will be called the "judgment time", as discriminated the aforementioned "predetermined time") than the aforementioned predetermined time. If the answer is NO, it is judged by the touch sensor 52 (at Step S8) whether or not the finger has left the screen. If the finger has left at the stage, the procedure is ended (at Step S9) by judging that the touch is erroneous. If the touch is continued, the routine returns again to Step S7, at which it is judged whether or not the judgment time elapses. If it is judged at Step S7 that the judgment time elapses, the CPU 64 judges it by the touch key sensor 52 (at Step S10) whether or not the finger has left the screen. If the answer NO, there is executed (at Step S11) the same decision of time lapse as that of Step S4. If the answer of Step S11 is YES, the pop-up menu is displayed in the monitor 16 (at Step S12). If the predetermined time does not elapse, the routine returns again to Step S10, at which it is judged whether or not the finger has left the screen. IF the finger leaves the screen before lapse of the predetermined time, there is executed the intrinsic operation (at Step S13), which is done when that portion of the screen is clicked.

Figure 29:
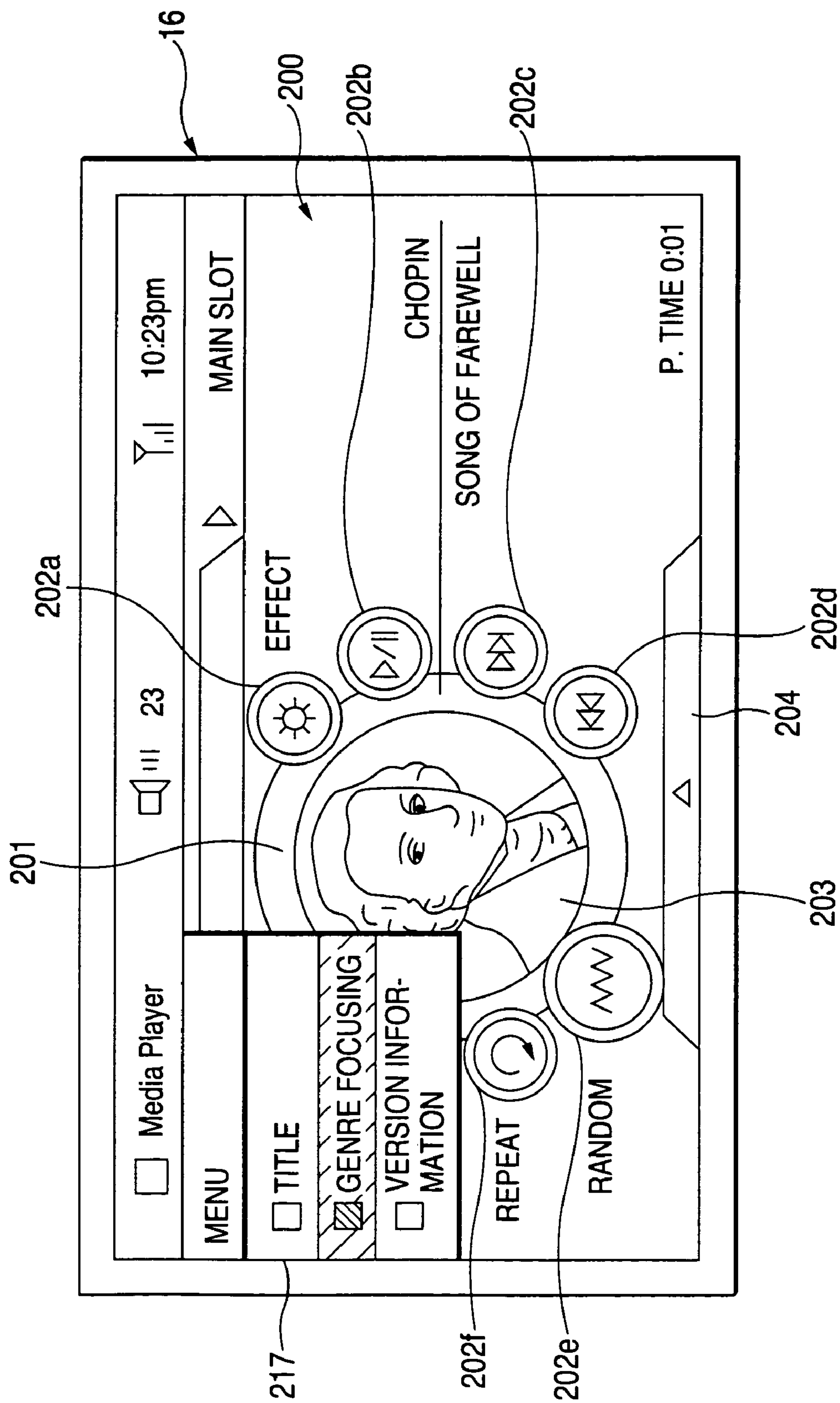
FIG. 29 is a diagram showing a media player screen displayed in the display unit of the display control device according to the embodiment, that is, a screen at the time when a genre focusing of the pull-down menu is selected.
Figure 30:
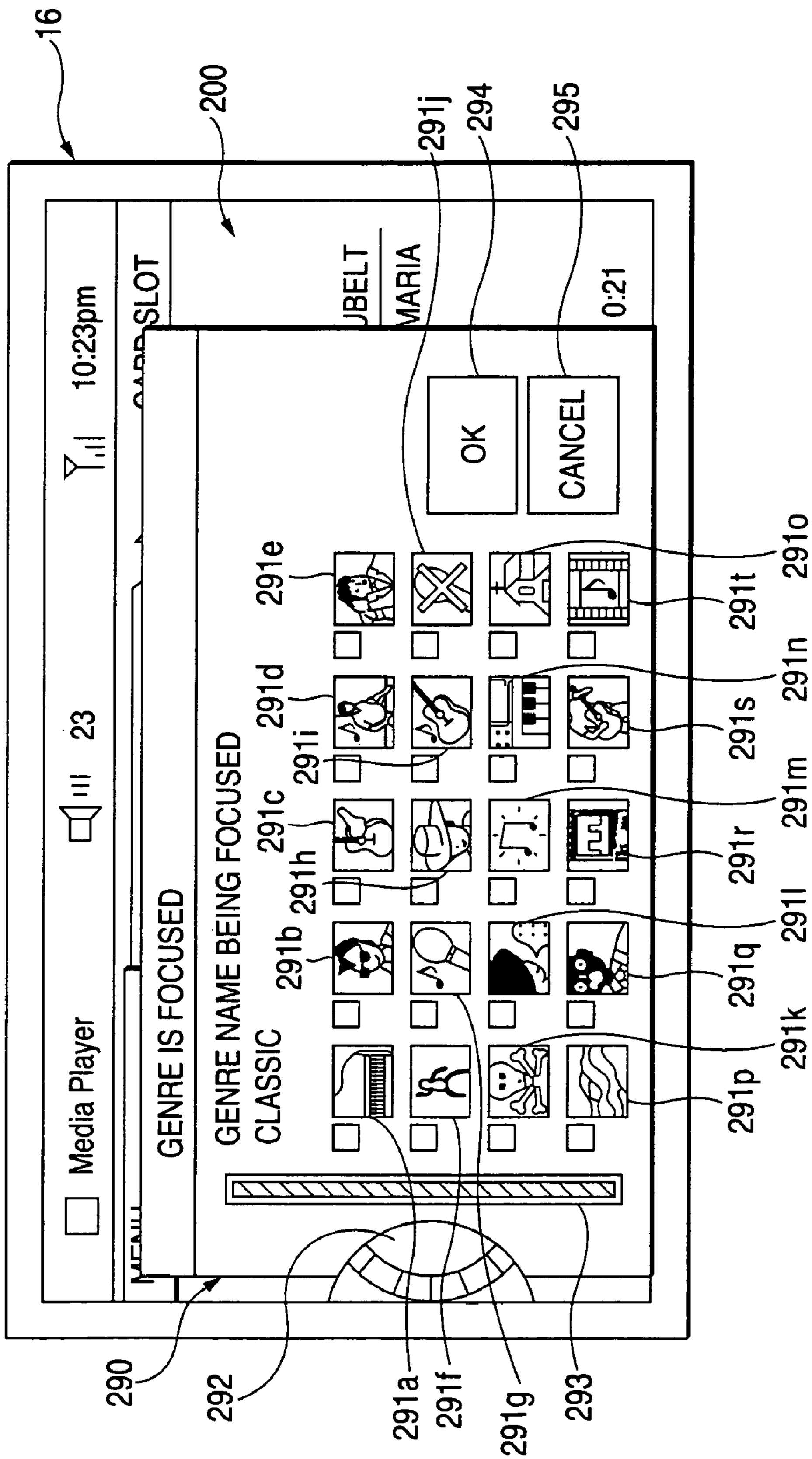
FIG. 30 is a diagram showing a media player screen displayed in the display unit of the display control device according to the embodiment, that is, a screen, on which a window for doing the genre focusing is displayed.
Figure 31:
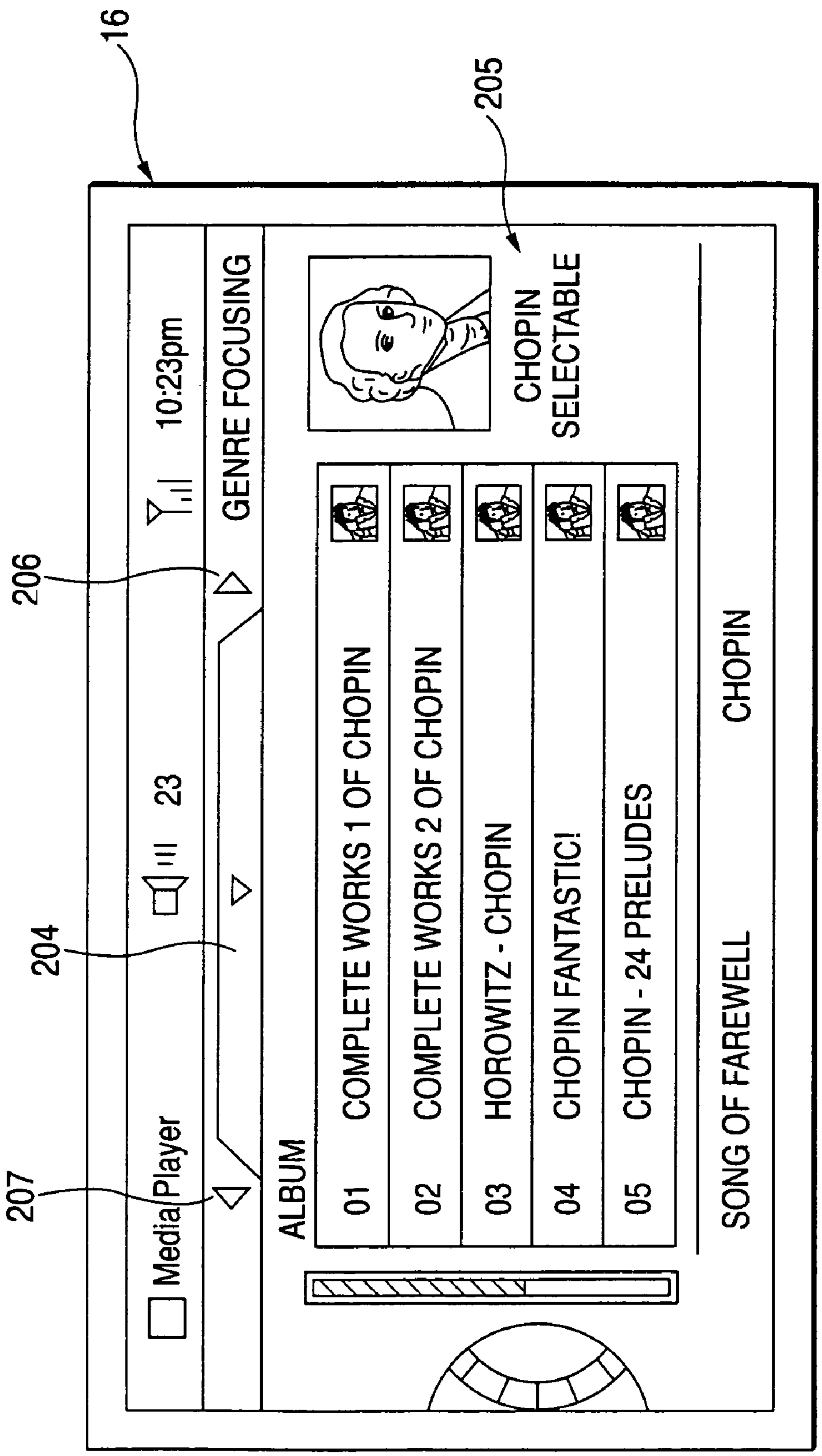
FIG. 31 is a diagram shown in FIG. 30 and showing the screen of a display screen, which is displayed in case a focusing is done by classics.
Figure 32:
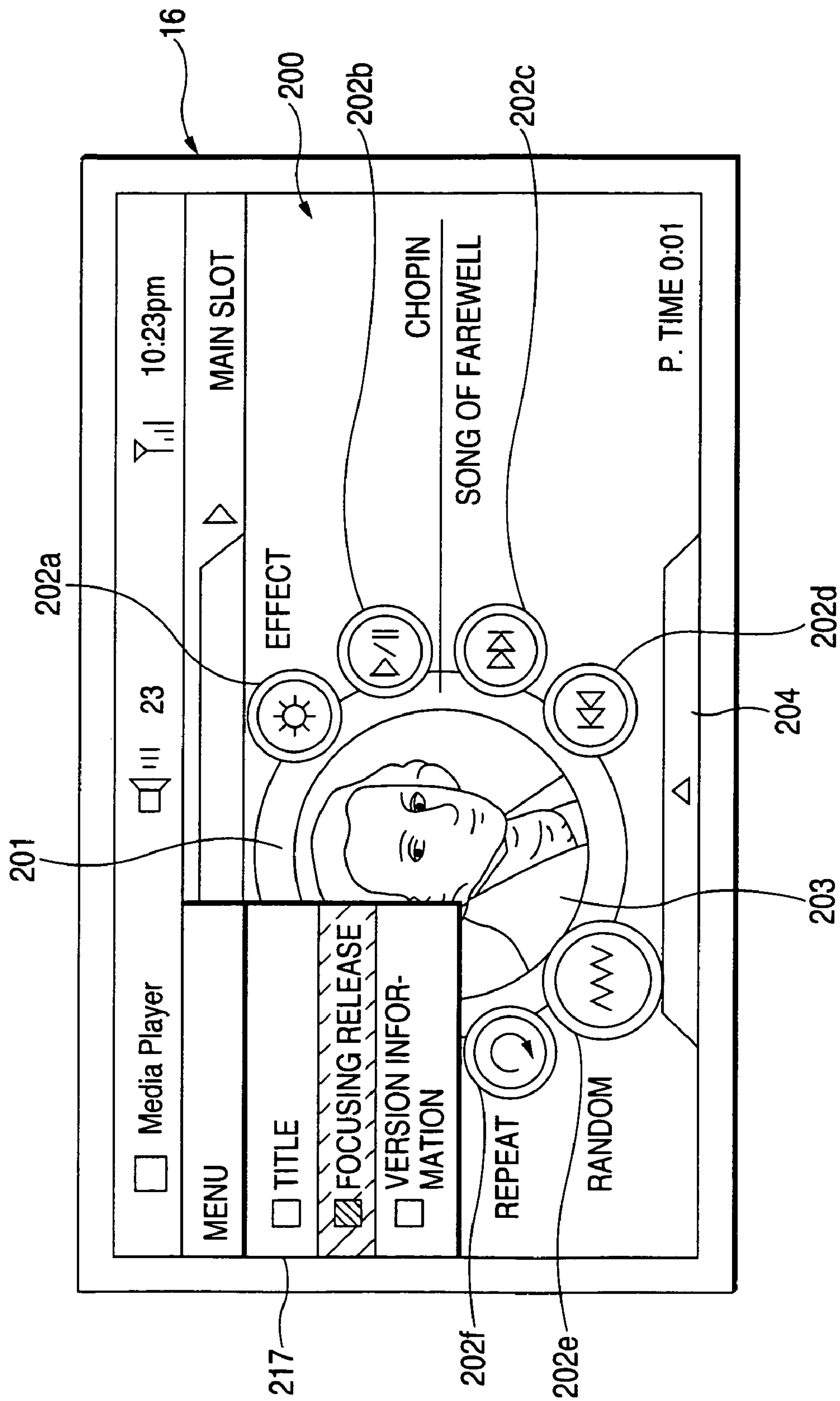
FIG. 32 is a diagram showing a media player screen displayed in the display unit of the display control device according to the embodiment, that is, a screen at the time when a genre focusing release of the pull-down menu is selected.

Here will be described the case, in which the "GENRE FOCUSING" is clicked in the aforementioned pull-down menu 217, as shown in FIG. 29. At this time, there is displayed in the monitor 16 a window 290, as shown in FIG. 30, in which there are displayed: genre icons 291*a* through 291*t*; a scroll dial 292; a position bar 293; an OK button 294; and a cancel button 295. When one or more of the genre icons 291*a* through 291*t* are clicked and when the OK button 294 is pushed (Each Square on the left side of the genre icon indicates whether or not the genre icon is selected.), the album or number, to which the genre icon is assigned, is retrieved, and the retrieved album or number is displayed in the monitor as in FIG. 14 (or FIG. 16). At this focusing time, the contents of the pull-down menu 217 are shown in FIG. 32. Therefore, the focusing is released by clicking the "FOCUSING RELEASE".

Figure 33:
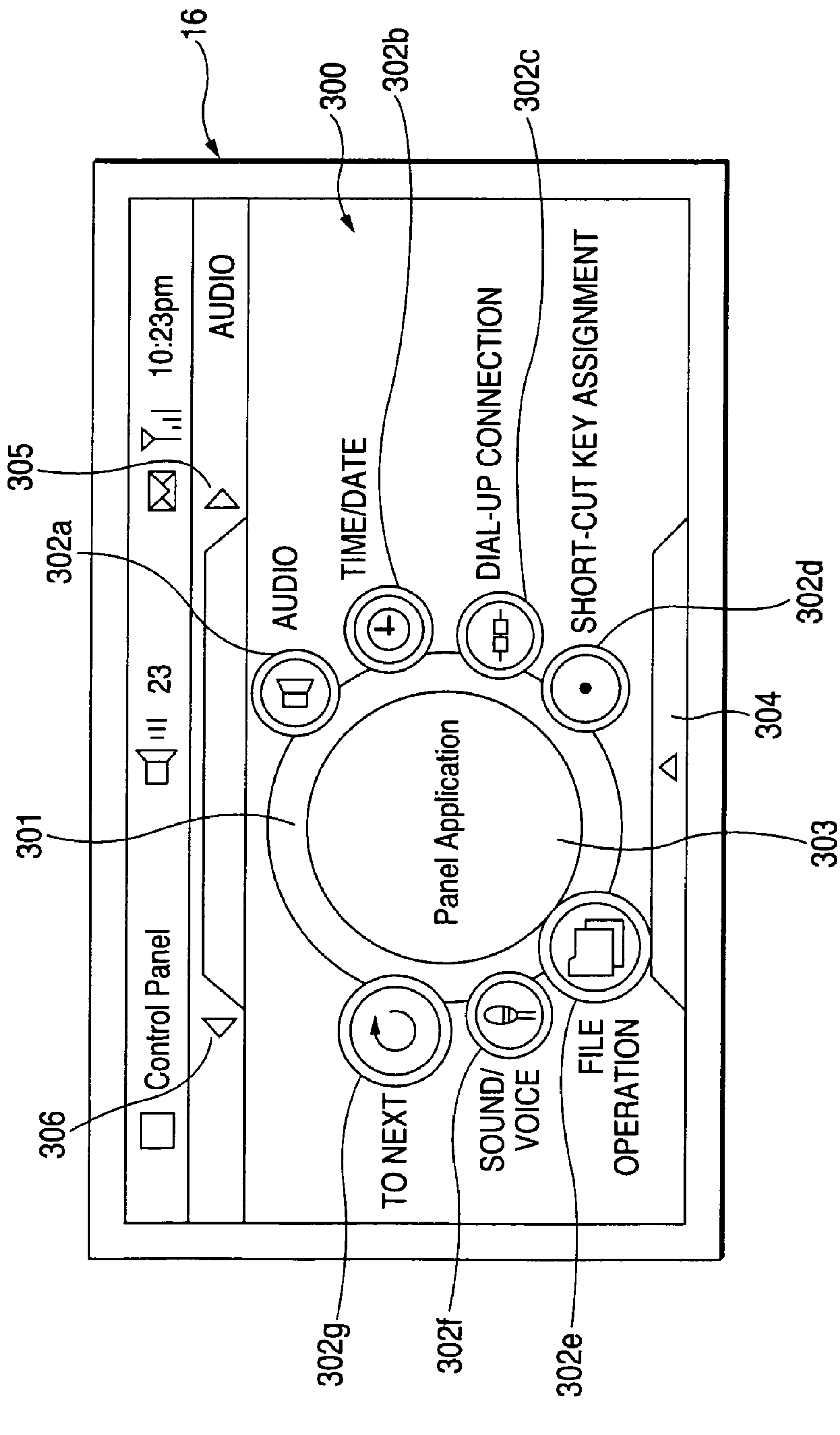
FIG. 33 is a first diagram showing a control screen, which is displayed in the display unit of the display control device according to the embodiment.

When the icon 102*e* is selected in the start menu screen 101, a control panel screen 300, as shown in FIG. 33, is displayed in the monitor 16. In the control panel screen 300, there are displayed: a base ring 301 arranged on the left side rather than the screen center; and satellite buttons 302*a* to 302*g* arranged along and around the base ring 301. The base ring 301 is provided therein with an information display portion 303.

Figure 34:
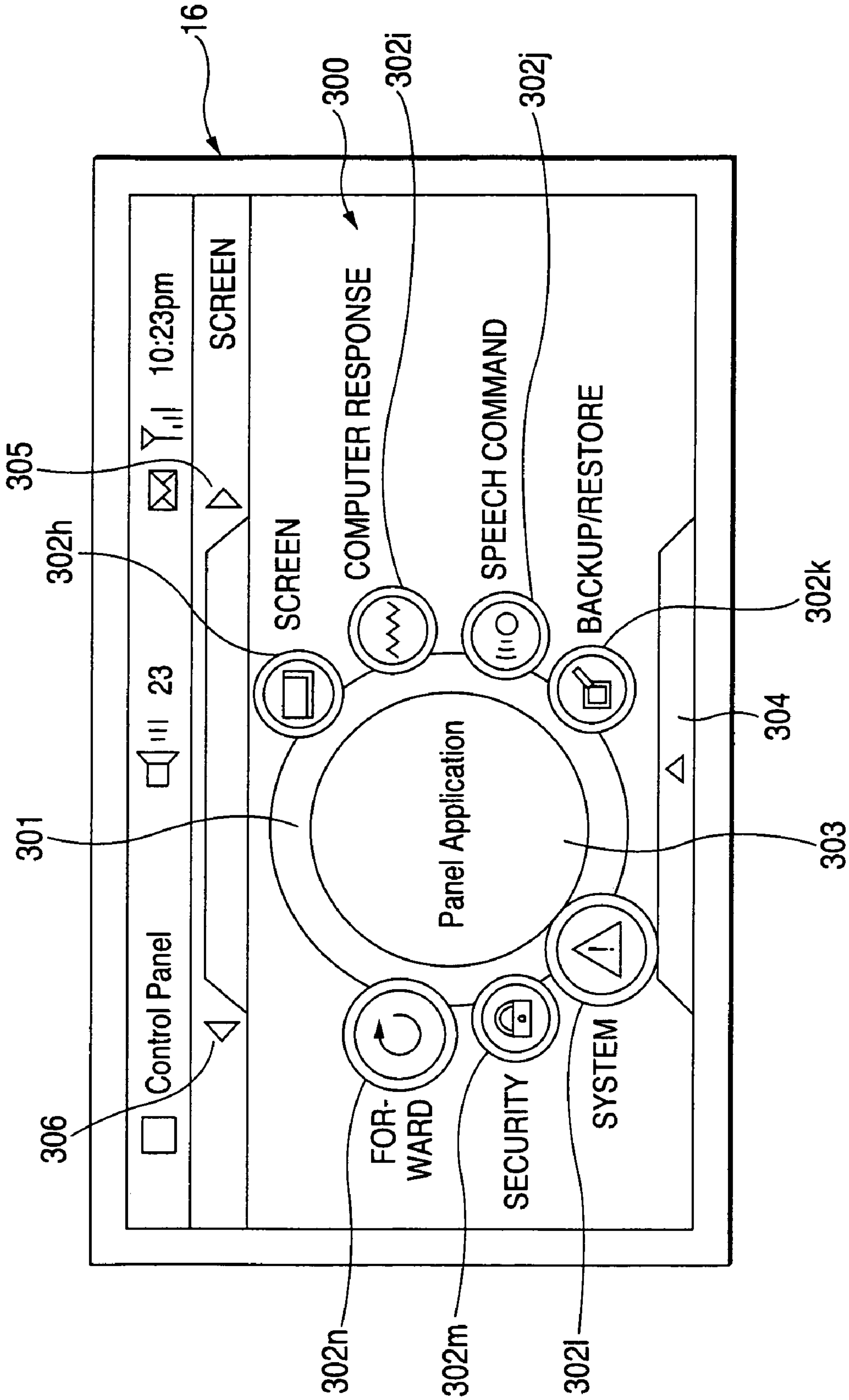
FIG. 34 is a second diagram showing a control screen, which is displayed in the display unit of the display control device according to the embodiment.

The satellite buttons 302*a* to 302*g* indicate the indexes of items to be set in the control panel screen 300 and are arranged on the left and right sides on the circumference of the base ring 301. The satellite button group on the right side includes: the satellite button 302*a* for setting the audio; the satellite button 302*b* for setting the time/date; the satellite button 302*c* for setting the dial-up connection; and the satellite button 302*d* for assigning the short-cut key. On the other hand, the satellite button group on the left side includes: the satellite button 302*e* for setting the file operation; the satellite button 302*f* for setting the sound/voice; and the satellite button 302*g* having the "TO NEXT". The number of the indexes of the necessary set items (i.e., the number of satellite buttons) is twelve (as referred to the following Table 1). In relation to the size of the monitor 16, however, it is difficult to display the twelve satellite buttons in one screen. In the control panel screen 300, therefore, there are prepared a first screen, as shown in FIG. 33, and a second screen, as shown in FIG. 34. The twelve satellite buttons are divided and displayed in the first screen and the second screen. The satellite button 302*g* is used for switching the first screen to the second screen.

Figure 35:
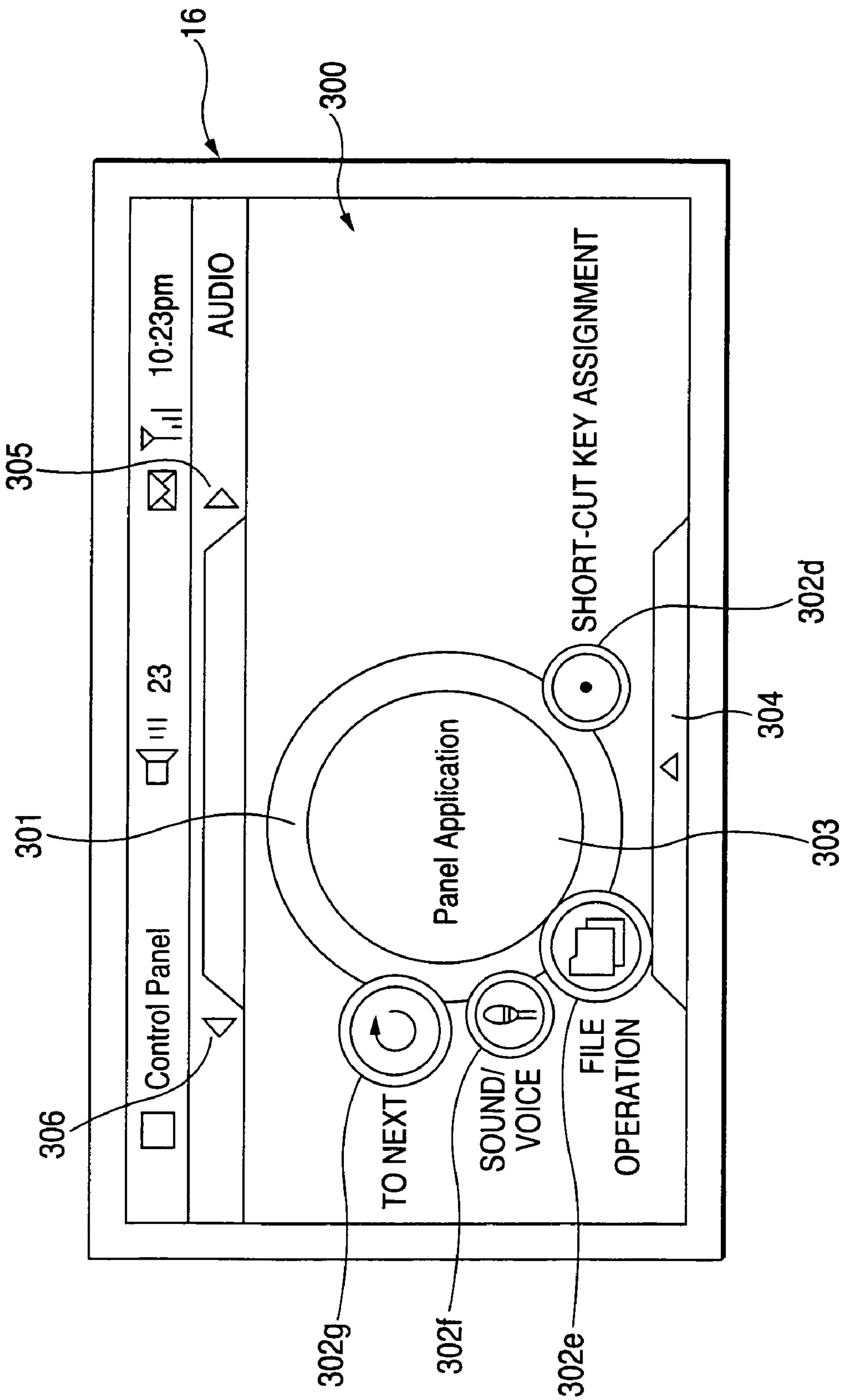
FIG. 35 is a diagram showing the behavior, in which the satellite buttons disappear from the control screen shown in FIG. 33.
Figure 36:
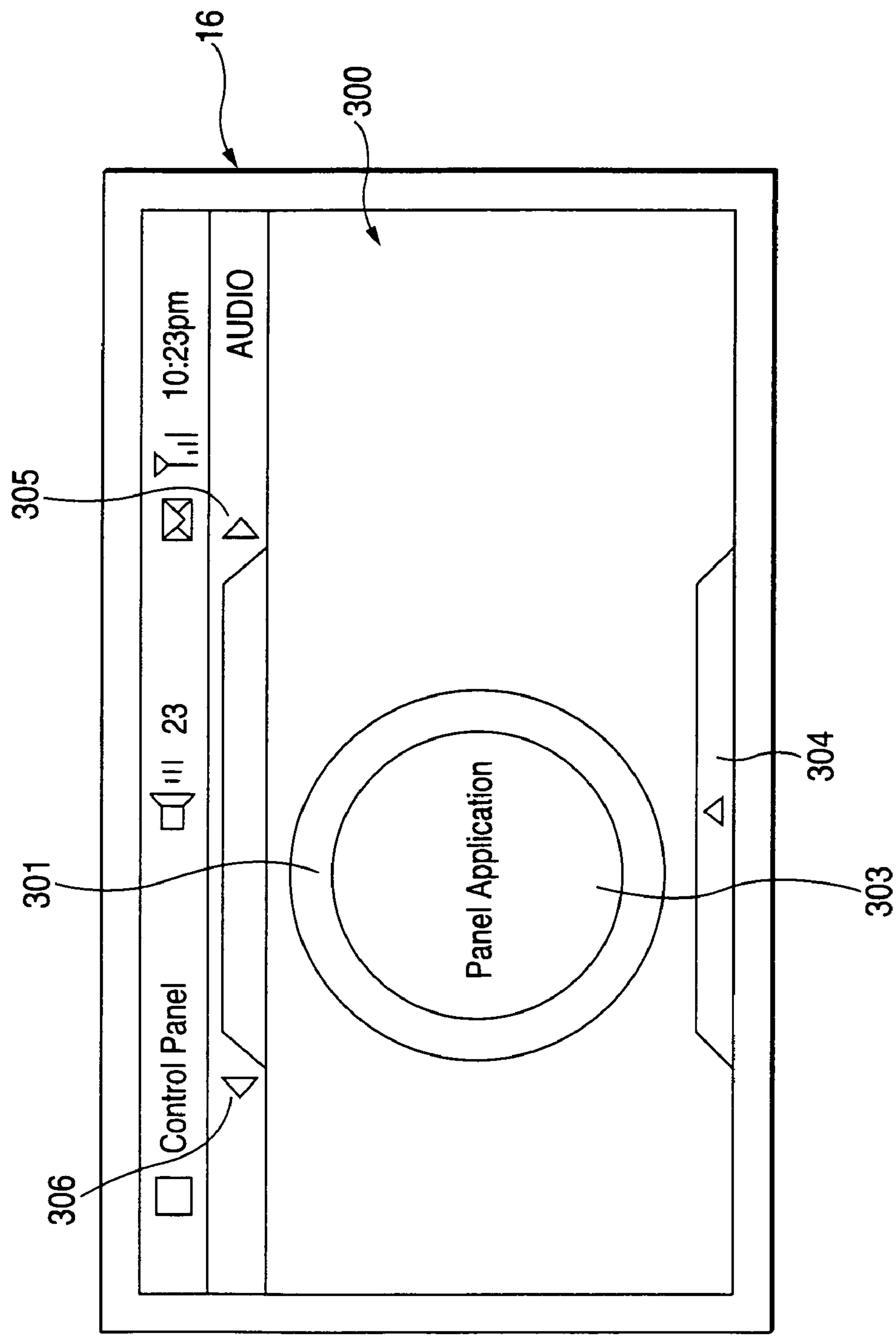
FIG. 36 is a diagram showing the behavior, in which the satellite buttons have disappeared from the control screen shown in FIG. 33.
Figure 37:
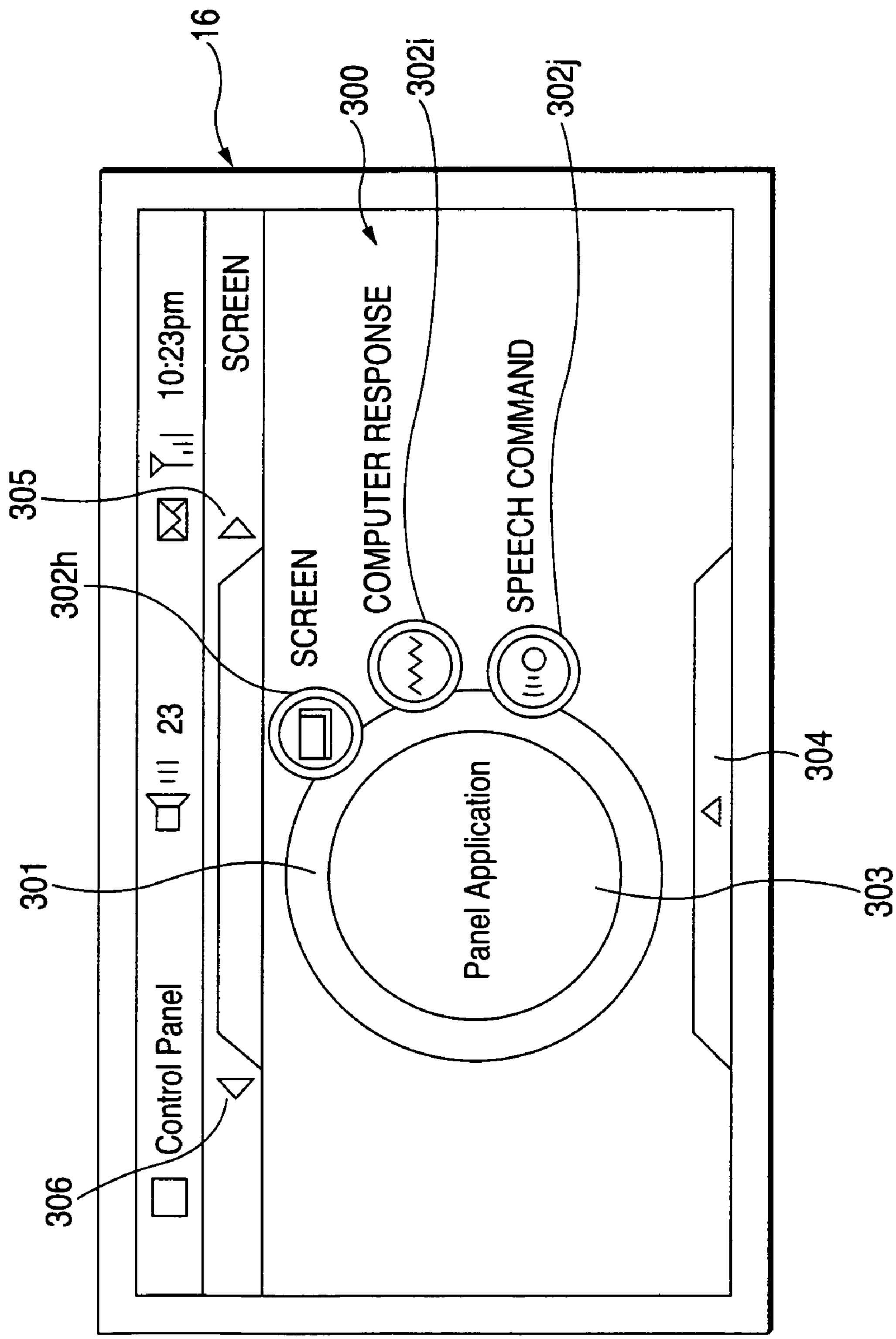
FIG. 37 is a diagram showing the behavior, in which the satellite buttons are displayed on the control screen shown in FIG. 34.

When the satellite button 302*g* is clicked, the satellite buttons 302*a* to 302*g* and the corresponding character rows are erased sequentially clockwise from the satellite button 302*a* (FIG. 35). After all the satellite buttons are once erased completely (FIG. 36), new satellite buttons 302*h* to 302*n* and corresponding character rows are displayed sequentially clockwise from the satellite button 302*h* (FIG. 37), and the second screen shown in FIG. 34 is displayed. However, the mode of rewriting the satellite buttons should not be limited to aforementioned one. As at the time of starting the application, as has been described by taking the radio screen 150 as an example, the satellite buttons and the corresponding character rows need neither be erased nor displayed at the same time. After all the satellite buttons 302*a* to 302*g* were erased, for example, the corresponding character row such as the "AUDIO" may be erased. Alternatively, after all the satellite buttons 302*h* to 302*n* were erased, the corresponding character row such as the "SCREEN" may be displayed.

The satellite buttons 302*h* to 302*n* are arranged like the satellite buttons 302*a* to 302*g* on the circumference of the base ring 301 separately on the left and right sides. The satellite button group on the right side includes: the satellite button 302*h* for setting the screen; the satellite button 302*i* for setting the computer response; the satellite button 302*j* for setting the speech command; and the satellite button 302*k* for setting the backup restore. On the other hand, the satellite button group on the left side includes; the satellite button 302*m* for setting the security; and the satellite button 302*n* indicating the "FORWARD". The satellite button 302*n* is used when the control panel screen 300 is switched from the second screen to the first screen. At this switching time, the erasures of the satellite buttons 302*h* to 302*n* and the displays of the satellite buttons 302*a* to 302*g* are similar to those at the time when the screen is switched from the first one to the second one. Here, the button to be used for switching the first screen and the second screen need not always be provided as the satellite button but may be prepared as another dedicated one.

Figure 38:
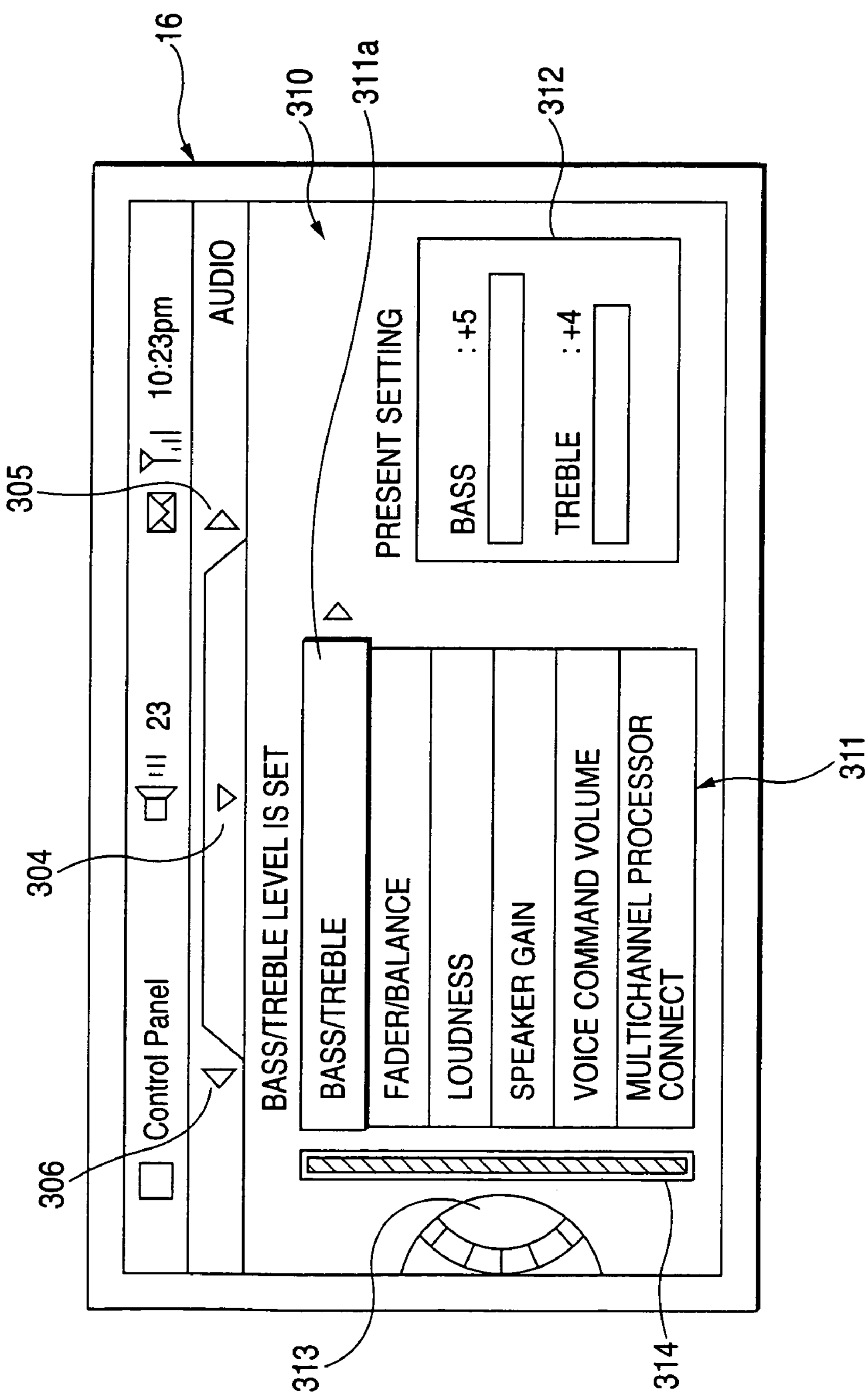
FIG. 38 is a diagram showing a screen, on which a bass/treble setting item of an audio setting screen is focused in the control screen displayed in the display unit of the display control device according to the embodiment.

A list button 304 is displayed in the lower portion of the control panel screen 300, and list change buttons 305 and 306 are displayed on the left and right sides of the upper portion. In the list change button 305, there is displayed the same character row as those attached to the satellite buttons 302*a* to 302*n*. When the list change button 305 or the remote control unit 19 is clicked, the satellite button at the position of the cursor changes clockwise, and the display in the list change button 305 changes accordingly. When the list change button 306 or the remote control unit 19 is clicked, the satellite button at the position of the cursor changes clockwise, and the display in the list change button 305 also changes accordingly. When the list button 304 is clicked with the cursor is positioned at a satellite button (excepting the satellite buttons 302*g* and 302*n*), when the enter is pushed in that state or when the satellite button is touched with the finger, the display screen is displayed. When the list button 304 is clicked with the cursor is positioned at the satellite button 302*a*, when the return button is pushed or when the satellite button 302*a* is touched with the finger, a display screen 310 is exposed and displayed, as shown in FIG. 38.

Items for setting the audio are longitudinally displayed in a list on the display screen 310. A scroll dial 313 and a position bar 314 are disposed on the left side of the display screen 310, and a window 312 for displaying the set contents of a list item button 311, at which the cursor is positioned, is disposed on the right side of the display screen 310. In FIG. 38, a list item button 311*a* for the bass/treble is selected with the cursor so that the preset set contents of the bass/treble are displayed in the window 312.

Figure 39:
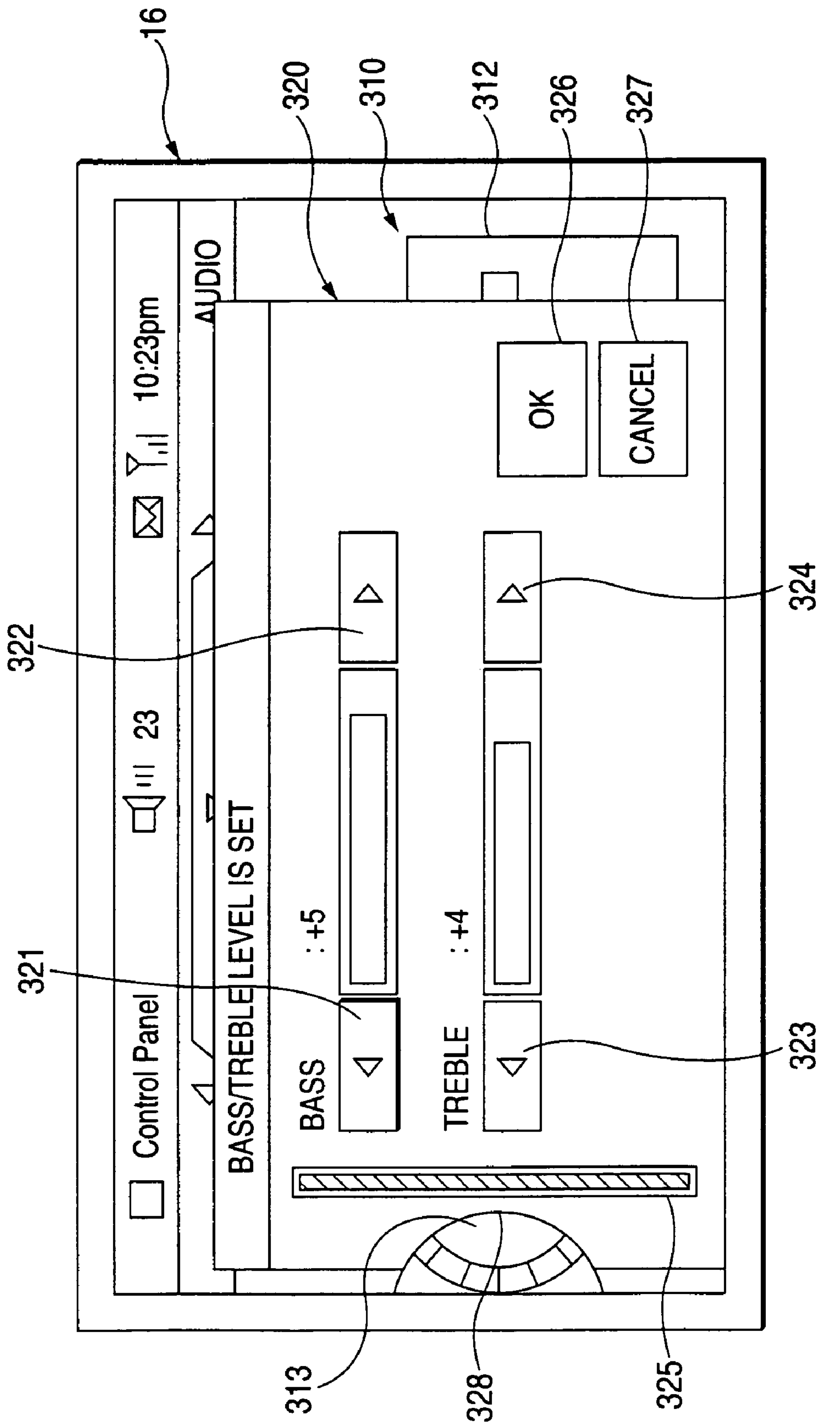
FIG. 39 is a diagram showing a screen, on which a window for setting the bass/treble level is displayed in the control screen displayed in the display unit of the display control device according to the embodiment.

When the list item button 311*a* is clicked, a window 320 shown in FIG. 39 is displayed over the display screen 310. In the window 320, there are displayed: an adjust button 321 for reducing the set value of the bass; an adjust button 322 for enlarging the set value of the bass; an adjust button 323 for reducing the set value of the treble; and an adjust button 324 for enlarging the set value of the treble. Moreover, an OK button 326, a cancel button 327 and a position bar 325 are displayed in the window 320, and a recess 328 is formed in the window 320. The set values of the bass and treble are changed, when the OK button 326 is pushed after the bass and treble were adjusted by the adjust buttons 321 to 324. When the cancel button 327 is pushed even if the values of the bass and treble are changed in that screen, the set values of the bass and treble are not changed.

Figure 40:
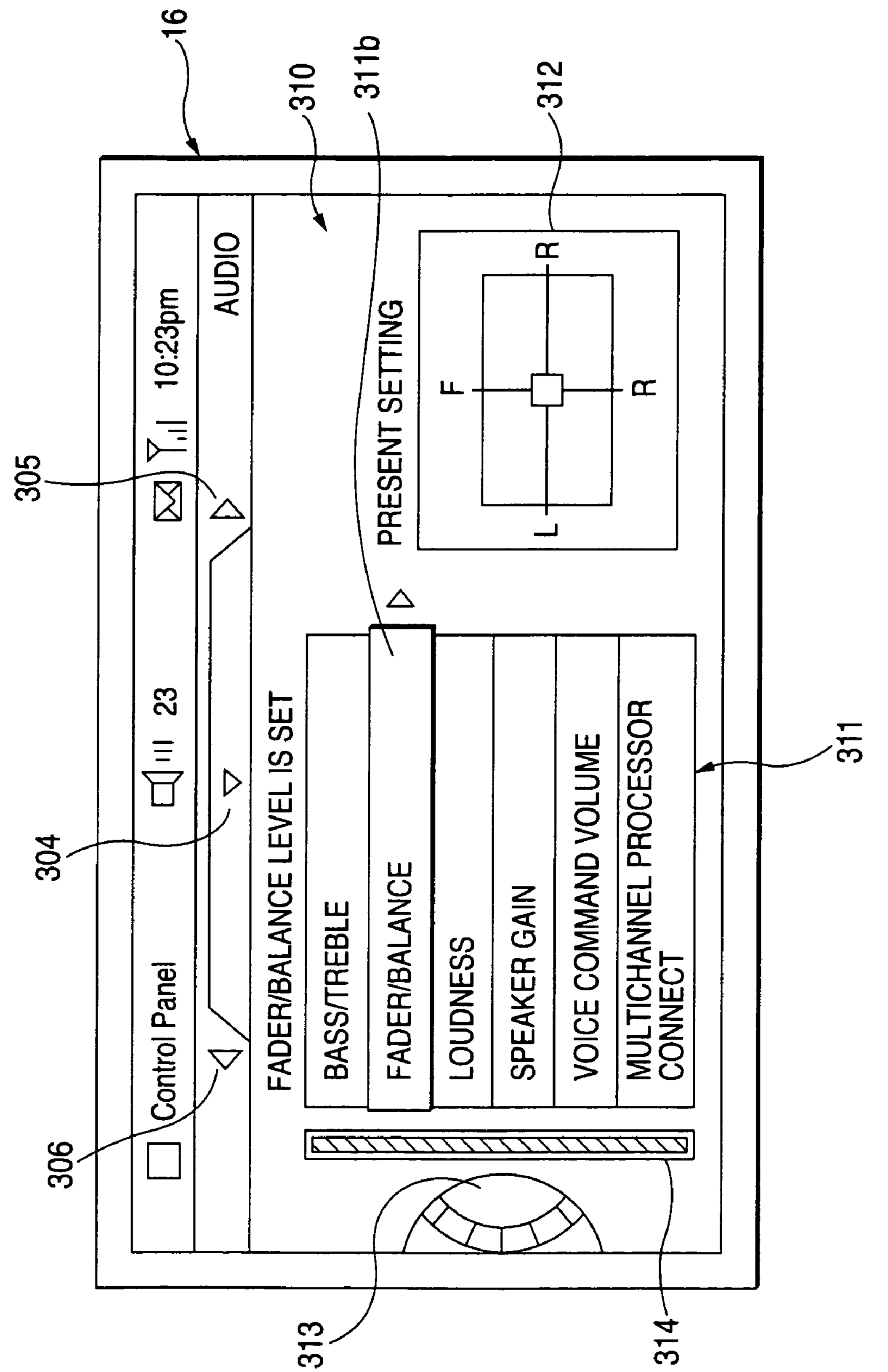
FIG. 40 is a diagram showing a screen, on which a fader/balance setting item of a display screen showing the audio setting screen is focused in the control screen displayed in the display unit of the display control device according to the embodiment.
Figure 41:
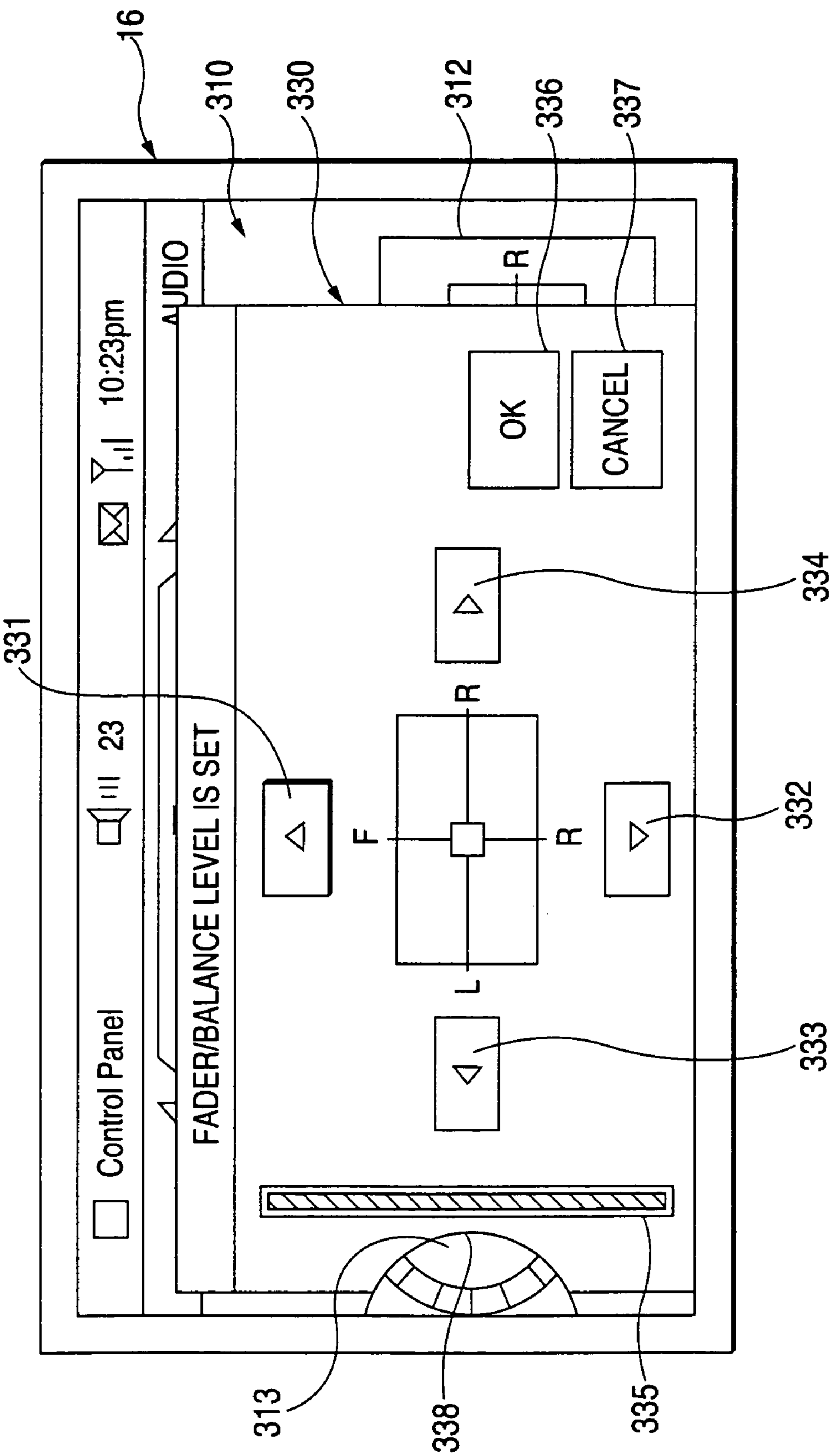
FIG. 41 is a diagram showing a screen, on which a window for setting the fader/balance level is displayed on the control screen displayed in the display unit of the display control device according to the embodiment.

With a list item button 311*b* on the fader/balance being selected by the cursor, as shown in FIG. 40, the present set contents of the fader/balance are displayed in the window 312. When the list item button 311*b* is clocked, a window 330 is displayed over the display screen 310, as shown in FIG. 41. In the window 330, there are displayed: an adjust button 331 for moving the fader forward of the vehicle compartment; an adjust button 332 for moving the fader backward of the compartment; an adjust button 333 for moving the balance leftward of the compartment; and an adjust button 334 for moving the balance rightward of the compartment. Moreover, an OK button 336, a cancel button 337 and a control bar 335 are displayed in the window 330, and a recess 338 is formed in the window 330. The set values of the fader and balance are changed, when the OK button 336 is pushed after the fader and balance were adjusted by the adjust buttons 331 to 334. When the cancel button 337 is pushed even if the values of the fader and balance are changed in that screen, the set values of the fader and balance are not changed.

Figure 42:
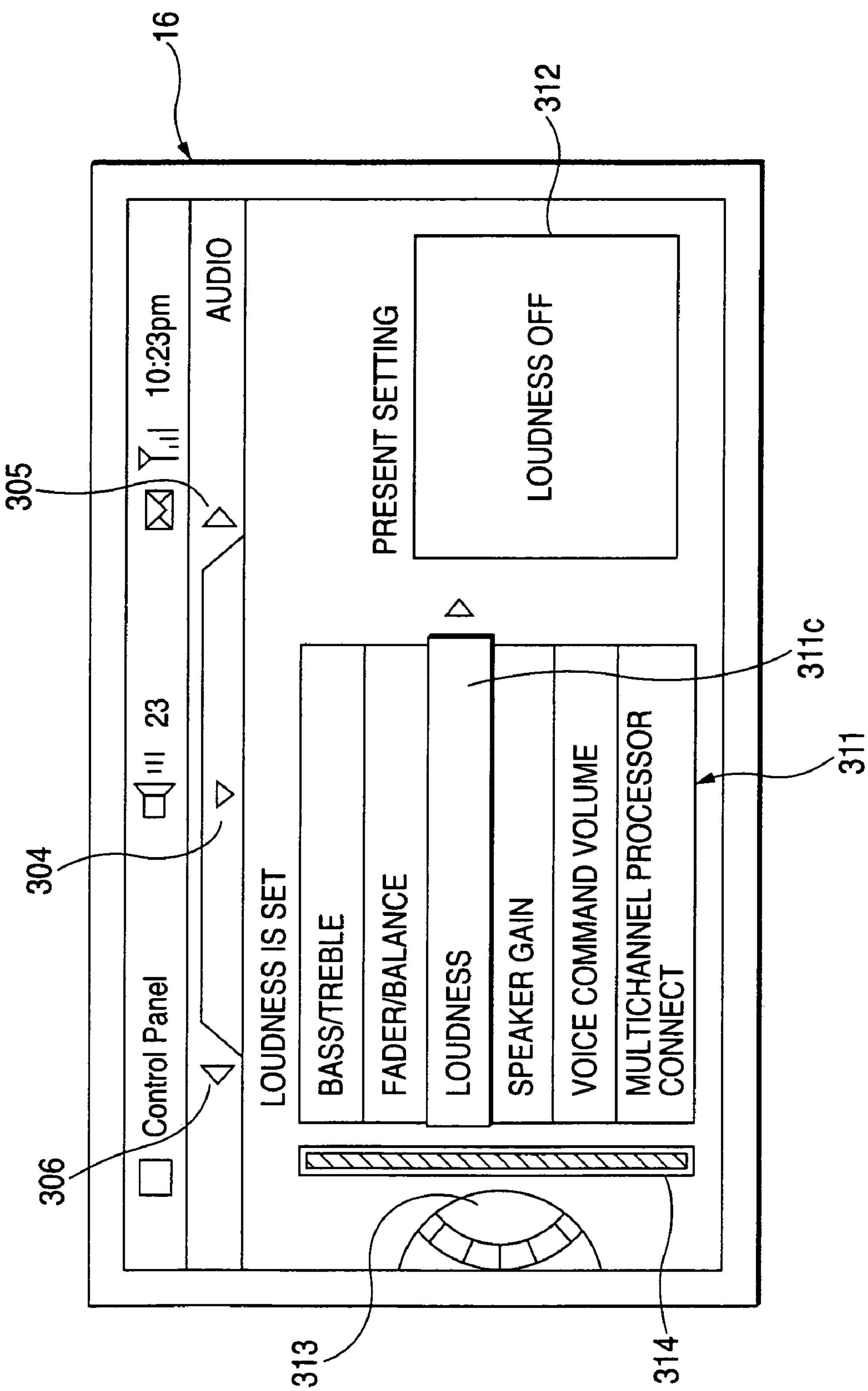
FIG. 42 is a diagram showing a screen, on which a loudness setting item of a display screen showing the audio setting screen is focused in the control screen displayed in the display unit of the display control device according to the embodiment.

With a list item button 311*c* on the loudness being selected by the cursor, as shown in FIG. 42, the present set contents of the loudness are displayed in the window 312. The ON/OFF of the loudness can be switched by clicking the list item button 311*c* like before. The items to be set in the control panel screen 300 are listed in Table 1.

TABLE 1

| | Satellite Button | Set Item |
|---|---|---|
| 1 | Audio | Bass/Treble Adjust |
| | | Fader/Balance Adjust |
| | | Loudness |
| | | Speaker Gain |
| | | Voice Command Volume |
| | | Multi-channel Processor connect |
| 2 | Time/Date | Format of Time |
| | | Setting of Time |
| | | Setting of Date |
| 3 | Dial-up Connect | Setting of Connect Target |
| | | Number of Time to Re-Dial |
| | | Interval of Re-Dialing |
| | | Auto-Connect |
| 4 | Short-cut Key Assign | Short Push Operation |
| | | Long Push Operation |
| 5 | File Operation | On-Board RAM |
| | | Main Slot |
| | | PC Card |
| 6 | Sound/Voice | Setting Sound Effect |
| | | Voice Guide Setting of Start Menu |
| 7 | Screen | Screen Adjust |
| | | Screen Saver Setting |
| 8 | Computer Response | Volume of TTS Sound Effect |
| | | Pitch/Speed of TTS |
| | | Speech Command Answer-Back |
| 9 | Speech Command | Global Command |
| | | Customer Vocabulary |
| | | Microphone Sensitivity Adjust |
| 10 | Back-up/Restore | Back-up |
| | | Restore |
| 11 | System | Add Application |
| | | Delete Application |
| | | System Default Setting |
| | | Connection Check |
| | | CE/NET Connection Check |
| | | System Information |
| | | Memory Information |
| | | Battery Information |
| | | User Information |
| 12 | Security (Name Change) | Password Setting |

* TTS (Text to Speech): Function to Output Text Information as Voice signals.

Figure 43:
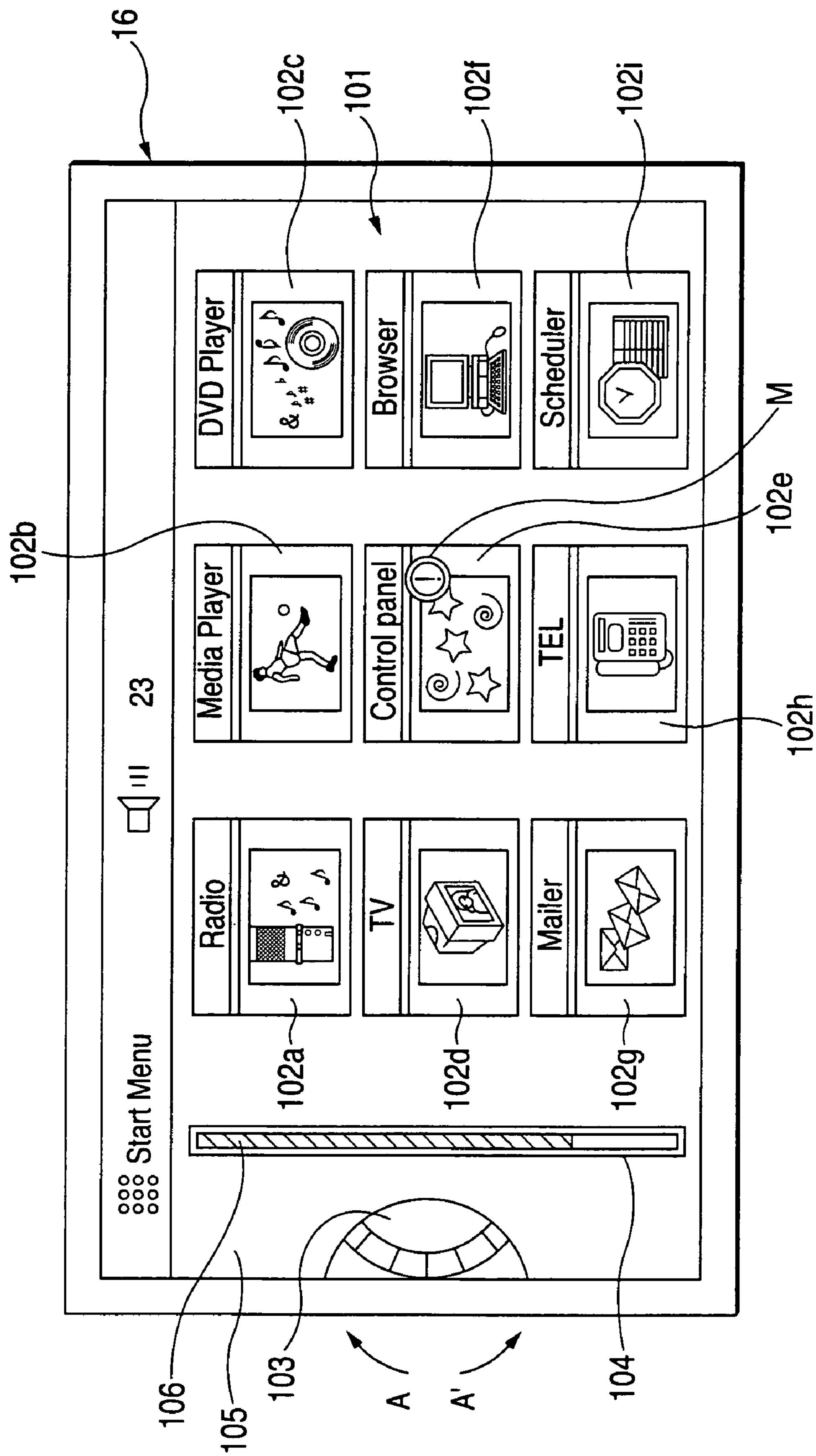
FIG. 43 is a diagram showing a screen, on which an exclamation mark is displayed in an icon of a control panel of the start menu screen displayed in the display unit of the display control device according to the embodiment.
Figure 44:
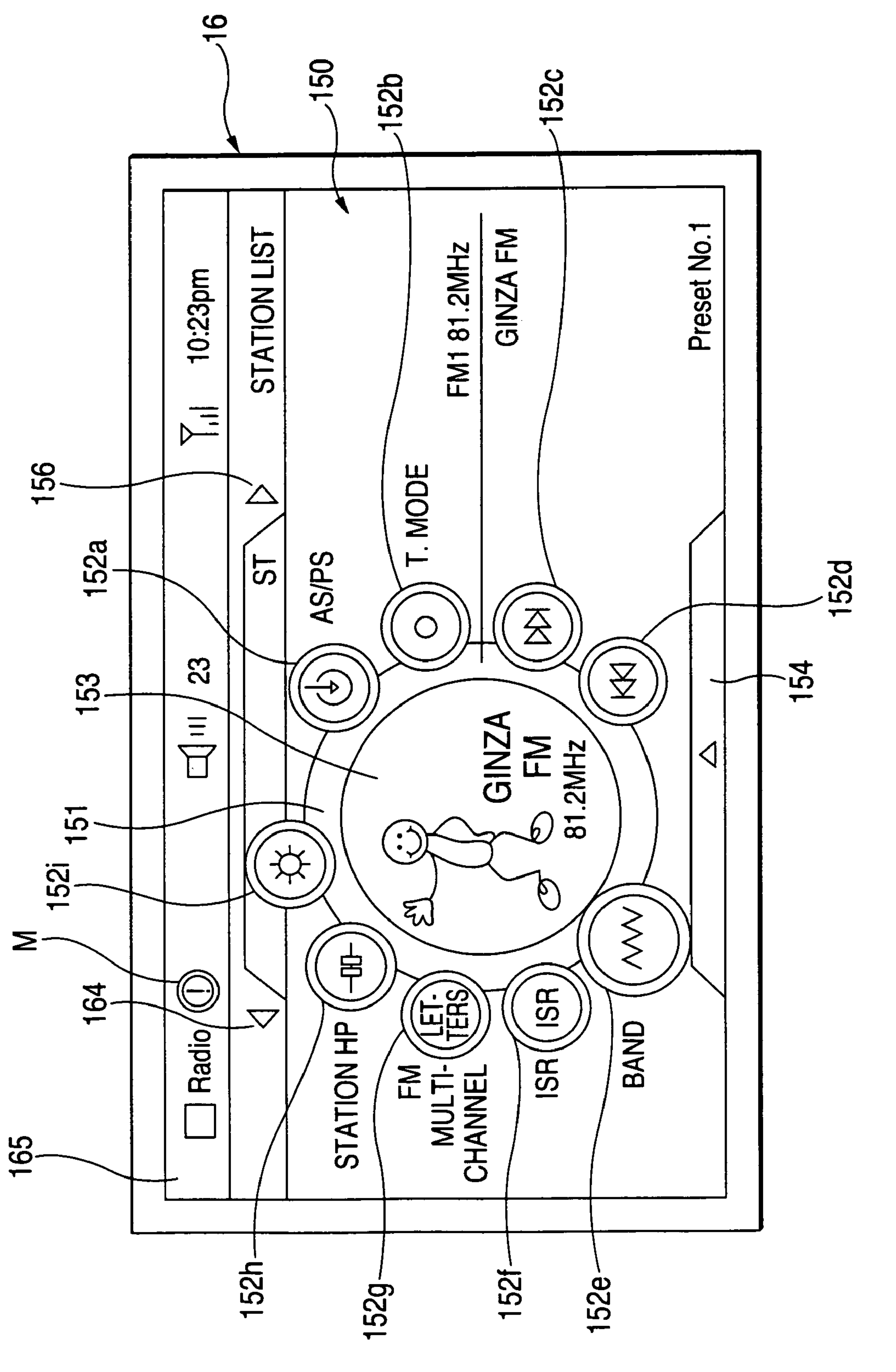
FIG. 44 is a diagram showing a screen, on which an exclamation mark is displayed on the radio screen displayed in the display unit of the display control device according to the embodiment.
Figure 45:
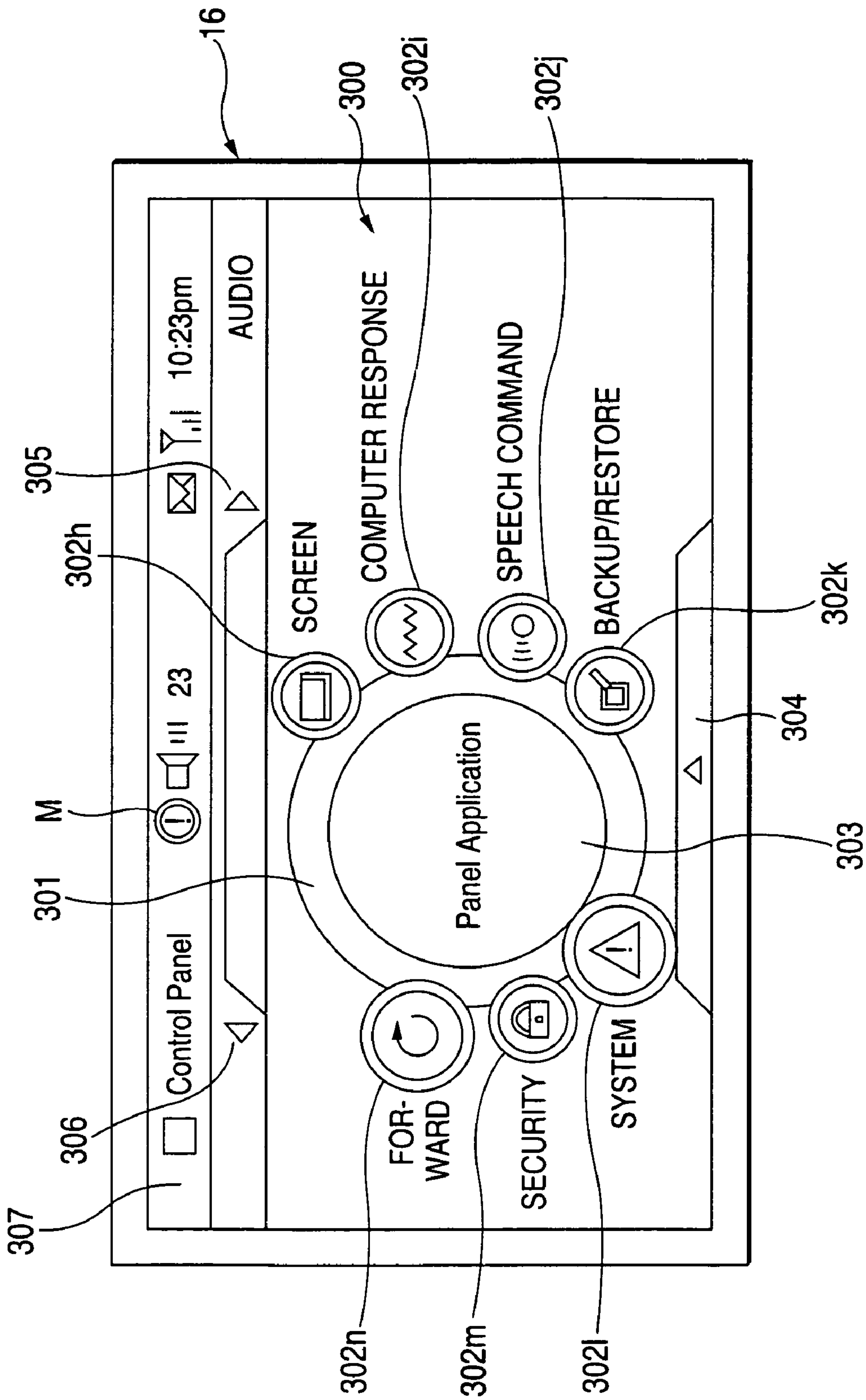
FIG. 45 is a diagram showing a screen, on which an exclamation mark is displayed on the control panel screen displayed in the display unit of the display control device according to the embodiment.
Figure 46:
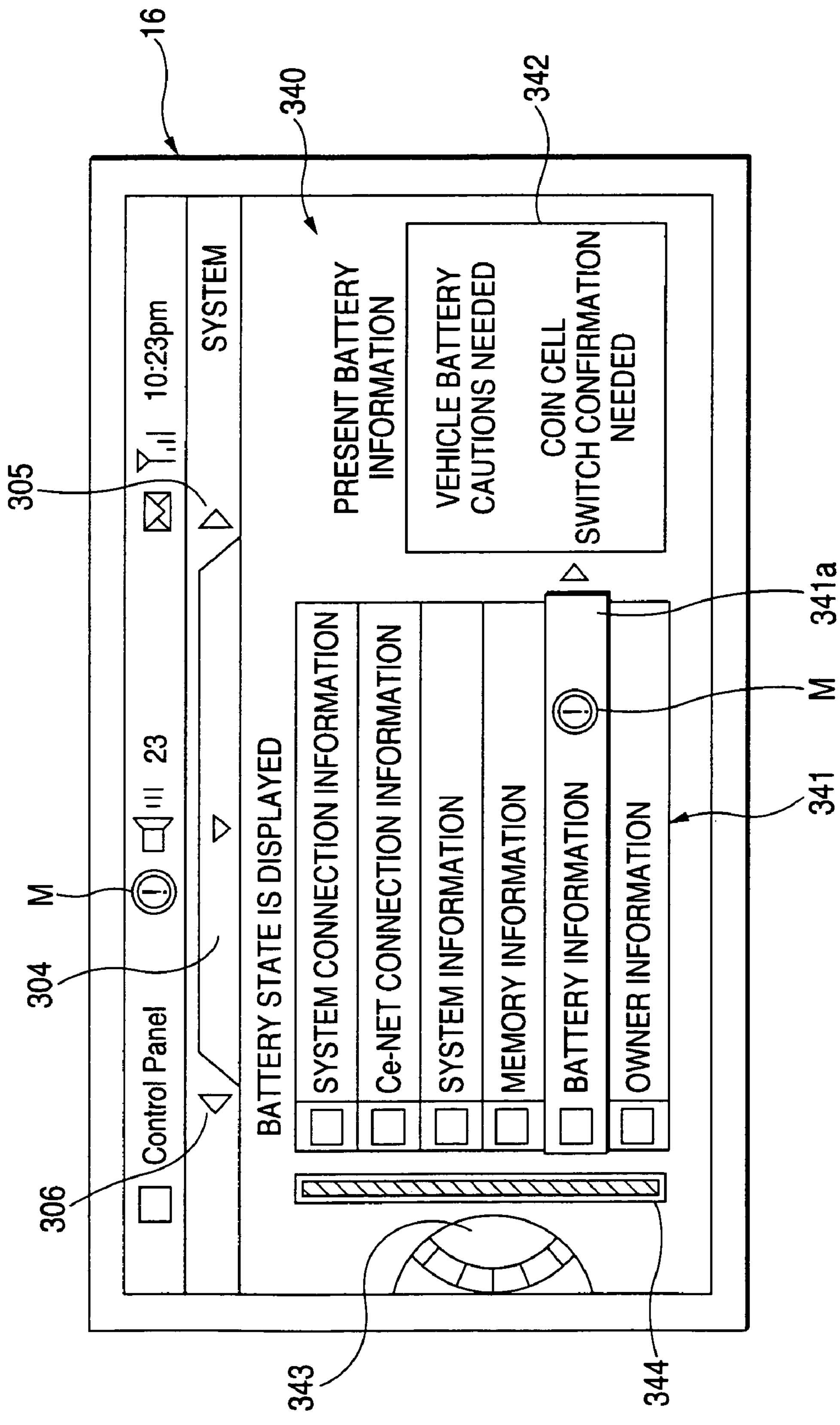
FIG. 46 is a diagram showing a control panel screen displayed in the display unit of the display control device according to the embodiment, that is, a screen of the case, in which an exclamation mark is displayed on the display screen showing a battery state.

In the icon 102*e* for transfer to the control panel screen 300, there may be displayed an exclamation mark M for stimulating the caution of the user, as shown in FIG. 43. The exclamation mark M is provided for noticing the user that the system is abnormal. When any icon is clicked in the state of FIG. 43, the exclamation mark M is displayed in the transferred screen, too. When the icon 102*a* is clicked in the state of FIG. 43, for example, the exclamation mark M is displayed in a title bar 165 of the radio screen, as shown in FIG. 44. When the icon 102*e* is clicked in the state of FIG. 43, the exclamation mark M is displayed in a title bar 307 of the control panel screen 300, as shown in FIG. 45. When the satellite button 302*l* is operated to display a display screen 340, as shown in FIG. 46, the exclamation mark M is displayed at the list item button on an abnormal portion, as shown in FIG. 46. The display screen 340 displays the items on the system in a list. A scroll dial 343 and a position bar 344 are disposed on the left side of the display screen 340, and a window 342 for displaying the contents of a list item button 341, at which the cursor is positioned, is disposed on the right side. In FIG. 46, the exclamation mark M is displayed at a list item button 341*a* on the battery information, and warns the user that the residual of the vehicle battery or the packaged cell of the computer is short.

Figure 47:
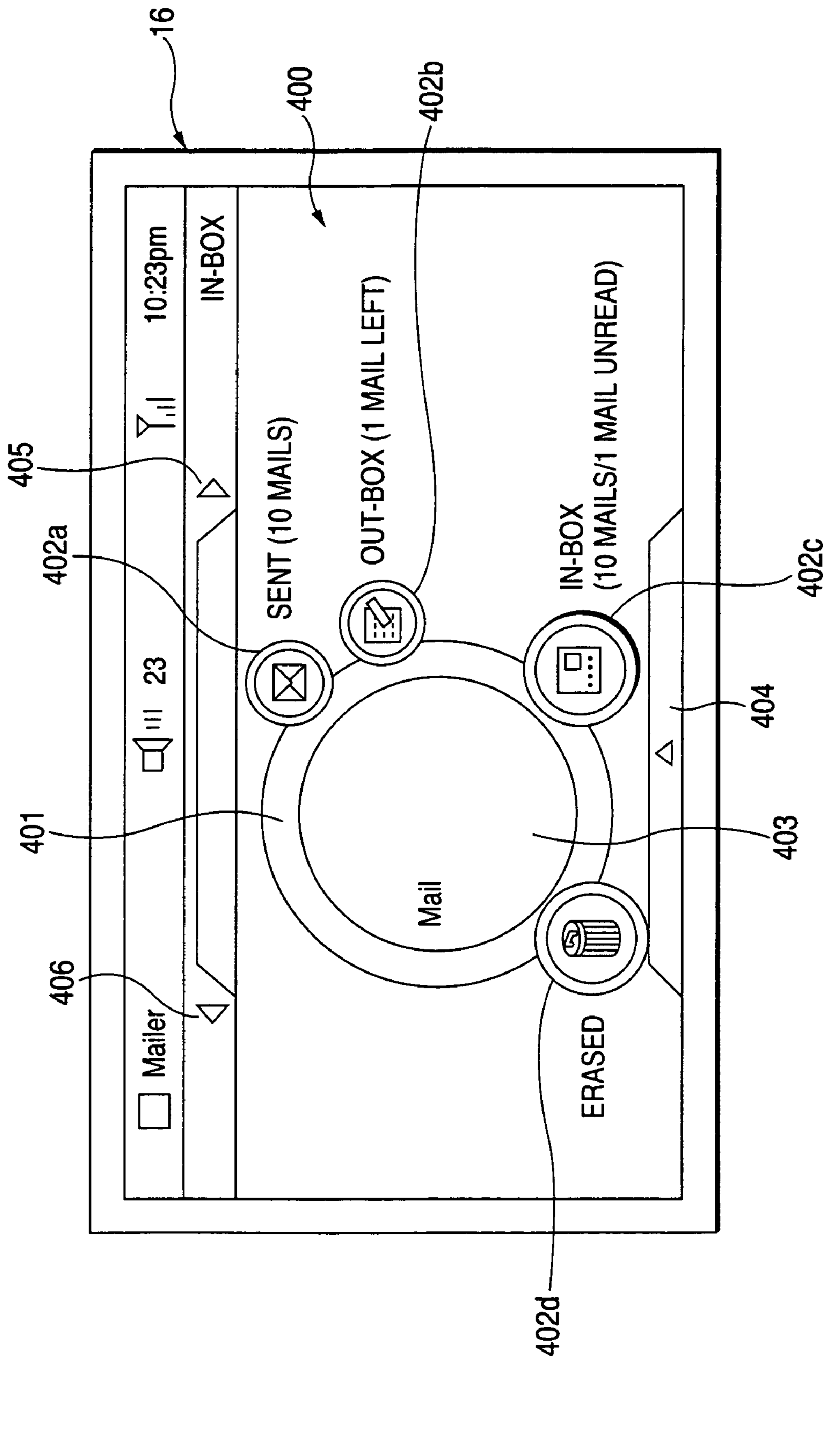
FIG. 47 is a diagram showing a mail screen displayed in the display unit of the display control device according to the embodiment.

When the icon 102*g* is selected in the start menu screen 101, a mail screen 400 shown in FIG. 47 is displayed in the monitor 16. In the mail screen 400, there are displayed: a base ring 401 arranged at the central portion of the screen; and satellite buttons 402*a* to 402*d* arranged along and around the base ring 401. The base ring 401 is provided therein with an information display portion 403. A list button 404 is displayed in the lower portion of the mail screen 400, and list change buttons 405 and 406 are displayed on the left and right sides of the upper portion. The satellite button, at which the cursor is located, is turned clockwise, when the list change button 405 is touched with the finger or when the right button 23 is pushed. The satellite button, at which the cursor is located, is changed to the counter-clockwise turn, when the list change button 406 is touched with the finger or when the left button 22 is pushed. In the list change button 406, on the other hand, there is displayed the character row, which is attached to the satellite button being focused.

Figure 48:
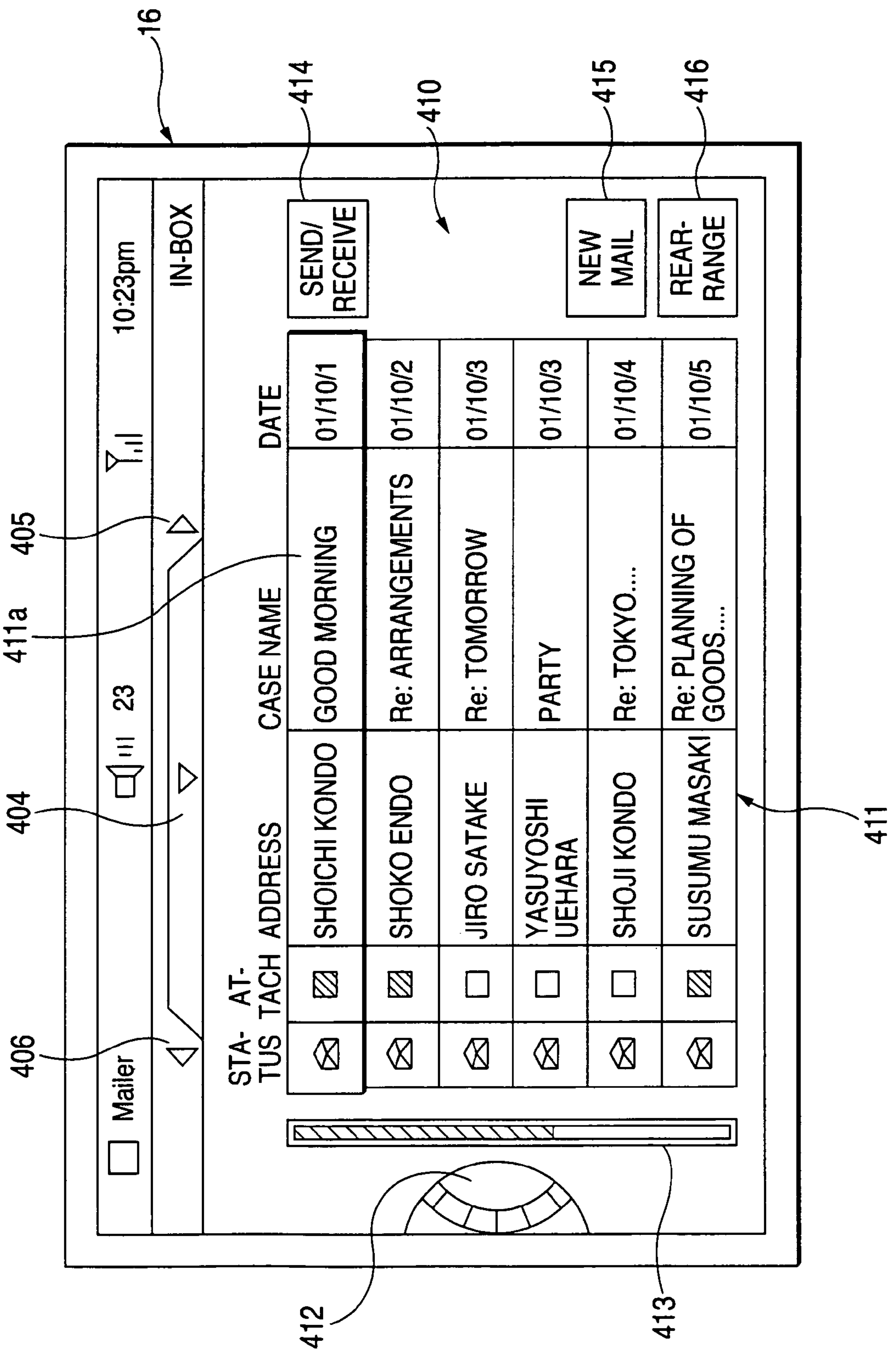
FIG. 48 is a diagram showing a screen, on which a display screen showing a list of an in-box is shown on the mail screen displayed in the display unit of the display control device according to the embodiment.

When the list button 404 is touched with the finger with the satellite button 402*c* (in-box button) being focused, as shown in FIG. 47, when the list button 21 is pushed or when the satellite button 402*c* is clicked, a display screen 410 shown in FIG. 48 is exposed and displayed from the lower portion of the screen in the monitor 16. In the display screen 410, there are displayed a list 411 of mails in the in-box, a scroll dial 412, a position bar 413, a send/receive button 414, a new mail button 415 and a rearrange button 416.

Figure 49:
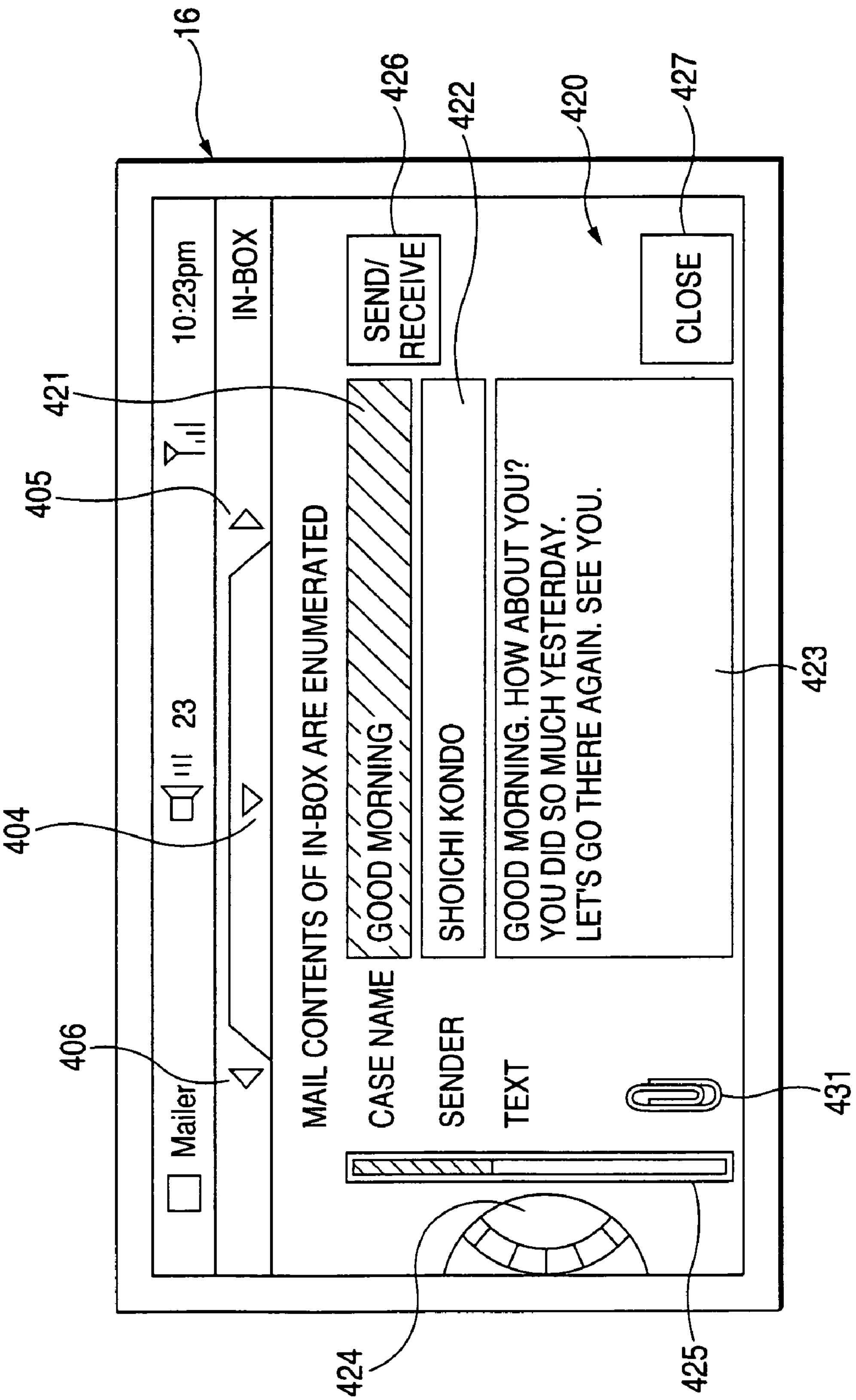
FIG. 49 is a diagram showing a screen, on which a display screen showing the contents of a mail of the in-box are shown on the mail screen displayed in the display unit of the display control device according to the embodiment.
Figure 50:
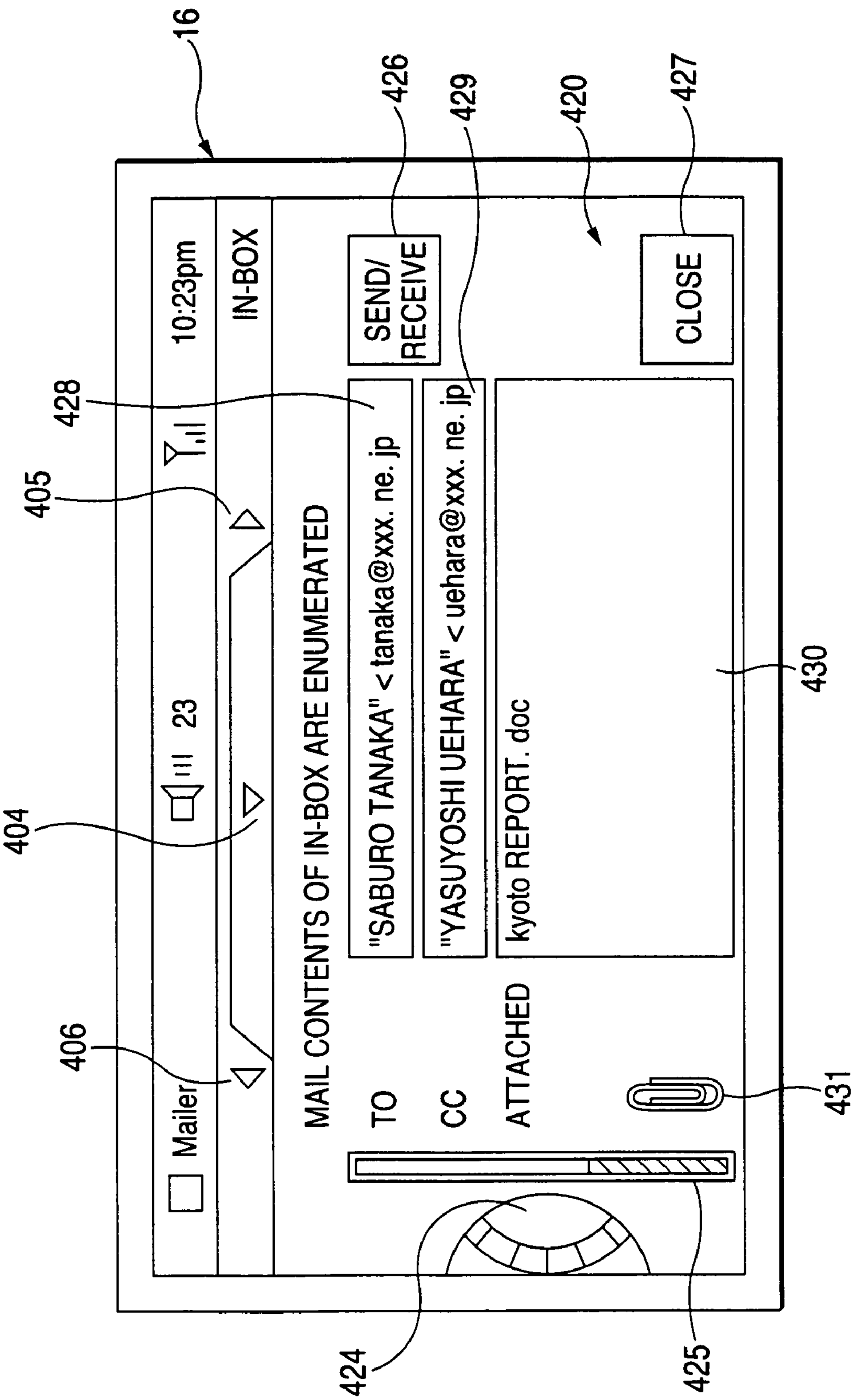
FIG. 50 is a diagram showing a screen, on which a display screen having changed the display range of the contents of a mail of the in-box is displayed on the mail screen displayed in the display unit of the display control device according to the embodiment.

When a list item button 411*a* composing the list 411 is touched with the finger within the range of the aforementioned predetermined or shorter time or is clicked by the controller 20, a display screen 420 shown in FIG. 49 is exposed from the lower portion of the screen and displayed over the display screen 410 in the monitor 16. In the display screen 420, there are displayed a case name column 421, a sender column 422, a text column 423, a scroll dial 424, a position bar 425, a send/receive button 426 and a close button 427. When the screen is scrolled down by the scroll dial 424, moreover, an address column 428, a carbon copy column 429 and an added file column 430 are displayed in the display screen 420, as shown in FIG. 50. When the added file is in the added file column 430, a clip mark 431 is displayed on the left side of the added file column 430.

Figure 51:
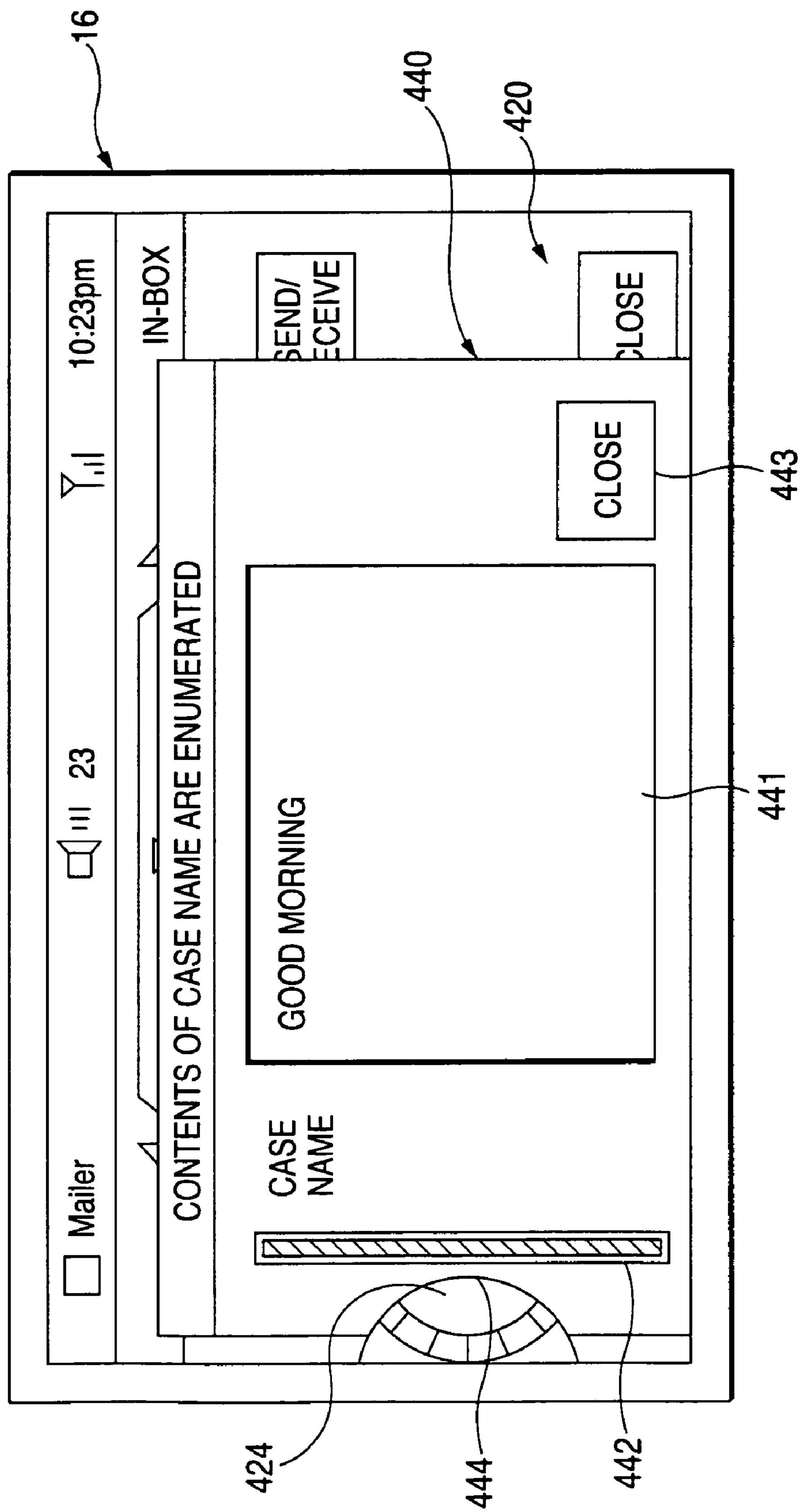
FIG. 51 is a diagram showing a screen, on which a window showing the case name of a mail of the in-box is displayed on the mail screen displayed in the display unit of the display control device according to the embodiment.

When the case name column 421 is clicked in the display screen 420, a window 440 shown in FIG. 51 is displayed over the display screen 420. A window portion 441 for displaying the contents of the case name, a position bar 442 and a close button 443 are displayed in the window 440, and a recess for exposing the scroll dial 424 is formed in the window 440.

Figure 52:
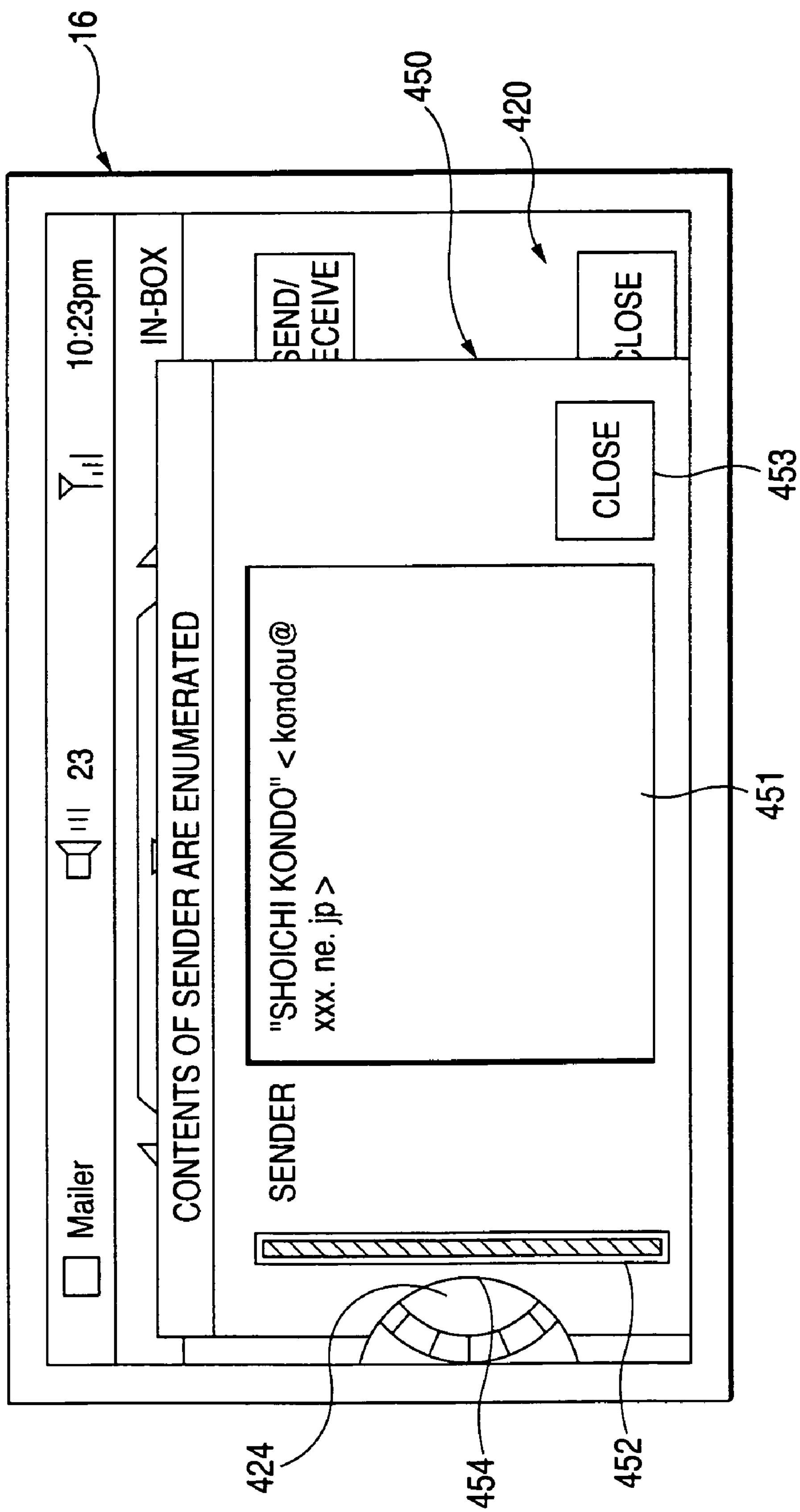
FIG. 52 is a diagram showing a screen, on which a window showing the sender of a mail of the in-box is displayed on the mail screen displayed in the display unit of the display control device according to the embodiment.

When the sender column 422 is clicked in the display screen 420, a window 450 shown in FIG. 52 is displayed over the display screen 420. A window 451 for displaying the detail of the sender, a position bar 452 and a close button 453 are displayed in the window 450, and a recess 454 for exposing the scroll dial 424 is formed in the window 450.

Figure 53:
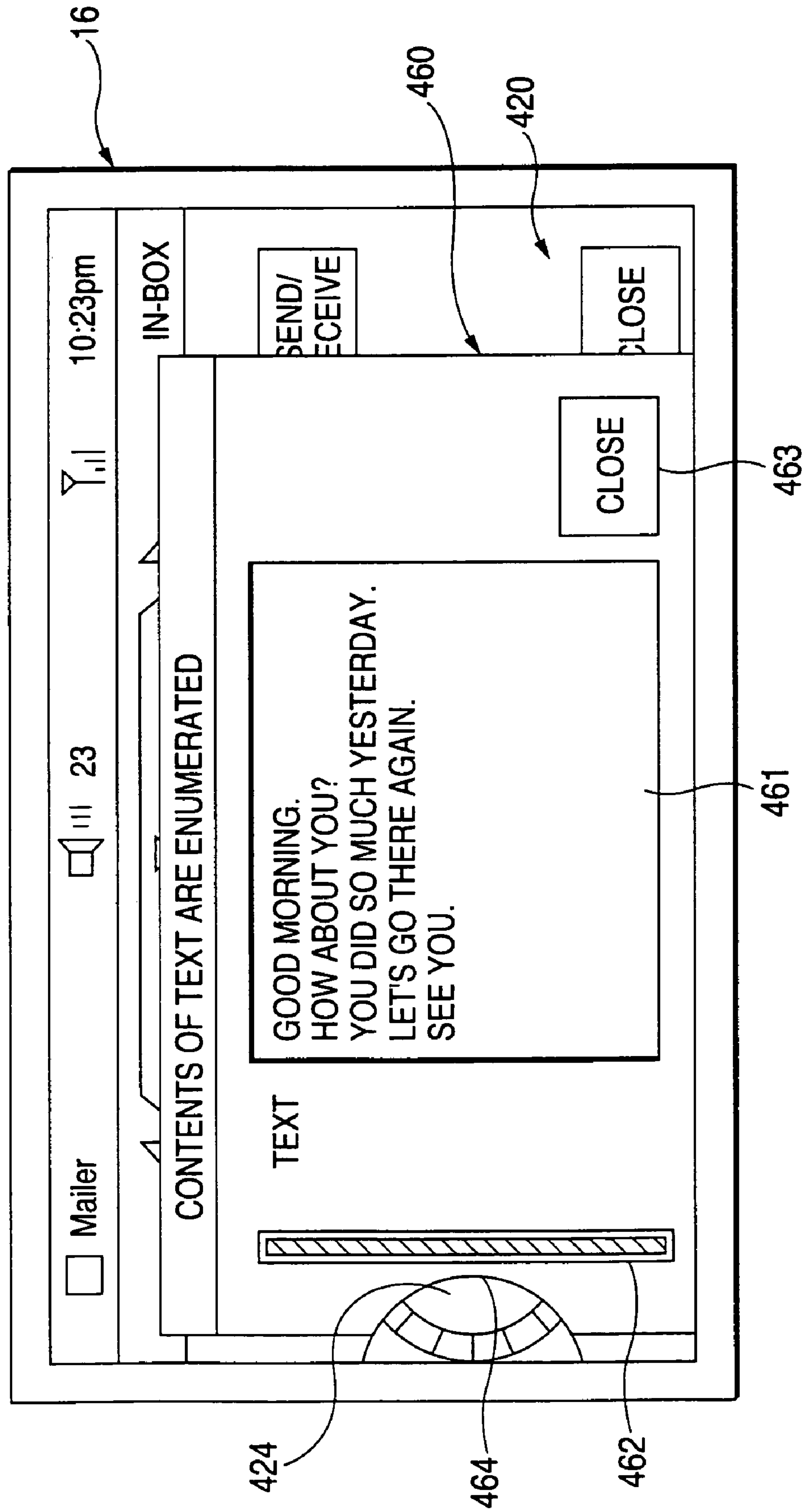
FIG. 53 is a diagram showing a screen, on which a window showing the text of a mail of the in-box is displayed on the mail screen displayed in the display unit of the display control device according to the embodiment.

When the text column 423 is clicked in the display screen 420, a window 460 shown in FIG. 53 is displayed over the display screen 420. A window 461 for displaying the contents of the text, a position bar 462 and a close button 463 are displayed in the window 460, and a recess 464 for exposing the scroll dial 424 is formed in the window 460.

Figure 54:
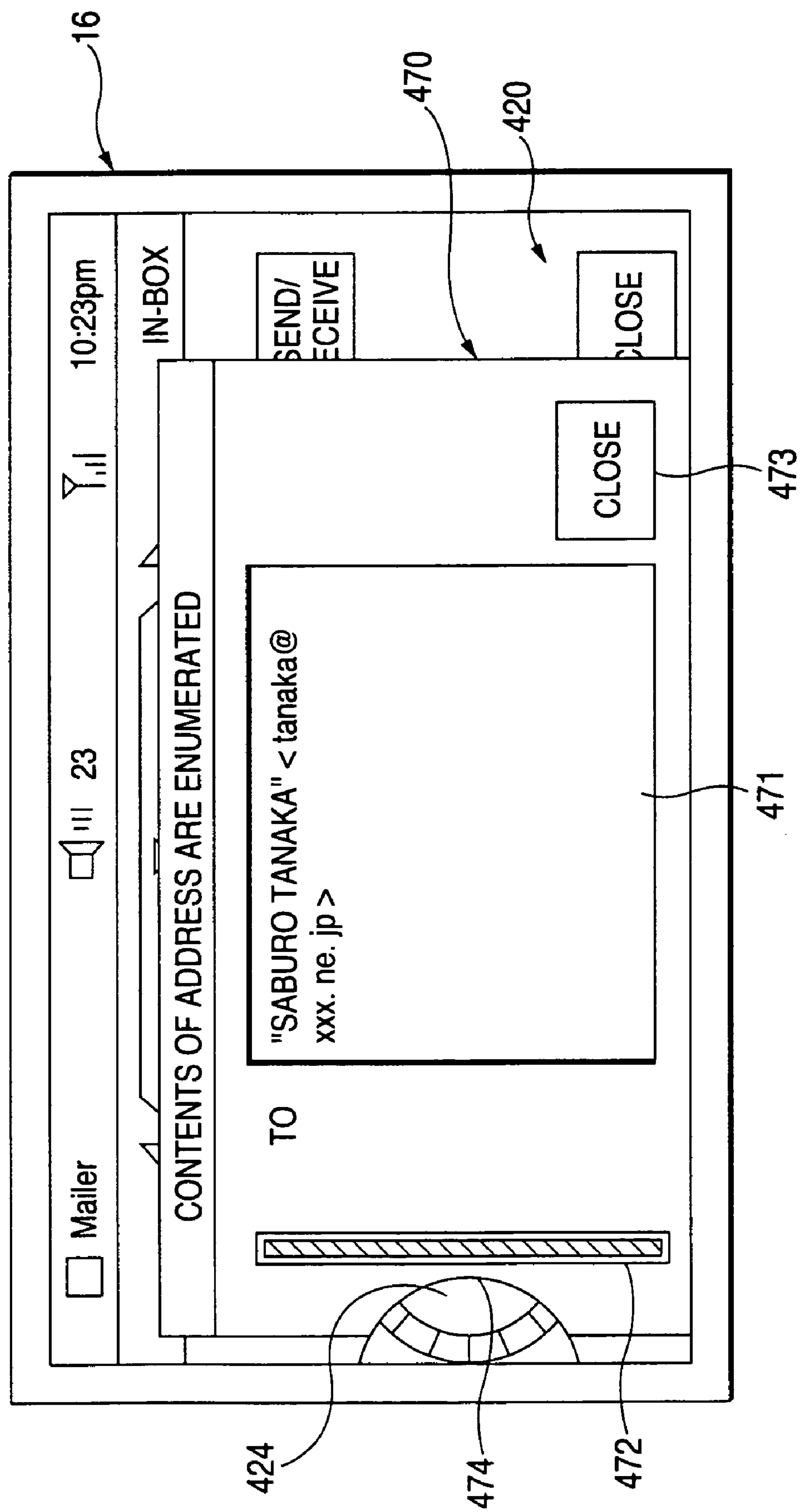
FIG. 54 is a diagram showing a screen, on which a window showing the address of a mail of the in-box is displayed on the mail screen displayed in the display unit of the display control device according to the embodiment.

When the address column 428 is clicked in the display screen 420, a window 470 shown in FIG. 54 is displayed over the display screen 420. A window 471 for displaying the detail of the sender, a position bar 472 and a close button 473 are displayed in the window 470, and a recess 474 for exposing the scroll dial 424 is formed in the window 470.

Figure 55:
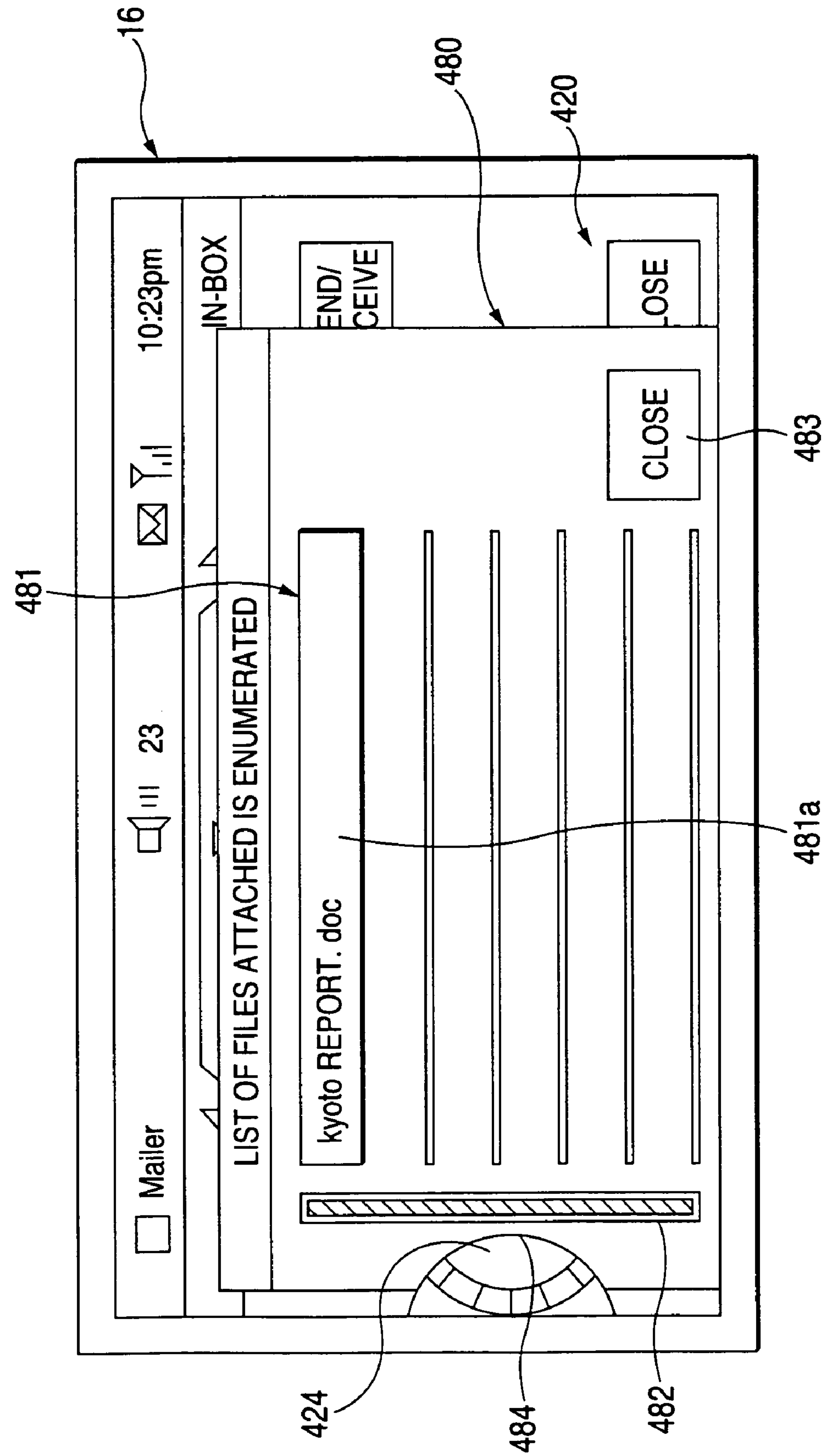
FIG. 55 is a diagram showing a screen, on which a window showing a list of attached files of a mail of the in-box is displayed on the mail screen displayed in the display unit of the display control device according to the embodiment.
Figure 56:
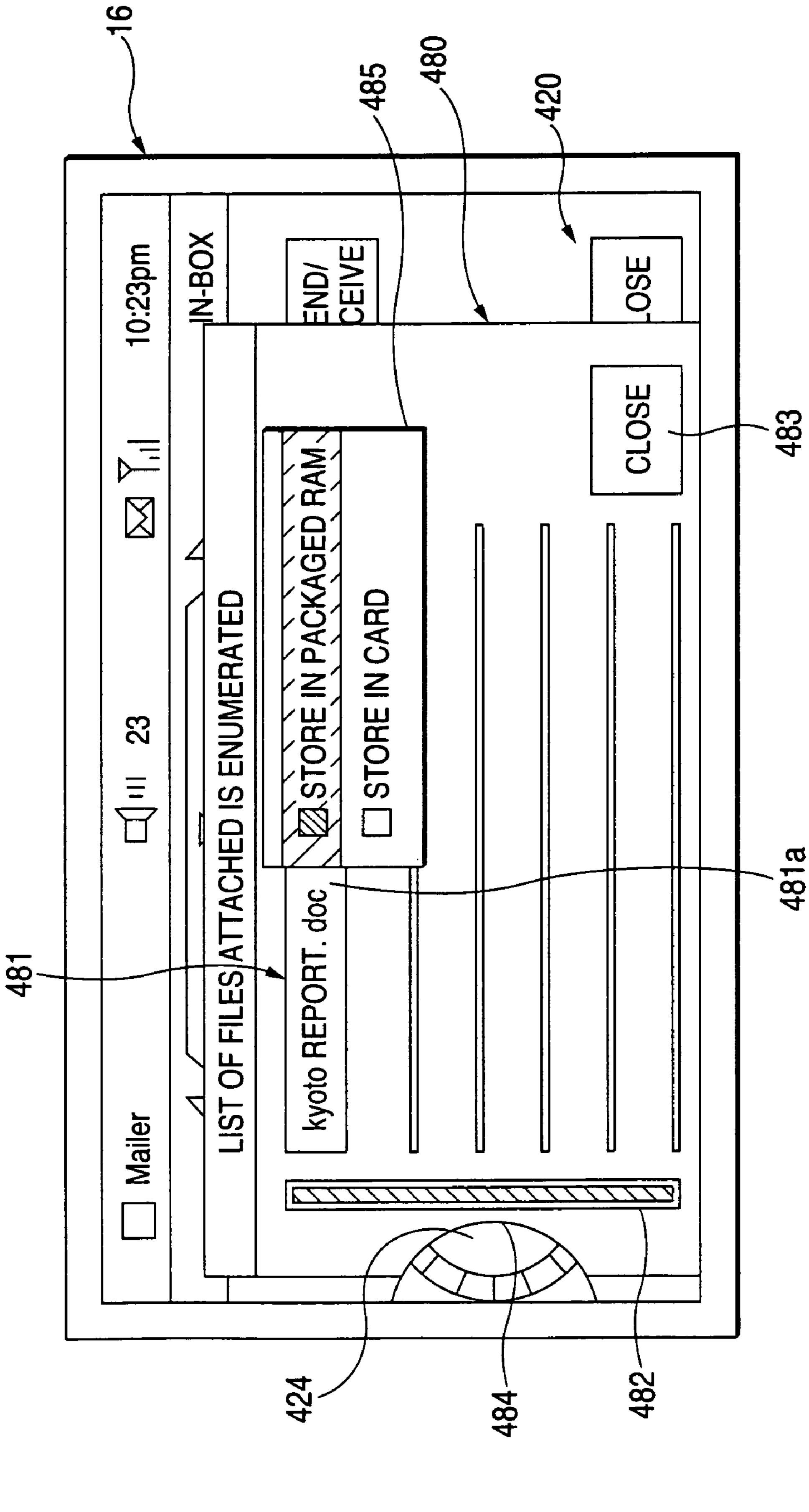
FIG. 56 is a diagram showing a screen, on which a pop-up menu is displayed in the window showing a list of attached files of the mail shown in FIG. 55.

When the added file column 430 is clicked in the display screen 420, moreover, a window 480 shown in FIG. 55 is displayed over the display screen 420. A list 481 of added files, a position bar 482 and a close button 483 are displayed in the window 480, and a recess 484 for exposing the scroll dial 424 is formed in the window 480. When a list item button 481*a* in the list 481 is touched in the display screen 420 with the finger within the range of the aforementioned predetermined or shorter time or clicked by the controller 20, the application suited for the added file automatically rises so that the contents of the added file are displayed. When the aforementioned predetermined time elapses after the list item button 481*a* was touched with the finger, on the other hand, a pop-up menu 485 shown in FIG. 56 is displayed in the monitor 16 so that the method for storing the added file can be selected.

Figure 57:
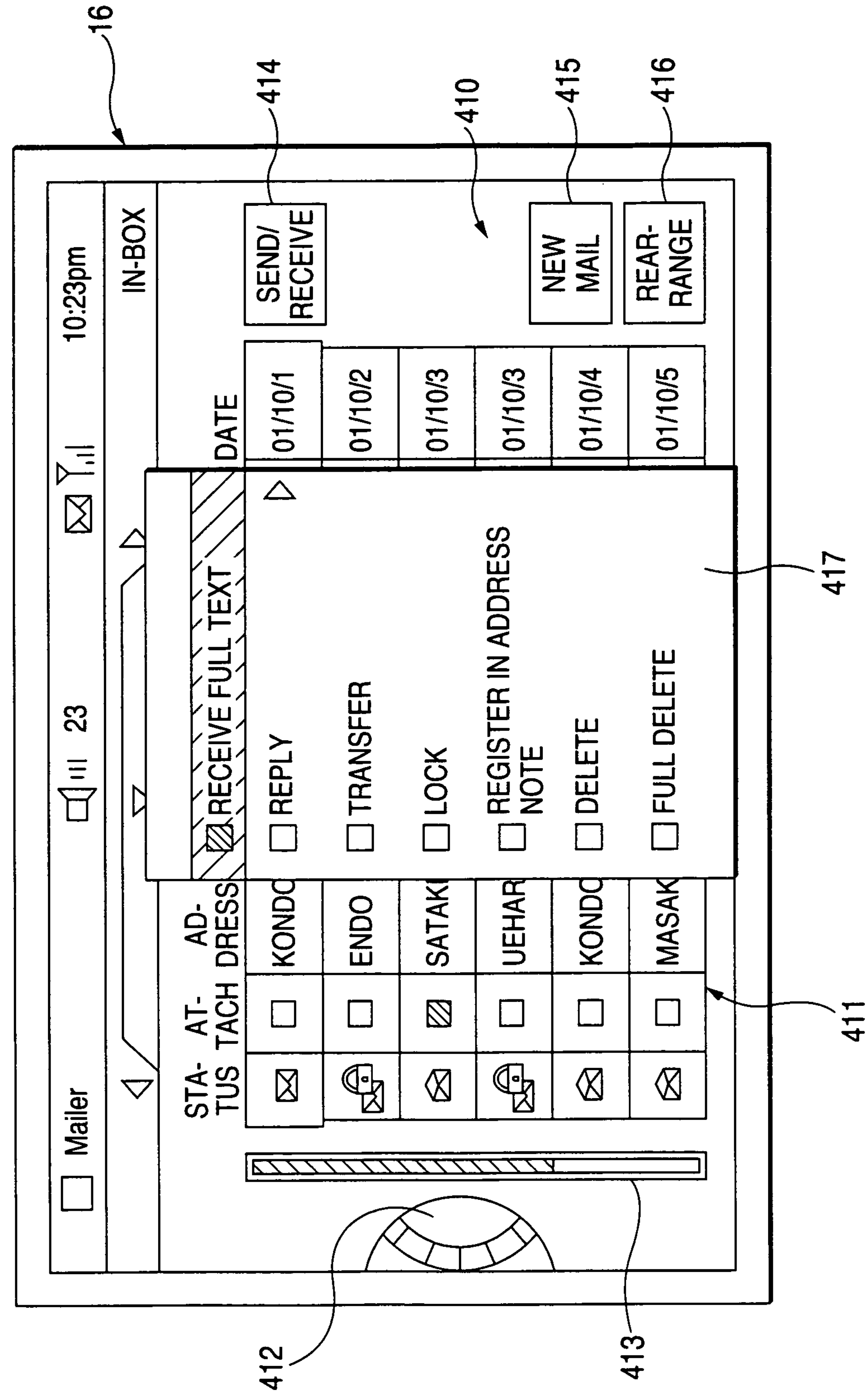
FIG. 57 is a diagram showing a screen, on which a pop-up menu is displayed on a display screen showing the contents of the in-box shown in FIG. 48.
Figure 58:
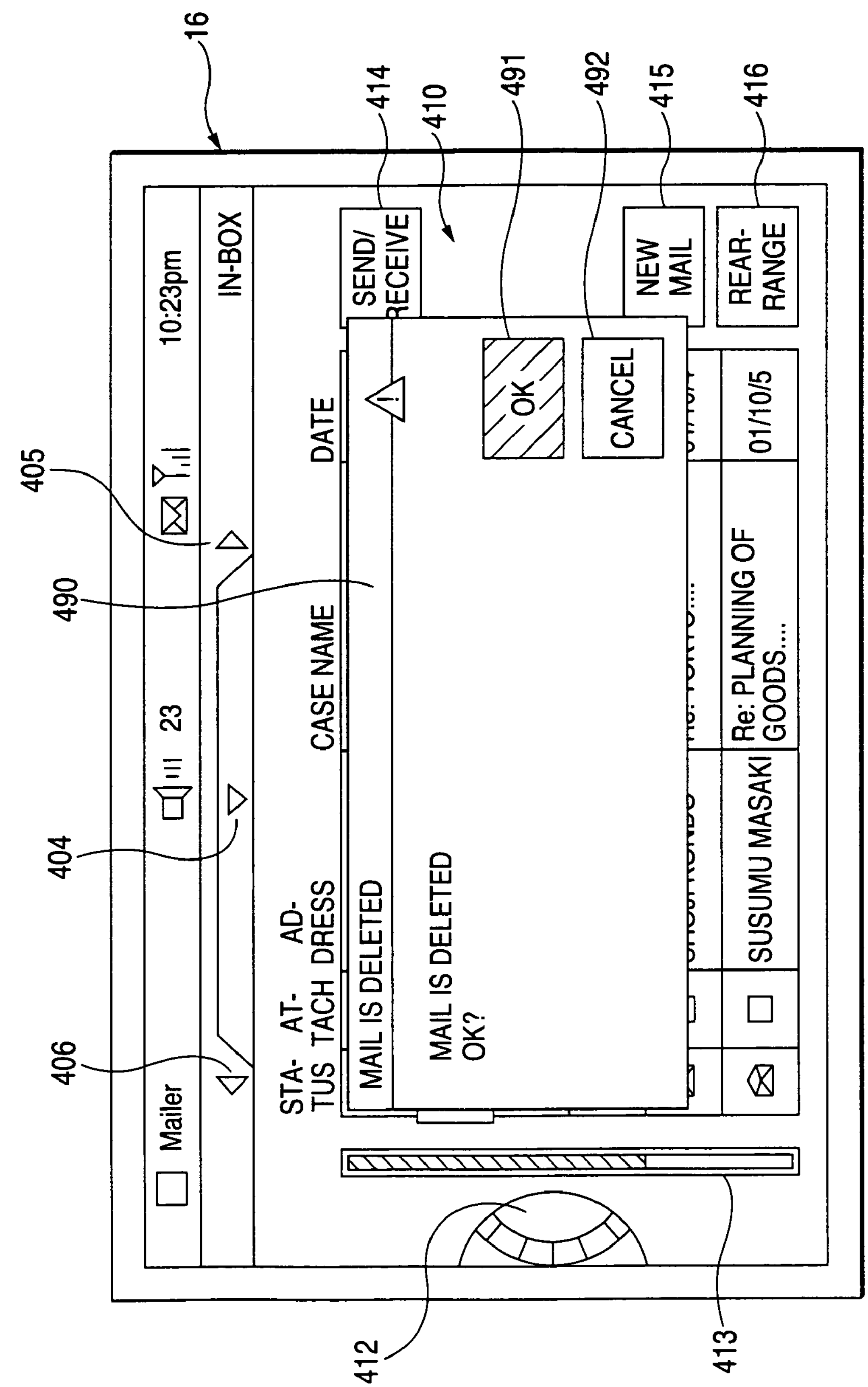
FIG. 58 is a diagram showing an address book screen, which is displayed in case an addition to an address node is selected in the pop-up menu of the display screen showing the contents of the in-box shown in FIG. 57.
Figure 59:
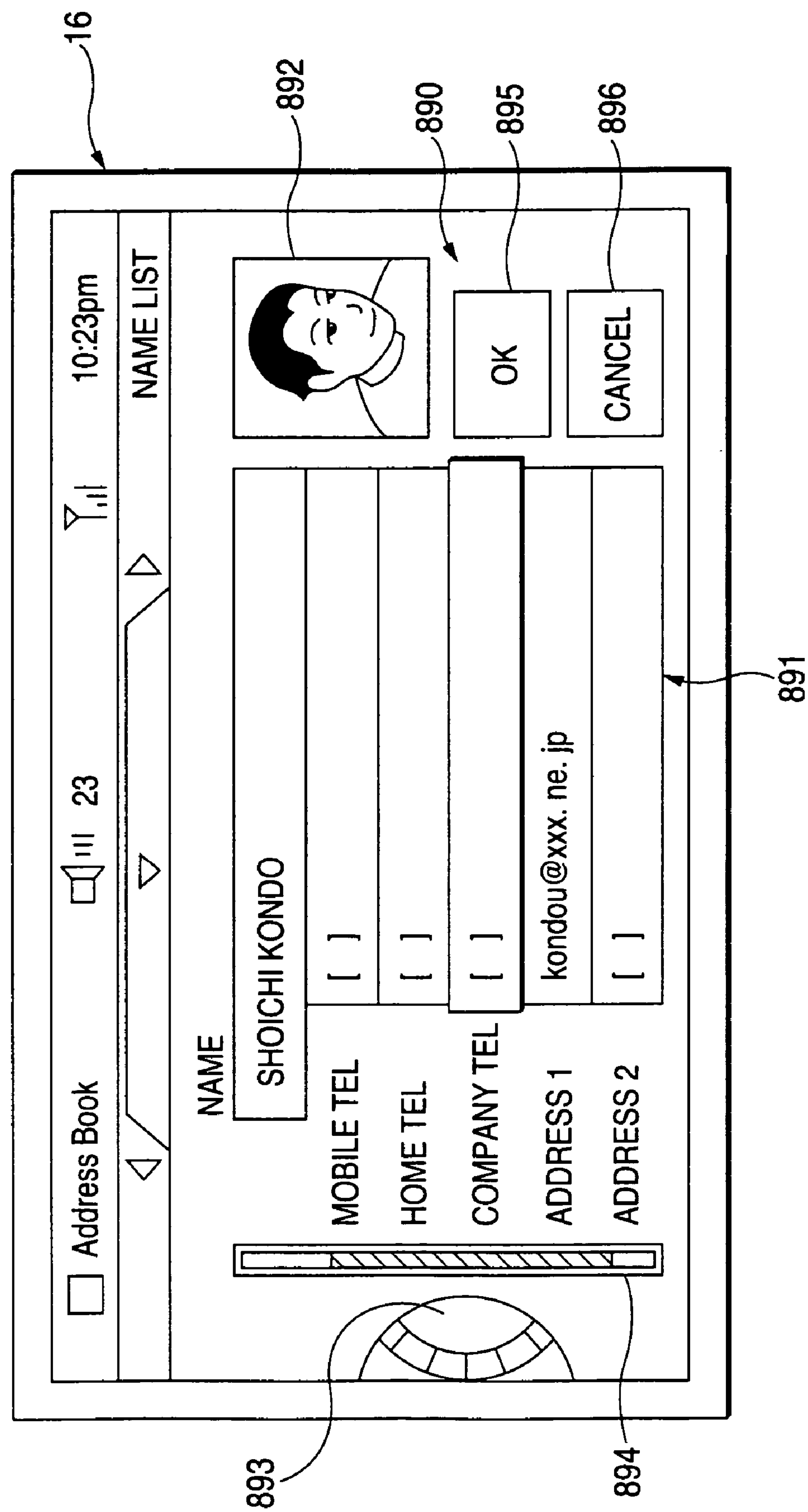
FIG. 59 is a diagram showing a window for confirming the propriety of a deletion displayed in case the deletion is selected in the pop-up menu of the display screen showing the contents of the in-box shown in FIG. 57.

When the aforementioned predetermined time elapses after the list item button 411*a* was touched with the finger in the screen of FIG. 48, on the other hand, a pop-up menu 417 shown in FIG. 57 is displayed in the monitor 16. In the computer 1, only a portion (e.g., only the header portion, or the header portion and a portion of the text) of the mail is received when the mail is to be received. When the "RECEIVE FULL TEXT" is clicked in the pop-up menu 417, the full text of the mail selected is received. When the "REPLAY" is clicked in the pop-up menu 417, on the other hand, there is displayed a screen for preparing a replay mail to the mail selected. When the "TRANSFER" is selected in the pop-up menu 417, there is displayed a screen for preparing a transfer mail to the mail selected. Moreover, the computer 1 has no place for storing the deleted mail temporarily as the deleted one. When the "LOCK" is clicked in the pop-up menu 417, however, the received mail cannot be detected to prevent an accidental loss. When the received mail is to be deleted, the user may click the "DELETE" (to delete only the selected mail) or the "FULL DELETE" (to delete all mails in the in-box). When the "DELETE" is selected, for example, a window 490 shown in FIG. 58 is displayed in the monitor 16. The window 490 displays that the deletion is confirmed for the user, an OK button 491 and a cancel button 492. When the OK button 491 is clicked, the deletion of the selected mail is executed.

When the "REGISTER IN ADDRESS NOTE" is clicked in the pop-up menu 417, there is displayed a display screen 890 in the later-described address note screen. In the display screen 890, there are displayed: a list 891 of the data on the sender of the mail selected; a window 892 for displaying a photograph or the like of the sender; a scroll dial 893; a position bar 894; an OK button 895; and a cancel button 896.

Figure 60:
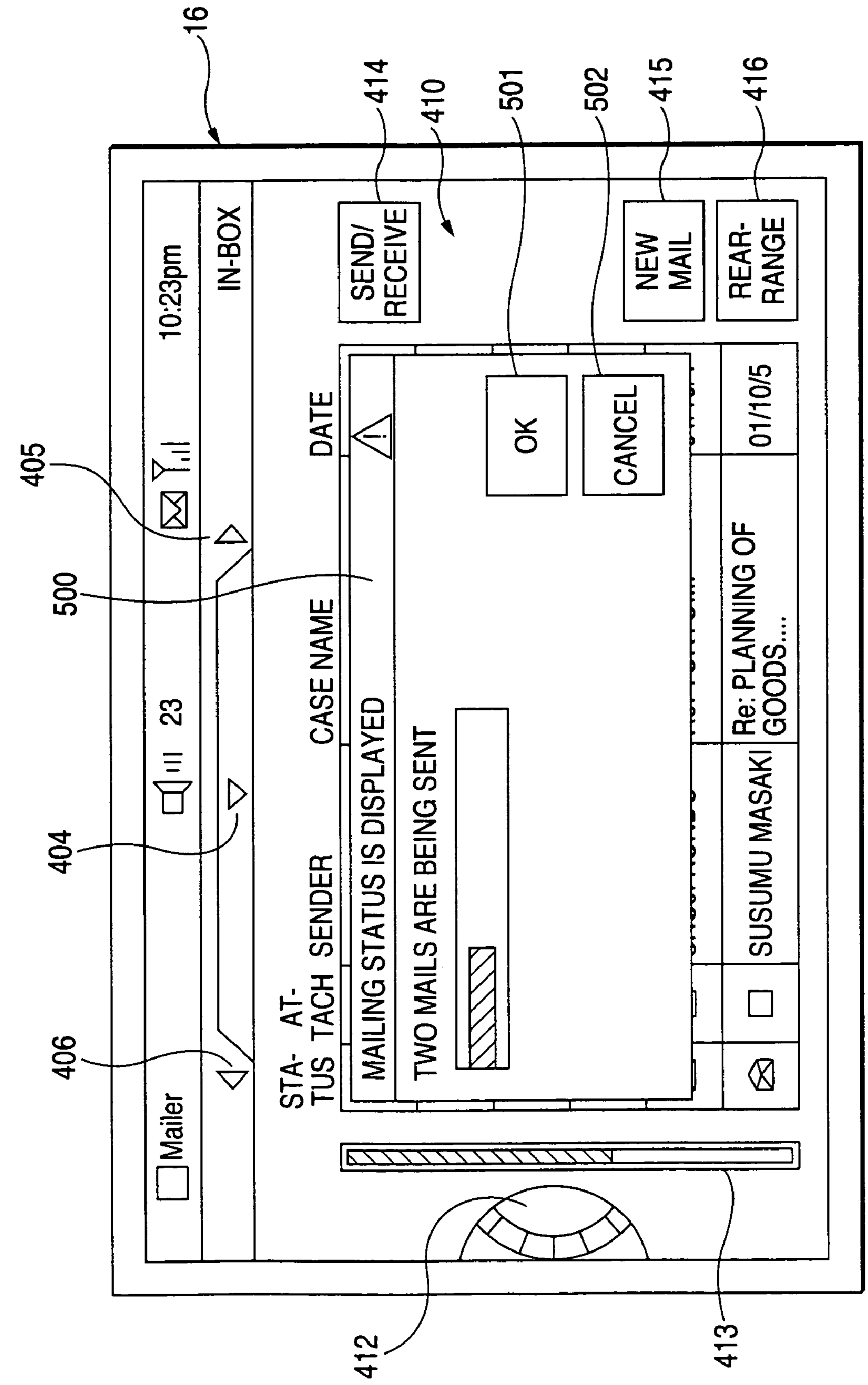
FIG. 60 is a diagram showing the behavior, in which a mail is sent/received on a mail screen displayed in the display unit of the display control device according to the embodiment.

When the send/receive button 414 is clicked in the screen of FIG. 48, a window 500 is displayed, as shown in FIG. 60, so that the mail is sent/received. An OK button 501 and a cancel button 502 are displayed in the window 500. When the OK button 501 is clicked, the window 500 disappears, and the send/receive operations are continued. When the cancel button 502 is clicked, the window 500 disappears, and the send/receive operation is suspended.

Figure 61:
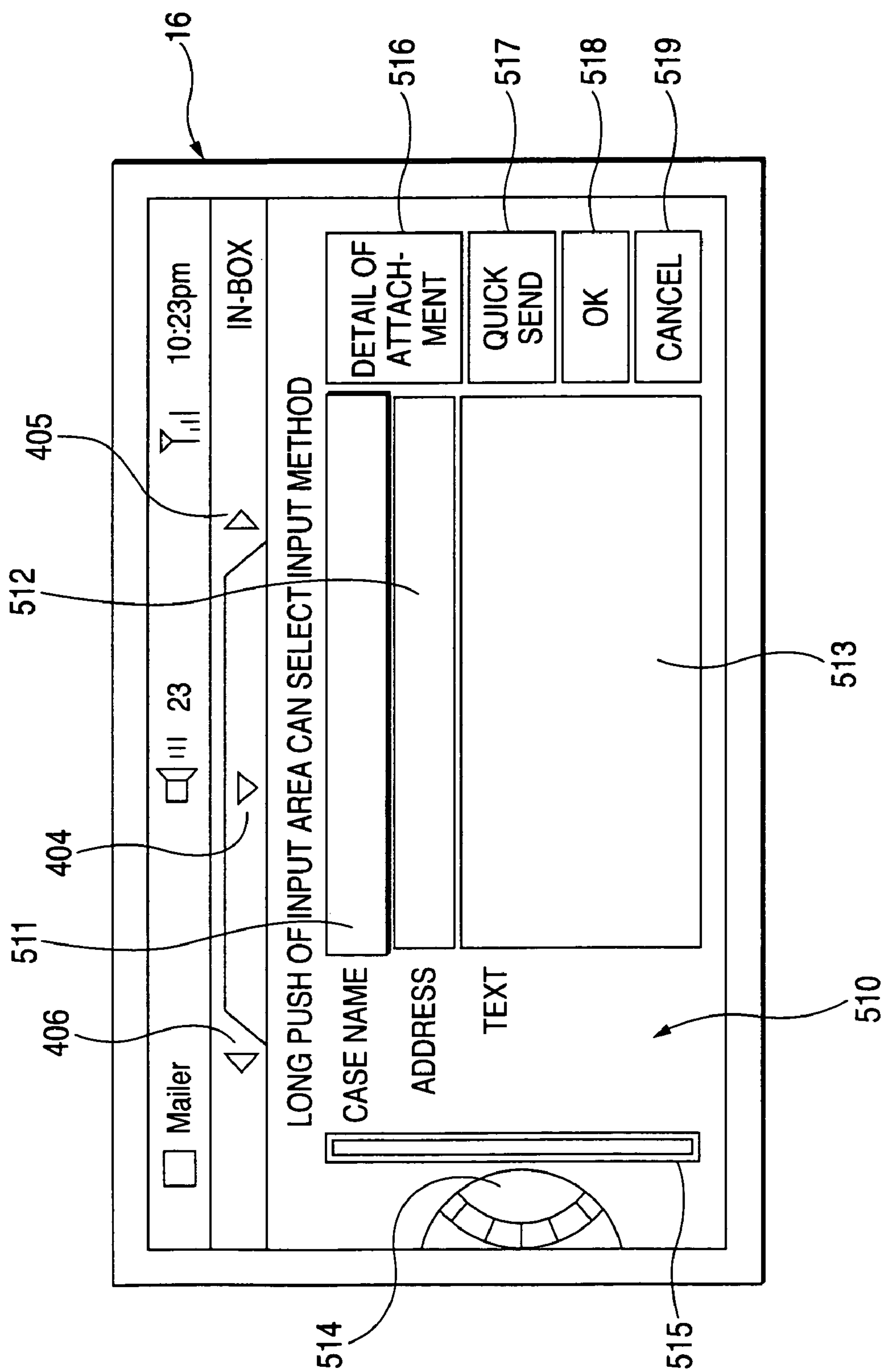
FIG. 61 is a diagram showing a mail preparing screen displayed in the display unit of the display control device according to the embodiment.

When the new mail button 415 is clicked in the screen of FIG. 48, there is displayed a display screen 510 shown in FIG. 61. In the display screen 510, there are displayed a case name input column 511, an address input column 512, a text input column 513, a scroll dial 514, a position bar 515, an attached detail button 516, a send button 517, an OK button 518 and a cancel button 519. When the screen is scrolled downward by the scroll dial 514 or the scroll dial 25, moreover, there is displayed an input column for the carbon copy or the file attachment.

Figure 62:
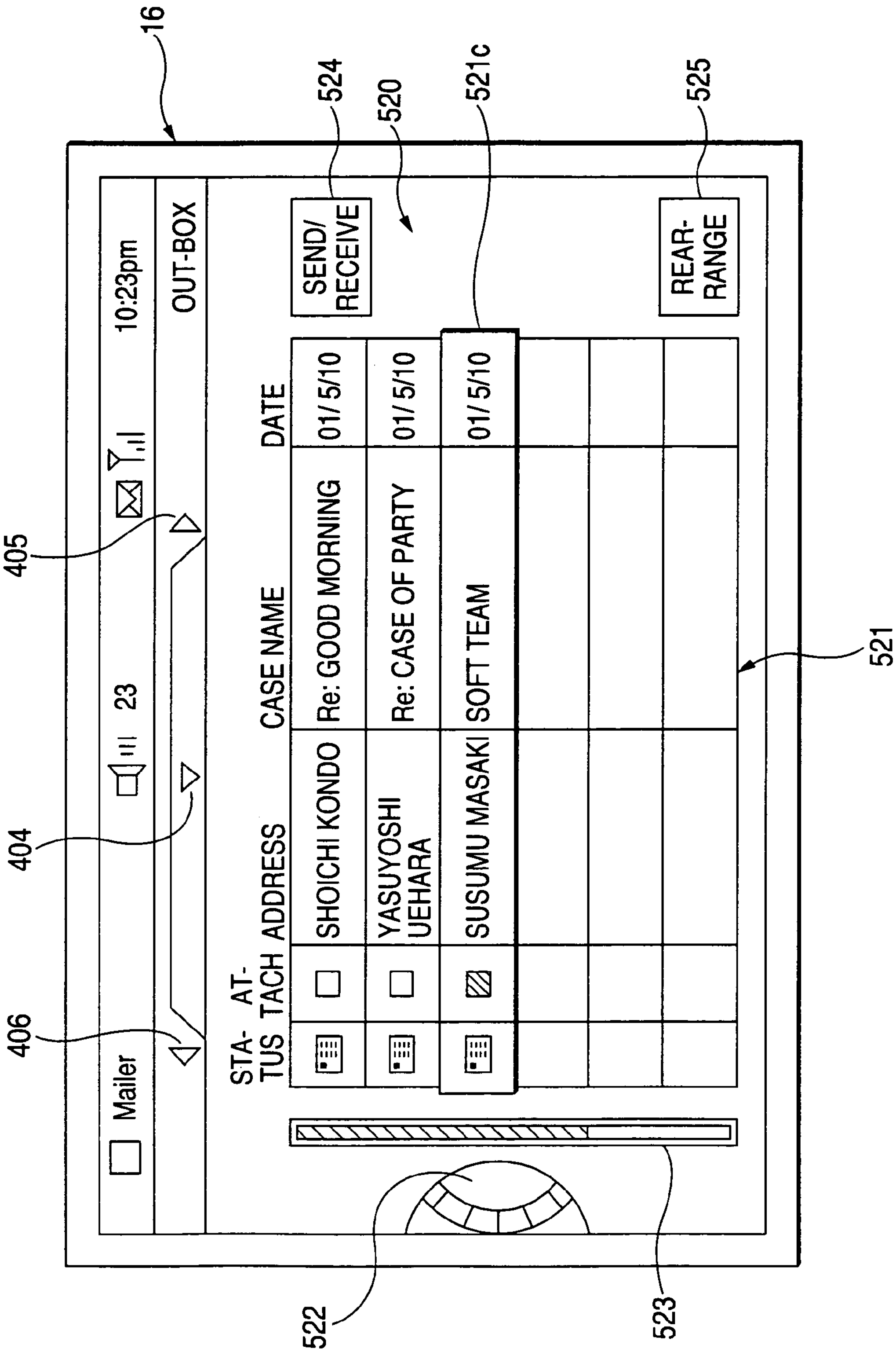
FIG. 62 is a diagram showing a screen, on which display screen showing a list of an out-box is displayed on a mail screen displayed in the display unit of the display control device according to the embodiment.

When the list button 404 is touched with the finger with the satellite button 402*b* (out-box button) being focused in the screen of FIG. 47, when the list button 21 is pushed or when the satellite button 402*b* is clicked; or when the list change buttons 405 and 406 are touched with the finger in the screen of FIG. 48, when the left button 22 or the right button 23 is pushed or when the display in the list change button 405 is the “OUT-BOX”, a display screen 520 shown in FIG. 62 is displayed in the monitor 16. In the display screen 520, there are displayed: a list 521 of mails in the out-box; a scroll dial 522; a position bar 523; a send/receive button 524; a rearrange button 525.

Figure 63:
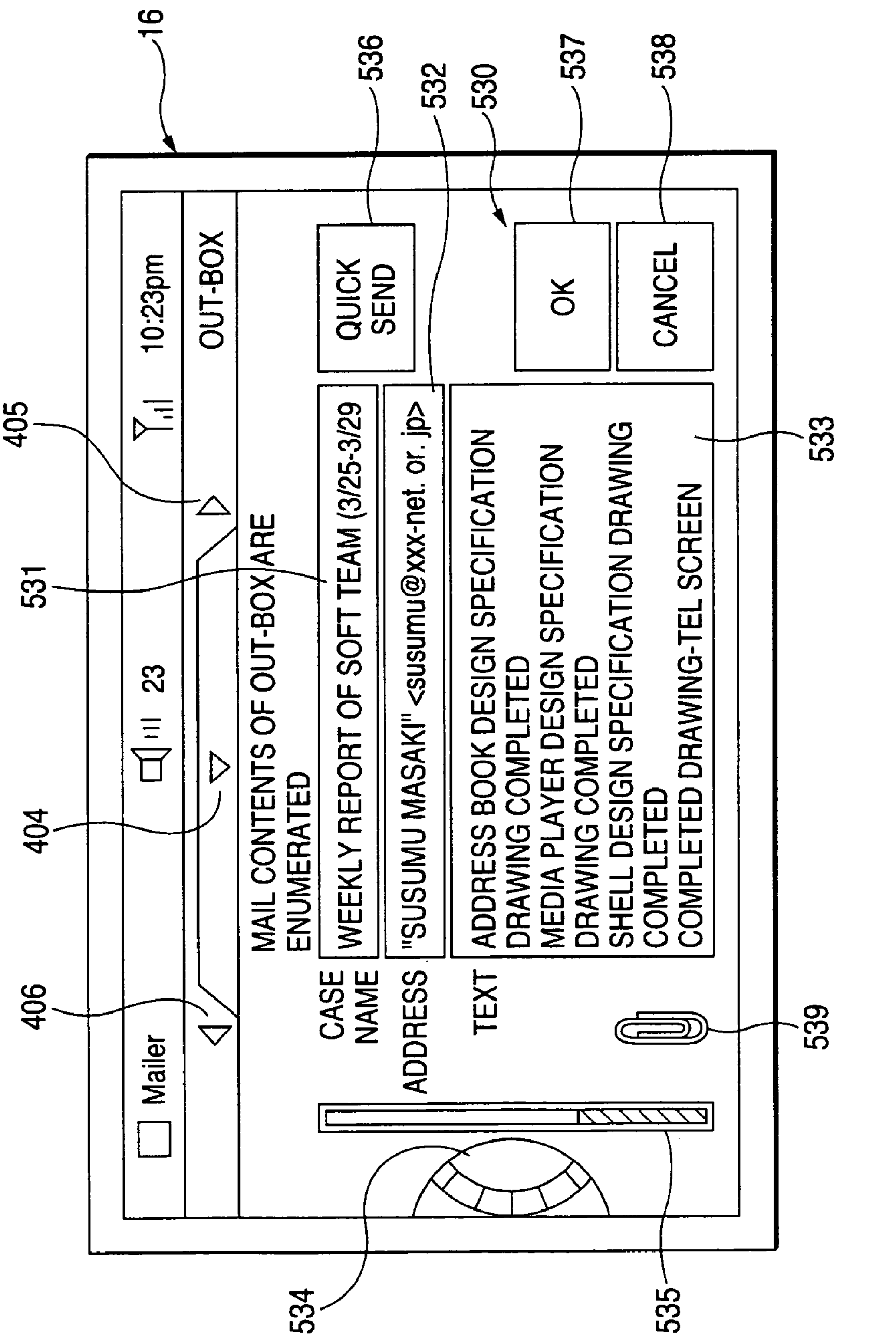
FIG. 63 is a diagram showing a screen, on which display screen showing the contents of a mail of the out-box is displayed on a mail screen displayed in the display unit of the display control device according to the embodiment.

When a list item button 521*c* is touched in the display screen 520 with the finger for the aforementioned predetermined or shorter time or clicked by the controller 20, a display screen 530 shown in FIG. 63 is displayed in the monitor 16. In the display screen 530, as in the display screen 420 on the in-box shown in FIG. 49, there are displayed: a case name column 531; an address column 532 (corresponding to the sender column 422 in the display screen 420); a text column 533; a scroll dial 534; a position bar 535; a send button 536; an OK button 537; and a cancel bar 538. In the presence of an attached file, a clip mark 539 is further displayed.

Figure 64:
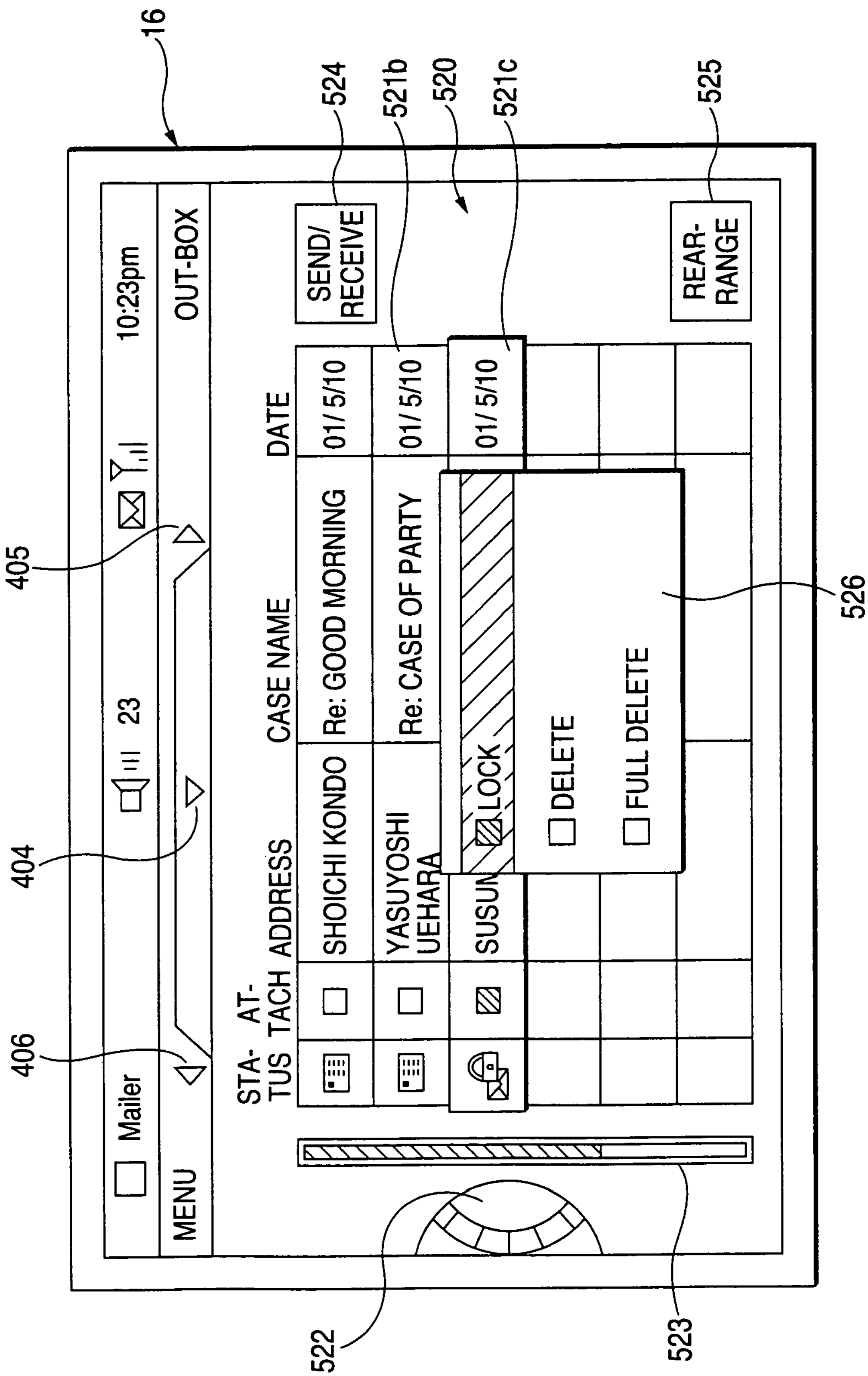
FIG. 64 is a diagram showing a screen, on which a pop-up menu is displayed on a display screen showing a list of the out-box, and shown in FIG. 48.

When the aforementioned predetermined time elapses after the list item button 521*c* was touched with the finger, on the other hand, a pop-up menu 527 shown in FIG. 64 is displayed over the display screen 520. However, the contents are restricted to the items of the pop-up menu 417 on the in-box shown in FIG. 57 so that their description is omitted.

Figure 65:
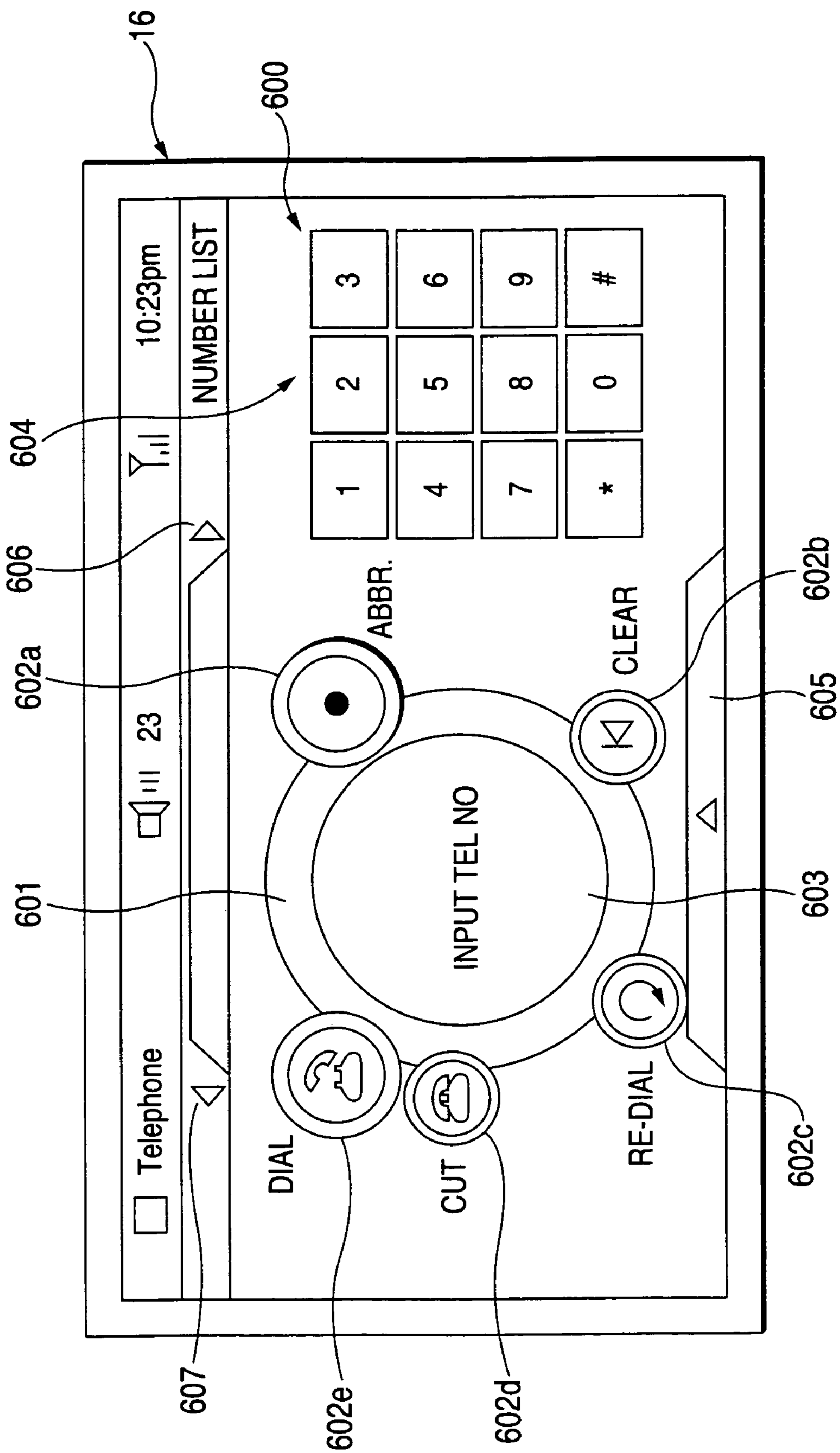
FIG. 65 is a diagram showing a telephone screen displayed in the display unit of the display control device according to the embodiment.

When the icon 102*h* is selected in the start menu screen 101, a telephone screen 600 shown in FIG. 65 is displayed in the monitor 16. In the telephone screen 600, there are displayed: a base ring 601 arranged on the left side of rather than the screen center; and satellite buttons 602*a* to 602*e* arranged along and around the base ring 601. The base ring 601 is provided there in with an information display portion 603. In the space on the right side of the telephone screen 600, there is displayed a ten key button 604 for inputting data such as a telephone number.

The satellite buttons 602*a* to 602*e* are divided into and arranged as: a satellite button group relating to the fundamental operations for the telephone; the satellite button 602*a* for calling the registered telephone number by an abbreviated dial; a satellite button 602 *b* (or clear button) for clearing the input of the ten key button 604; and the re-dialing satellite button 602 *c*. The satellite button group includes the line connecting satellite button 602*e* and the line cutting satellite button 602*d*.

A list button 605 is displayed in the lower portion of the telephone screen 600, and list change buttons 606 and 607 are displayed on the left and right sides of the upper portion. When the list change buttons 606 and 607 are touched with the finger or when the left button 22 or the right button 23 is pushed, the display at the list change button 606 is changed to the “NO LIST”, “SEND HISTORY” and “RECEIVE HISTORY”. Display screens 610, 620 and 630 corresponding to the individual displays, which are caused to appear when the list button 605 is touched or when the list button 21 is pushed, are shown in FIG. 66, FIG. 67 and FIG. 68.

Figure 66:
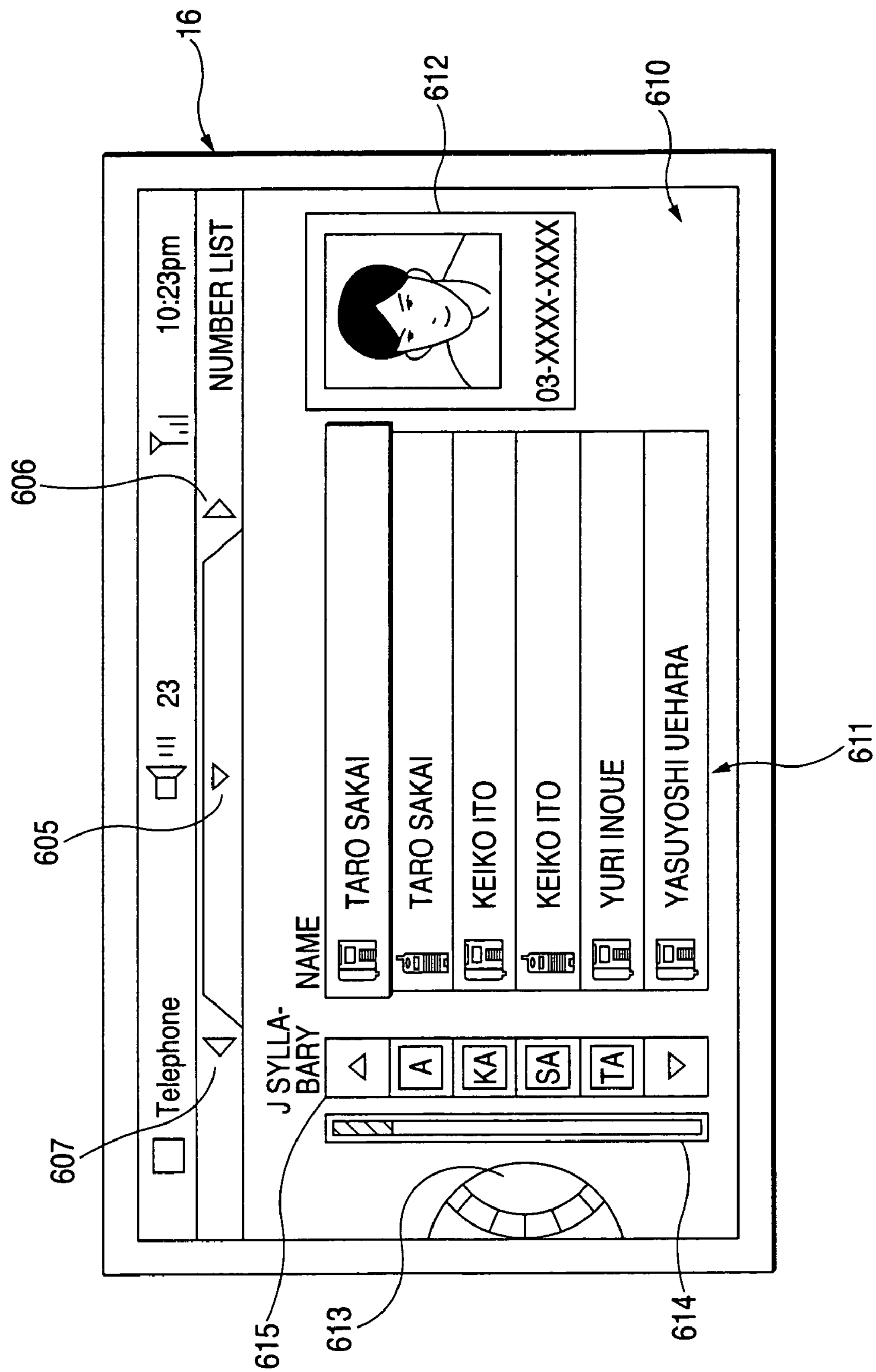
FIG. 66 is a diagram showing a screen, on which display screen showing the contents of a telephone number list is displayed on a telephone screen displayed in the display unit of the display control device according to the embodiment.

The display screen 620 shown in FIG. 66 is provided with a window 612 for displaying a list 611 of the telephone numbers at the screen center and for displaying the photograph and the telephone number of the registered person corresponding to the focused list item button on the right side. In the embodiment, the name of the registered person and the kind of the home or mobile telephone are displayed at each list item button. On the left of the list item button, there are displayed a scroll dial 613, a position bar 614 and a Japanese syllabary index 615.

Figure 67:
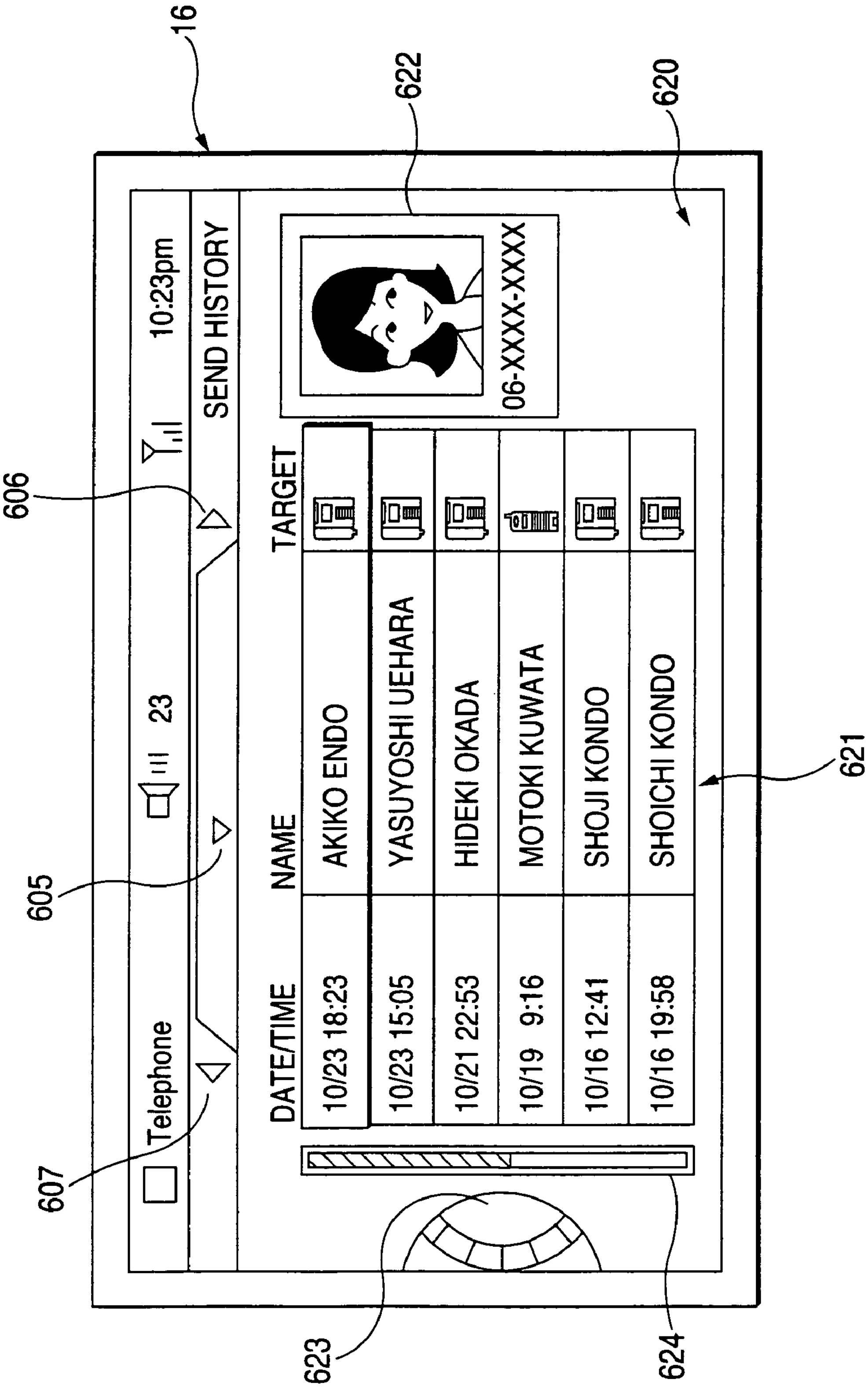
FIG. 67 is a diagram showing a screen, on which display screen showing the contents of a send history is displayed on a telephone screen displayed in the display unit of the display control device according to the embodiment.

In the display screen 620 shown in FIG. 67, a list of send history is displayed at the screen center. On the right side, there is disposed a window 622 for displaying the photograph or the like of the registered person and the telephone number, which correspond to the list item button being focused. Each list item button displays the send date/time, the name of the sender and the kind of home or mobile telephone. On the left side of the list item button, there are displayed a scroll dial 623 and a position bar 624.

Figure 68:
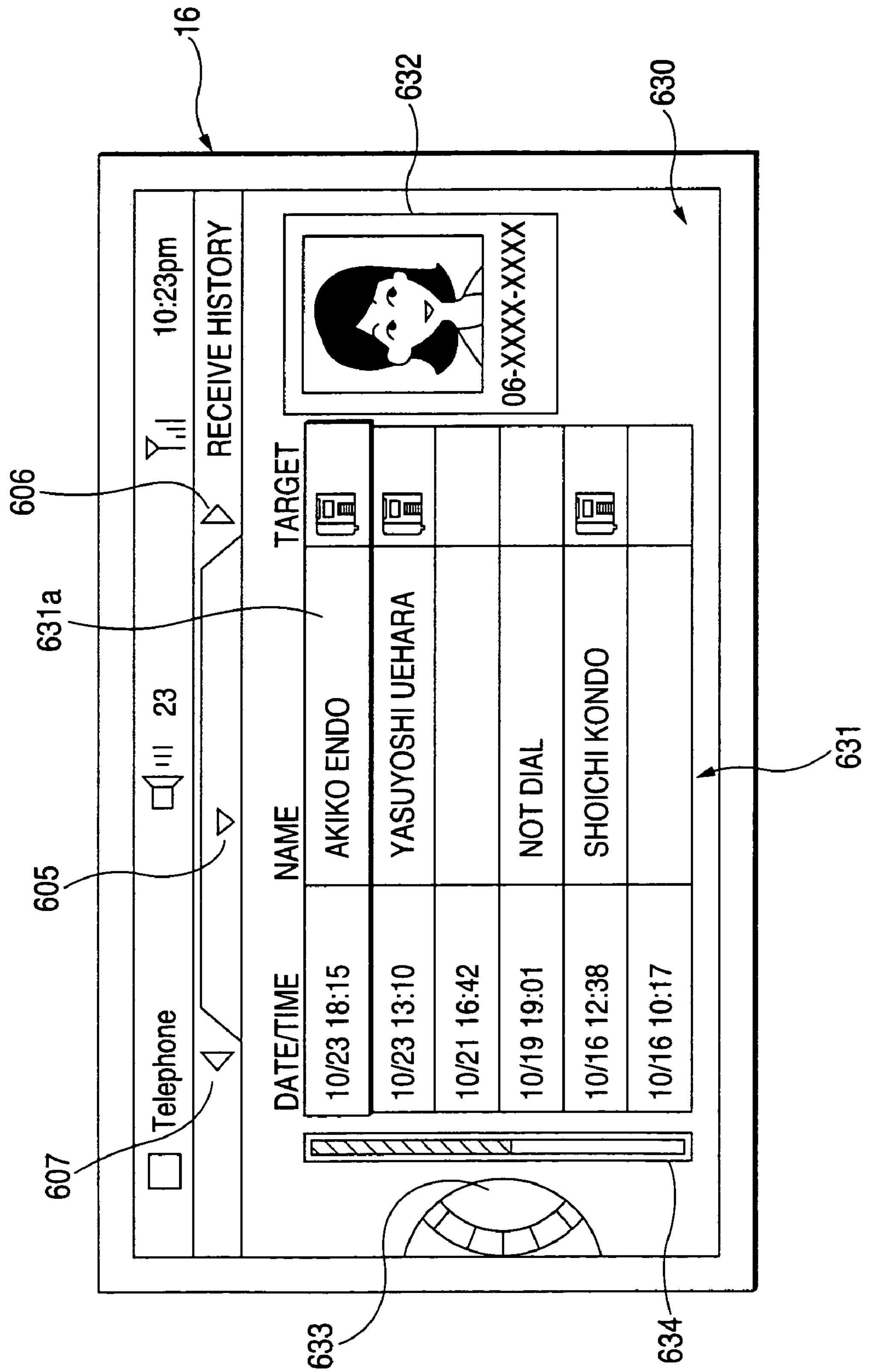
FIG. 68 is a diagram showing a screen, on which display screen showing the contents of a receive history is displayed on a telephone screen displayed in the display unit of the display control device according to the embodiment.
Figure 69:
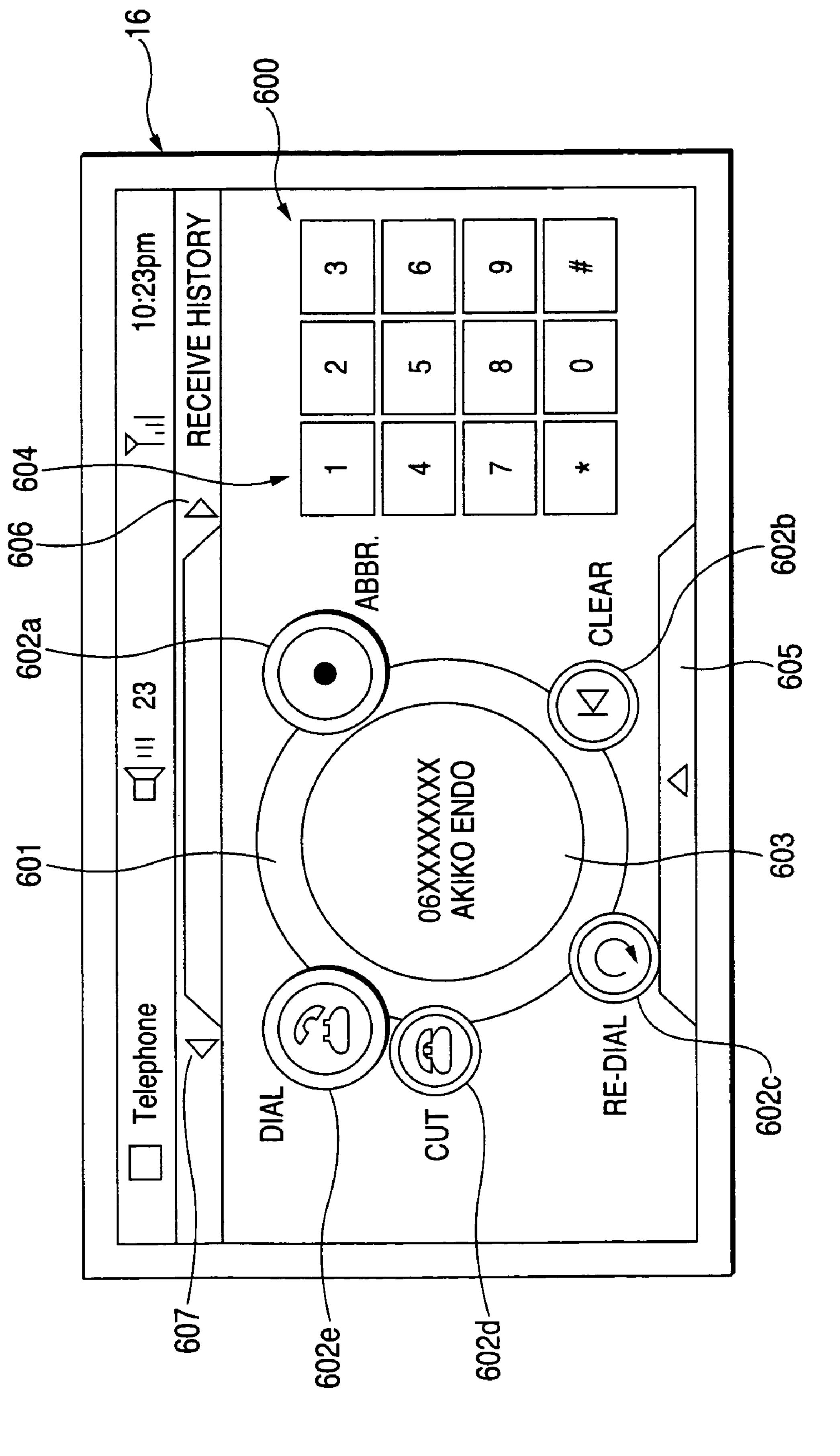
FIG. 69 is a diagram showing a telephone screen, on which a telephone number is displayed by clicking list buttons of the display screen shown in FIG. 68.

In the display screen 630 shown in FIG. 68, a receive history list 631 is displayed at the screen center. On the right side, there is disposed a window 632 for displaying the photograph or the like of the registered person and the telephone number, which correspond to the list item button being focused. Each list item button displays the receive date/time, the name of the sender and the kind of home or mobile telephone. On the left side of the list item button, there are displayed a scroll dial 633 and a position bar 634. When a list item button 631*a* is clicked, for example, in that screen, the display screen 630 disappears and changes into the screen shown in FIG. 69. When the satellite button 602*e* is then clicked, the home telephone (as referred to FIG. 68) of Mr. Endo is dialed.

Figure 70:
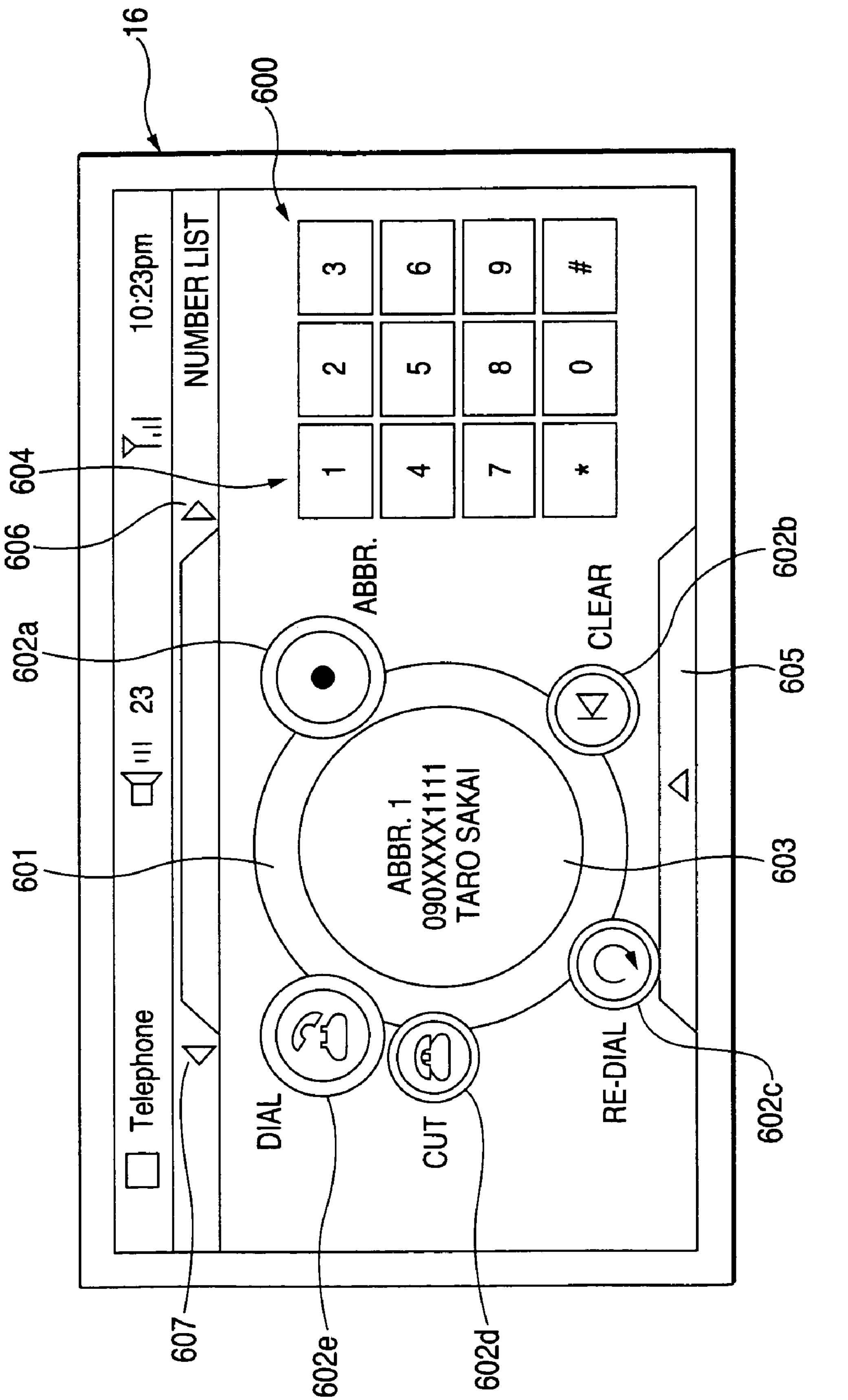
FIG. 70 is a diagram showing a screen, on which the telephone number of a person of an abbreviated number 1 is displayed on the telephone screen displayed in the display unit of the display control device according to the embodiment.

When the telephone is dialed without displaying the display screen in the screen of FIG. 65, there are cases, in which the abbreviated dial is used and in which the telephone number is directly inputted. In the case of the abbreviated dial, the user clicks the satellite button 602*a* (abbreviated button) and then clicks any of “1”, “2”, “3”, “4”, “5” and “6” of the ten key button 604 or the ten key button 27 of the remote control unit 19. The computer 1 can register six telephone numbers as the abbreviated dials. When the “1” of the ten key button 604 is clicked after the satellite button 602*a* was clicked, for example, the registered telephone number and the registered person of the abbreviated number 1 are displayed in the information display portion 603, as shown in FIG. 70. When the satellite button 602*e* is clicked in the state, Mr. Sakai or the registered person is called.

In the case of the abbreviated dial, on the other hand, the user is enabled, merely by clicking the satellite button 602*a* without using the ten key button 604 or the ten key button 27, to call. In the computer 1, more specifically, when the user clicks the satellite button 602*a* once, the registered telephone number of the abbreviated number 1 and the registered person are displayed in the information display portion 603, as shown in FIG. 70. When the user clicks the satellite button

602*a* two times, the registered telephone number of the abbreviated number 2 and the registered person are displayed in the information display portion 603. When the user clicks the satellite button 602*a* n-times, the registered telephone number of the abbreviated number n and the registered person are displayed in the information display portion 603 (3≦n≧6). By thus repeating the clicking of the satellite button 602*a*, therefore, the user can dial and call the desired registered telephone number which is registered as the abbreviated dial.

Figure 71:
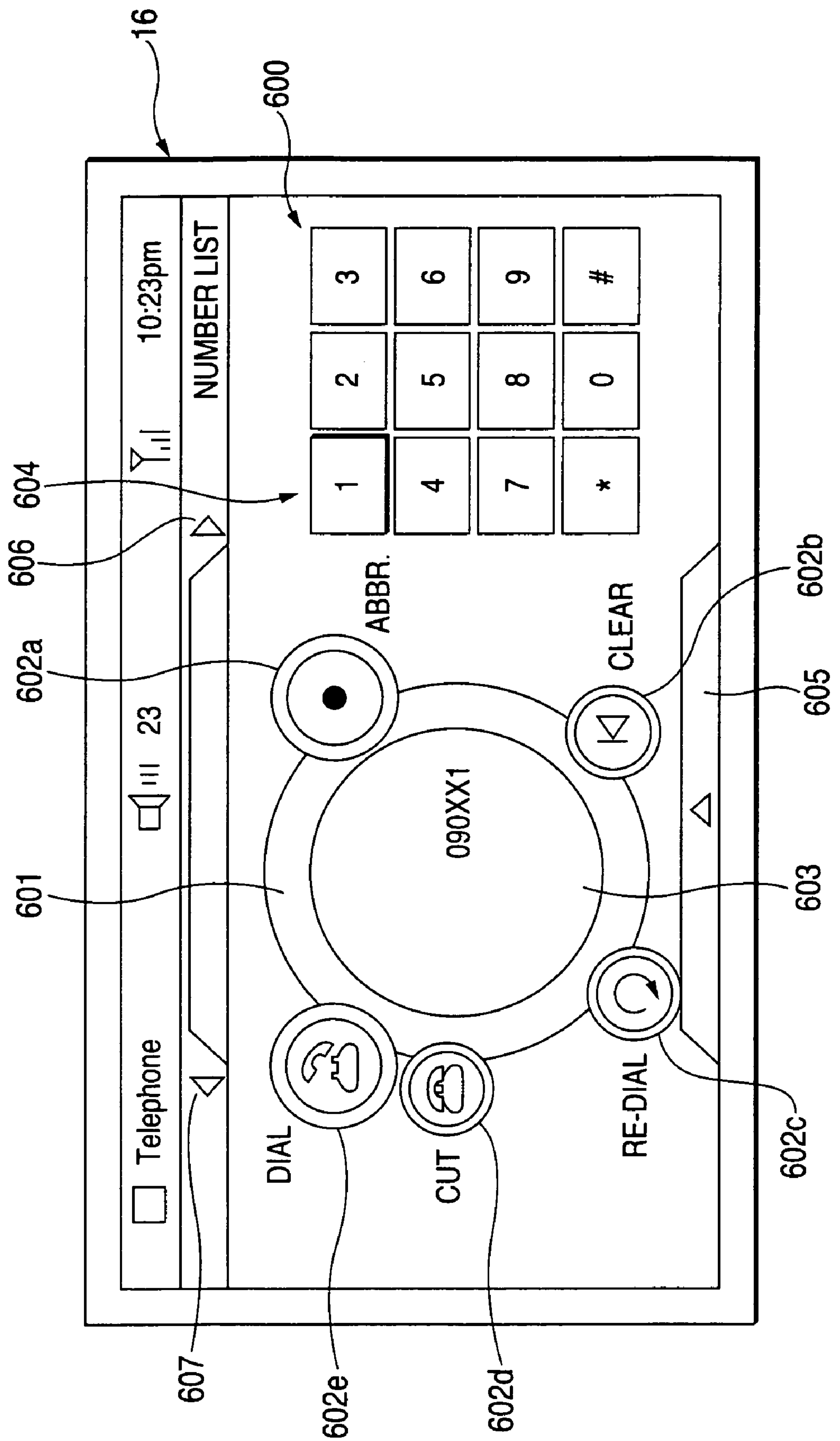
FIG. 71 is a diagram showing a screen, on which a telephone number inputted by ten keys is displayed on the telephone screen displayed in the display unit of the display control device according to the embodiment.

In case the user inputs the telephone number manually, on the other hand, the user inputs the numerals of the telephone number one by one through the ten key button 604 or the ten key button 27. The numerals inputted are displayed in the information display portion 603, as shown in FIG. 71. In case the input of the numerals is mistaken, the numeral inputted just before can be deleted by touching the satellite button 602*b* (clear button) with the finger within the aforementioned predetermined or shorter time or by clicking with the controller 20. In case the aforementioned predetermined time elapses after the satellite button 602*b* was touched with the finger, all the characters are deleted. The telephone is called to the inputted telephone number, when the satellite button 602*e* is clicked after the input of the telephone number was completed.

Here, the movement of the cursor between the satellite buttons and between the satellite button groups can be made by the controller 20 of the remote control unit 19, the left button 22, the right button 23 and the list change button. In the screen of FIG. 71, it can be deemed that the five satellite buttons are disposed around the base ring 601. However, the satellite buttons 602*c* to 602*e* on the left side demand no subsequent operation for dialing or cutting the telephone. On the other hand, the satellite buttons 602*a* and 62*b* on the right side are different in that they demand other operations (e.g., an inputting by the ten key button 604 or the ten key button 27) even after they were clicked. Therefore, those satellite buttons can also be divided into two satellite button groups. In the embodiment, the satellite buttons 602*a* to 602*e* are defined by dividing them into those left and right satellite button groups in connection with the movement of the cursor.

In connection with the controller 20, more specifically, the movement of the cursor between the satellite buttons 602*a* and 602*b* (as will be called the "first satellite button group") and the movement of the cursor between the satellite buttons 602*c* to 602*e* (as will be called the "second satellite button group") are done by the upward and downward operations, and the movement of the cursor among the first satellite button group, the second satellite button group and the ten key button 604 is done by the leftward and rightward operations. When the cursor is moved from the second satellite button group or the ten key button 604 to the first satellite button group, the satellite button 602*a* at the highest position of the screen of the first satellite button group is focused 602*a*. When the cursor is moved from the first satellite button group to the second satellite button group, the satellite button 602*e* at the highest position of the second satellite button group is focused. When the cursor is moved from the first satellite button group to the ten key button 604, the button "0" is focused. Here, all the satellite buttons 602*a* and 602*e* and the button "0" have a high frequency of use so that they can be clicked immediately after the movement of the cursor between the satellite button groups (and between the satellite button group and the ten key button, as in the following). Thus, the operations of the user are facilitated at the time of dialing the telephone.

However, the cursor position just after moved between the satellite button groups should not be limited thereto but may be returned to the previous position of the satellite button group or the ten key button or the destination of the cursor, as has been described in connection with the radio screen 150.

Alternatively, the cursor to return to the ten key button 604 may be returned to the previous position of the cursor before transmitted or to the button "0" after once transmitted. With the construction, for example, the user made a mistake in the inputting operation of the ten key button 604 and clicked the satellite button 602*b* or the clear button, so that the cursor is returned again to the ten key button 604. In the case, the button itself at the position, to which the cursor has returned, has been inputted by the erroneous operation and should not be clicked at the next time. Usually, the button to be intrinsically clicked is located near the erroneous button. Therefore, the distance from the return position of the cursor to the button to be intrinsically clicked is shortened to facilitate the inputting operation of the user. After the inputting operation was completed to complete the transmitting operation, what is next inputted is a new telephone number and generally begins from the numeral "0". Therefore, the numeral "0" is focused at the time when the cursor has moved to the ten key button 604, so that the next input is facilitated. According to the method, however, those buttons of the ten key button 604 that are focused immediately before the cursor moves to the first satellite button group are limited to "1", "4", "7" and "*". Therefore, the cursor may be returned not to the button, which has been focused just before the movement, but to the button which has been clicked just before the movement.

Here, whether the time for the cursor to move to the ten key button 604 is before or after the transmission is monitored by the CPU 64 and the RAM 66. The CPU 64 judges the situation before the transmission when the telephone number being inputted is stored in the RAM 66 (or when the telephone number being inputted is displayed in the information display portion 603). When the stored telephone number is cleared by the transmission, the CPU 64 judges the situation after the transmission. Moreover, the cursor in the satellite button moves sequentially clockwise independently of the satellite button group according to the right button 23 or the list change button 606 and moves sequentially counter-clockwise independently of the satellite button group according to the left button 22 or the list change button 607. FIG. 119 to FIG. 122 schematically show movement examples of the cursor by the operation of the controller 20.

Figure 119:
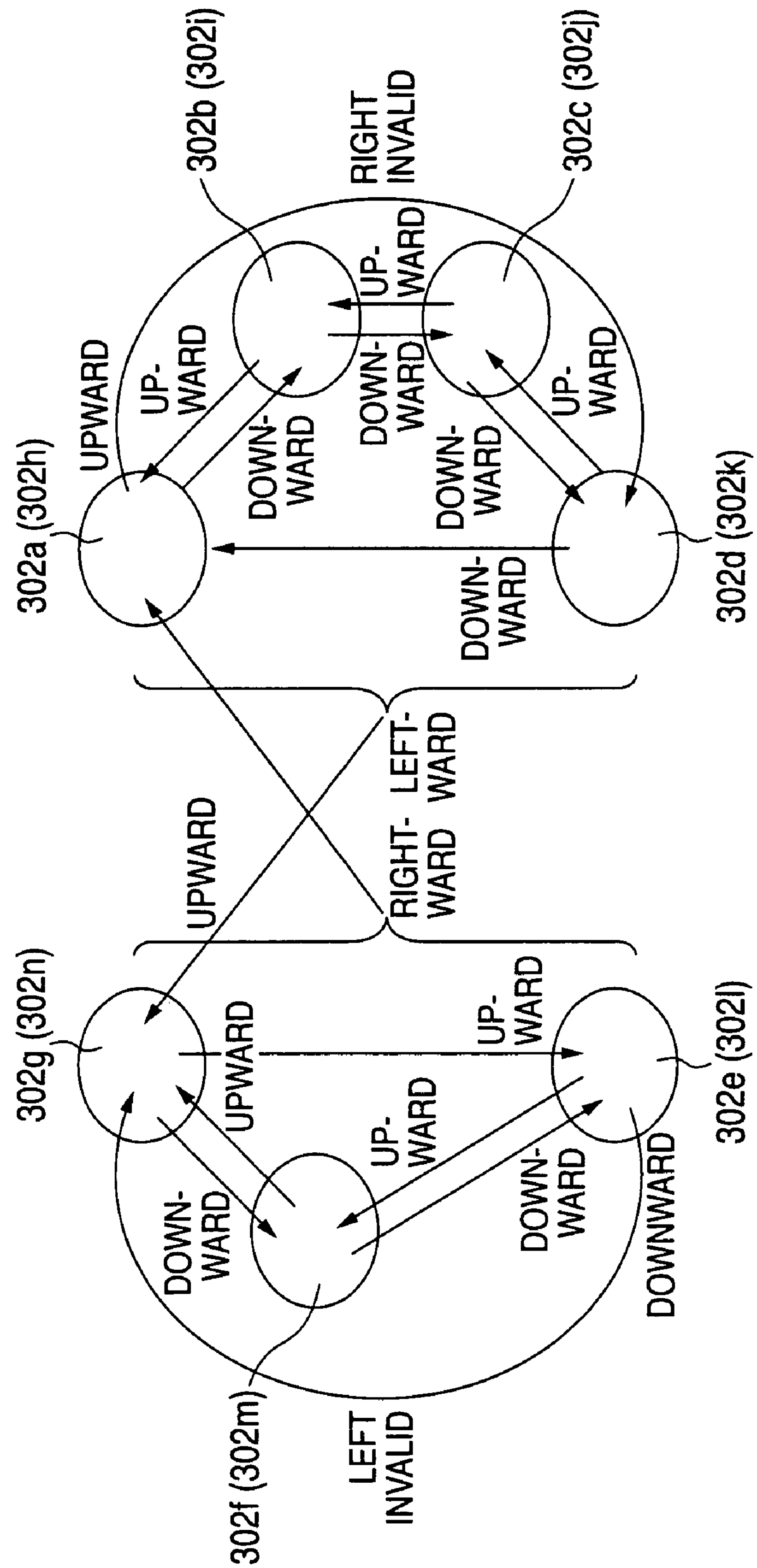

FIG. 119 shows an example of the movement of the cursor in the control panel screen 300. The cursor moves to go round in the satellite button group, when the controller 20 is operated upward or downward, but can move to another satellite button group when the controller 20 is operated leftward or rightward. When the controller 20 is operated rightward while the cursor is in the satellite button group on the left side, more specifically, the cursor moves to the highest one (i.e., the satellite button 302*a* (302*h*) of the satellite button group on the right side. The operation is invalid when the controller 20 is operated leftward. When the controller 20 is operated leftward while the cursor is in the satellite button group on the right side, more specifically, the cursor moves to the highest one (i.e., the satellite button 302*g* (302*n*) of the satellite button group on the left side. The operation is invalid when the controller 20 is operated rightward.

Figure 120:
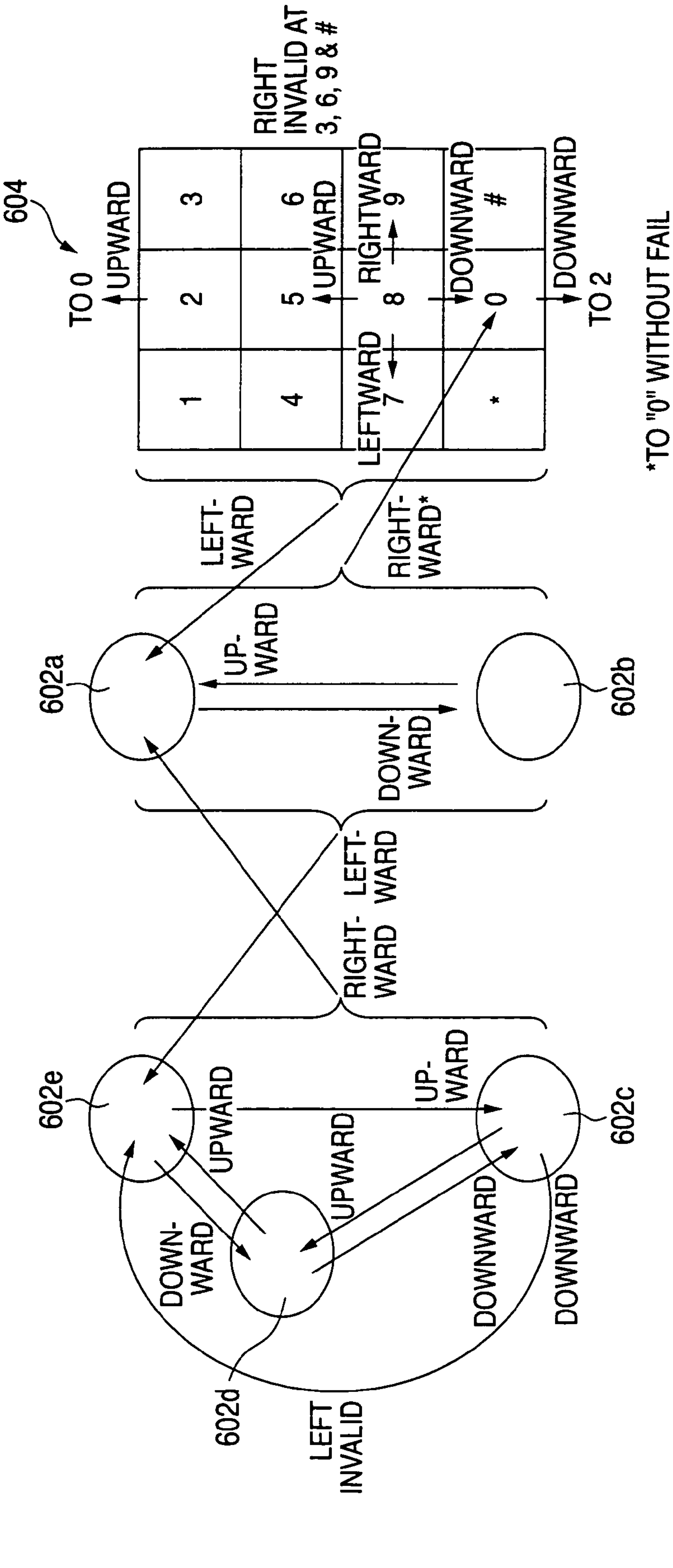

FIG. 120 shows an example of the movement of the cursor in the telephone screen 600. The method for moving the cursor in the satellite button group on the left side is similar to that in FIG. 119. When the controller 20 is operated rightward while the cursor is in the satellite button group on the right side, the cursor moves to the button "0" of the ten key button 604. In order that the cursor may move from the ten key button 604 to the satellite button group on the right side, the controller 20 has to be operated leftward when the cursor is at any of the buttons "1", "4", "7" and "*". When the controller 20 is operated rightward while the cursor is at any of the buttons "3", "6", "9" and "#", the operation is invalid.

Figure 121:
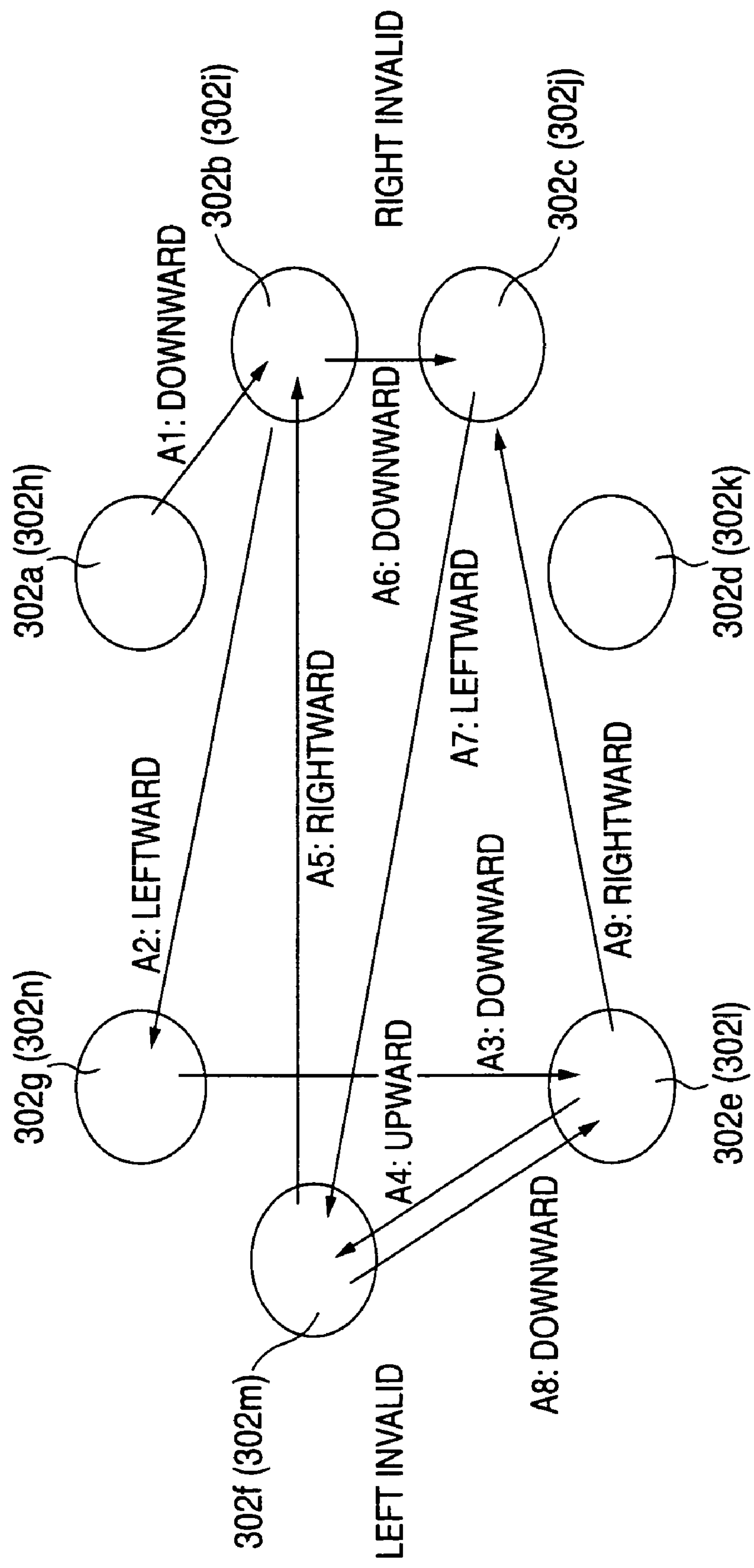

FIG. 121 shows an example of the movement of the cursor in the control panel screen 300. Symbols A1 to A9 in FIG. 121 designate that the cursor is moved in the recited order by the operation of the controller 20. When the cursor at the satellite button 302*b* (302*i*) in the satellite button group on the right side moves to the satellite button group on the left side (A2) and returns from the satellite button 302*f* (302*m*) to the satellite button group on the right side, the cursor returns to the satellite button 302*b* (302*i*) at the nearest position of the satellite button group on the right side (A5). When the cursor moves again from the satellite button 302*c* (302*j*) to the satellite button group on the left side, moreover, it returns the nearest satellite button 302*f* (302*m*) of the satellite button group on the left side (A7). When the cursor then returns to the satellite button group on the right side, it returns the nearest satellite button 302*c* (302*j*) of the satellite button group on the right side (A9).

Figure 122:
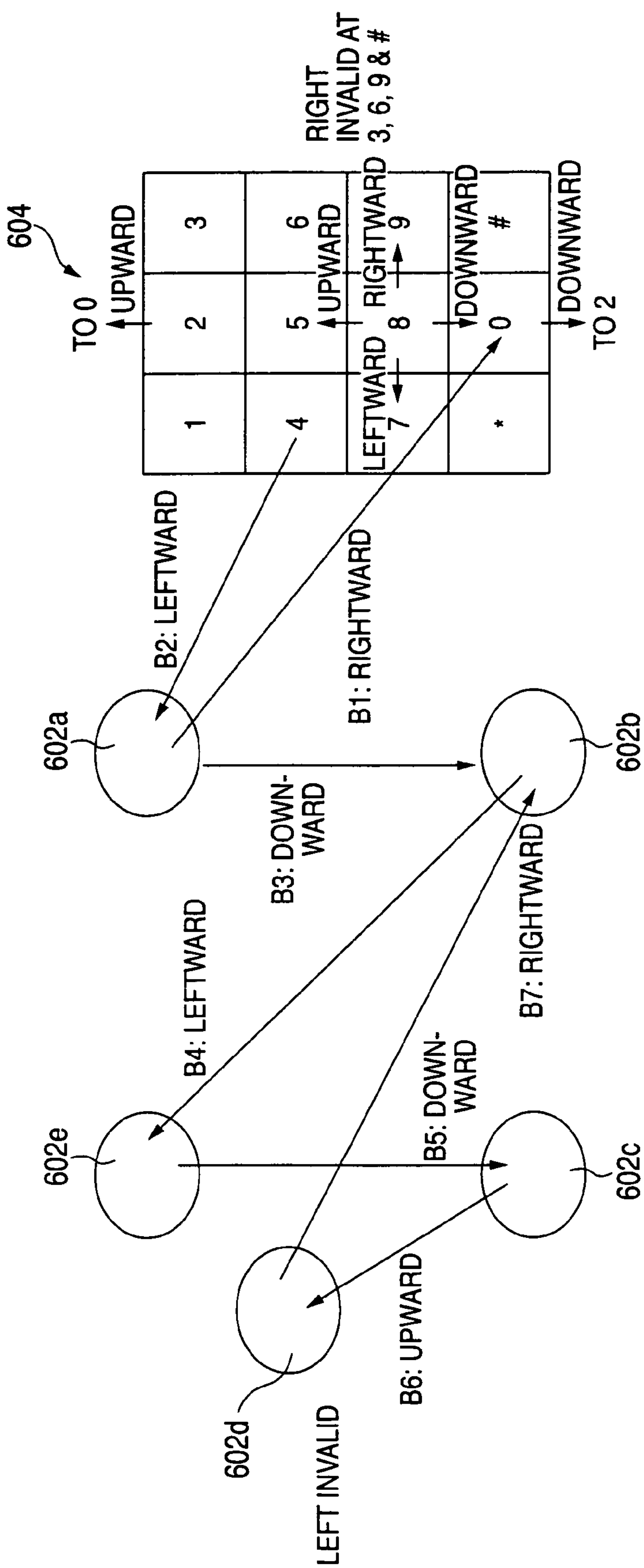

FIG. 122 shows an example of the movement of the cursor in the telephone screen 600. Symbols B1 to B7 in FIG. 122 designate that the cursor was moved in the recited order by the operation of the controller 20. When the cursor at the button "4" in the ten key button 604 moves to the satellite button group on the right side, it moves to the highest button (the satellite button 602*a*) of the satellite button group on the right side (B2) unless it was historically in the satellite button group on the right side. When the cursor moves from the satellite button 602*b* to the satellite button group on the left side, it moves to the highest button (the satellite button 602*e*) in the satellite button group on the left side (B4) unless it was historically in the satellite button group on the left side. When the cursor returns from the satellite button group on the left side to the satellite button group on the right side, on the other hand, it returns to the satellite button 602*b* (B7), because it was historically positioned at the nearest satellite button 602*b* of the satellite button group on the right side.

Figure 72:
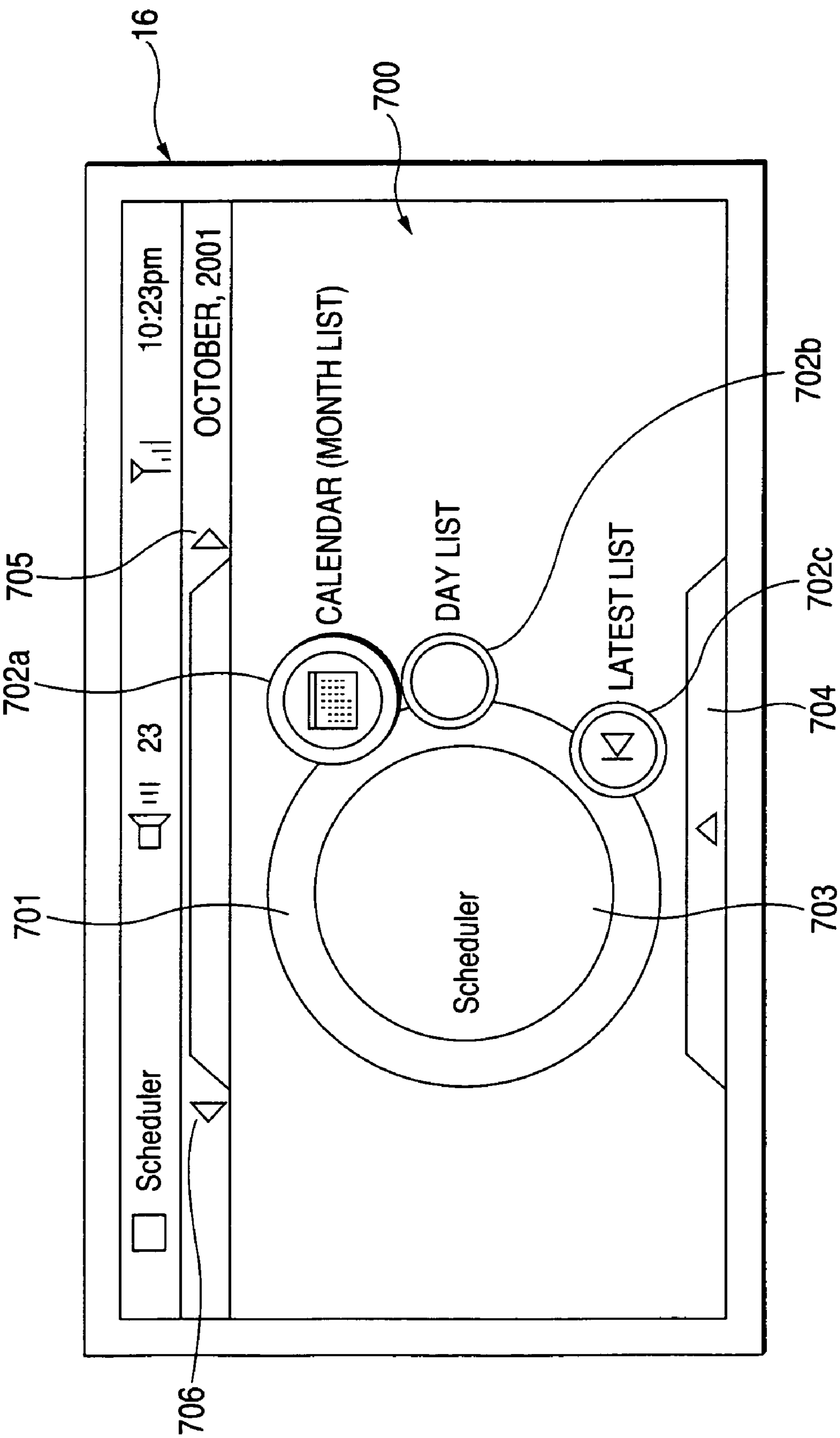
FIG. 72 is a diagram showing a scheduler screen displayed in the display unit of the display control device according to the embodiment.
Figure 73:
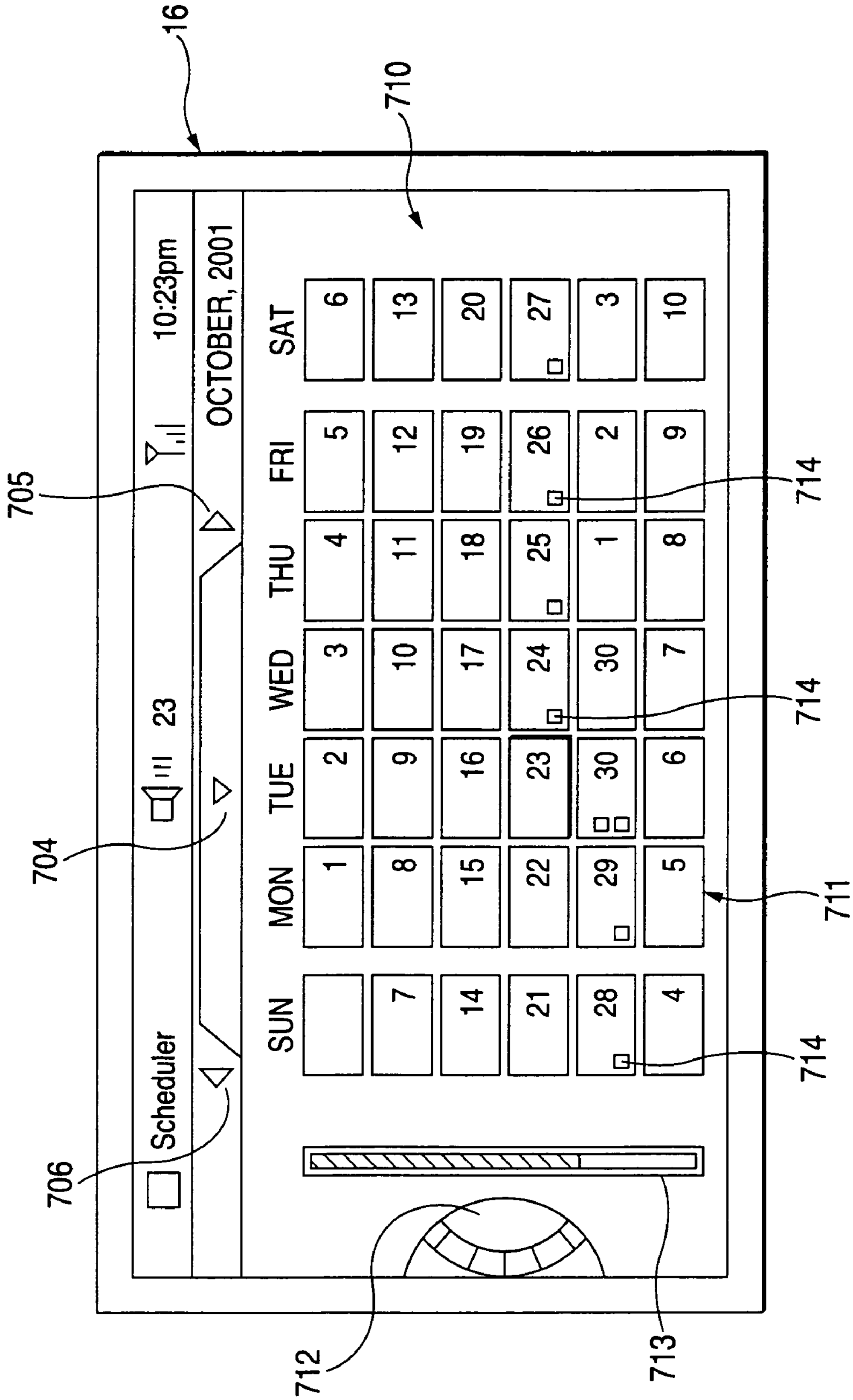
FIG. 73 is a diagram showing a screen, on which a display screen showing a calendar is displayed on a scheduler screen displayed in the display unit of the display control device according to the embodiment.

When the icon 102*i* is selected in the start menu screen 101, a scheduler screen 700 shown in FIG. 72 is displayed in the monitor 16. In the scheduler screen 700, there are displayed: a base ring 701 arranged screen center portion; and satellite buttons 602*a* to 702*c* arranged along and around the base ring 701. The base ring 701 is provided therein with an information display portion 703. Moreover, a list button 703 is displayed in the lower portion of the scheduler screen 700, and list change buttons 705 and 706 are displayed on the left and right sides of the upper portion. When the list change button 705 and 706 are touched with the finger or when the left button 22 or the right button 23 is pushed, the satellite button, at which the cursor is positioned, is changed. In FIG. 72, the satellite button 702*a* of the calendar (month list) is focused, so that a display screen 710 is exposed and displayed, as shown in FIG. 73, when the list button 704 is touched in this state with the finger or when the list button 21 is pushed.

Figure 74:
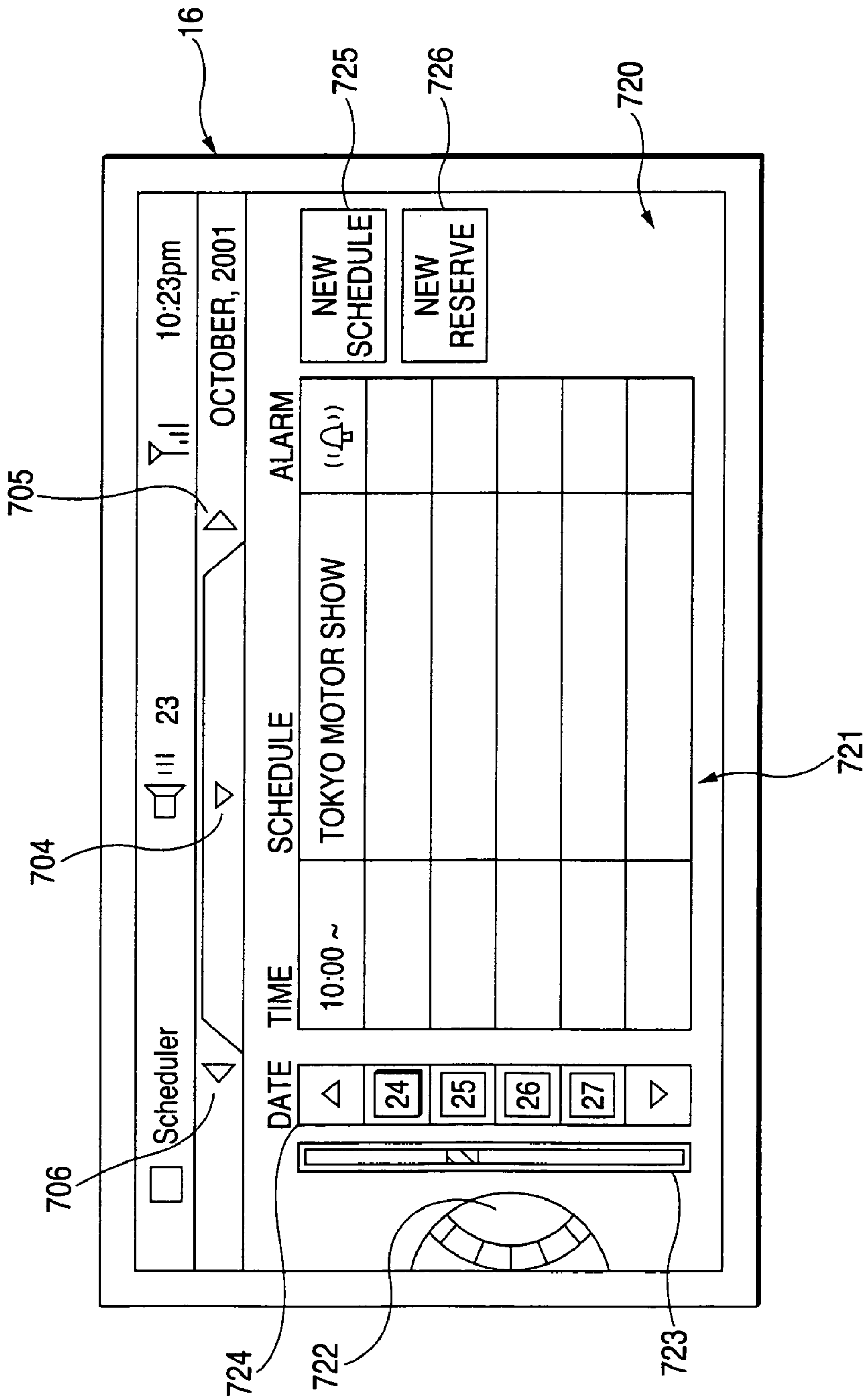
FIG. 74 is a diagram showing a screen, on which a display screen showing a day list is displayed on a scheduler screen displayed in the display unit of the display control device according to the embodiment.

In the display screen 710, there are displayed: a calendar 711 from the present month to the next month; a scroll dial 712; and a position bar 713. A square mark 714 at each date of the calendar 711 is attached according to the schedule of that date. When the date of 24th is clicked in the screen of FIG. 73, a new display screen 720 shown in FIG. 74 is displayed to display the detail schedule at 24th. The display screen 720 is provided at its center with a schedule list 721, on the left side with a scroll dial 722, a position bar 723 and a date index 724, and on the right side with buttons 725 and 726 for inputting a new schedule and a new reservation. The display screen 720 is displayed, too, when the list button 704 is touched with the finger with the satellite button 702*b* of the date list being selected in the scheduler screen 700.

Figure 75:
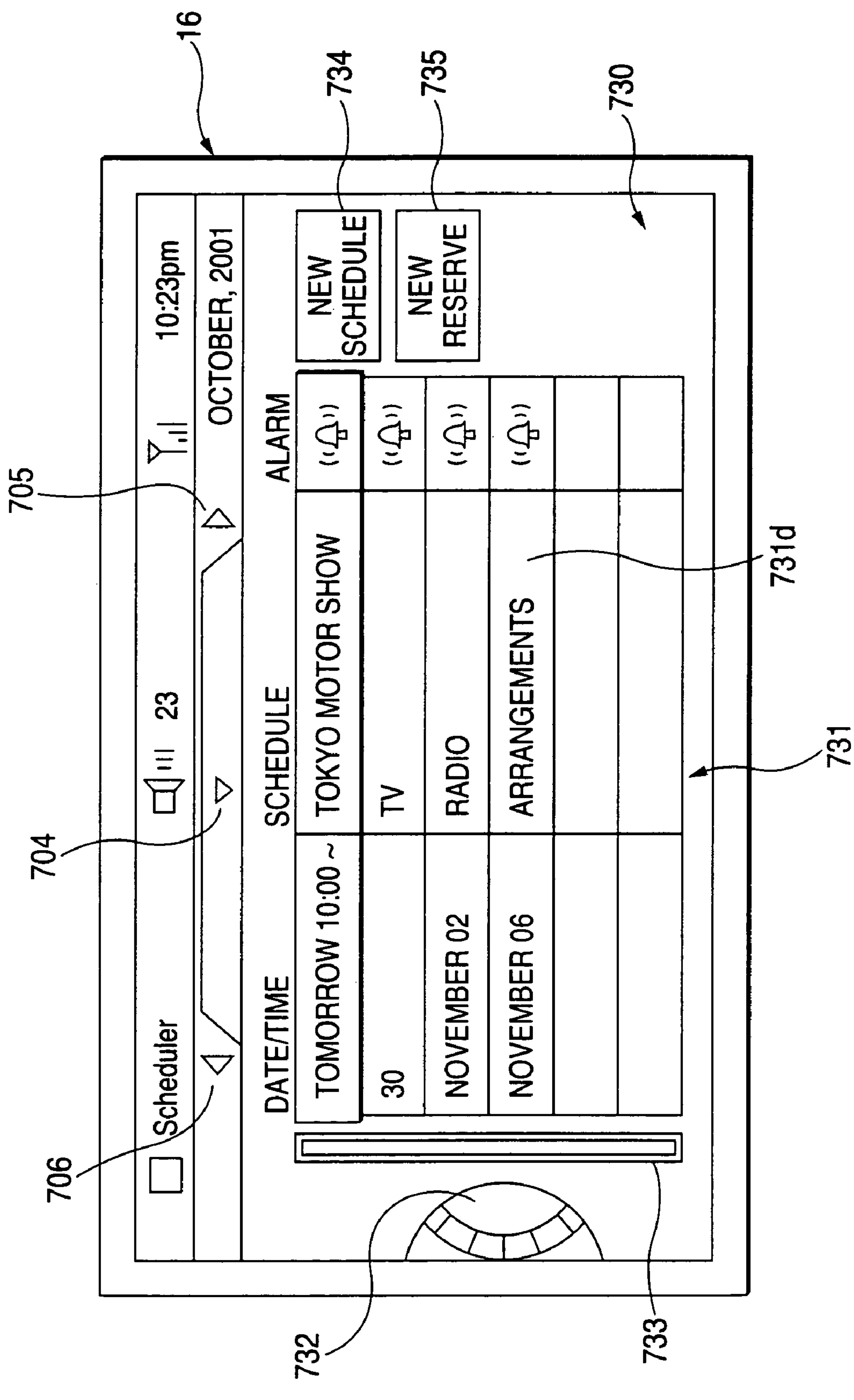
FIG. 75 is a diagram showing a screen, on which a display screen showing an immediate list is displayed on a scheduler screen displayed in the display unit of the display control device according to the embodiment.
Figure 76:
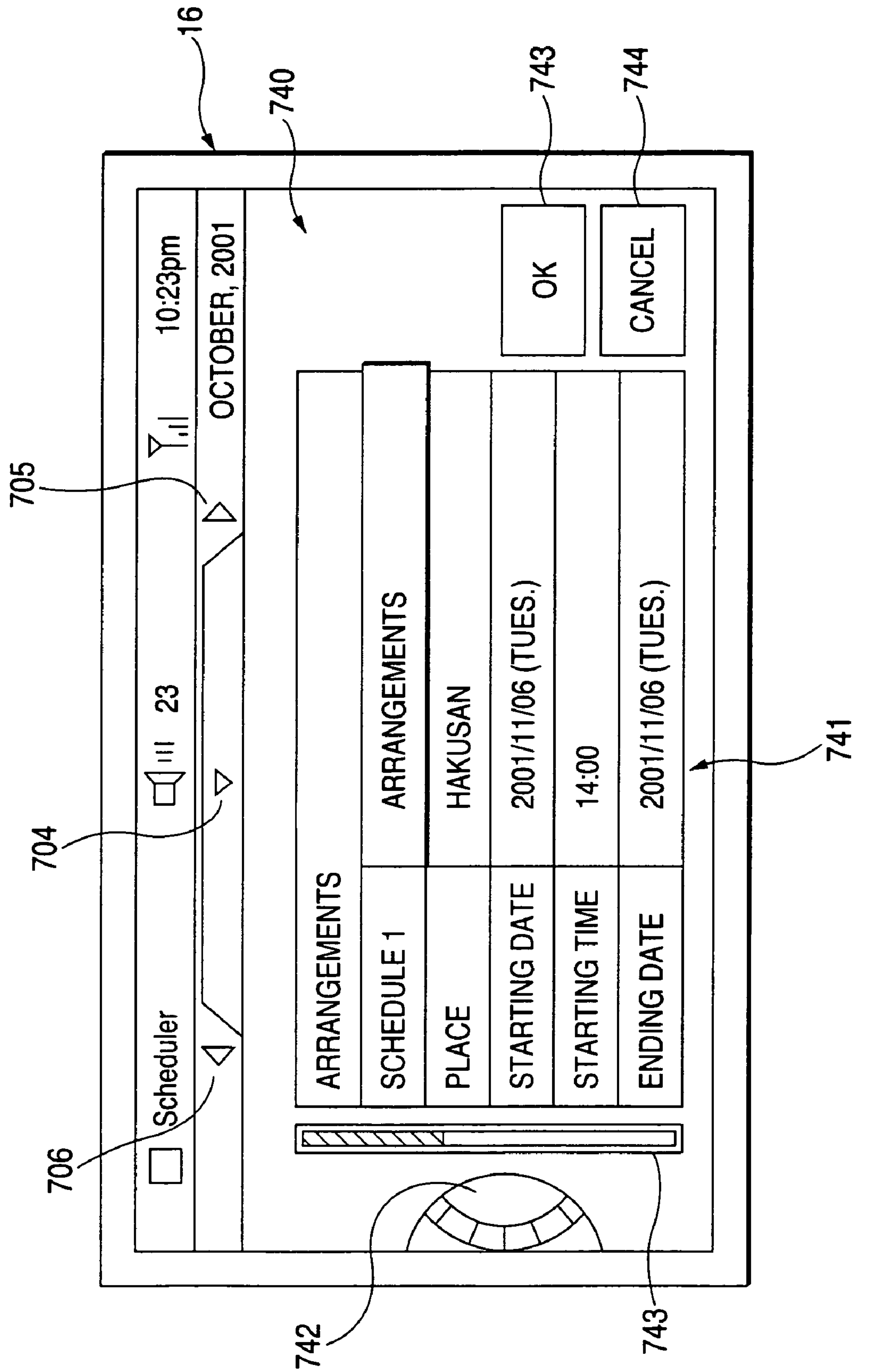
FIG. 76 is a diagram showing a screen, on which a display screen showing the detailed contents of a scheduler is displayed on a scheduler screen displayed in the display unit of the display control device according to the embodiment.

When the list button 704 is touched with the finger in the scheduler screen 700 with the satellite button 702*c* of the nearest list being focused or when the list button 21 is pushed, a display screen 730 shown in FIG. 75 is displayed. In the display screen 730, six schedules from the present to the latest are displayed in a list 731 at the center. The display screen 730 is provided on the left side with a scroll dial 732 and a position bar 733 and on the right side with buttons 734 and 735 for inputting a new schedule and a new reservation. When a list item button 731*d* indicating the "ARRANGEMENTS" is clicked in that screen, for example, a display screen 740 indicating the detail of the "ARRANGEMENTS" is displayed, as shown in FIG. 76. Here, the display screen 740 is provided not only with a list 741 showing the detail of the schedule contents but also with a scroll dial 742, a position bar 743, an OK button 743 and a cancel button 744.

Figure 77:
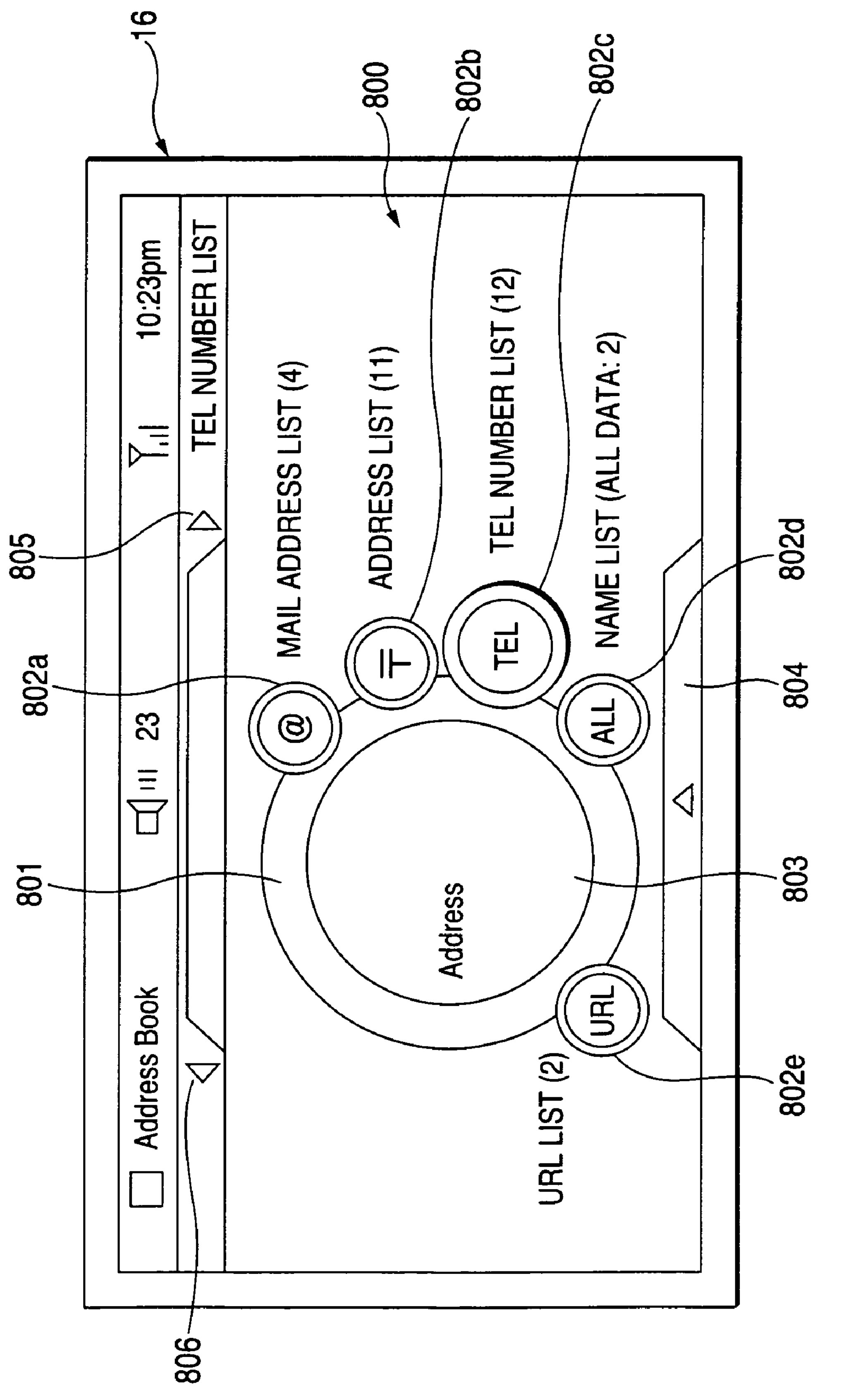
FIG. 77 is a diagram showing an address note screen displayed in the display unit of the display control device according to the embodiment.
Figure 78:
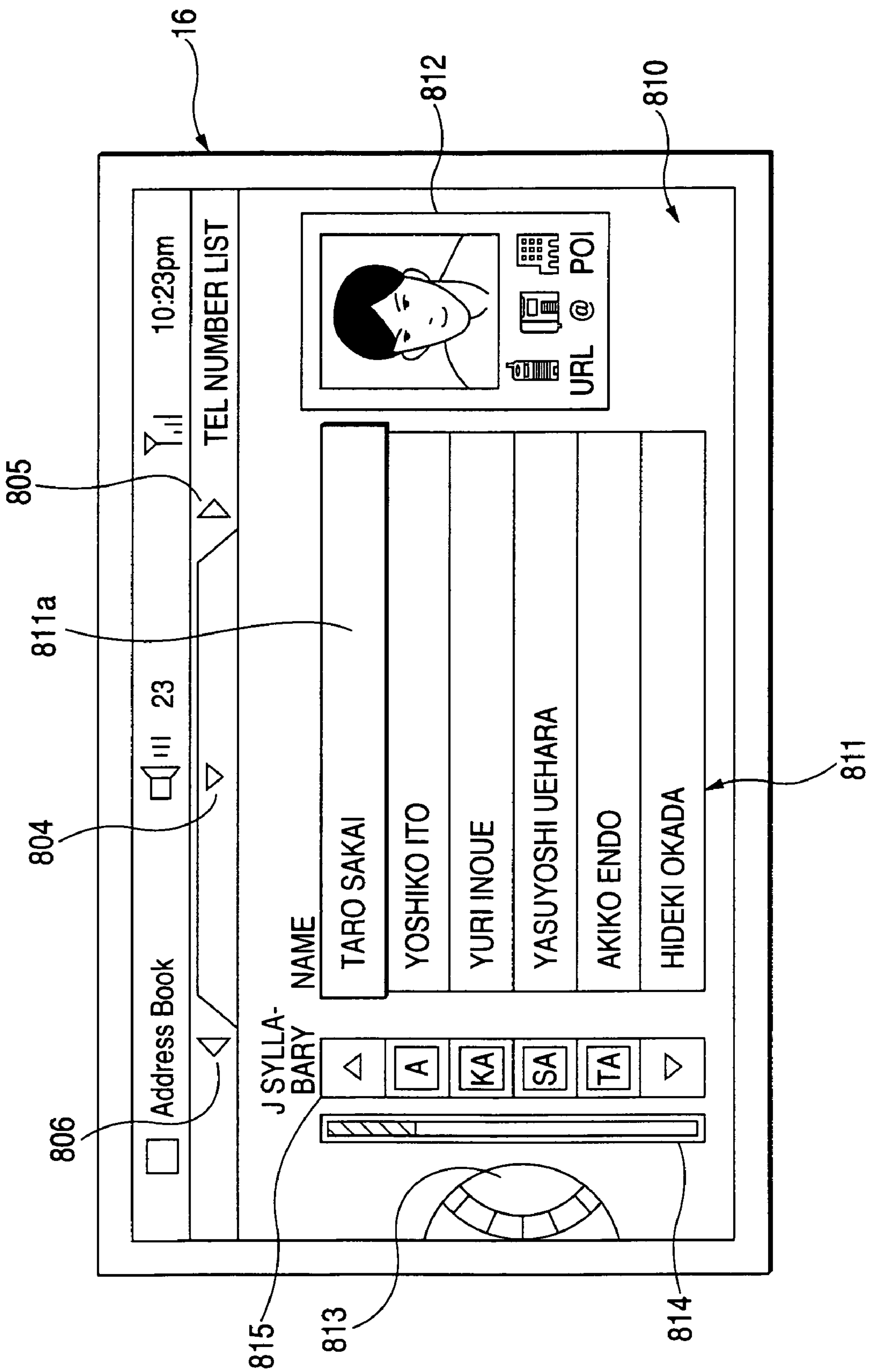
FIG. 78 is a diagram showing a screen, on which a display screen showing a telephone number list is displayed on the address note screen displayed in the display unit of the display control device according to the embodiment.

When the icon 102*l* is selected in the start menu screen 101, an address note screen 800 shown in FIG. 77 is displayed in the monitor 16. In the address note screen 800, there are displayed: a base ring 801 arranged at the screen center; and satellite buttons 802*a* to 802*e* arranged along and around the base ring 801. The address note screen 800 is provided therein with an information display portion 803. Moreover, a list button 804 is displayed in the lower portion of the address note screen 800, and list change buttons 805 and 806 are displayed on the left and right sides of the upper portion. When the list change buttons 805 and 806 are touched with the finger or when the left button 22 or the right button 23 is pushed, the satellite button, at which the cursor is positioned, is changed. In FIG. 77, the satellite button 802*c* of the telephone number list is focused. When the list button 804 is touched in this state with the finger or when the list button 21 is pushed, a display screen 810 is exposed and displayed, as shown in FIG. 78.

In the display screen 810, a name list 811 of persons having their telephone number information registered is displayed at the center. In FIG. 77, for example, a list item button 811*a* is focused, and an icon 812 having the photograph or the like of the corresponding person is displayed on the right side. To the icon 812, there are attached the mark of the mobile telephone, the mark of the home telephone, the mark of the place of employment (mark of a building), the mark of "URL", the mark of "@" and the mark of "POI". This means that not only the name but also the telephone number information of the mobile telephone, the telephone number information of the home telephone, the information of the place of employment, the URL information, the mail address information and the POI information (that is, any positional information on the registered person) are registered. On the left side of the display screen 810, there are displayed a scroll dial 813, a position bar 814 and a Japanese syllabary index 815.

Figure 79:
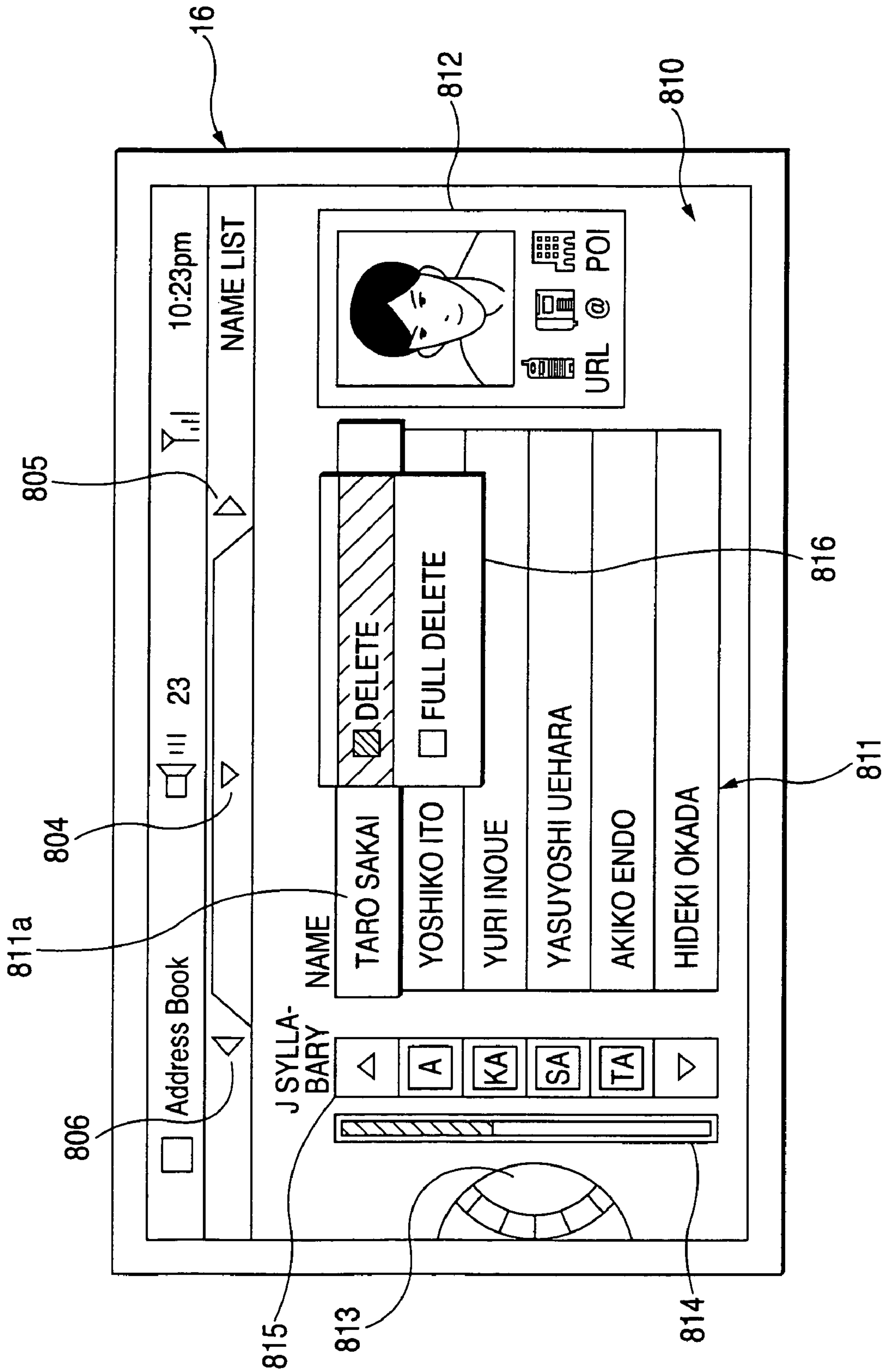
FIG. 79 is a diagram showing a screen, on which a pop-up menu is displayed on a display screen showing a telephone number shown in FIG. 78.

When the list item button 811*a* is touched in the display screen 810 with the finger for the aforementioned predetermined or longer time, there is displayed a pop-up menu 816 shown in FIG. 79. In the pop-up menu 816, the address information of the selected person is deleted, when the "DELETE" is clicked, and the address information of all persons is deleted when the "FULL DELETE" is clicked.

Figure 80:
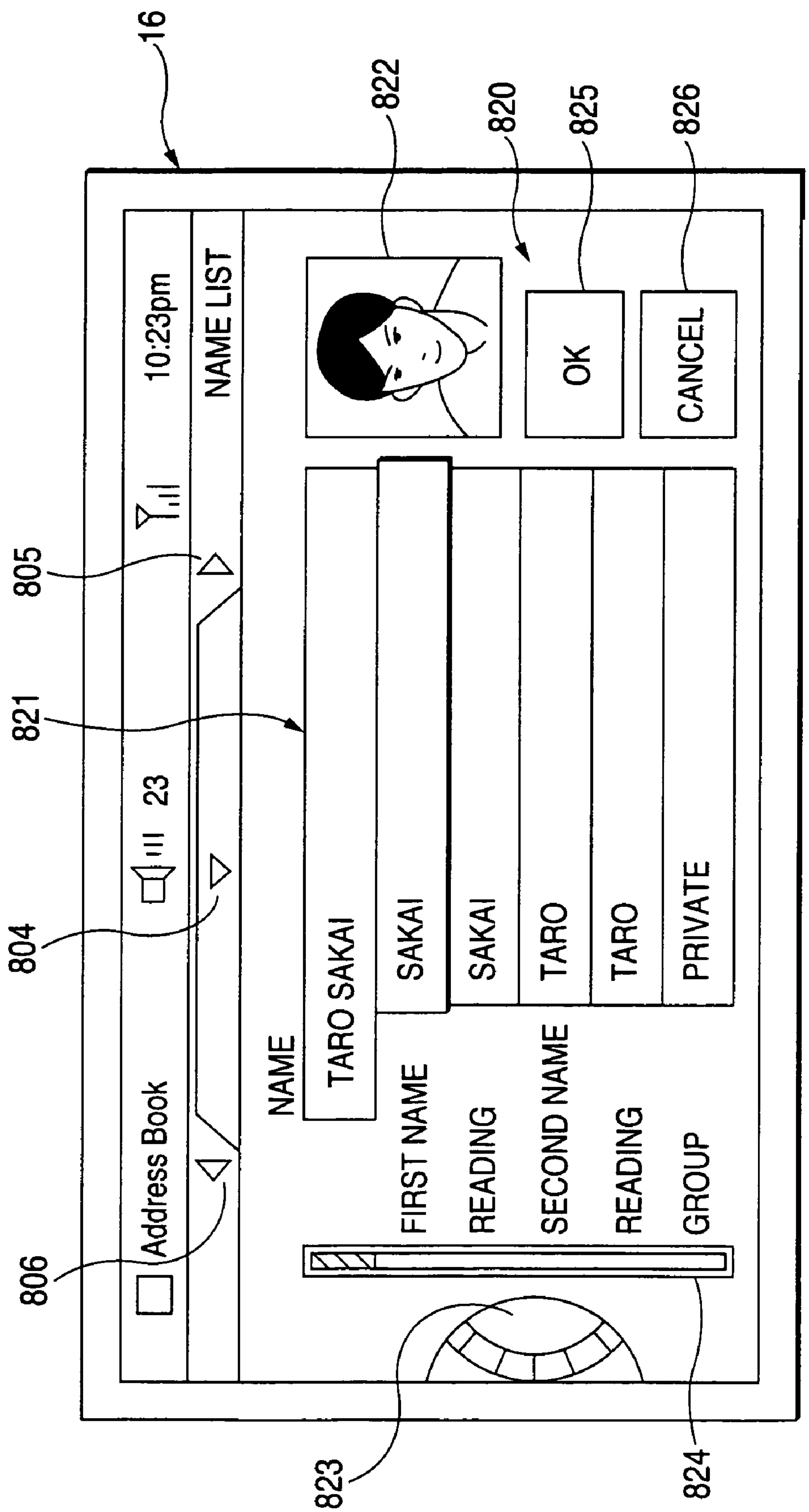
FIG. 80 is a diagram showing a screen, on which a display screen indicating various pieces of information on a listed person is displayed on the address note screen displayed in the display unit of the display control device according to the embodiment.
Figure 81:
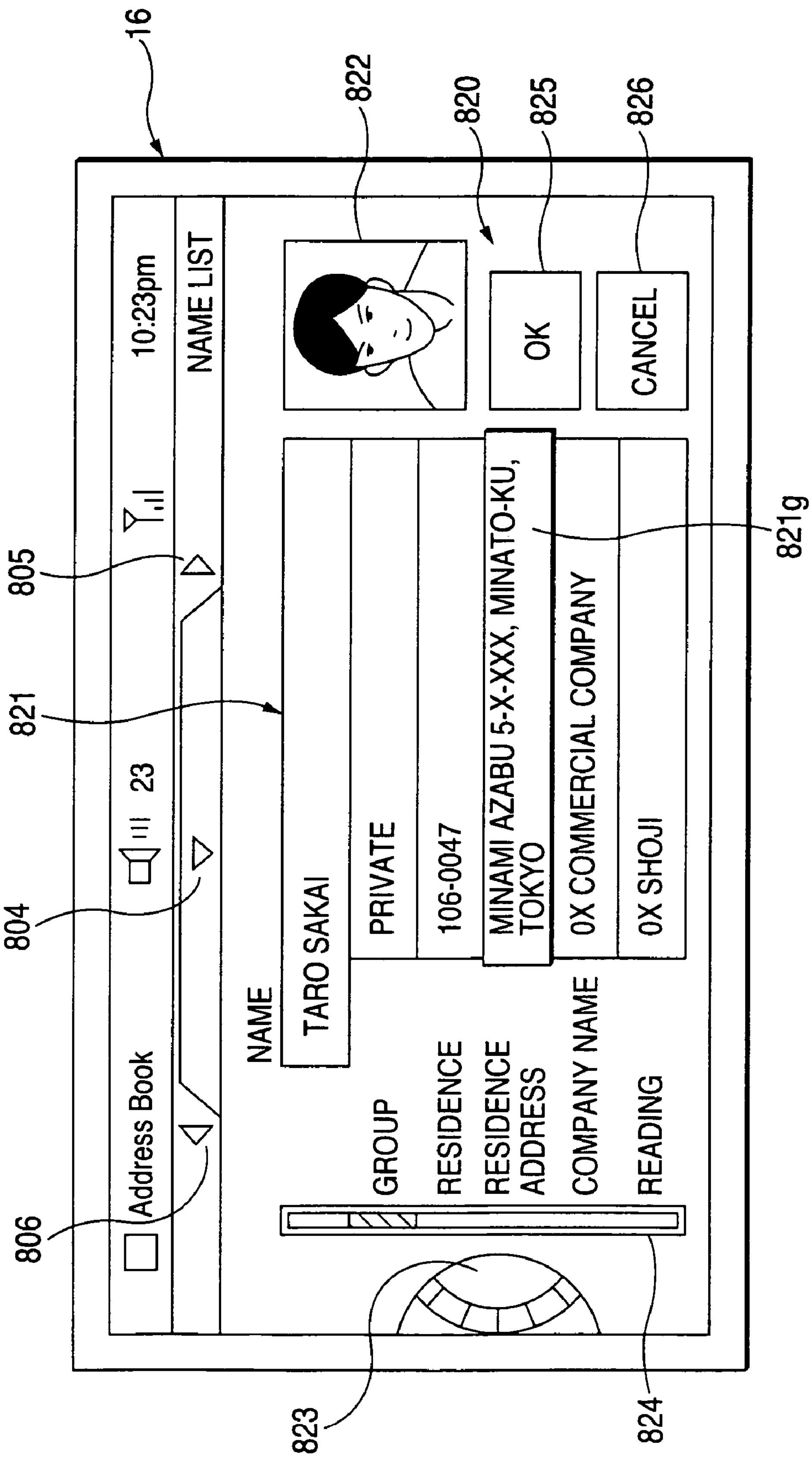
FIG. 81 is a diagram showing a screen, on which pieces of information other than those shown in FIG. 80 are displayed on the display screen showing the various pieces of information of the listed person shown in FIG. 80.
Figure 82:
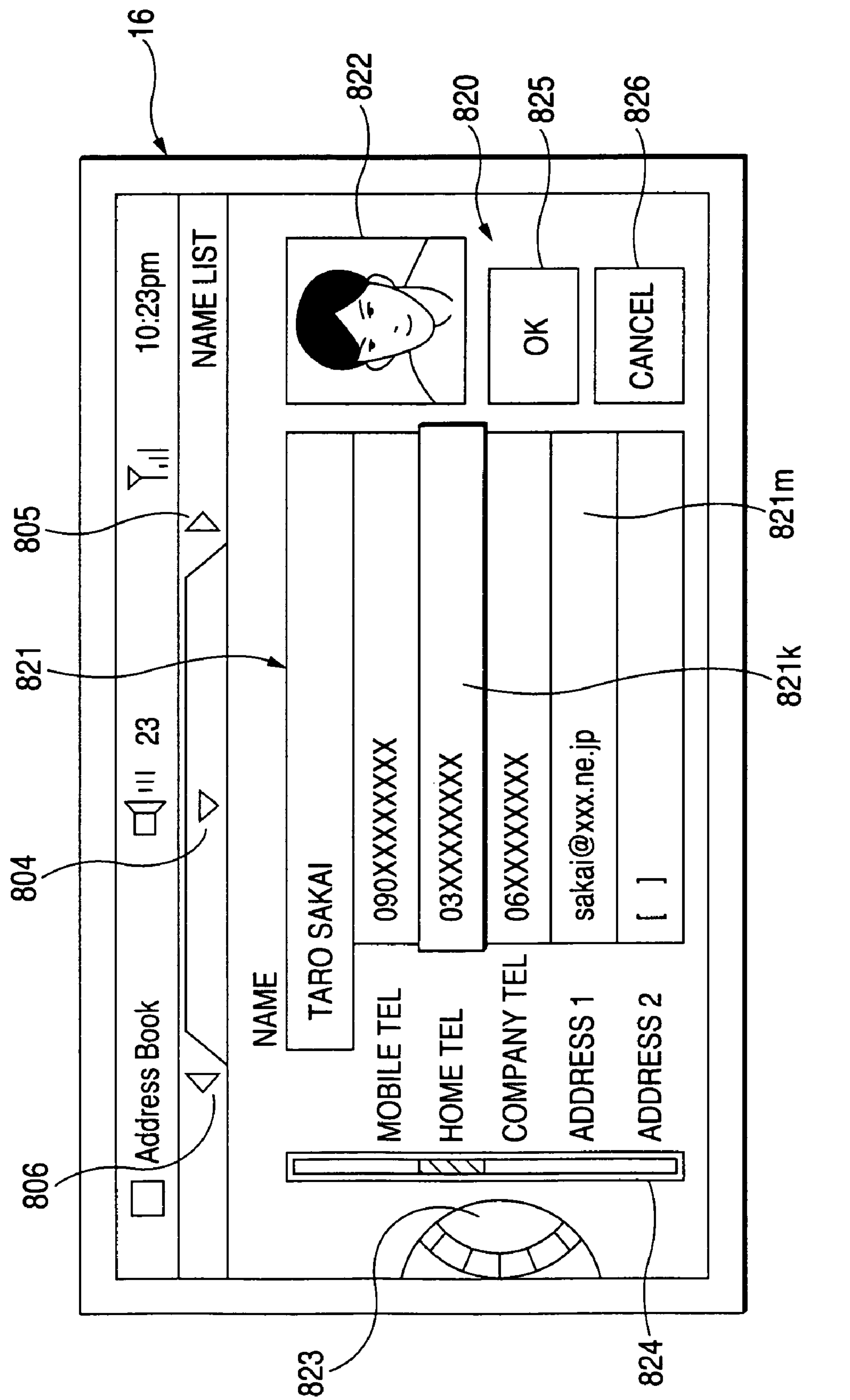
FIG. 82 is a diagram showing a screen, on which pieces of information other than those shown in FIGS. 80 and 81 are displayed on the display screen indicating the various pieces of information of the listed person shown in FIGS. 80 and 81.
Figure 83:
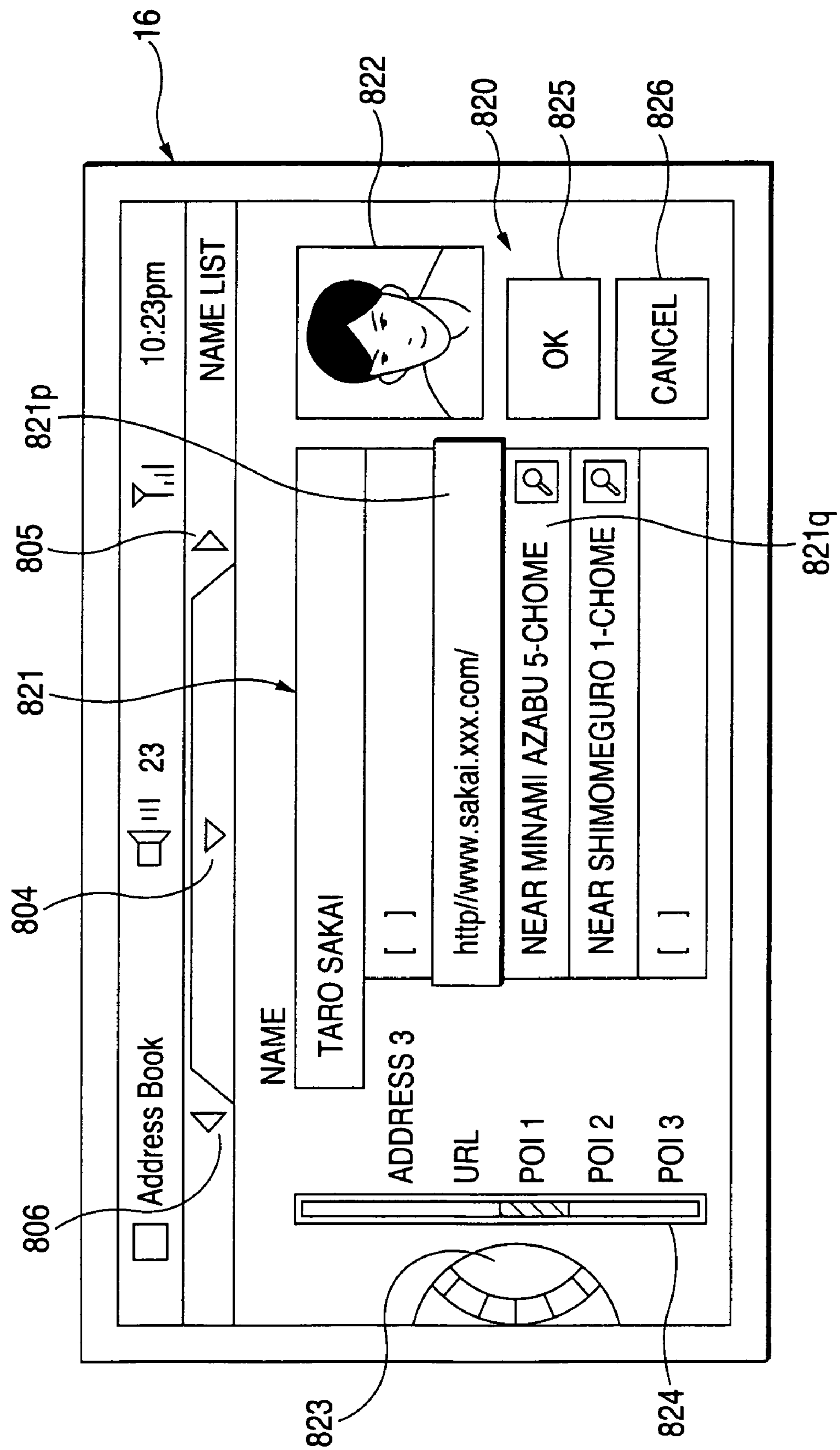
FIG. 83 is a diagram showing a screen, on which pieces of information other than those shown in FIGS. 80 to 82 are displayed on the display screen indicating the various pieces of information of the listed person shown in FIGS. 80 to 82.

When the list item button 811*a* is touched in the display screen 810 with the finger within the range of the aforementioned predetermined or shorter time or clicked by the controller 20, a new display screen 820 shown in FIG. 80 is displayed in the monitor 16. In the display screen 820, there are displayed: a list of detailed data on the registered person selected; a window 822 for displaying the photograph or the like of the registered person; a scroll dial 823; a position bar 824; an OK button 825; and a cancel button 826. In connection with the list 821, the items of the name, the first name and its reading, the second name and its reading, and the group are exclusively displayed in FIG. 80. By scrolling the screen downward by the scroll dial 823 or the scroll dial 25, however, there are displayed the various items such as the "RESIDENCE ADDRESS", "COMPANY NAME", "COMPANY ADDRESS", "MOBILE TEL", "HOME TEL", "COMPANY TEL", "MAIL 1", "MAIL 2", "MAIL 3" and "URL". FIG. 81 to FIG. 83 show the screens at the time when the scroll dial 823 or the scroll dial 25 is moved.

Figure 84:
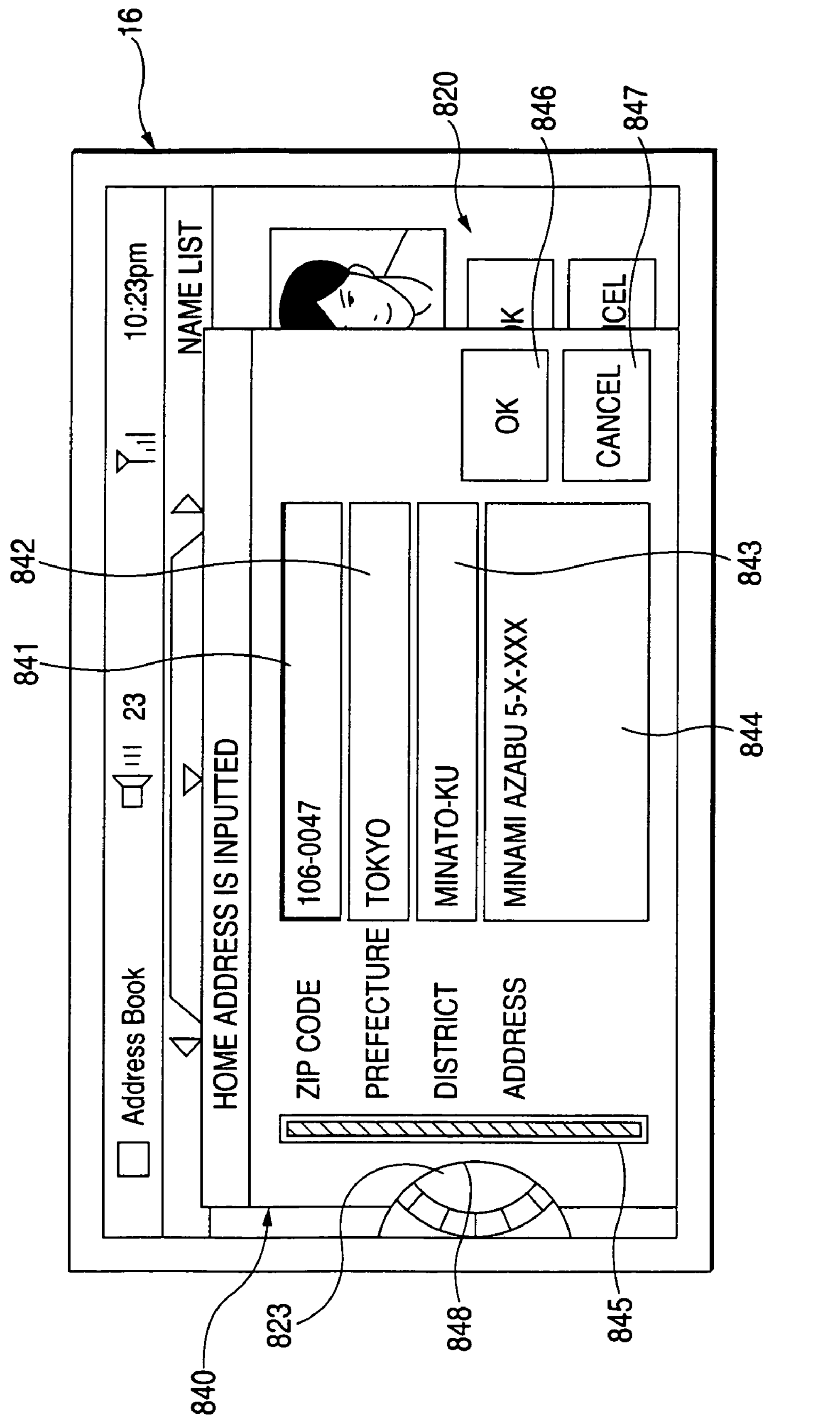
FIG. 84 is a diagram showing a screen, on which a window for inputting the contents of a home address of the display screen indicating the various pieces of information of the listed person shown in FIG. 80 is displayed.
Figure 85:
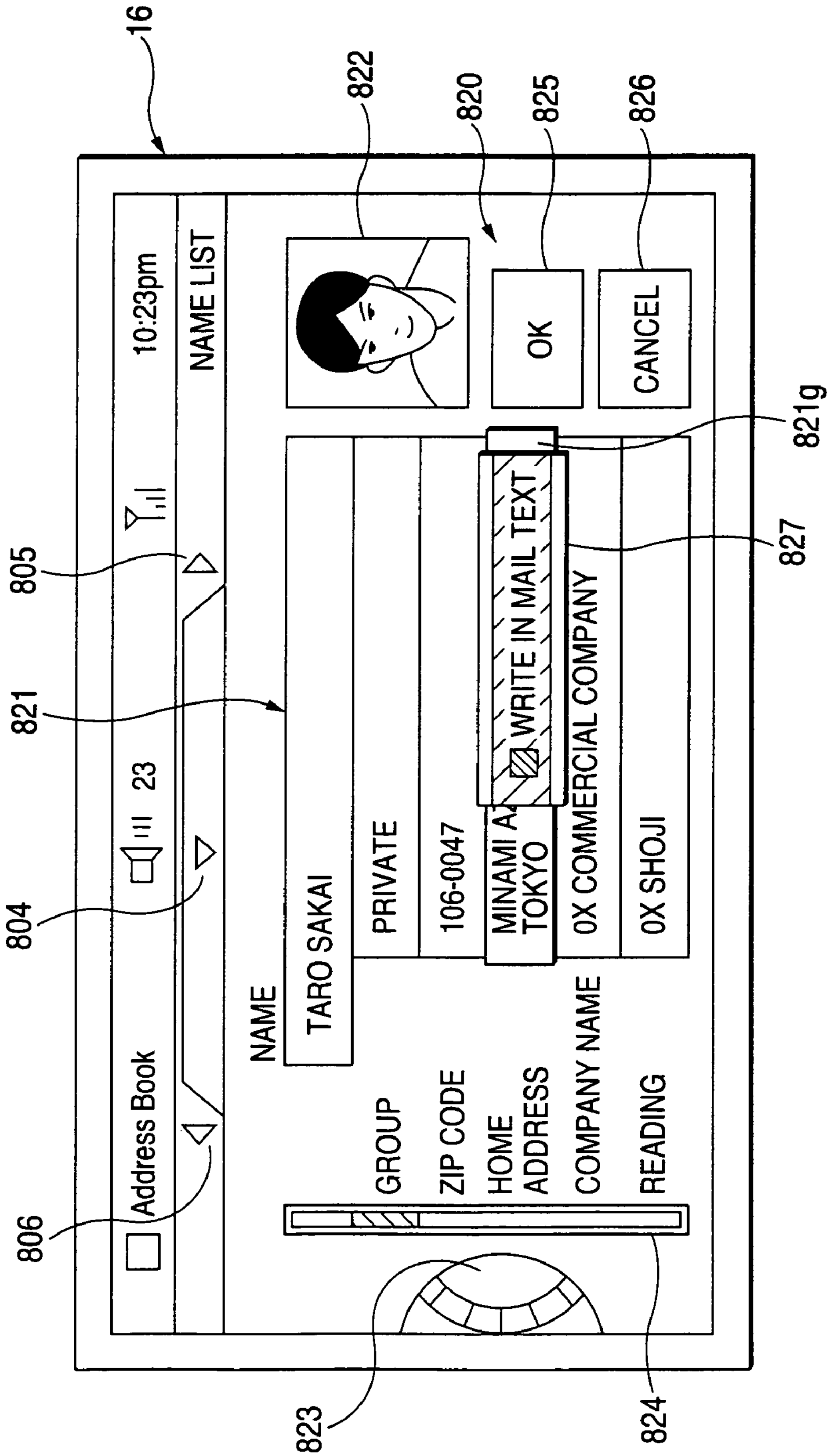
FIG. 85 is a diagram showing a screen, on which a pop-up menu on the home address shown in FIG. 80 is displayed on the display screen indicating various pieces of information of the listed person shown in FIG. 80.
Figure 86:
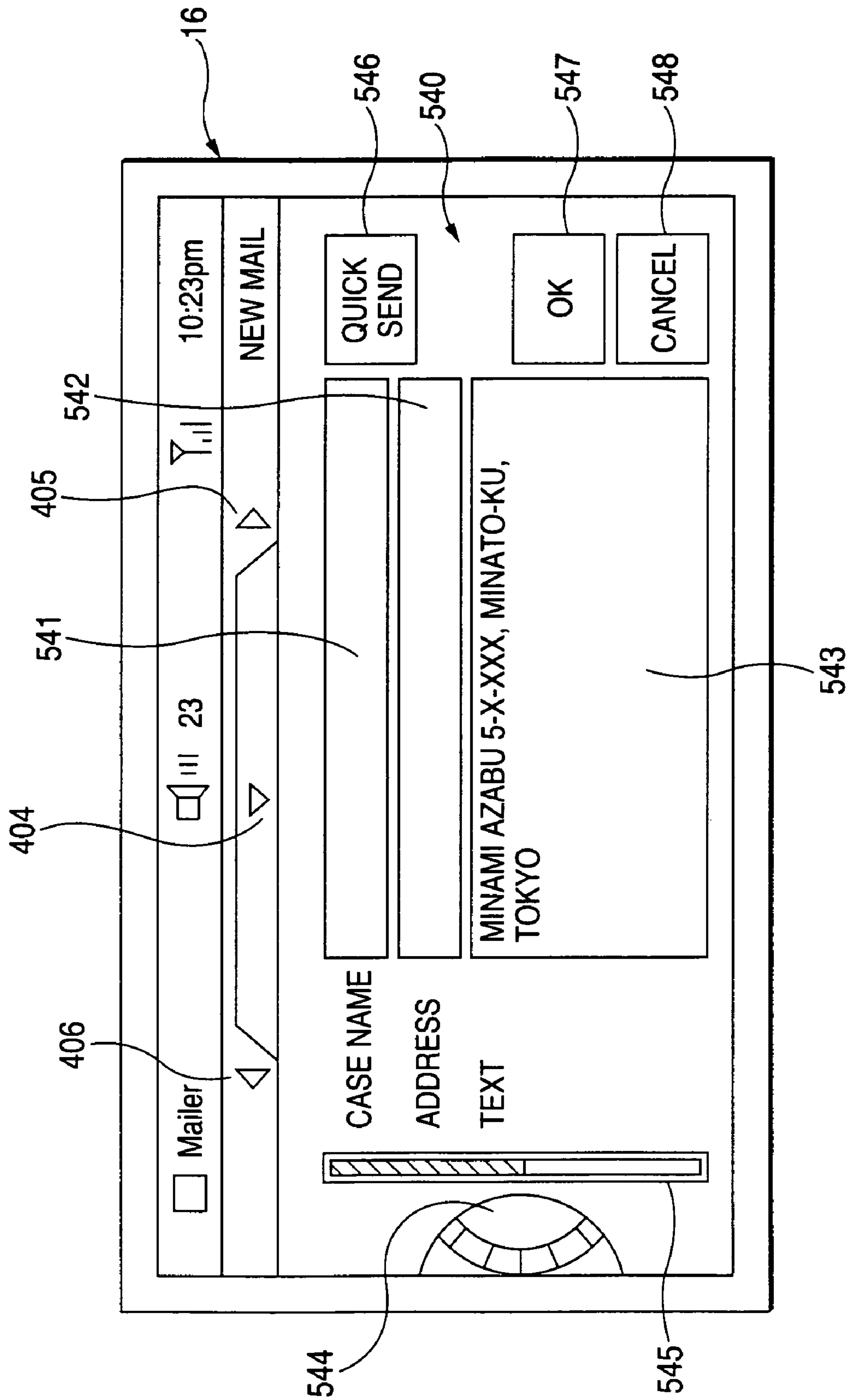
FIG. 86 is a diagram showing a screen, on which the contents of the home address of the display screen indicating the various pieces of information of the listed person shown in FIG. 80 are written in the text of the mail preparing screen.

When a list item button 821*g* of the home address is touched in the screen of FIG. 81 with the finger within the aforementioned predetermined time or shorter time or clicked by the controller 20, a home address editing window 840 is displayed over the display screen 820, as shown in FIG. 84. The window 840 is provided with a zip code input column 841, a prefecture input column 842, a district input column 843, an address input column 844, a position bar 845, an OK button 846, a cancel button 847 and a recess 848. When the zip code input column 841, the prefecture input column 842, the district input column 843 or the address input column 844 is clicked, the input screen by a keyboard similar to that shown in FIG. 21 is displayed in the monitor 16, so that the individual columns can be inputted and edited. In the screen of FIG. 81, on the other hand, when a predetermined time elapses after the list item button 821*g* was touched with the finger, a pop-up menu 827 is displayed, as shown in FIG. 85. When the "WRITE IN MAIL TEXT" is clicked in the pop-up menu 827, a mail preparing display screen 540, in which the home address is written in the text, is displayed in the monitor 16, as shown in FIG. 86. The display screen 540 is provided not only with a case name input column 541, an address input column 542, a text input column 543, a scroll dial 544, a position bar 545, a send button 546, an OK button 547 and a cancel button 548 but also with the address column, the carbon copy column and the added file column, which are displayed by scrolling the screen downward.

Figure 87:
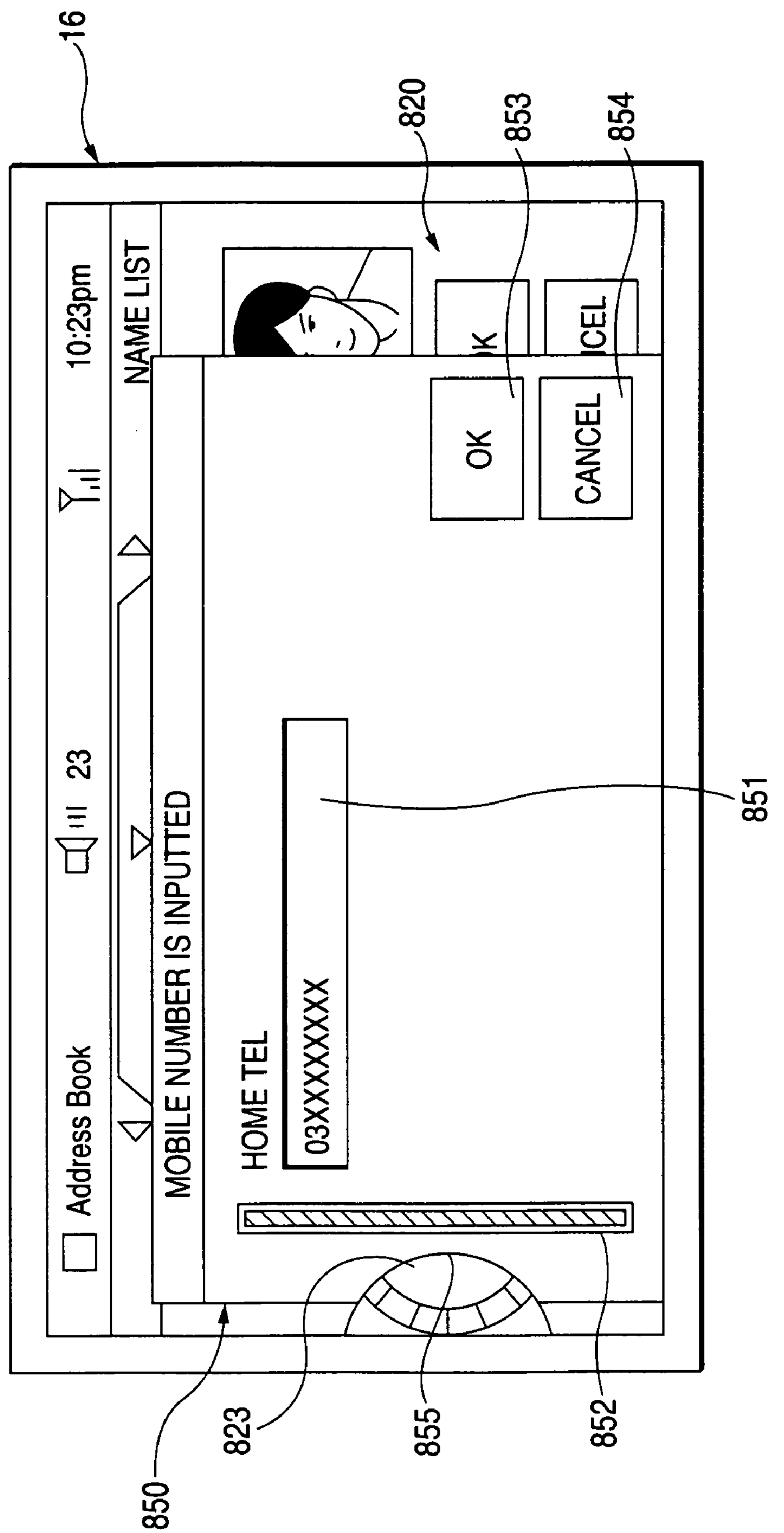
FIG. 87 is a diagram showing a screen, on which a window for inputting the contents of the home TEL of the display screen indicating the various pieces of information of the listed person shown in FIG. 82 is displayed.
Figure 88:
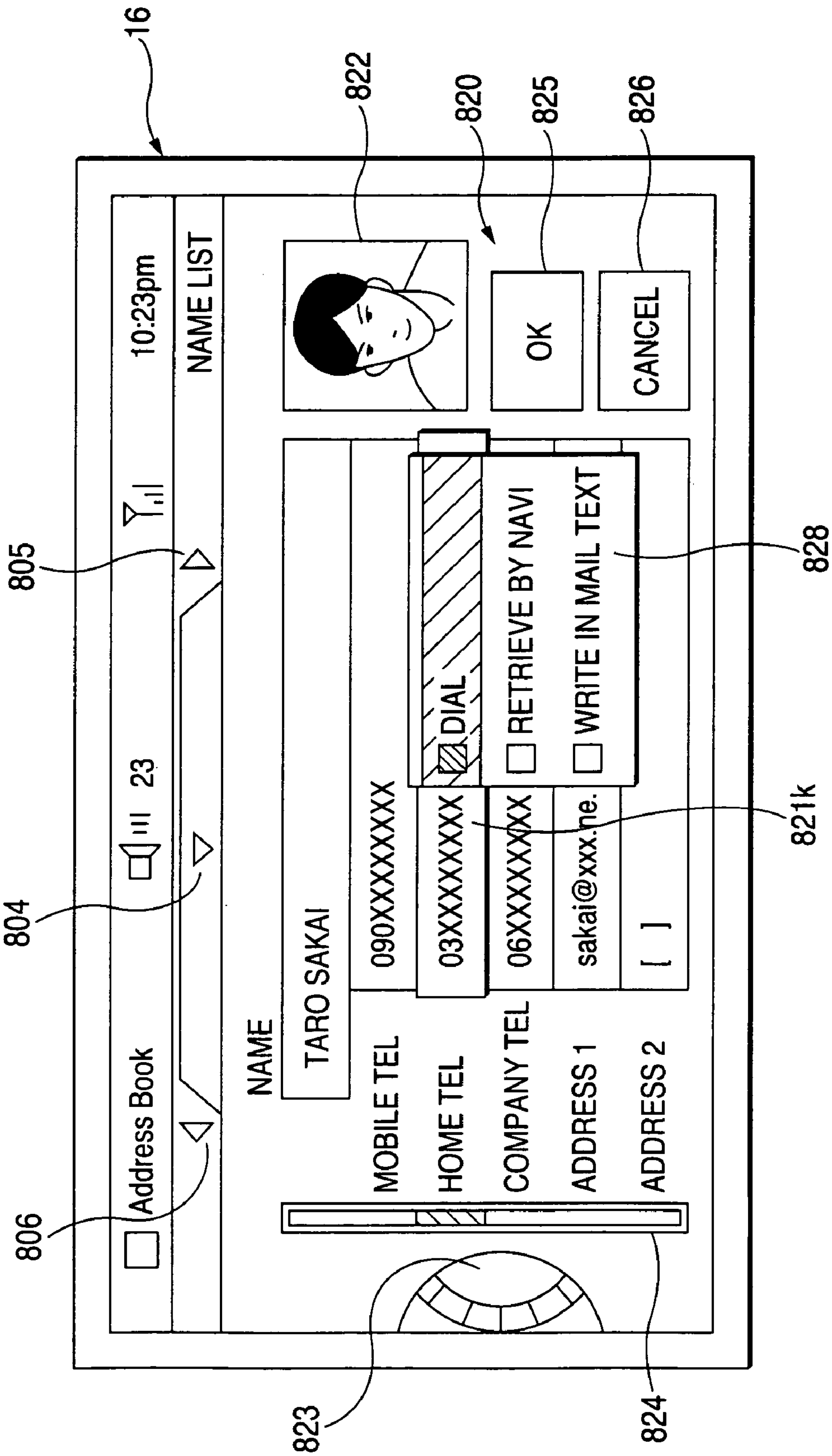
FIG. 88 is a diagram showing a screen, on which a pop-up menu on the home TEL shown in FIG. 82 is displayed on the display screen indicating various pieces of information of the listed person shown in FIG. 82.
Figure 89:
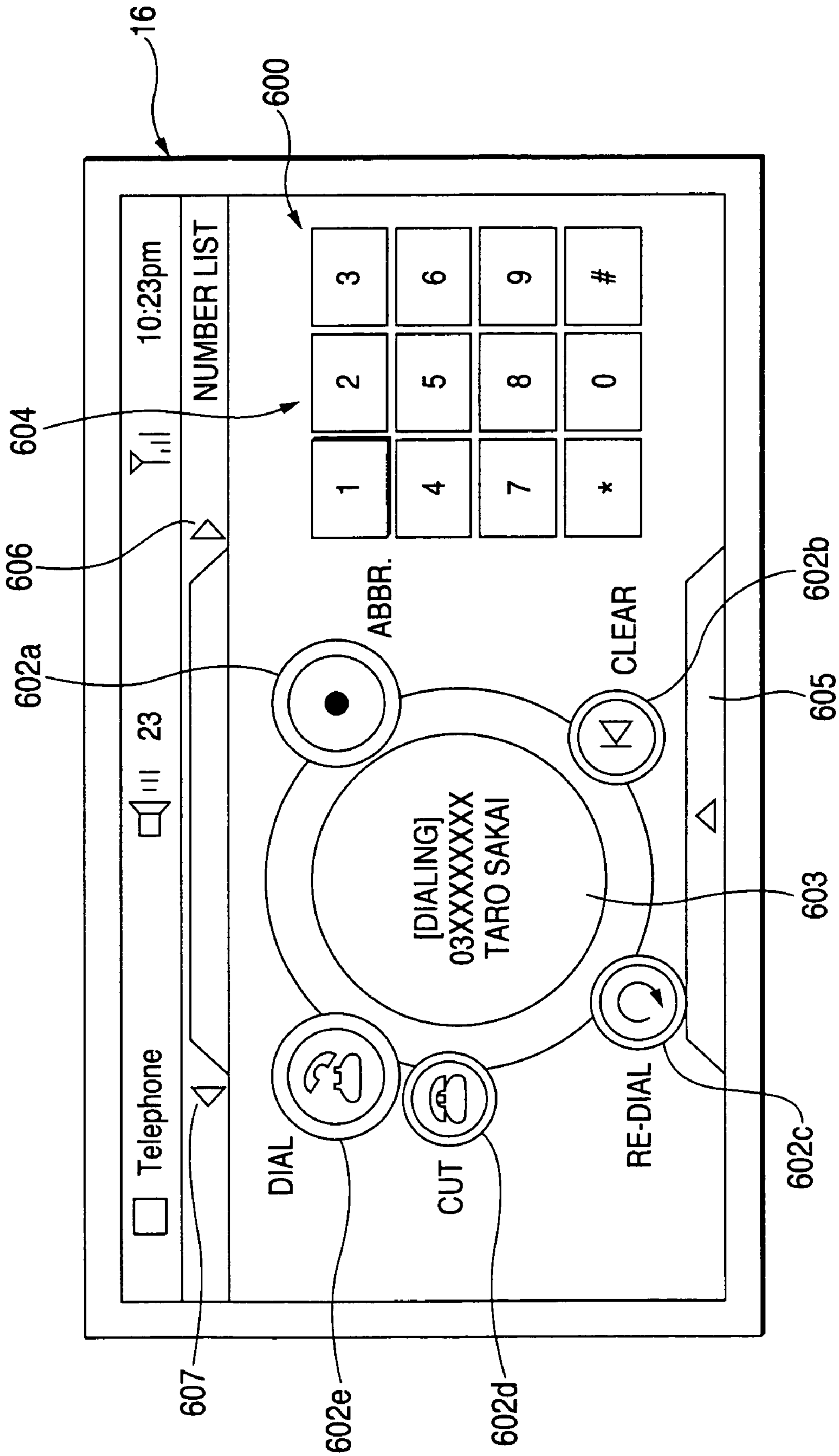
FIG. 89 is a diagram showing a screen, on which the number of the home TEL of the display screen indicating the various pieces of information of the listed person shown in FIG. 82 is inputted on the telephone screen.
Figure 90:
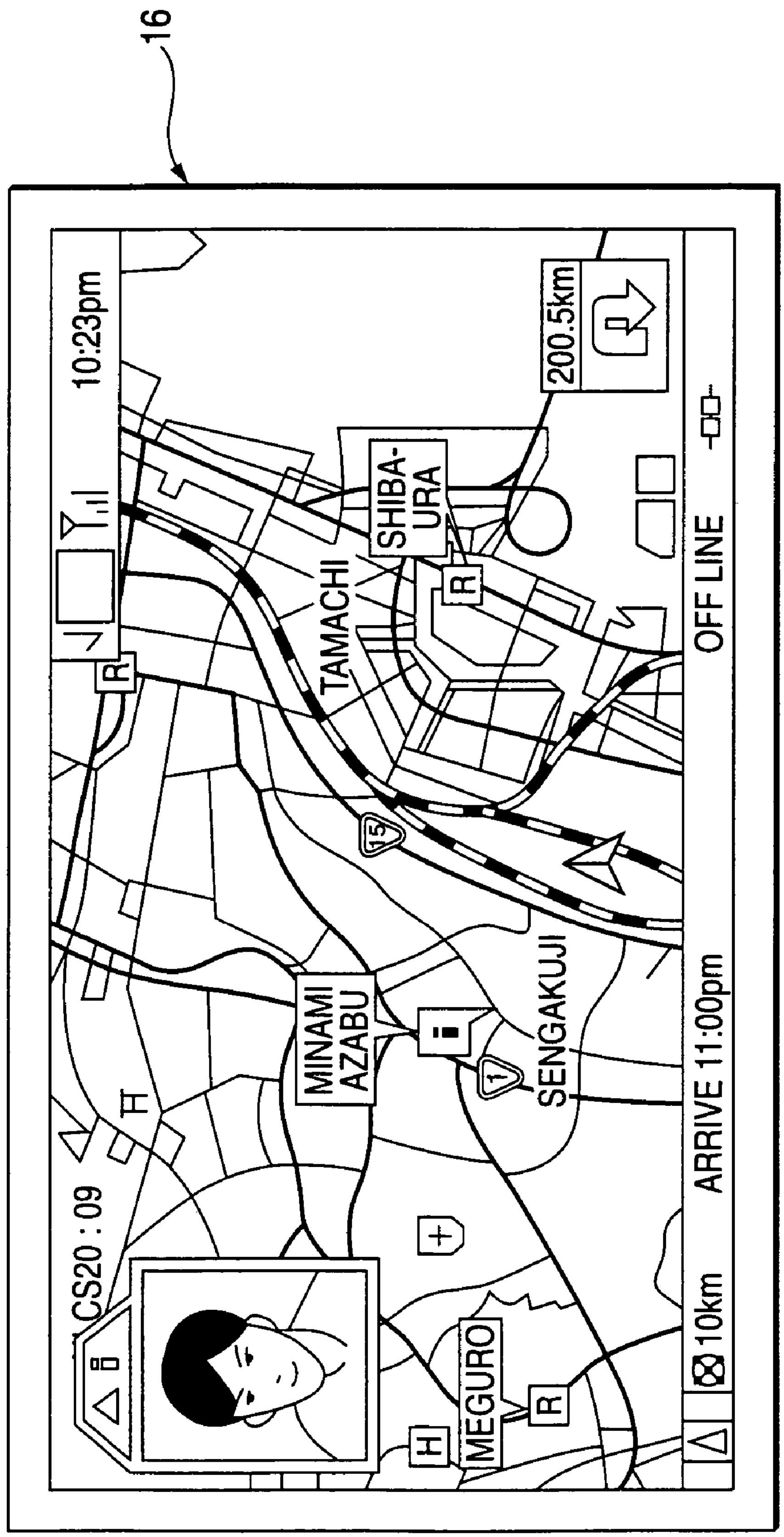
FIG. 90 is a diagram showing a screen, on which the place retrieved from the number of the home TEL of: the display screen indicating the various pieces of information of the listed person shown in FIG. 82 is displayed in a navigation style.
Figure 91:
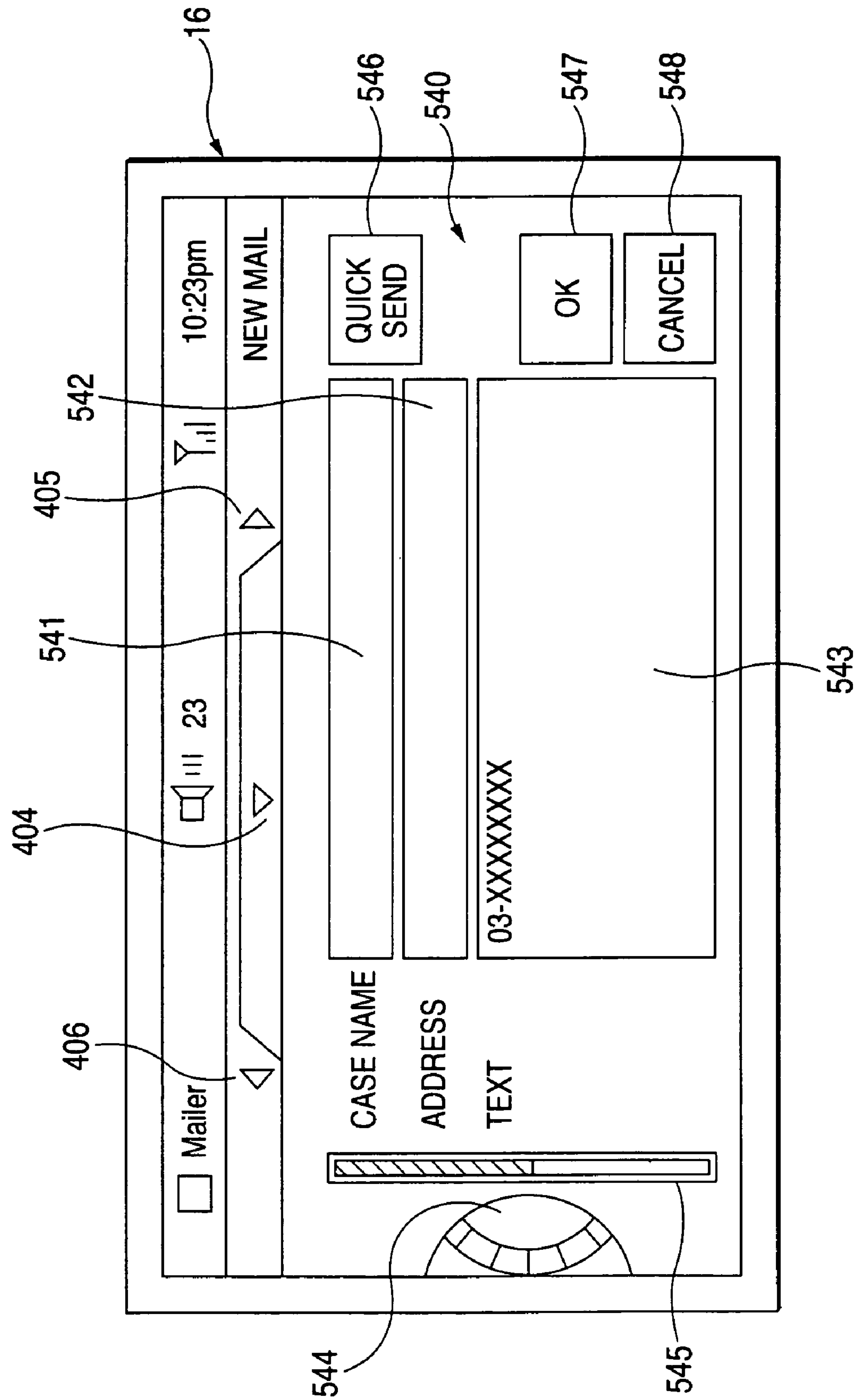
FIG. 91 is a diagram showing a screen, on which the address retrieved from the number of the home TEL of the display screen indicating the various pieces of information of the listed person shown in FIG. 82 is written in the text of the mail preparing screen.

In the screen of FIG. 82, when a home telephone number list item button 821*k* is touched with the finger for the aforementioned predetermined or shorter time or clicked by the controller 20, a home telephone number editing window 850 is displayed over the display screen 820, as shown in FIG. 87. The window 850 is provided with a telephone number input column 851, a position bar 852, an OK button 853, a cancel button 854 and a recess 855. When the telephone number input column 851 is clicked, the input screen by the keyboard is displayed in the monitor 16 so that the telephone number input column 851 can be inputted and edited. In the screen of FIG. 82, on the other hand, when a predetermined or longer time elapses after the list item button 821*k* was touched with the finger, a pop-up menu 828 is displayed, as shown in FIG. 88. When the "DIAL" is clicked in the pop-up menu 828, the send screen for the home telephone number is displayed, as shown in FIG. 89. When the "RETRIEVE BY NAVI" is clicked in the pop-up menu 828, the map indicating the position corresponding to that telephone number is displayed, as shown in FIG. 90. When the "WRITE IN MAIL TEXT" is selected in the pop-up menu 828, the display screen 540 for preparing the mail, in which the home telephone number is written in the text, is displayed, as shown in FIG. 91.

Figure 92:
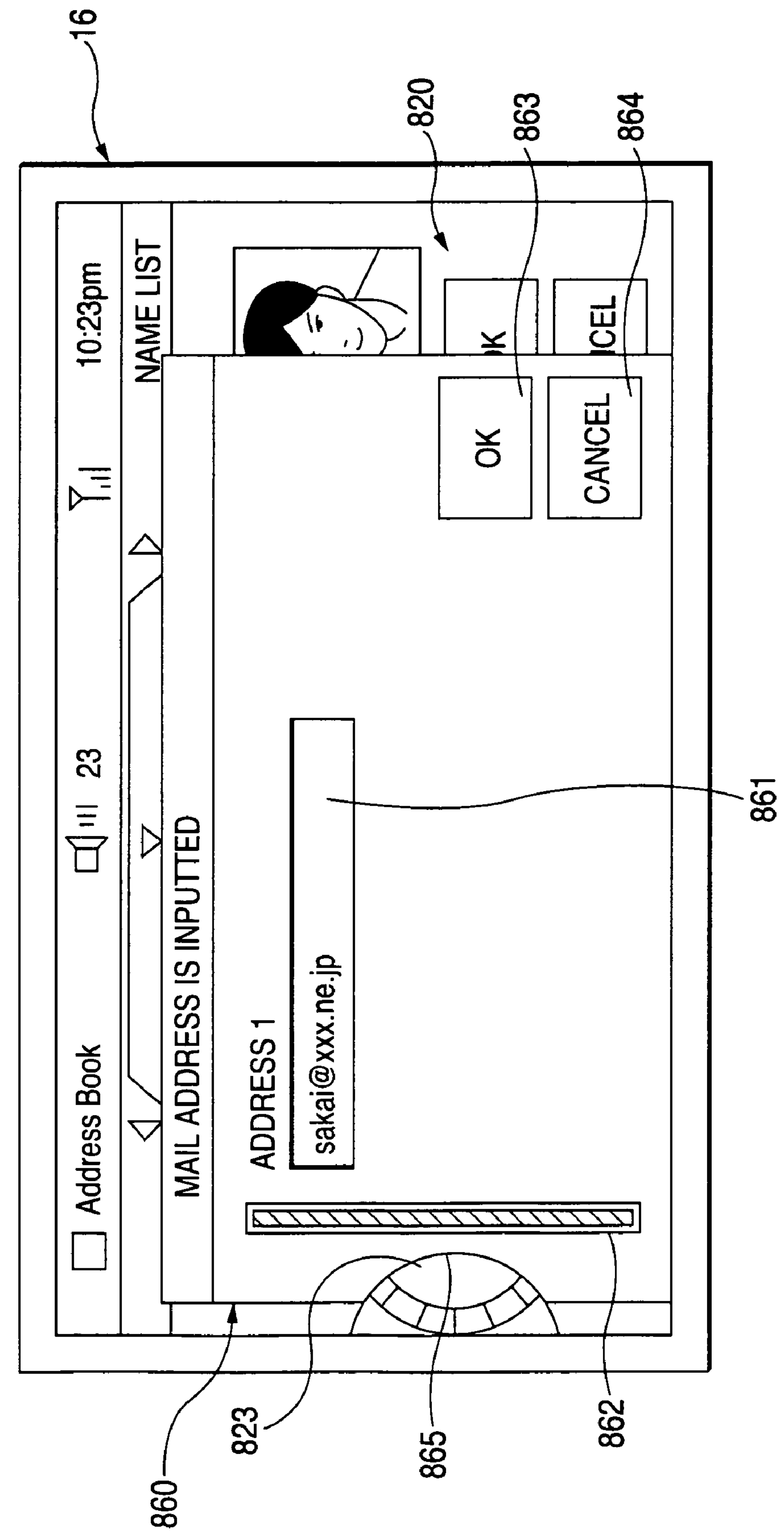
FIG. 92 is a diagram showing a screen, on which a window for inputting the contents of the mail address of Address 1 of the display screen indicating the various pieces of information of the listed person shown in FIG. 82 is displayed.
Figure 93:
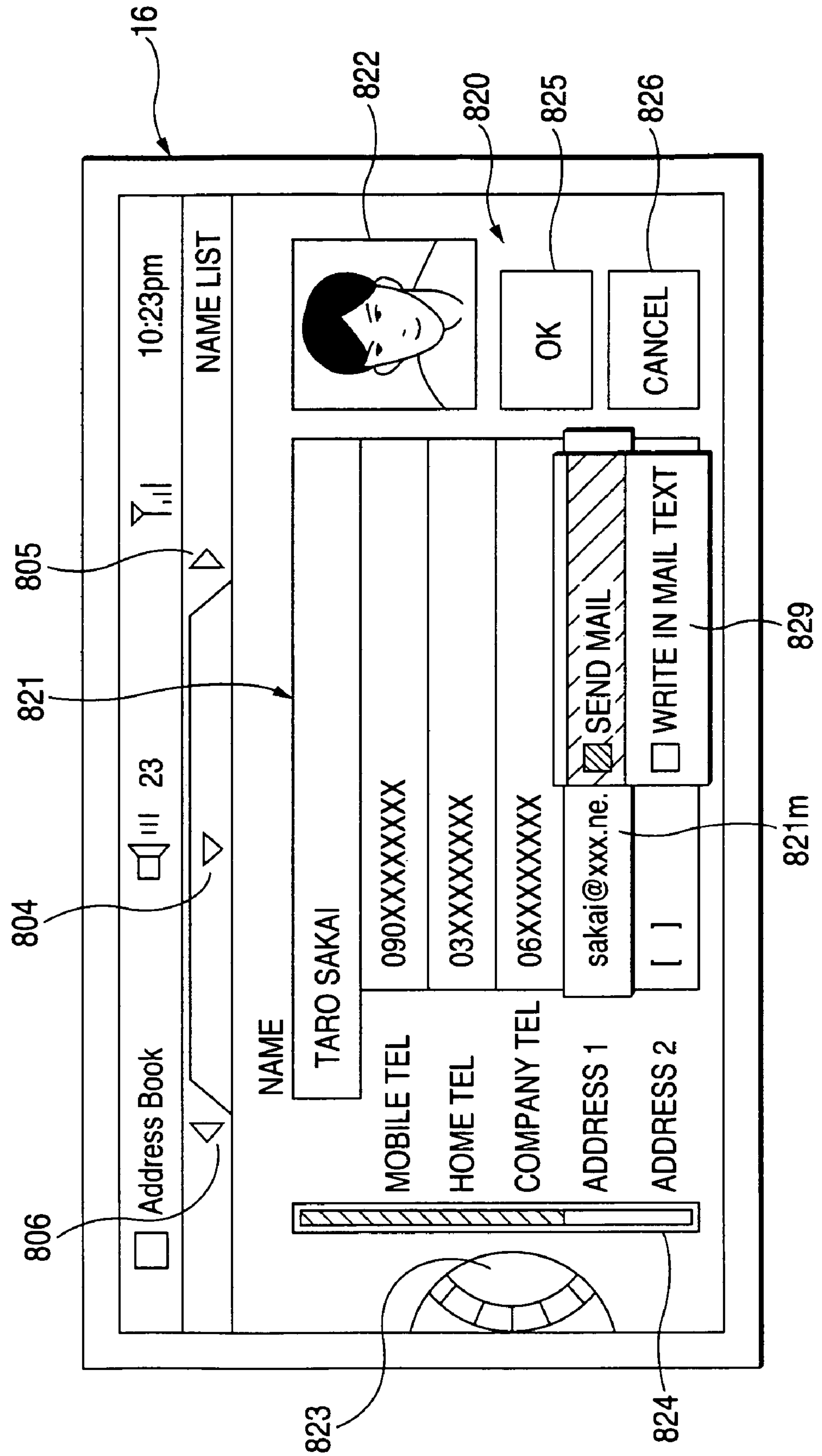
FIG. 93 is a diagram showing a screen, on which a pop-up menu on the mail address of Address 1 shown in FIG. 82 is displayed on the display screen indicating various pieces of information of the listed person shown in FIG. 82.
Figure 94:
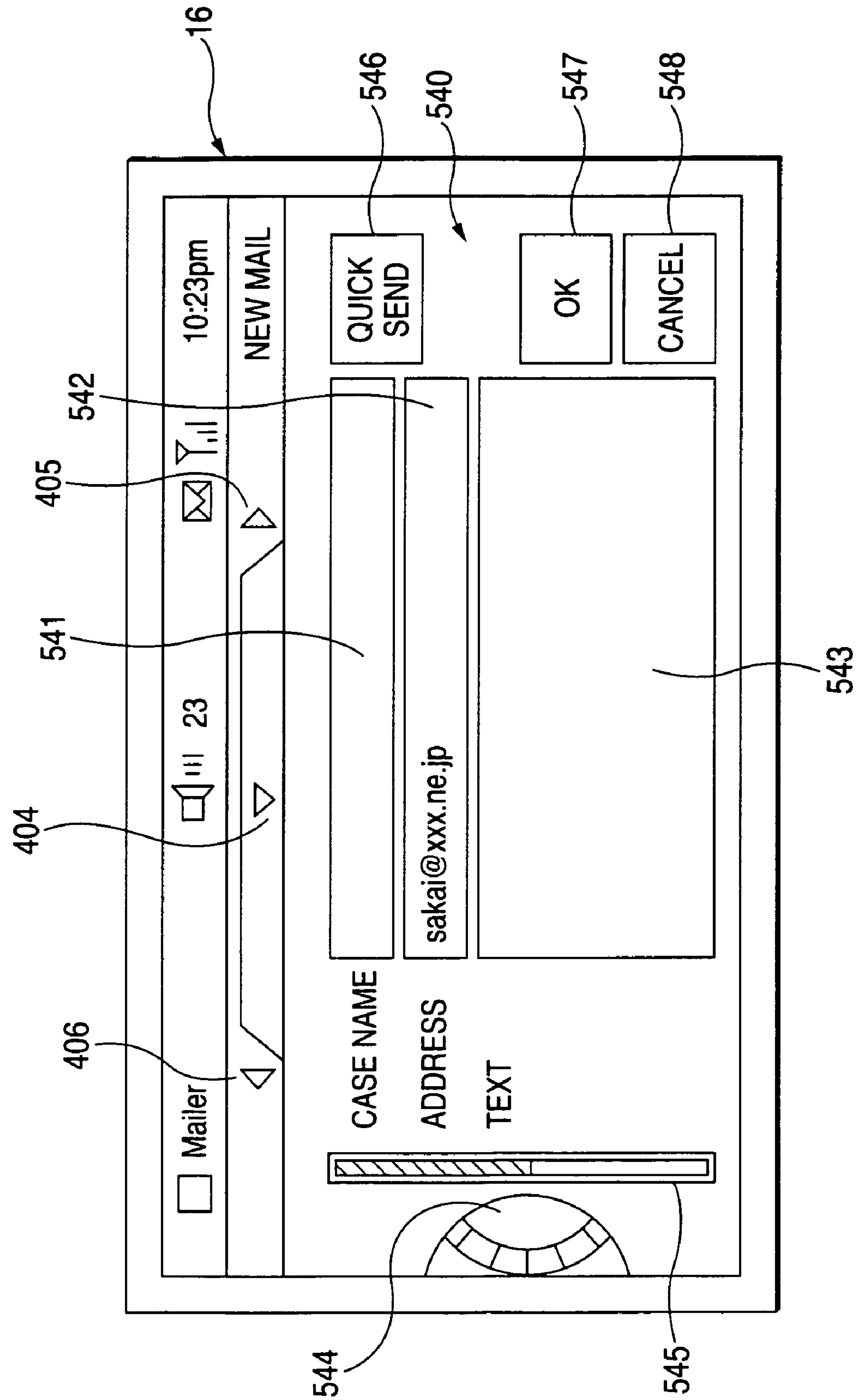
FIG. 94 is a diagram showing a screen, on which the contents of the mail address of Address 1 of the display screen indicating the various pieces of information of the listed person shown in FIG. 82 are written in the address of the mail preparing screen.
Figure 95:
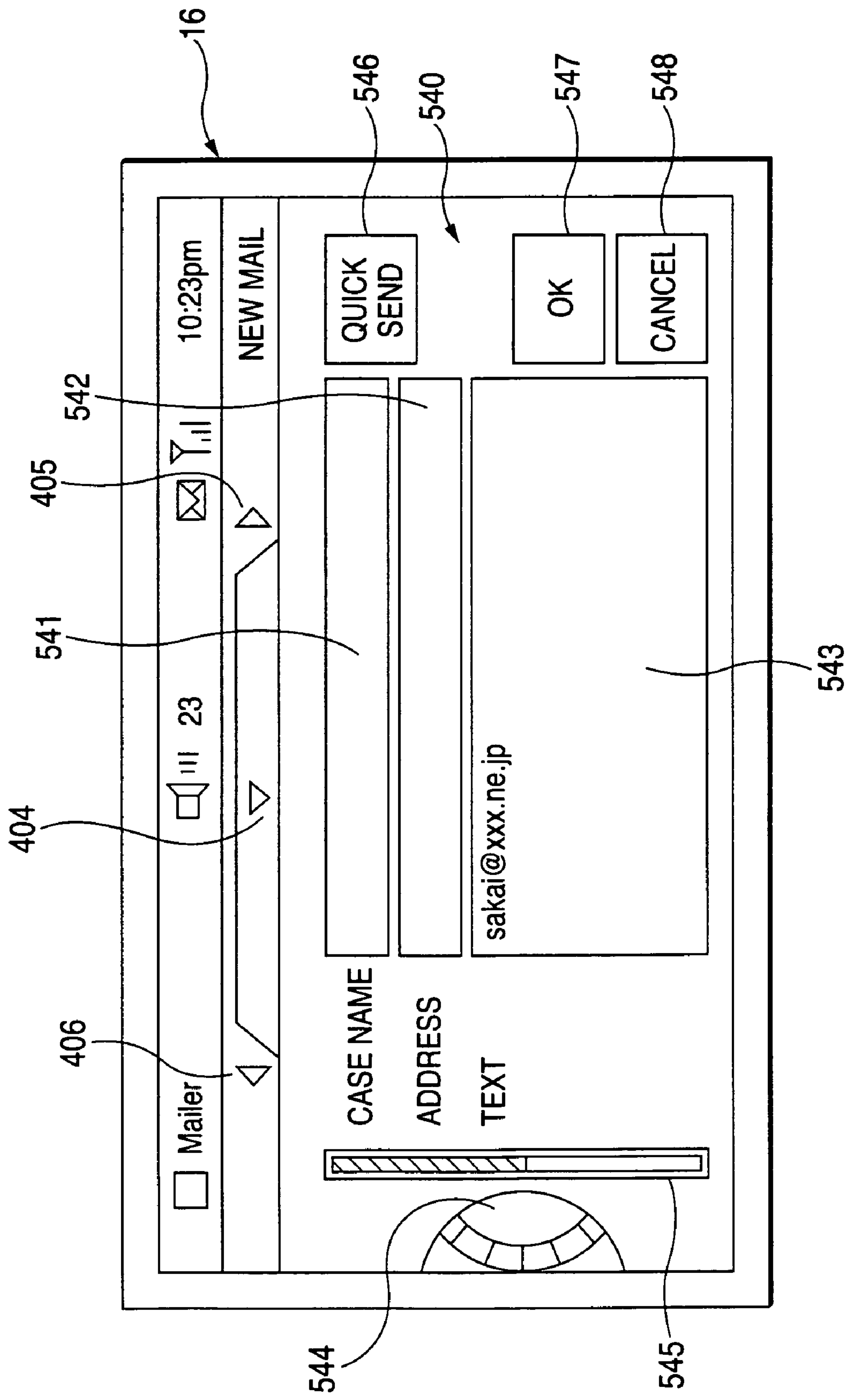
FIG. 95 is a diagram showing a screen, on which the contents of the mail address of Address 1 of the display screen indicating the various pieces of information of the listed person shown in FIG. 82 are written in the text of the mail preparing screen.

In the screen of FIG. 82, when a list item button 821*m* of the address (mail address) is touched with the finger within the aforementioned predetermined or shorter time or clicked by the controller 20, an address editing window 860 is displayed over the display screen 820, as shown in FIG. 92. The window 860 is provided with an address input column 861, a position bar 862, an OK button 863, a cancel button 864 and a recess 865. When the address input column 861 is clicked, the input screen by the keyboard is displayed in the monitor 16 so that the address input column 861 can be inputted and edited. In the screen of FIG. 82, on the other hand, when a predetermined or longer time elapses after the list item button 821*m* was touched with the finger, a pop-up menu 829 is displayed, as shown in FIG. 93. When the "SEND MAIL" is clicked in the pop-up menu 829, the display screen 540 for preparing the mail having that address is displayed, as shown in FIG. 94. When the "WRITE IN MAIL TEXT" is selected in the pop-up menu 829, the display screen 540 for preparing the mail having the address written in the text is displayed, as shown in FIG. 95.

Figure 96:
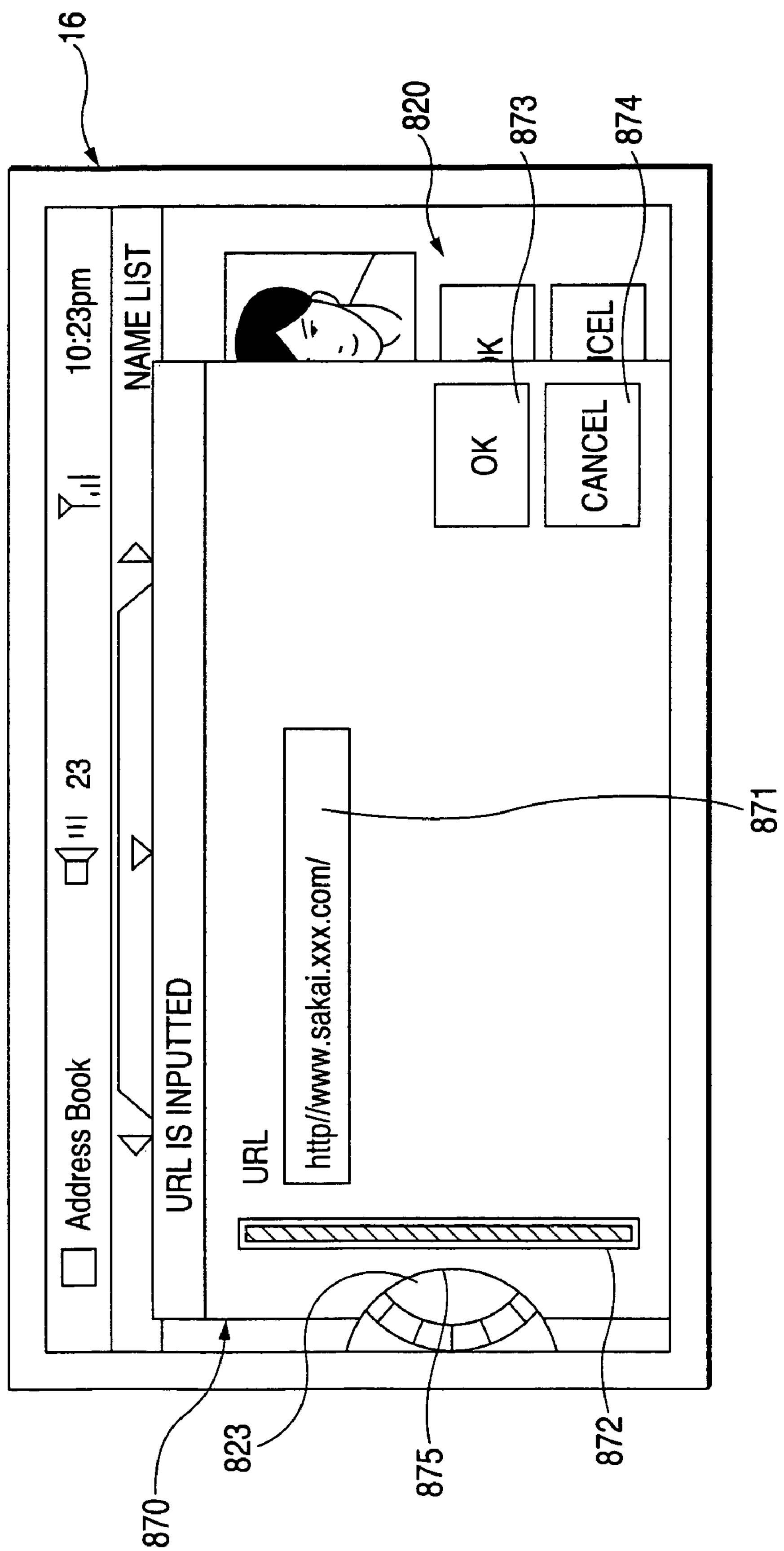
FIG. 96 is a diagram showing a screen, on which a window for inputting the contents of the address of the URL of the display screen indicating the various pieces of information of the listed person shown in FIG. 83 is displayed.
Figure 97:
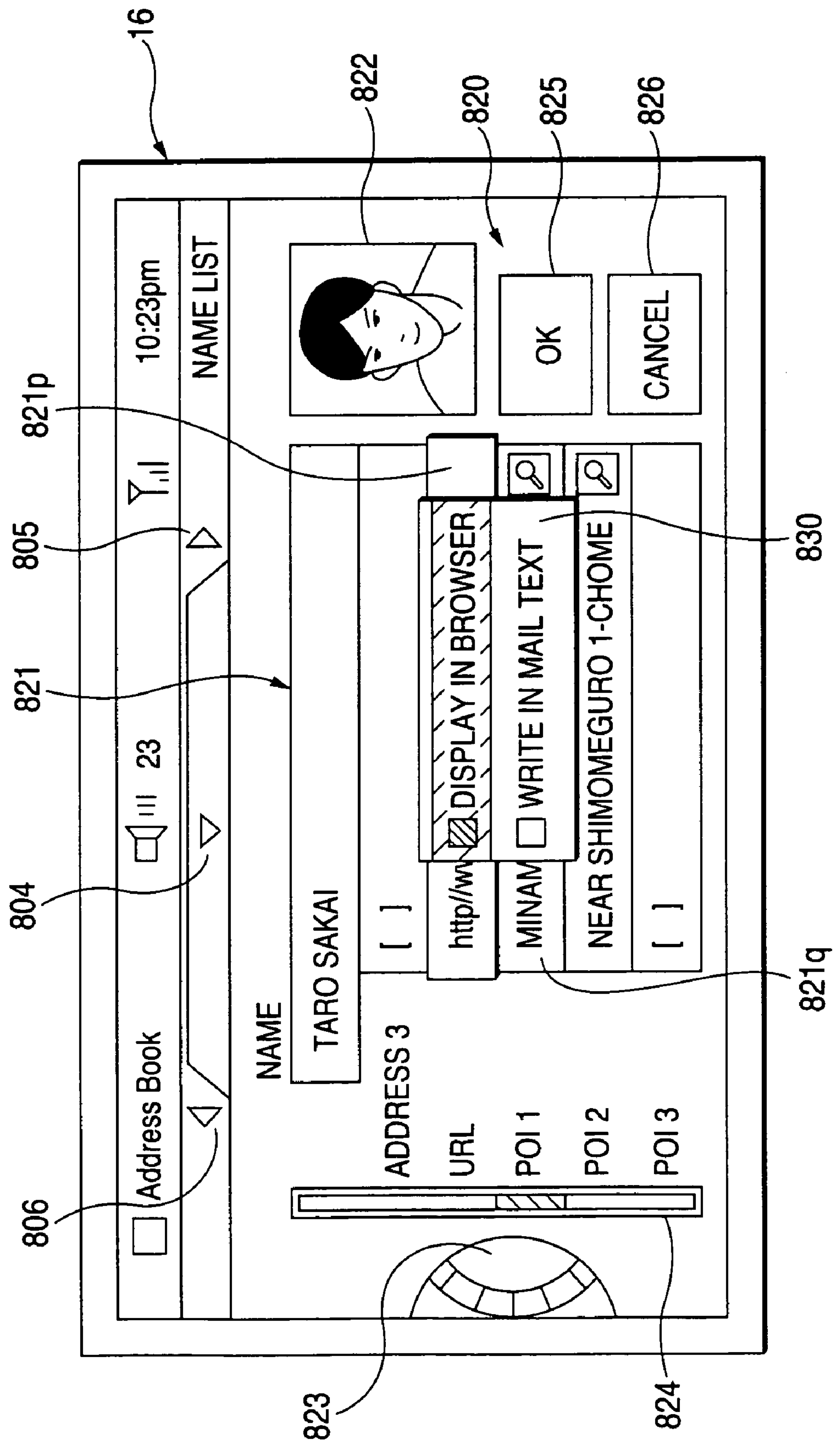
FIG. 97 is a diagram showing a screen, on which a pop-up menu on the address of the URL shown in FIG. 83 is displayed on the display screen indicating various pieces of information of the listed person shown in FIG. 83.
Figure 98:
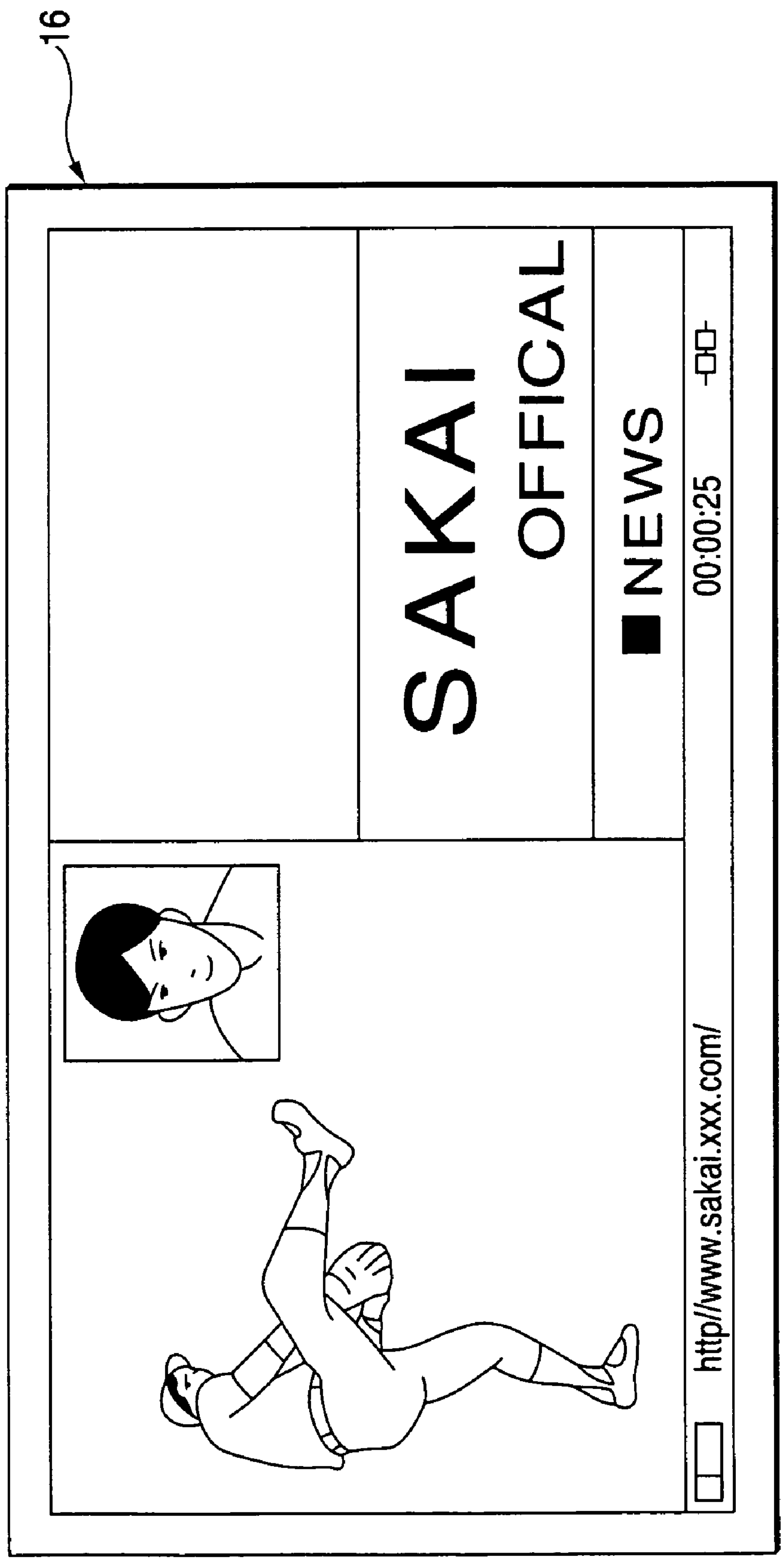
FIG. 98 is a diagram showing a screen, on which the address of the URL of the display screen indicating the various pieces of information of the listed person shown in FIG. 83 is displayed on a browser screen.
Figure 99:
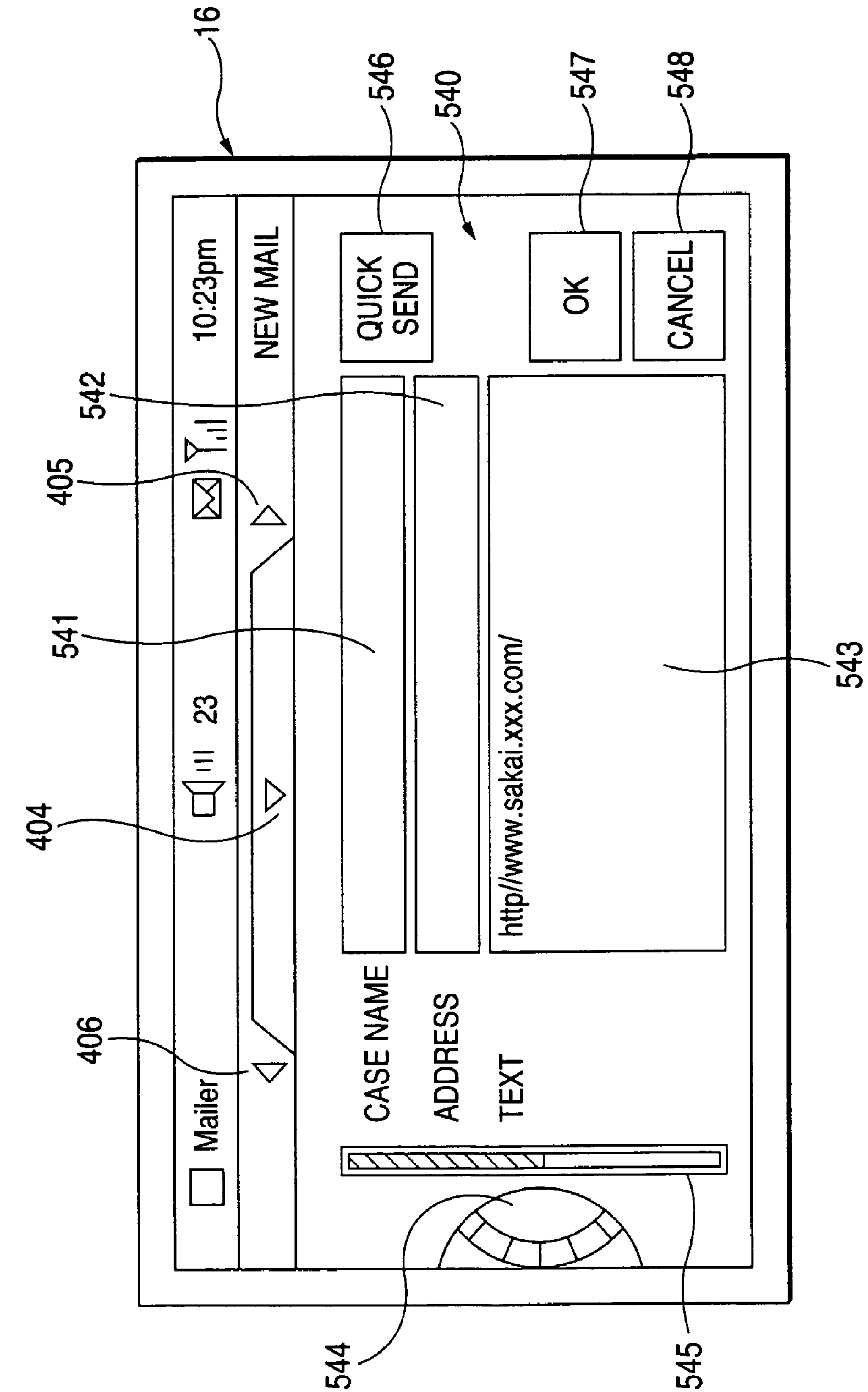
FIG. 99 is a diagram showing a screen, on which the contents of the address of the URL of the display screen indicating the various pieces of information of the listed person shown in FIG. 83 are written in the text of the mail preparing screen.

In the screen of FIG. 83, when a list item button 821*p* of the URL is touched with the finger within the aforementioned predetermined or shorter time or clicked by the controller 20, a URL editing window 870 is displayed over the display screen 820, as shown in FIG. 96. The window 870 is provided with a URL input column 871, a position bar 872, an OK button 873, a cancel button 874 and a recess 875. When the URL input column 871 is clicked, the input screen by the keyboard is displayed in the monitor 16 so that the URL input column 871 can be inputted and edited. In the screen of FIG. 83, on the other hand, when a predetermined or longer time elapses after the list item button 821*p* was touched with the finger, a pop-up menu 830 is displayed, as shown in FIG. 97. When the "DISPLAY IN BROWSER" is clicked in the pop-up menu 830, the later-described browser is started so that its URL page is displayed, as shown in FIG. 98. When the "WRITE IN MAIL TEXT" is selected in the pop-up menu 830, the display screen 540 for preparing the mail having the URL written in the text is displayed, as shown in FIG. 99.

Figure 100:
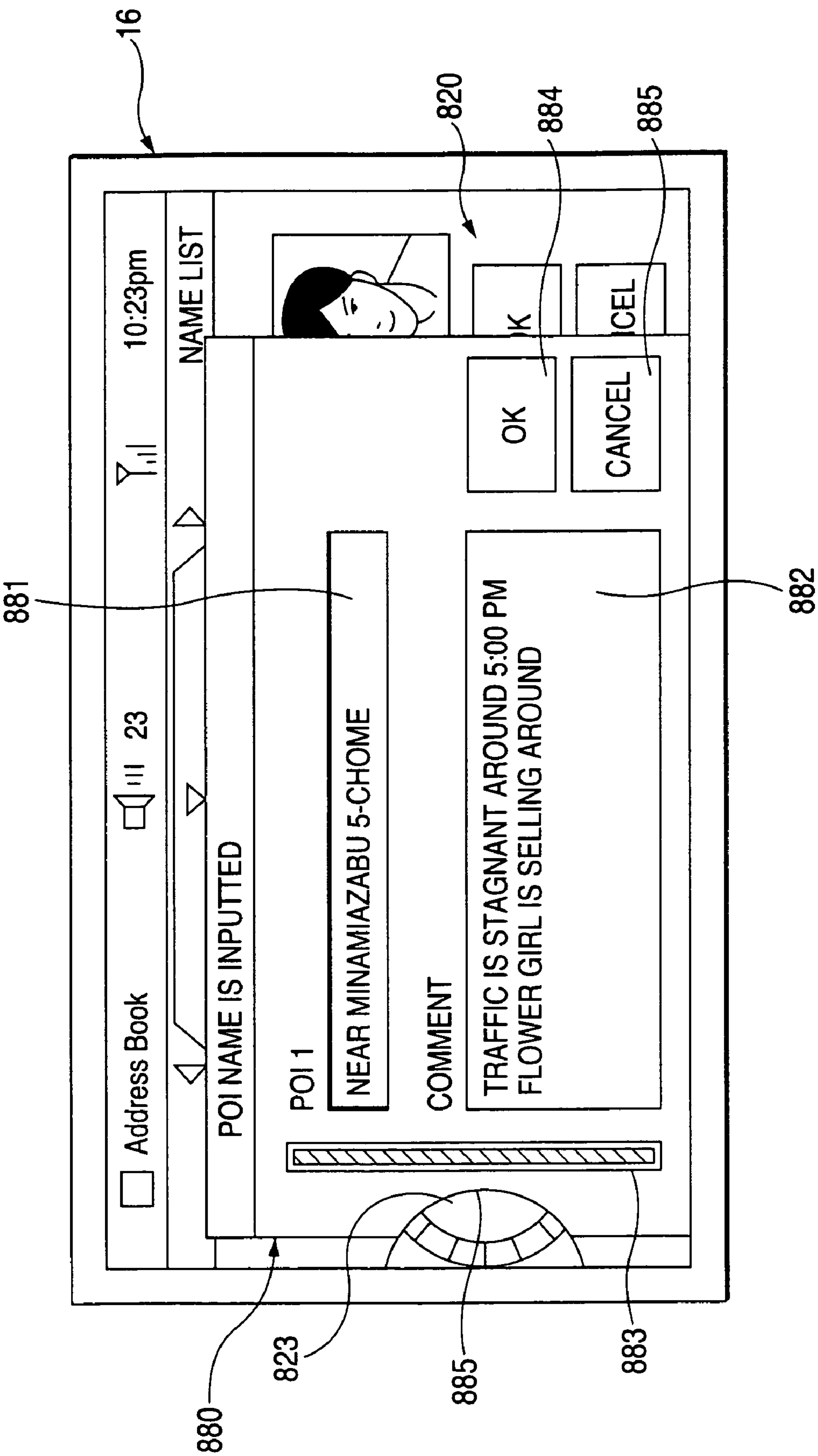
FIG. 100 is a diagram showing a screen, on which a window for inputting the contents of the POI 1 of the display screen indicating the various pieces of information of the listed person shown in FIG. 83 is displayed.
Figure 101:
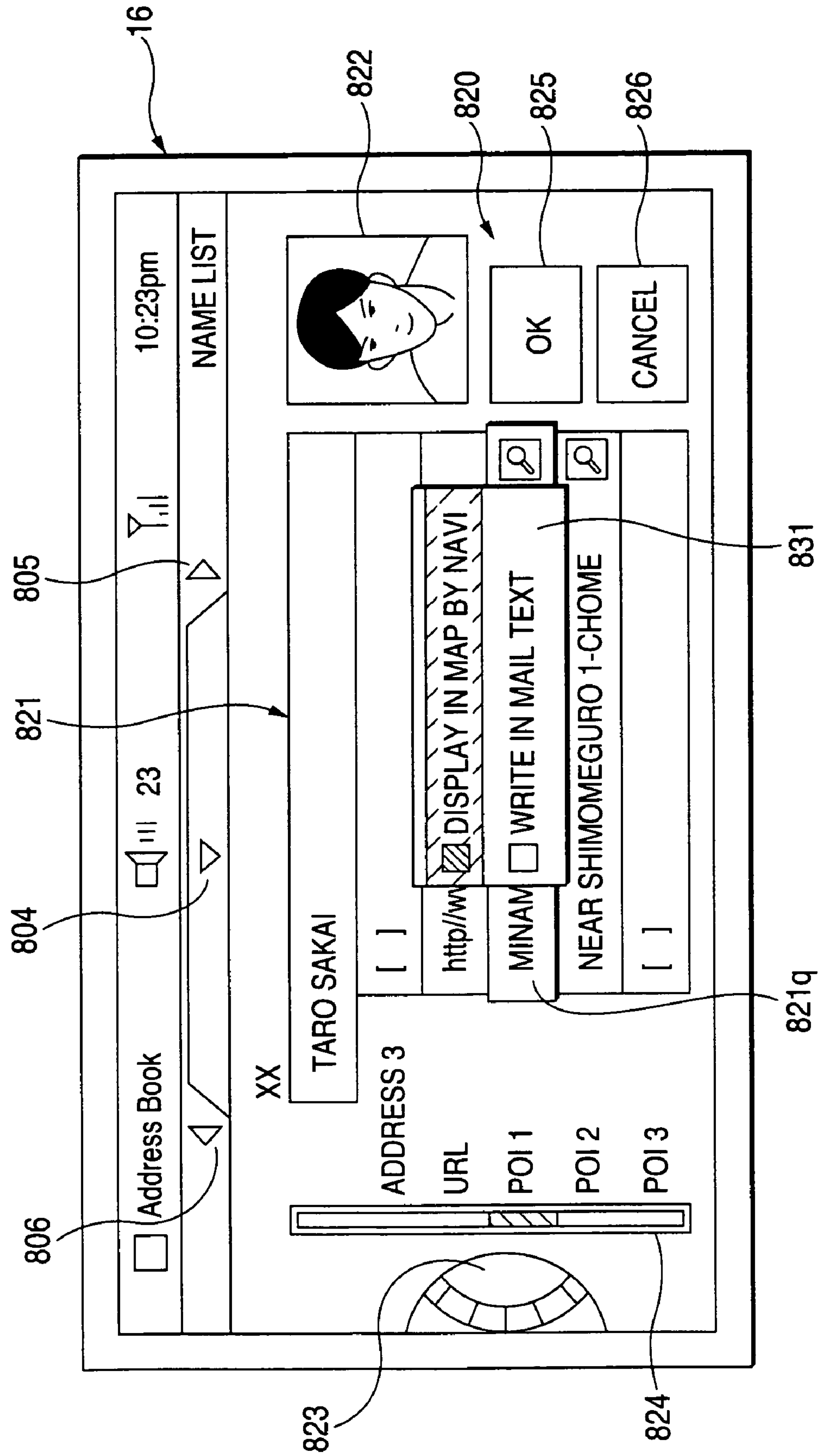
FIG. 101 is a diagram showing a screen, on which a pop-up menu on the POI 1 shown in FIG. 83 is displayed on the display screen indicating various pieces of information of the listed person shown in FIG. 83.
Figure 102:
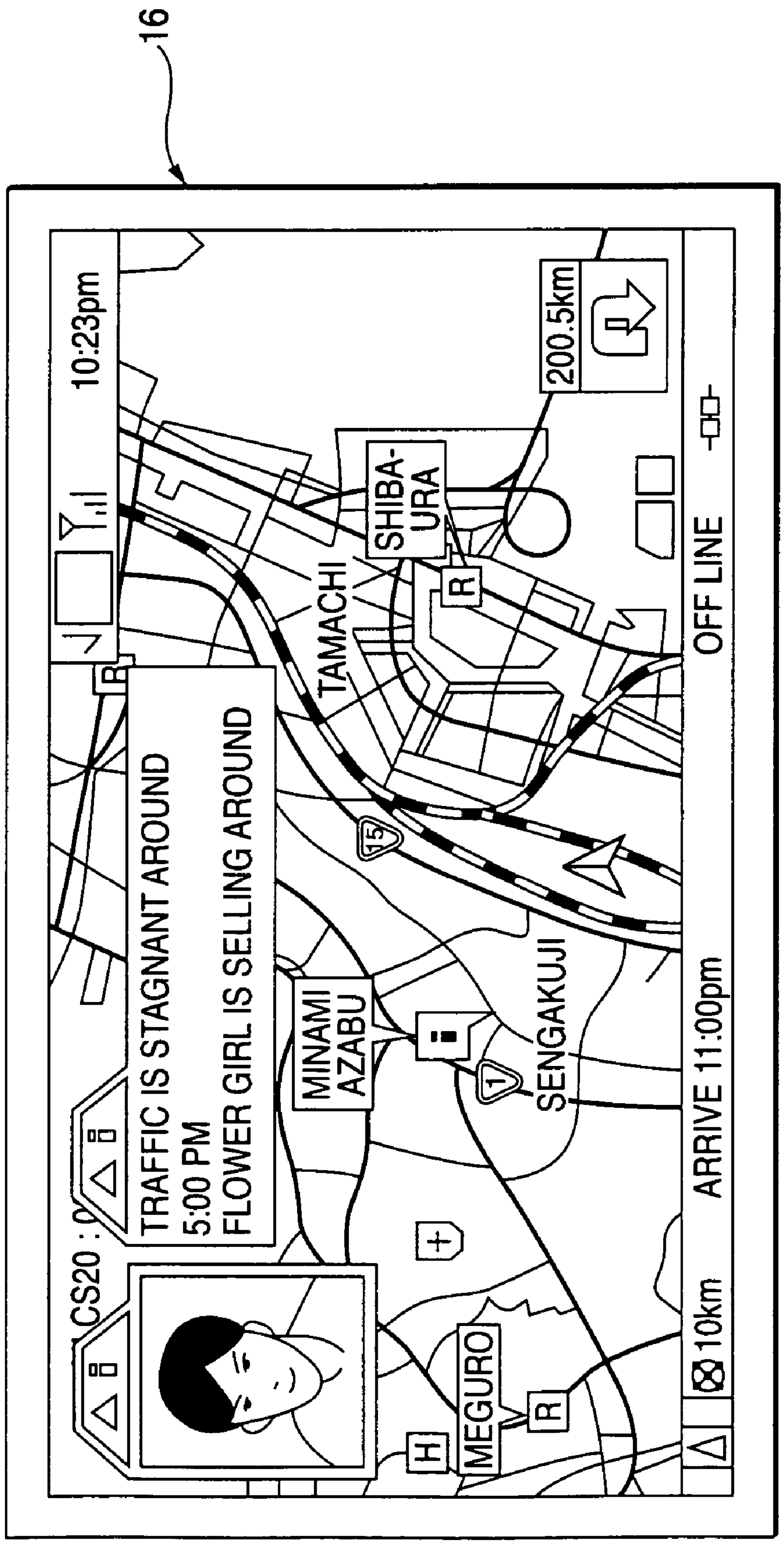
FIG. 102 is a diagram showing a screen, on which the place retrieved from the information of the POI 1 of the display screen indicating the various pieces of information of the listed person shown in FIG. 83 is displayed in the navigation style.
Figure 103:
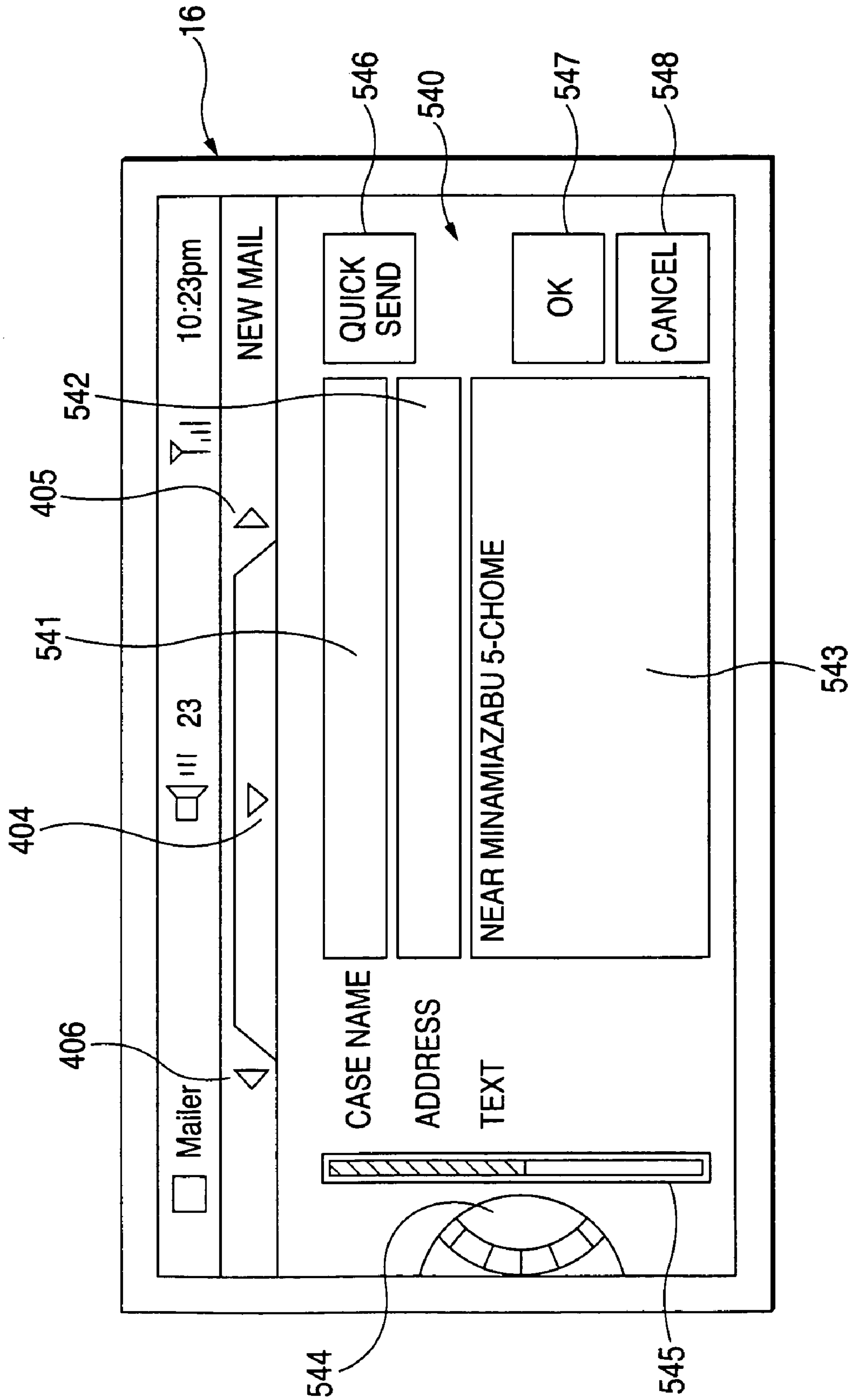
FIG. 103 is a diagram showing a screen, on which the contents of the POI 1 of the display screen indicating the various pieces of information of the listed person shown in FIG. 83 are written in the text of the mail preparing screen.

In the screen of FIG. 83, when a list item button 821*q* of the POI is touched with the finger within the aforementioned predetermined or shorter time or clicked by the controller 20, a POI editing window 880 is displayed over the display screen 820, as shown in FIG. 100. The window 880 is provided with a POI input column 881, a comment input column 882, a position bar 883, an OK button 884, a cancel button 885 and a recess 885. When the POI input column 881 or the comment input column 882 is clicked, the input screen by the keyboard is displayed in the monitor 16 so that the individual columns can be inputted and edited. In the screen of FIG. 83, on the other hand, when a predetermined or longer time elapses after the list item button 821*q* was touched with the finger, a pop-up menu 831 is displayed, as shown in FIG. 101. When the "DISPLAY IN MAP BY NAVI" is clicked in the pop-up menu 831, the map indicating the position corresponding to the POI is displayed, as shown in FIG. 102. When the "WRITE IN MAIL TEXT" is selected in the pop-up menu 831, the display screen 540 for preparing the mail having the POI written in the text is displayed, as shown in FIG. 103.

Here, when another satellite button other than the satellite button 802*a* is selected in the address note screen 800, a display screen similar to the display screen 810 is displayed. When the list item button is clicked in that display screen, a display screen similar to the display screen 820 can be displayed.

Figure 104:
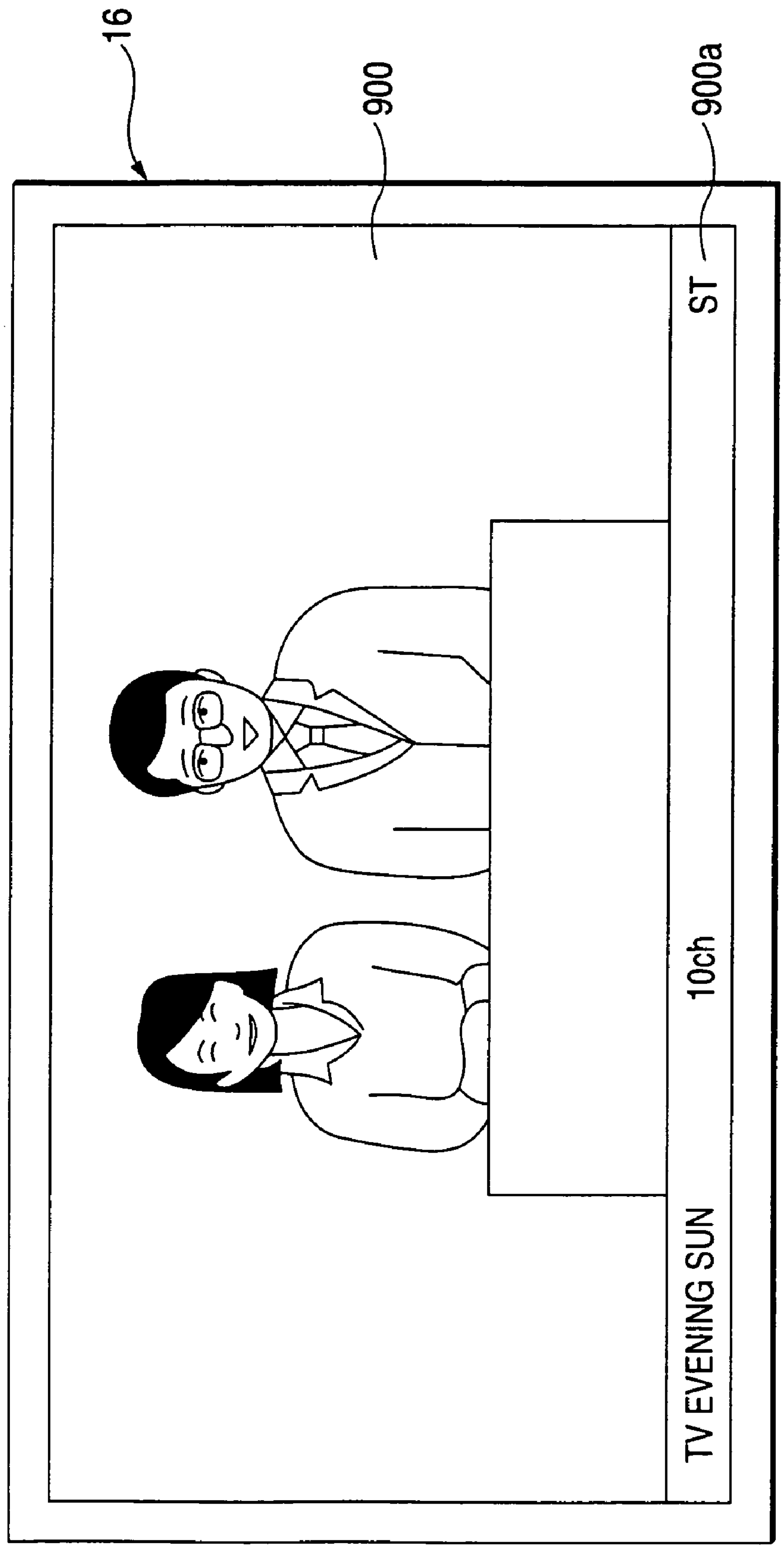
FIG. 104 is a diagram showing a TV broadcasting screen displayed in the display unit of the display control device according to the embodiment.
Figure 105:
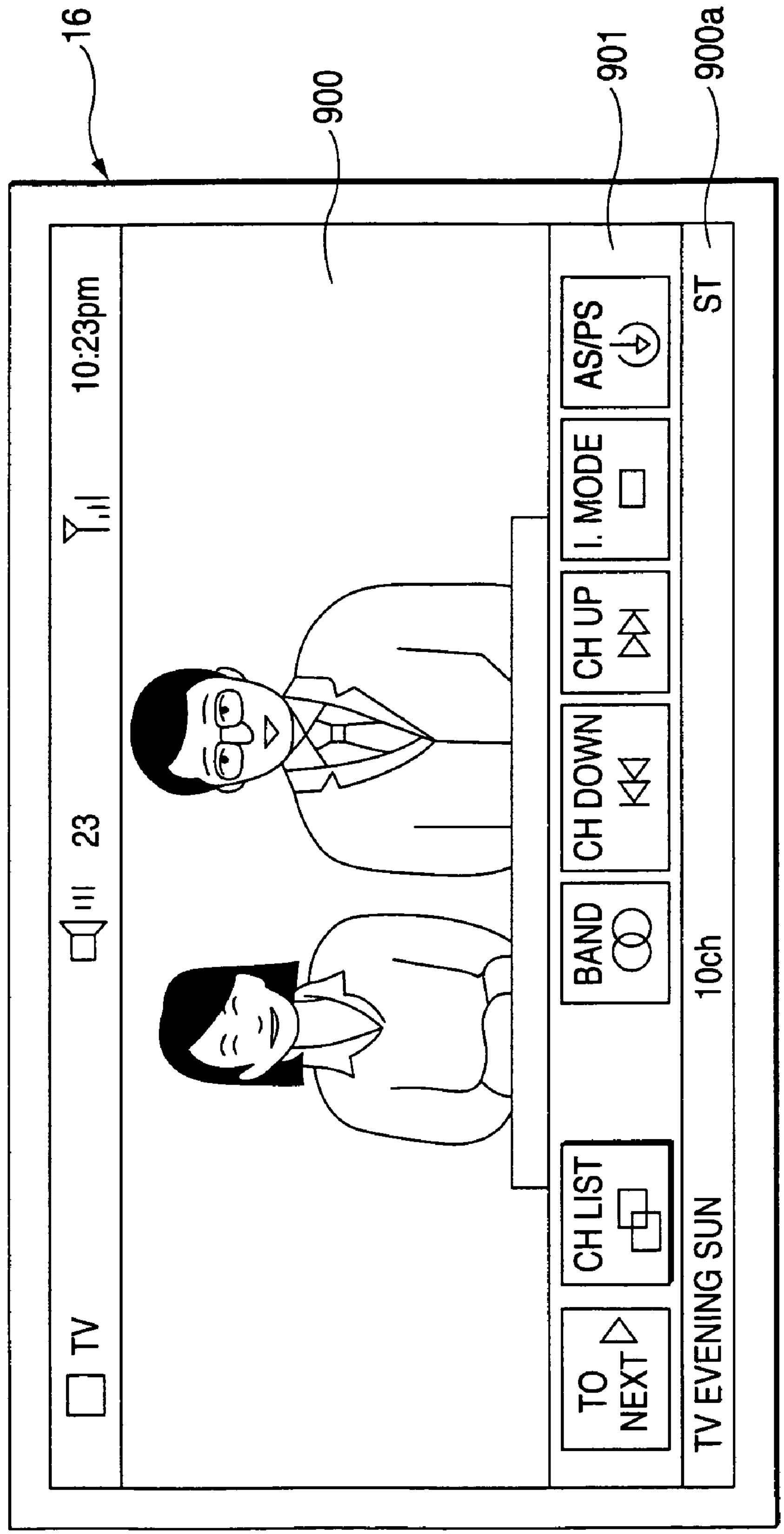
FIG. 105 is a diagram showing a screen, on which a tool bar is displayed on the TV broadcasting screen displayed in the display unit of the display control device according to the embodiment.
Figure 106:
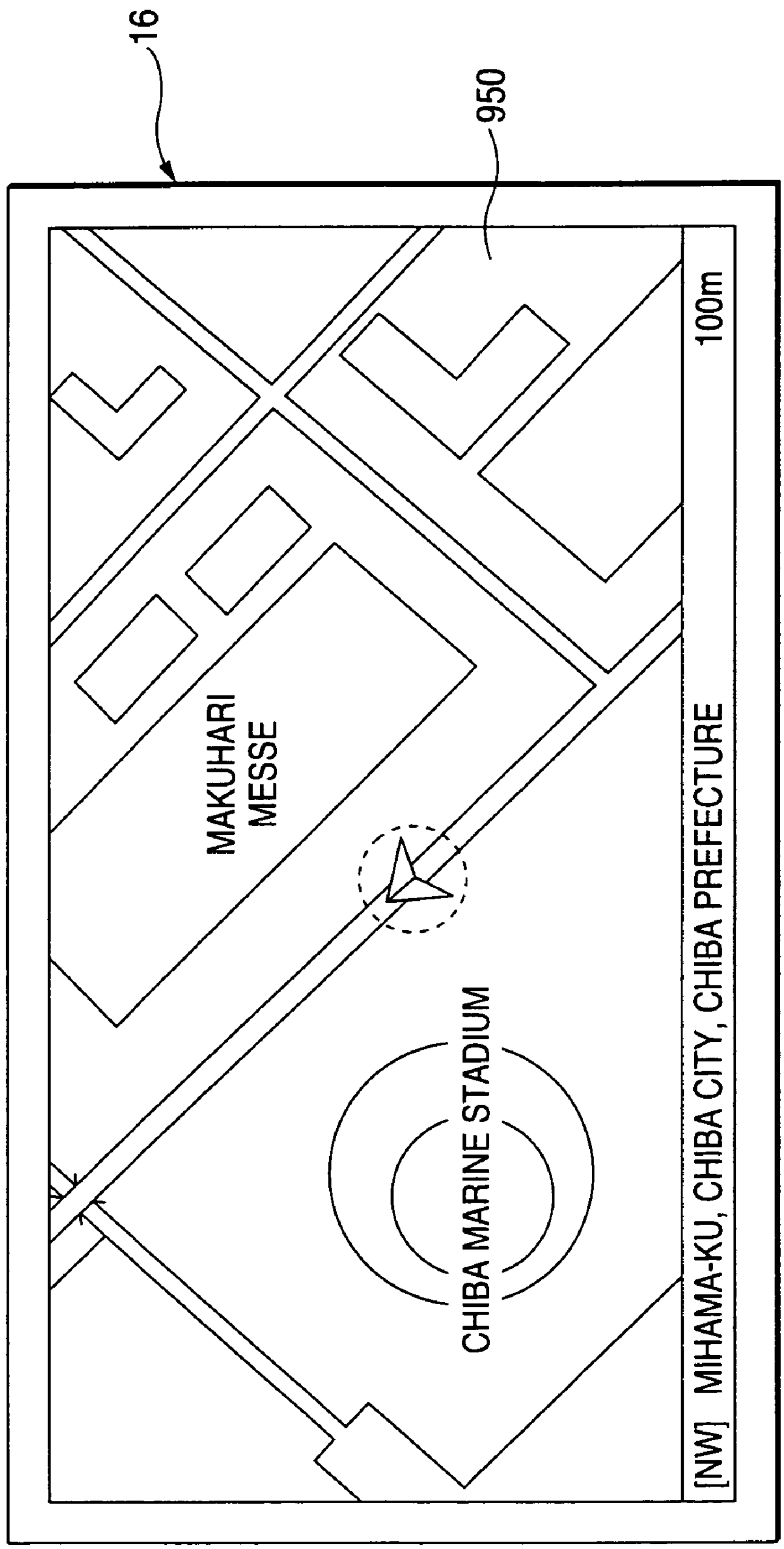
FIG. 106 is a diagram showing a navigation screen displayed in the display unit of the display control device according to the embodiment.

In addition to the icons thus far described, another icon is prepared in the start menu screen 101. In the icon, the display using the monitor 16 fully is frequently dominant so that the base ring, the satellite buttons and so on are not always displayed. In case the icon 102*d* is clicked in the start menu screen 101, for example, a TV broadcasting screen 900 is displayed in the monitor 16, as shown in FIG. 104. In the lower portion of the screen, there is displayed a status bar 900*a*, which indicates the TV station name, the channel, the stereophonic state and so on being received. Here, the status bar 900*a* is automatically erased when a constant time elapses after the display, thereby to enlarge the display area of the TV screen. When the operation button 17*b* (menu button) is operated in the state of FIG. 104, a tool bar 901 shown in FIG. 105 is so displayed in the lower portion of the screen as to push up the status bar 900*a*. In the start menu screen 101, on the other hand, when the icon 102*k* is clicked, a vehicle navigation screen 950 is displayed in the monitor 16, as shown in FIG. 106.

Figure 107:
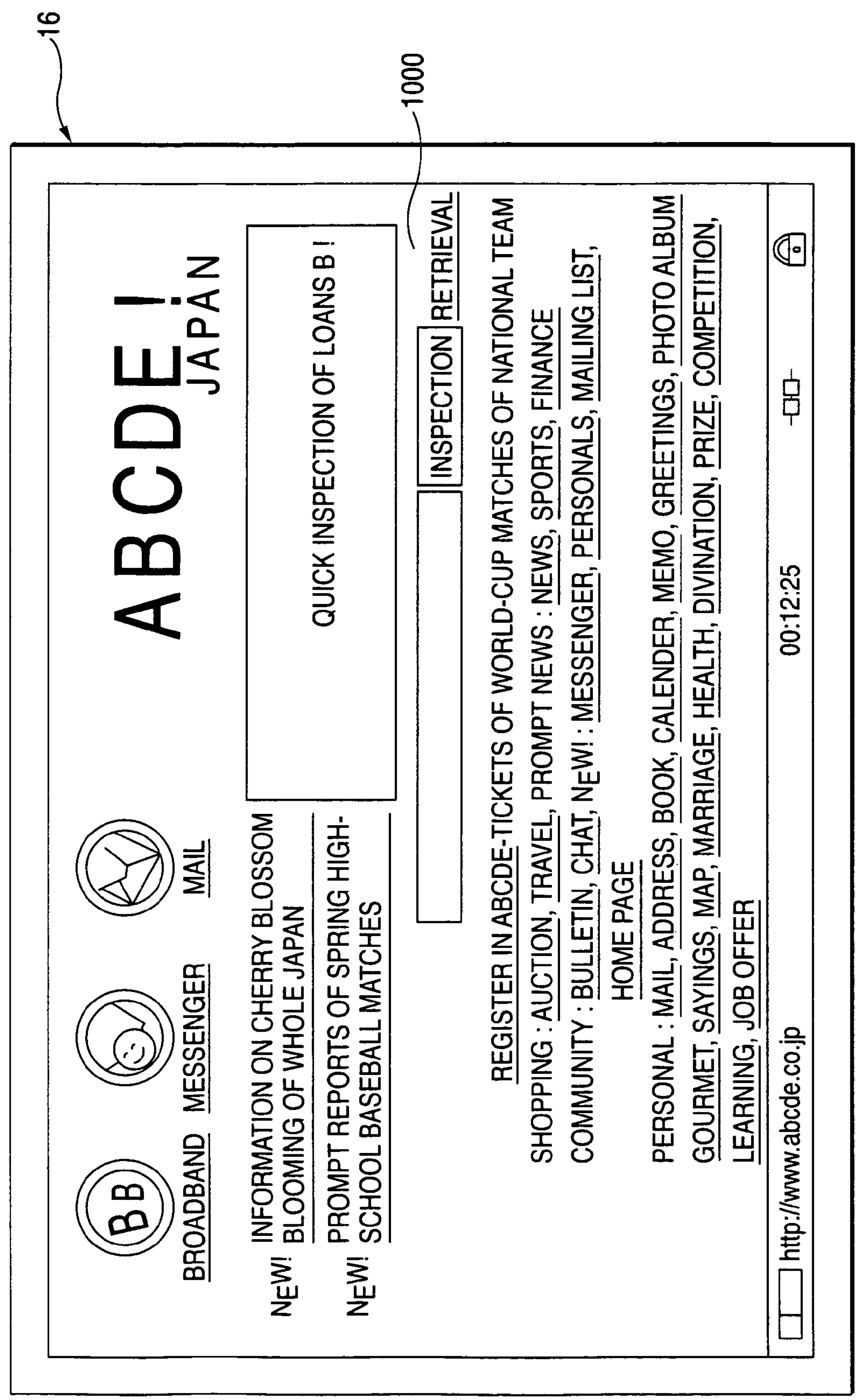
FIG. 107 is a diagram showing an internet screen displayed in the display unit of the display control device according to the embodiment.
Figure 108:
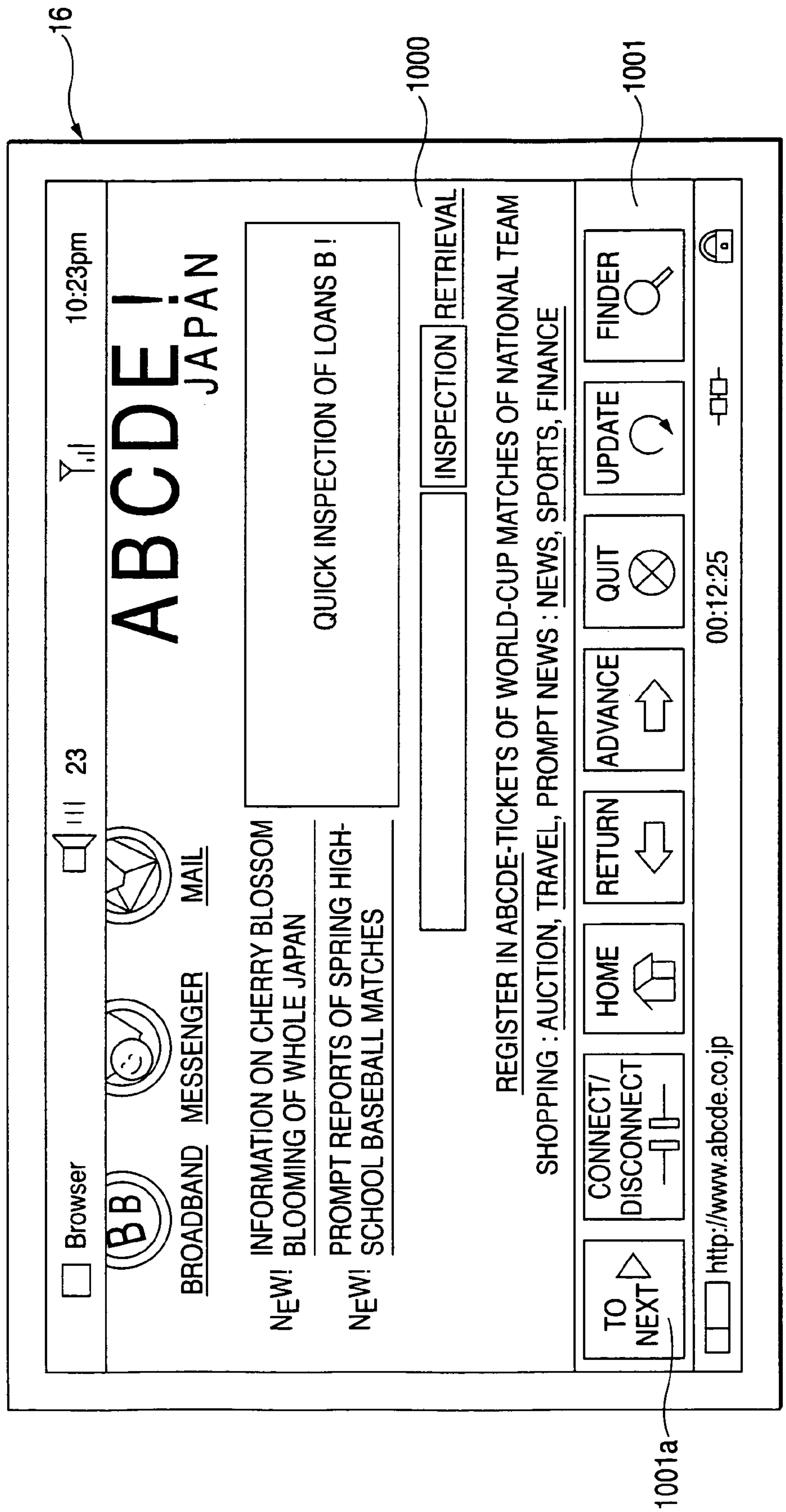
FIG. 108 is a diagram showing a screen, on which a tool bar is displayed on the internet screen displayed in the display unit of the display control device according to the embodiment.
Figure 109:
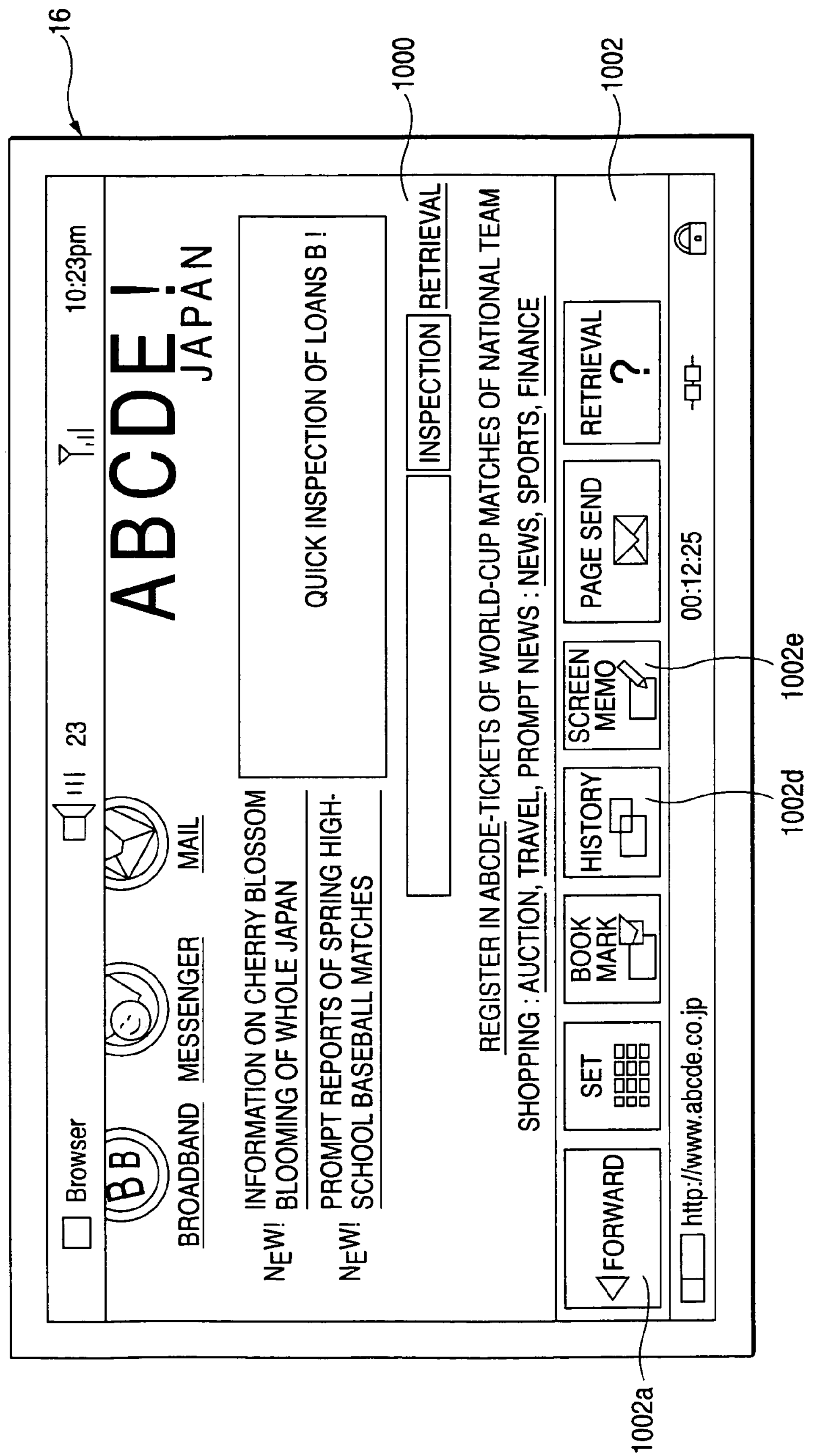
FIG. 109 is a diagram showing a screen, on which another tool bar is displayed on the internet screen displayed in the display unit of the display control device according to the embodiment.

When the icon 102*f* is selected in the start menu screen 101, moreover, an internet screen 1000 is displayed in the monitor 16, as shown in FIG. 107. When the operation button 17*b* (menu button) is then operated, a tool bar 1001 shown in FIG. 108 is displayed in the lower portion of the screen. When a "NEXT" button 1001*a* is clicked in the tool bar 1001, the tool bar 1001 is retracted and erased from the left side of the screen, and a tool bar 1002 shown in FIG. 109 is exposed and displayed from the left side of the screen. When a "FORWARD" button 1002 is clicked in the tool bar 1002, moreover, the tool bar 1002 is retracted and erased to the left side of the screen, and the tool bar 1001 is then exposed and displayed again from the left side of the screen.

Figure 110:
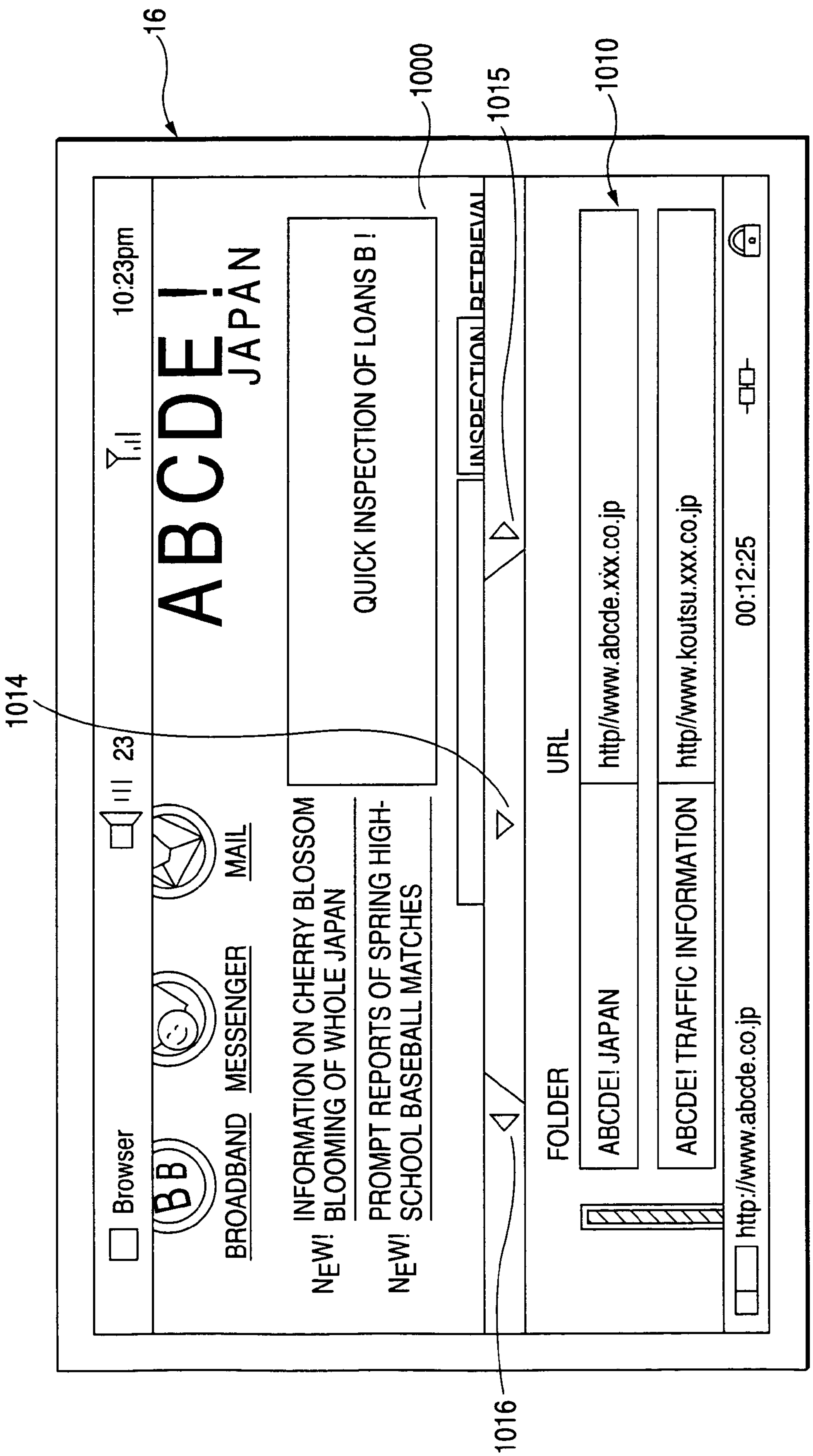
FIG. 110 is a diagram showing the behavior, in which a display screen showing the history of a tool bar shown in FIG. 109 is displayed on the screen by depressing the history in the internet screen displayed in the display unit of the display control device according to the embodiment.
Figure 111:
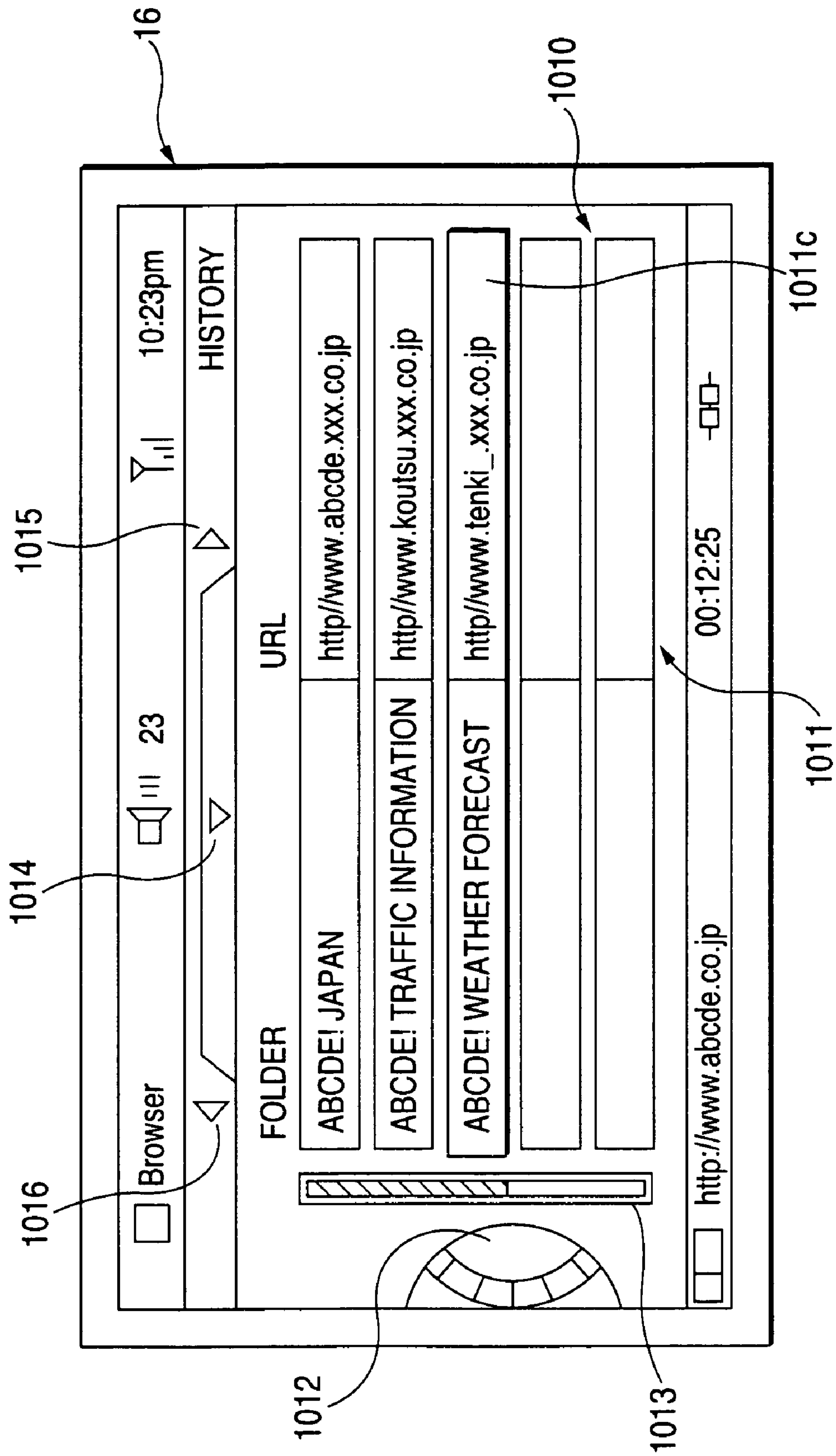
FIG. 111 is a diagram showing a screen, on which the display screen indicating the history is displayed on the internet screen displayed in the display unit of the display control device according to the embodiment.

When a "HISTORY" button 1002*d* is clicked in the tool bar 1002, the tool bar 1002 is retracted and erased to the lower side of the screen, and a display screen 1010 is exposed and displayed from the lower side of the screen (FIG. 110 and FIG. 111). In the display screen 1010, there are displayed: a list 1011 of the history of the URL accessed in the past; a scroll dial 1012; and a position bar 1013. Moreover, the display screen 1010 is provided at its upper portion with a list button 1014 and on the left and right sides with list change buttons 1015 and 1016, which move upward and downward together with the display screen 1010 thereby to make the internet screen 1000 from the aforementioned other screens.

Figure 112:
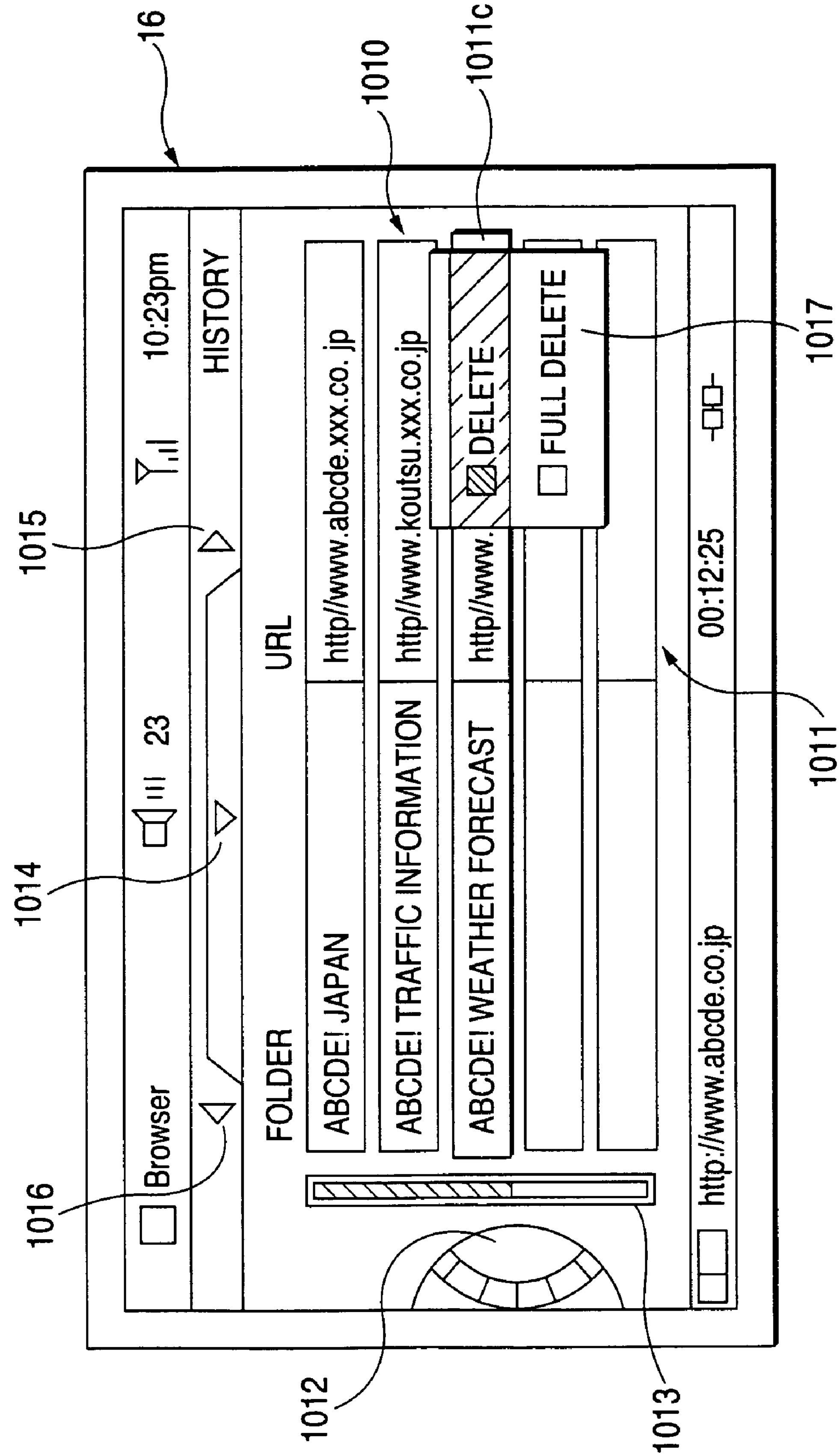
FIG. 112 is a diagram showing a screen, on which a pop-up menu is displayed on the display screen indicating the history displayed on the internet screen displayed in the display unit of the display control device according to the embodiment.
Figure 113:
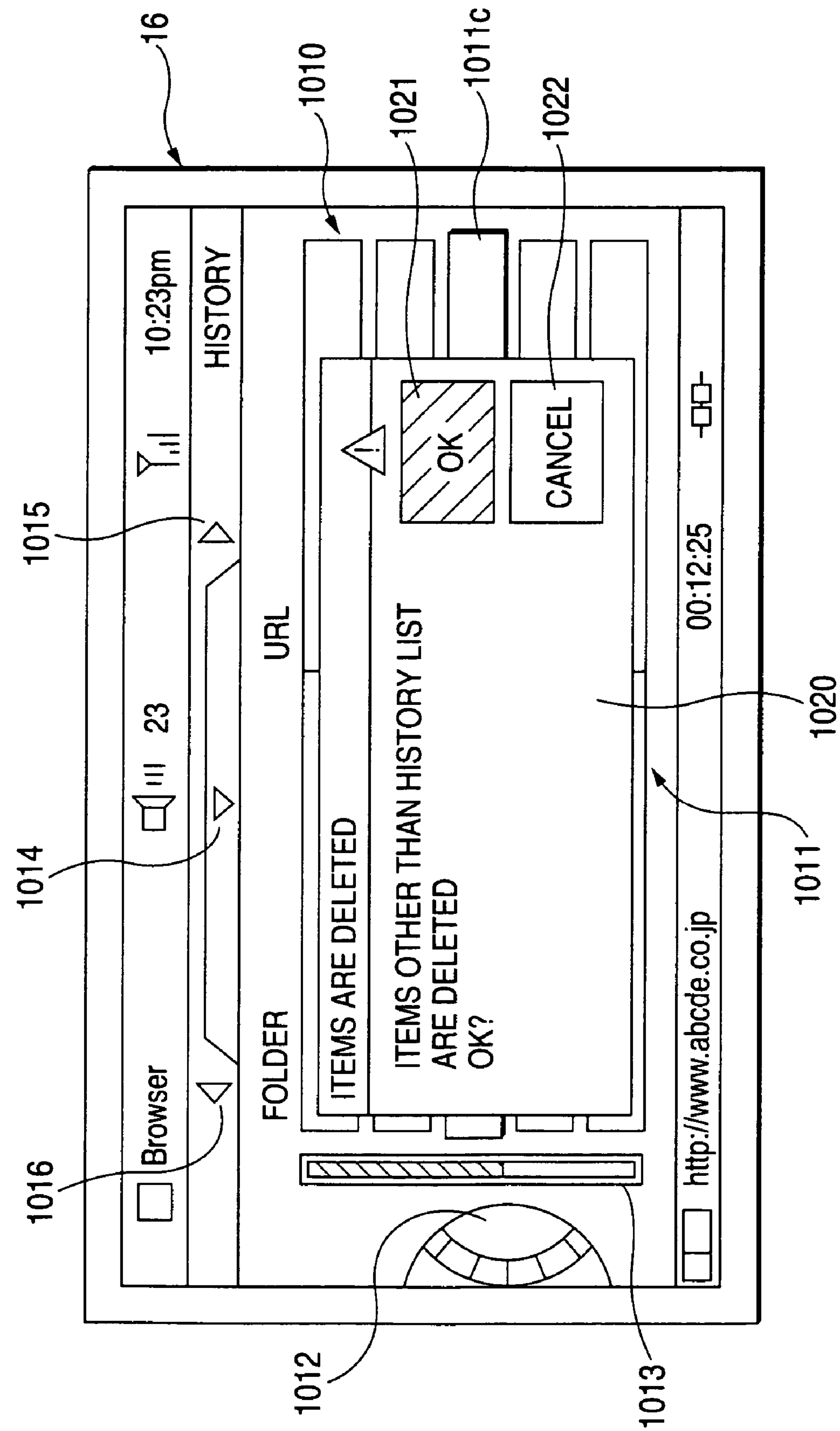
FIG. 113 is a diagram showing a screen, on which a winder for confirming the propriety of a deletion displayed in case the deletion is selected is displayed in the pop-up menu displayed on the display screen indicating the history shown in FIG. 112.

In the display screen 1010, for example, when a list item button 1011*c* is touched with the finger within the range of the aforementioned predetermined or shorter time or clicked by the controller 20, the display screen 1010 is retracted and erased to the lower side of the screen so that the page of the URL described in the list item button 1011*c* is displayed in the internet screen 1000. When the aforementioned predetermined time elapses after the list item button 1011*c* was touched with the finger, a pop-up menu 1017 shown in FIG. 112 is displayed in the monitor 16. When the "DELETE" is clicked in the pop-up menu 1017, a window 1020 shown in FIG. 113 is displayed in the monitor 16. In the window 1020, there are displayed: the confirmation of the deletion, an OK button 1021; and a cancel button 1022. When the OK button 1021 is clicked, the selected history is deleted.

Figure 114:
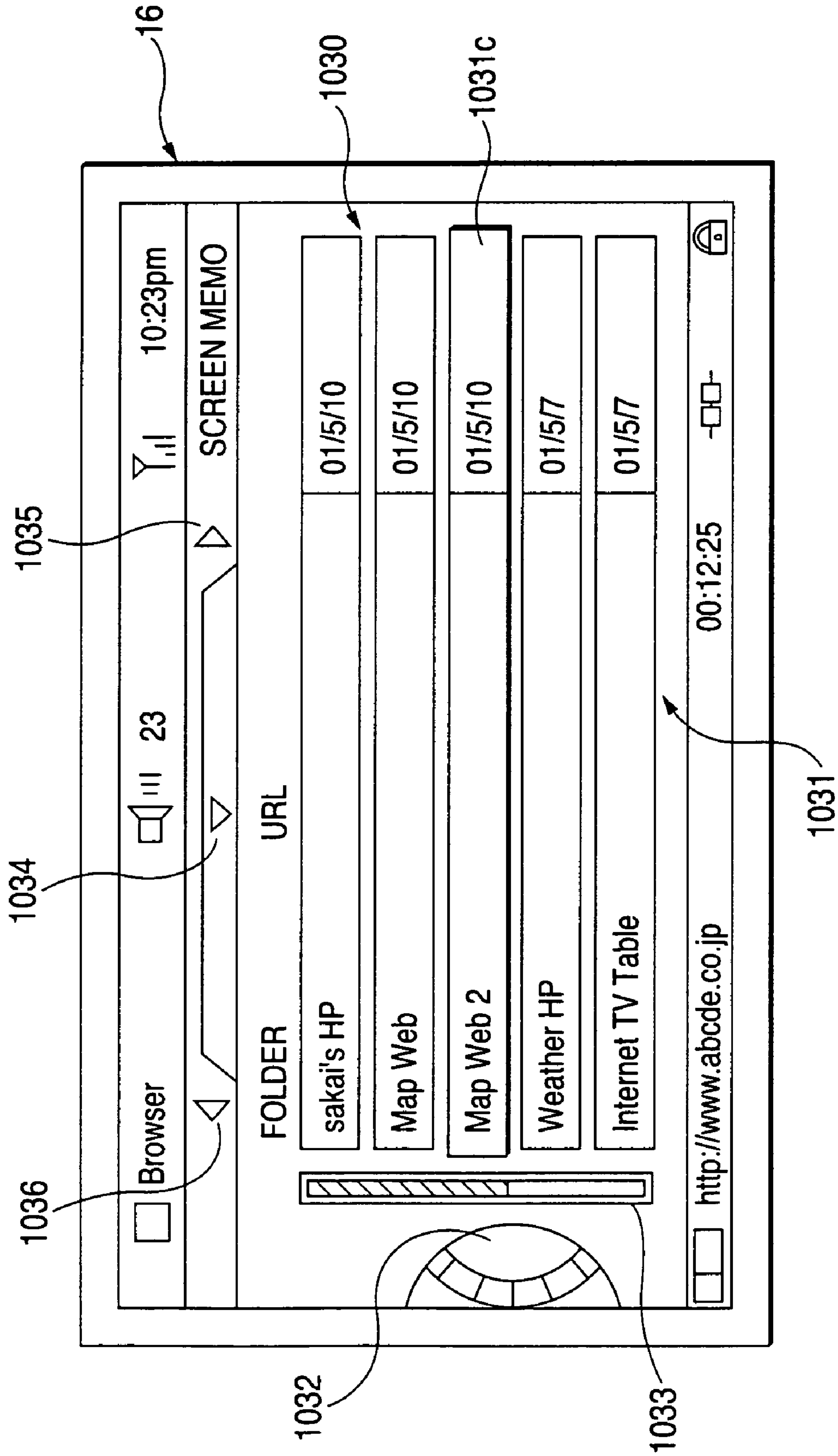
FIG. 114 is a diagram showing the screen, on which a display screen showing a screen memo is displayed by depressing the tool bar shown in FIG. 109 in the internet screen displayed in the display unit of the display control device according to the embodiment.

When a button 1002*e* of the "SCREEN MEMO" is clicked in the tool bar 1002, the tool bar 1002 is retracted and erased from the lower side of the screen, and a display screen 1030 is exposed and displayed from the lower side of the screen (FIG. 114). In the display screen 1030, there are displayed: a list 1031 of the URL stored as the memo in the past; a scroll dial 1032; a position bar 1033; a list button 1034; and list change buttons 1035 and 1036.

In the display screen 1030, for example, when a list item button 1031*c* is touched with the finger within the range of the aforementioned predetermined or shorter time or clicked by the controller 20, the display screen 1030 is retracted and erased to the lower side of the screen so that the page of the URL described in the list item button 1031*c* is displayed in the internet screen 1000.

Figure 115:
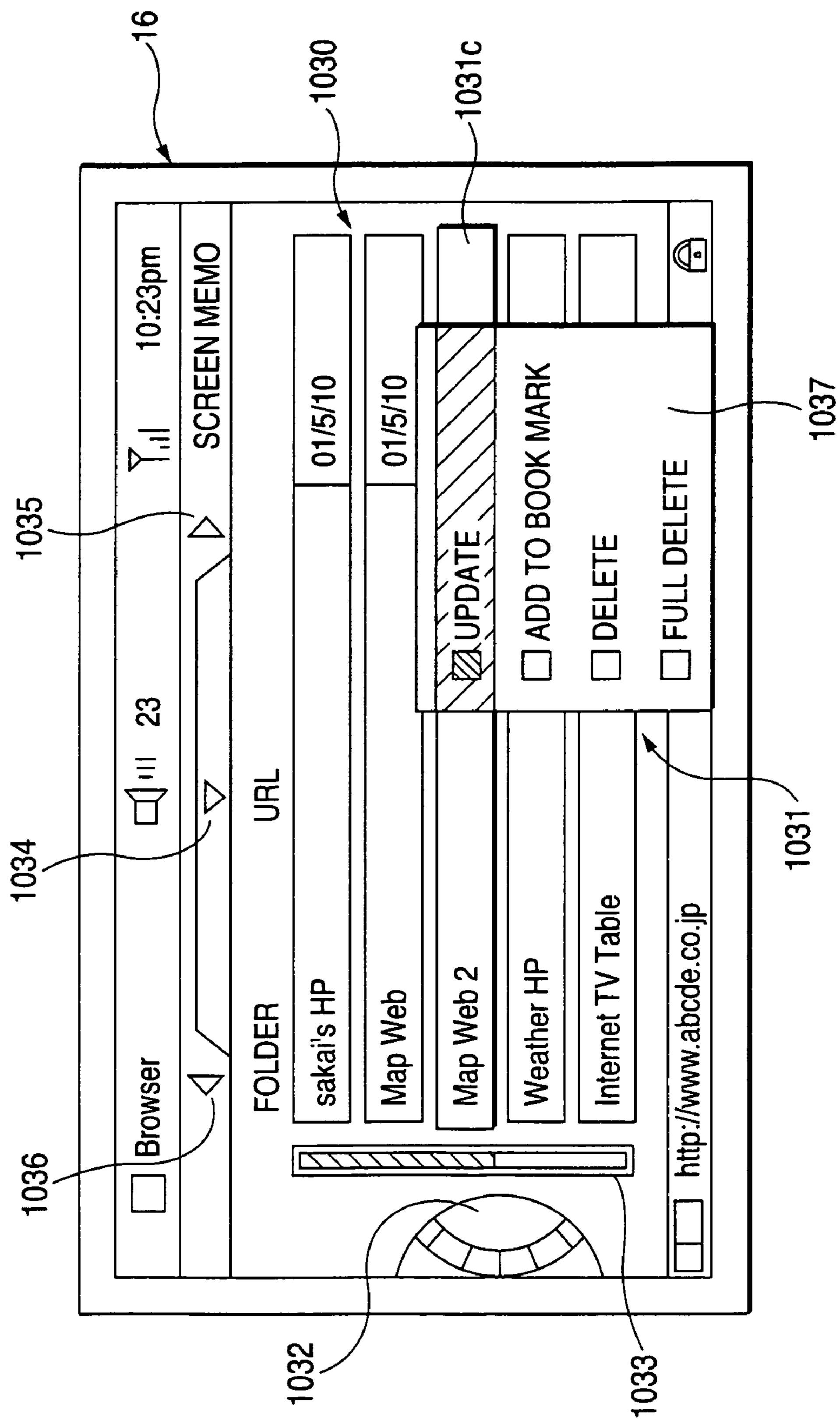
FIG. 115 is a diagram showing a screen, on which a pop-up menu is displayed on the display screen indicating the screen memo displayed on the internet screen displayed in the display unit of the display control device according to the embodiment.
Figure 116:
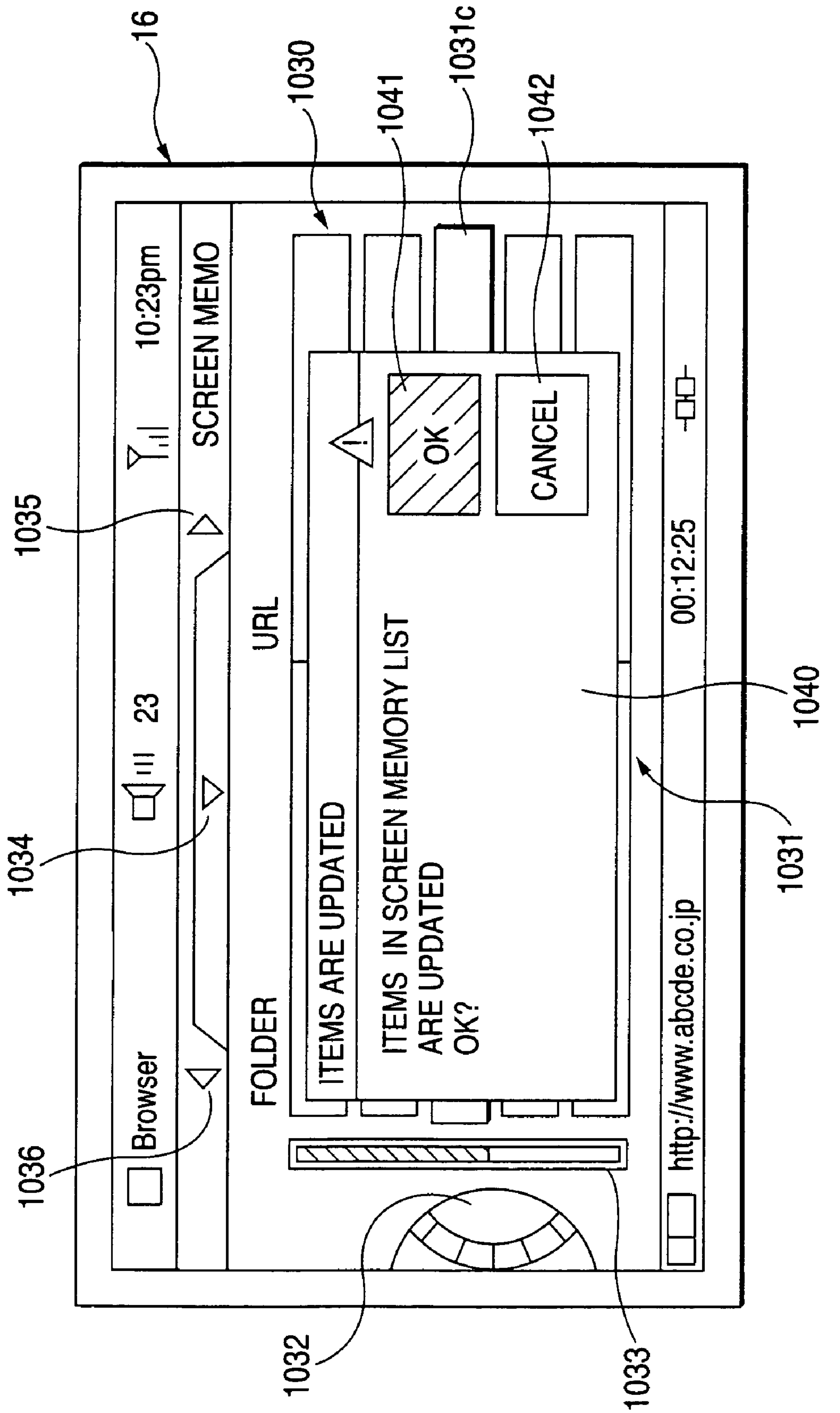
FIG. 116 is a diagram showing a screen, on which a confirming winder displayed in case a changing item is selected is displayed in the pop-up menu displayed on the display screen indicating the image memo shown in FIG. 115.

When the aforementioned predetermined time elapses after the list item button 1031*c* was touched with the finger, a pop-up menu 1037 shown in FIG. 115 is displayed in the monitor 16. When the "UPDATE" is clicked in the pop-up menu 1037, a window 1040 shown in FIG. 116 is displayed in the monitor 16. In the window 1040, there are displayed: the confirmation of the update; an OK button 1041; and a cancel button 1042. When the OK button 1041 is clicked, the selected memory (URL) is updated.

Figure 117:
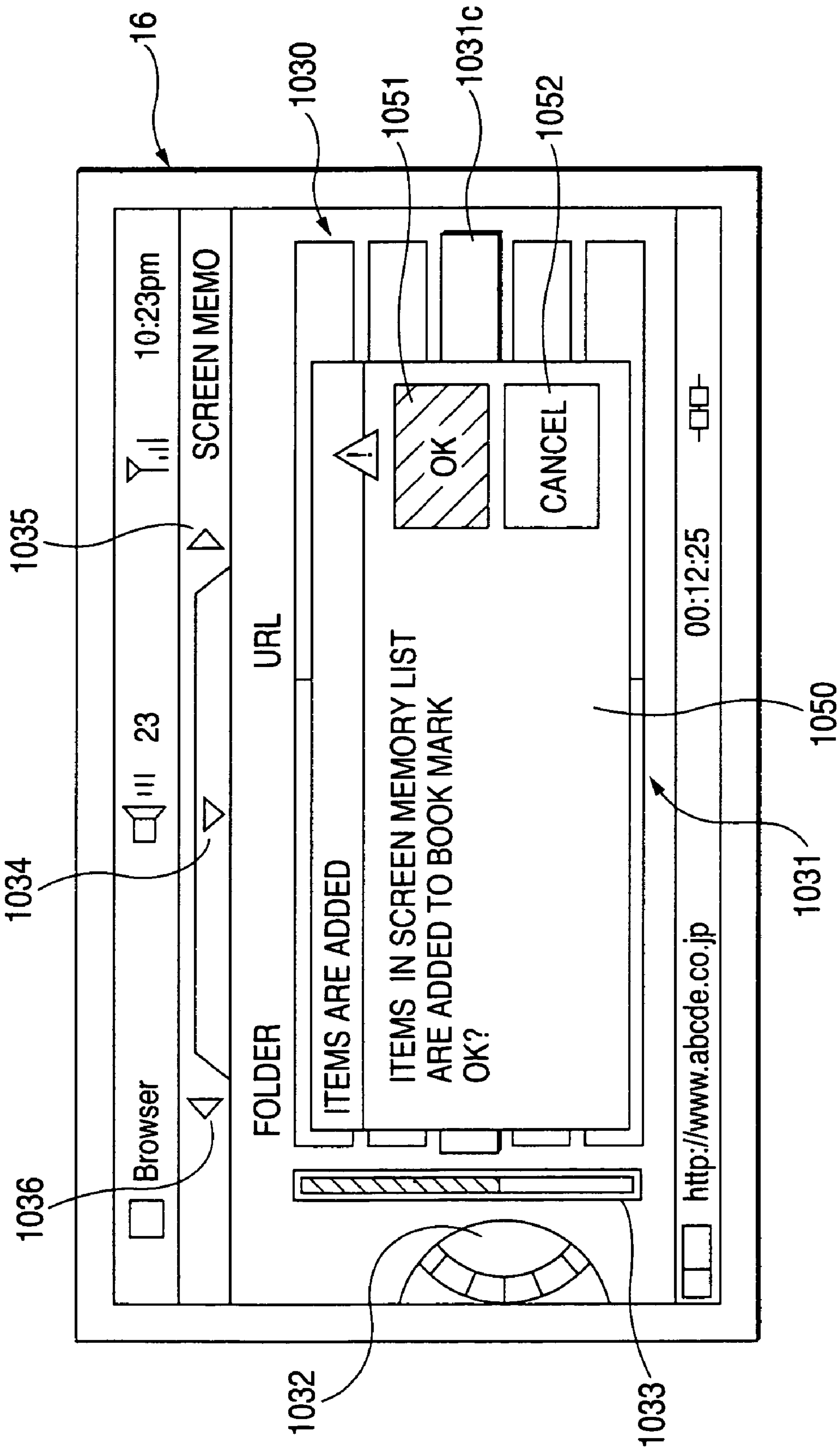
FIG. 117 is a diagram showing a screen, on which a confirming winder displayed in case an item on a bookmark is selected is displayed in the pop-up menu displayed on the display screen indicating the image memo shown in FIG. 115.

When the "ADD TO BOOKMARK" is clicked in the pop-up menu 1037, a window 1050 shown in FIG. 117 is displayed in the monitor 16. In the window 1050, there are displayed: the confirmation of addition to the bookmark; an OK button 1051; and a cancel button 1052. When the OK button 1051 is clicked, the selected memo (URL) is added to the bookmark.

Figure 118:
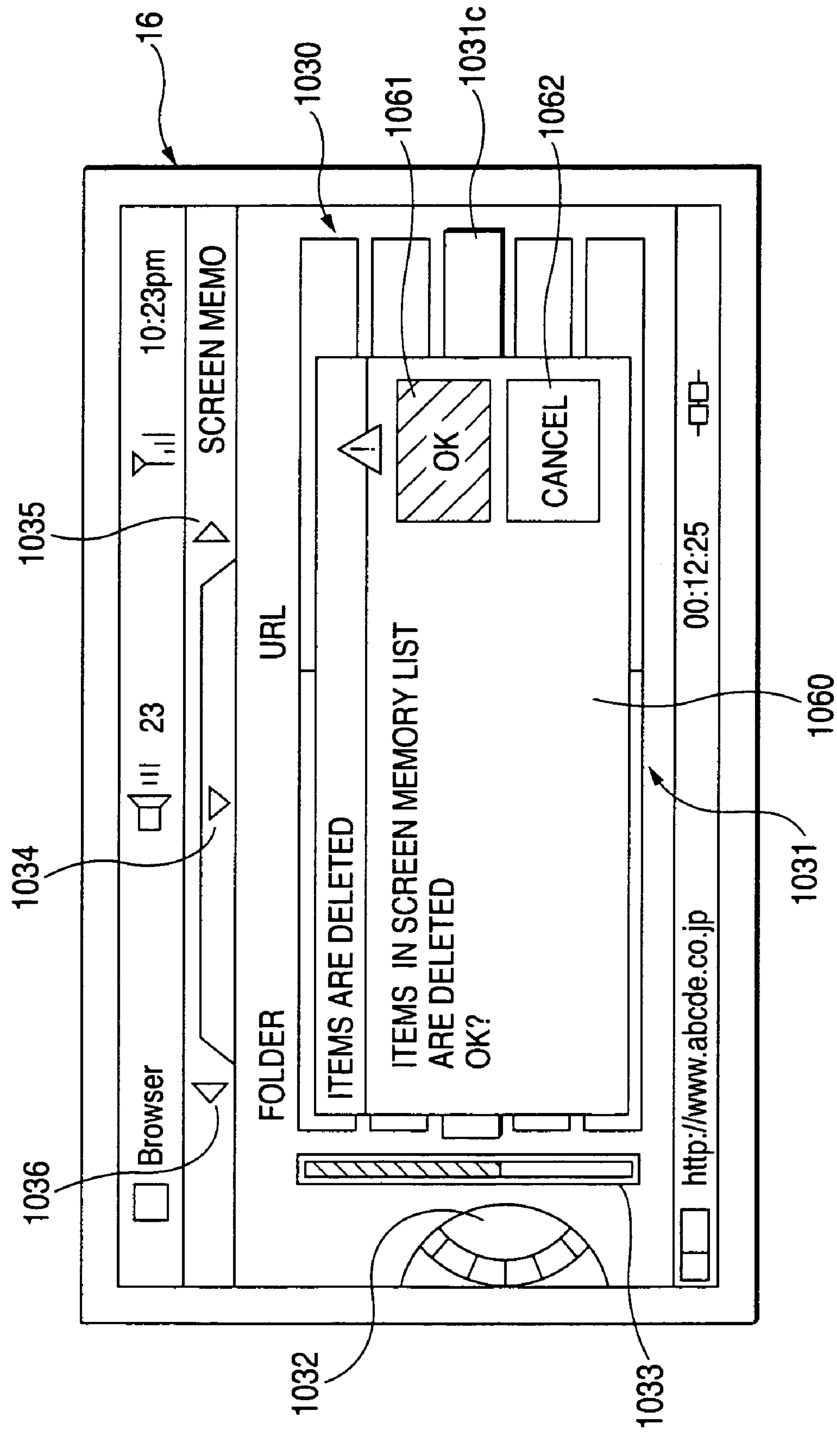
FIG. 118 is a diagram showing a screen, on which a confirming winder displayed in case a deleted item is selected is displayed in the pop-up menu displayed on the display screen indicating the image memo shown in FIG. 115.

When the "DELETE" is clicked in the pop-up menu 1037, a window 1060 shown in FIG. 118 is displayed in the monitor 16. In the window 1060, there are displayed: the confirmation of the deletion; an OK button 1061; and a cancel button 1062. When the OK button 1061 is clicked, the selected memo (URL) is deleted. In the display control device according to the embodiment of the invention thus far described, when the cursor is to be transferred to a different satellite button group by operating the controller 20 of the remote control unit 19, the cursor is moved to the highest satellite button 802 of the satellite button group in the screen, so that the user using the display control device of the invention can store the focused and displayed satellite button unconsciously and so that the image display method can be given operational and apparent feasibility and familiarity.

By moving the cursor not to the highest satellite button in the screen but to the satellite button of the highest using frequency of the satellite button group or the satellite button to execute the main function of the application screen, the target satellite button can be clicked immediately after the cursor was moved to another satellite button group, so that the operability can be improved.

Especially in the telephone screen 600, when the ten key button 604 is selected by the controller 20 so as to input the telephone number, the button "0" is focused at the stage where the cursor transfers to the ten keys, so that the load for selecting the button of the ten keys can be reduced to shorten the operation time.

When the satellite button 602*b* or the clear button is erroneously clicked so that the cursor is returned to the ten key button 604, moreover, the button near the button to be intrinsically inputted can be focused and displayed by moving the cursor to the button of the ten keys before the movement of the cursor, thereby to improve the operability better. By moving the cursor to the erroneously inputted button of the ten keys, moreover, the button near the button to be intrinsically inputted can be focused and displayed so that the correct number can be input promptly and easily to improve the operability better.

In the display control device according to the embodiment of the invention, a specific button is focused and displayed in case the button to be focused and displayed is changed by the button changing means from the button of one button group to a button of another button group. Therefore, the user using the display control device of the invention can store the focused and displayed satellite button unconsciously and so that the image display method to be displayed in the monitor can be given the operational and apparent feasibility and familiarity.

Although the present invention has been shown and described with reference to specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A display control device comprising:

a display control section adapted to display a start menu screen, said start menu screen comprising a plurality of icons corresponding to a plurality of functions, whereby upon selection of one of said plurality of icons said display control section is adapted to display a plurality of button groups, arranged along an annular ring, each having at least one button in a monitor connected thereto and to display any of the buttons displayed in the monitor in focused state; and a button change section including an in-group button changing operation unit adapted to change the button to be focused from one button to another within the button group, and an inter-group button changing operation unit adapted to change the button to be focused from a button of one button group to a button of another button group, wherein, when the button to be focused is changed by the inter-group button changing operation unit from the button of one button group to the button of another button group, the display control section displays a predetermined button of the button group changed in focused state;

wherein the display control device further comprises a keypad displayed on the display control section, wherein the annular ring is disposed on a first side of the display control section and the keypad is displayed on a second side of the display control section;

wherein an entry from the keypad is displayed in a center of the annular ring;

wherein when switching from the annular ring to the keypad, focus is indicated by a most frequently selected button; and wherein if a mistake is made during entry by the keypad, focus is placed at a mistaken button to allow for selection of adjacent buttons.

2. The display control device as claimed in claim 1, wherein the display control section displays a base ring in the monitor as is formed in an information display portion for displaying various information, and displays the buttons arranged around the base ring by dividing the buttons into the button groups.

3. The display control device as claimed in claim 1, wherein the display control section comprises a processing unit adapted to execute software application programs, and wherein the display control section displays and divides the button groups for functions of the software application programs to be executed by the processing unit, and applies the predetermined button to a button for executing a frequently used function in the button groups.

4. The display control device as claimed in claim 1, wherein the display control section comprises a processing unit adapted to execute software application programs, and wherein the display control section displays and divides the button groups for functions of the software application programs to be executed by the processing unit, and applies the predetermined button to a button for executing a main function in the button groups.

5. The display control device as claimed in claim 1, wherein the display control section displays ten keys as one of the button groups, and wherein when the button to be focused is changed by the inter-group button changing operation unit from a button of one button group to a button of the ten keys, the display control section displays the predetermined button in the ten keys in focused state.

6. The display control device as claimed in claim 5, wherein the display control section applies the predetermined button to a button indicating "0" in the ten keys.

7. The display control device as claimed in claim 5, wherein the display control section comprises a button memory unit adapted to memorize a button that was focused immediately before the button to be focused is changed by the inter group button changing operation unit from a button of the ten keys to a button of another button group, wherein when the button to be focused is changed by the inter-group button changing operation unit from a button of the another button group to a button of the ten keys, the display control section displays the button memorized in the button memory unit in focused state.

8. The display control device as claimed in claim 5, wherein the button change section further comprises a button determining unit adapted to determine the focused button, wherein the display control section comprises:

a processing unit adapted to execute a software application program for realizing a telephone communication;

a ten key memory unit adapted to memorize a button of the ten keys, which was focused immediately before the button to be focused is changed by the inter-group button changing operation unit from the button in the ten keys to the button of the another button group; and a telephone number memory unit adapted to memorize a number of the button of the ten keys determined by the button determining unit, as a telephone number, wherein the display control section displays a communication button as any of the buttons; the communication button for starting the transmission of the telephone number to be memorized in the telephone number memory unit and for erasing the telephone number memorized in the telephone number memory unit, wherein when the button to be focused is changed by the inter-group button changing operation unit from the button of the another button group to the button in the ten keys and when the telephone number is memorized in the telephone number memory unit, the display control section displays the button of the ten keys memorized in the ten key memory unit in focused state, and wherein when the button to be focused is changed by the inter-group button changing operation unit from the button of the another button group to the button in the ten keys and when no telephone number is memorized in the telephone number memory unit, the display control section displays the button of the ten keys indicating "0" in focused state.

9. The display control device as claimed in claim 5, wherein the button change section further comprises a button determining unit adapted to determine the focused button, wherein the display control section comprises:

a processing unit adapted to execute a software application program for realizing a telephone communication;

a determined key memory unit adapted to memorize the button of the ten keys, which was determined by the button determining unit immediately before the button to be focused is changed by the inter-group button changing operation unit from the button in the ten keys to the button of the another button group; and a telephone number memory unit adapted to memorize a number of the button of the ten keys determined by the button determining unit, as a telephone number, wherein the display control section displays a communication button as any of the buttons; the communication button for starting the transmission of the telephone number to be memorized in the telephone number memory unit and for erasing the telephone number memorized in the telephone number memory unit, wherein when the button to be focused is changed by the inter-group button changing operation unit from the button of the another button group to the button in the ten keys and when the telephone number is memorized in the telephone number memory unit, the display control section displays the button of the ten keys memorized in the ten key memory unit in focused state, and wherein when the button to be focused is changed by the inter-group button changing operation unit from the button of the another button group to the button in the ten keys and when no telephone number is memorized in the telephone number memory unit, the display control section displays the button of the ten keys indicating "0" in focused state.

10. The display control device as claimed in claim 1, wherein the in-group button changing operation unit is operated in an array direction of the buttons in the button groups so that the button displayed in focused state is to be moved from one button to another button displayed in the array direction within an identical button group by the display control section.

11. The display control device as claimed in claim 1, wherein the inter-group button changing operation unit is operated in an array direction of the button groups so that the button displayed in focused state is to be moved from one button in one button group to a button of another button group displayed in the array direction by the display control section.

12. The display control device as claimed in claim 1, further comprising a remote controller separated from the display control section, wherein the button change section is disposed in the remote controller.

13. The display control device as claimed in claim 1, wherein the display control section displays the button selected by the button change section in focused state by displaying highlighted.

14. The display control device as claimed in claim 1, wherein the display control section displays the button selected by the button change section in focused state by displaying enlarged.

15. The display control device as claimed in claim 1, wherein the display control section displays the button selected by the button change section in focused state by changing the display color of the focused button.

16. The display control device of claim 1, wherein the focused state of a button comprises a cursor positioned at the button.

17. The display control device of claim 1, wherein when the button to be focused is selected by the display control device, the display changes from a first display window to a second display window corresponding to the button to be focused.

18. The display control device of claim 17, wherein said second display window comprises a plurality of sub-buttons directed to the button selected by the display control device in said first display window.

19. The display control device according to claim 1, further comprising an input unit which inputs a button selection command by a user, wherein the in-group button changing operation unit changes the button to be focused in response to the button selection command input to the input unit.

20. The display control device according to claim 1, wherein said plurality of button groups indicates possible operations corresponding to a selected icon.

21. The display control device according to claim 1, further comprising an information display portion disposed within the annular ring, said information display portion displaying an image which identifies a selected icon.

22. The display control device according to claim 21, wherein the image comprises at least one of a still picture or a motion picture representing the selected icon.

23. The display control device according to claim 1, wherein the display control section comprises a button memory unit adapted to memorize a button that was focused immediately before the button to be focused is changed by the inter-group button changing operation unit from a button of one button group to a button of another button group, and wherein when the button to be focused is changed by the inter-group button changing operation unit from a button of the another button group to a button of the one button group, the display control section displays the button memorized in the button memory unit in focused state.

24. A display control device comprising:

a display control section adapted to display a start menu screen, said start menu screen comprising a plurality of icons arranged along an annular ring, corresponding to a plurality of functions, whereby upon selection of a telephone icon said display control section is adapted to display in a monitor connected thereto ten keys composed of a plurality of buttons for inputting a telephone number and a communication button for starting a telephone communication, and to display any of the ten keys and the communication button displayed in the monitor in focused state; and a button change section adapted to change the button to be focused from one button to another, wherein the display control section displays a predetermined button of the ten keys in focused state when the ten keys previously not displayed are displayed in the monitor;

wherein the annular ring is disposed on a first side of the display control section and the ten keys that make up a keypad are displayed on a second side of the display control section;

wherein an entry from the keypad is displayed in a center of the annular ring;

wherein when switching from the annular ring to the keypad, focus is indicated by a most frequently selected button; and wherein if a mistake is made during entry by the keypad, focus is placed at a mistaken button to allow for selection of adjacent buttons.

25. The display control device as claimed in claim 24, further comprising a button determining section adapted to determine the button displayed in focused state, wherein the display control section comprises:

a processing unit adapted to execute software application programs for realizing a telephone communication;

a telephone number memory unit adapted to memorize the number of the button of the ten keys determined by the button determining section, as the telephone number and to erase the memorized telephone number when the communication button is determined by the button determining unit; and a button memory unit adapted to memorize the button focused immediately before the ten keys are erased from the monitor, wherein when the telephone number is not memorized in the telephone number memory unit and when the ten keys not displayed are displayed in the monitor by the display control unit, the display control section displays the button indicating "0" of the ten keys in focused state, and wherein when the telephone number is memorized in the telephone number memory unit and when the ten keys not displayed are displayed in the monitor by the display control section, the display control section displays the button memorized in the button memory unit in focused state.

26. The display control device as claimed in claim 24, further comprising a button determining section for determining the button displayed in focused state, wherein the display control section comprises:

a processing unit adapted to execute software application programs for realizing a telephone communication;

a telephone number memory unit adapted to memorize the number of the button of the ten keys determined by the button determining unit, as the telephone number and to erase the memorized telephone number when the communication button is determined by the button determining section; and a determined button memory unit adapted to memorize the button of the ten keys determined by the button determining section immediately before the ten keys are erased from the monitor, wherein when the telephone number is not memorized in the telephone number memory unit and when the ten keys not displayed are displayed in the monitor by the display control section, the display control section displays the button indicating "0" of the ten keys in focused state, and wherein when the telephone number is memorized in the telephone number memory unit and when the ten keys not displayed are displayed in the monitor by the display control section, the display control section displays the button memorized in the determined button memory unit in focused state.

27. The display control device as claimed in claim 24, wherein the display control section applies a button indicating "0" of the ten keys to the predetermined button.

28. The display control device as claimed in claim 24, wherein the display control section applies a button of the ten keys indicating the numeral of the telephone number to be normally dialed firstly.

29. The display control device as claimed in claim 24, wherein the display control section displays the button selected by the button change section in focused state by displaying highlighted.

30. The display control device as claimed in claim 24, wherein the display control section displays the button selected by the button change section in focused state by displaying enlarged.

31. The display control device as claimed in claim 24, wherein the display control section displays the button selected by the button change section in focused state by changing the display color of the focused button.

32. The display control device according to claim 24, wherein the display control section comprises a button memory unit adapted to memorize the button which was displayed in focused state immediately before the ten keys are erased from the monitor, and wherein the display control section displays the button memorized in the button memory unit in focused state as the predetermined button.

33. A display control device comprising:

a display control section adapted to display a start menu screen, said start menu screen comprising a plurality of icons arranged along an annular ring, corresponding to a plurality of functions, whereby upon selection of a telephone icon said display control section is adapted to display in a monitor connected thereto a plurality of buttons for inputting a telephone number and a communication button for starting a communication, and to display any of the ten keys and the communication button displayed in the monitor in focused state; and a button change section adapted to change the button to be displayed in focused state from one button to another, wherein when the communication button is displayed in focused state and when the button to be displayed in focused state is changed by the button change section from the communication button to the button of the ten keys, the display control section displays a predetermined button of the ten keys in focused state;

wherein the annular ring is disposed on a first side of the display control section and the ten keys that make up a keypad are displayed on a second side of the display control section;

wherein an entry from the keypad is displayed in a center of the annular ring;

wherein when switching from the annular ring to the keypad, focus is indicated by a most frequently selected button; and wherein if a mistake is made during entry by the keypad, focus is placed at a mistaken button to allow for selection of adjacent buttons.

34. The display control device as claimed in claim 33, further comprising a button determining section adapted to determine the button displayed in focused state, wherein the display control section comprises:

a processing unit adapted to execute software application programs for realizing a telephone communication;

a telephone number memory unit adapted to memorize the number of the button of the ten keys determined by the button determining section, as the telephone number and to erase the memorized telephone number when the communication button is determined by the button determining section; and a ten key memory unit adapted to store the button of the ten keys displayed in focused state immediately before the button displayed in focused state is changed by the button change section from the button of the ten keys to the communication button, wherein when the telephone number is not memorized in the telephone number memory unit and when the button displayed in focused state is changed by the display control section from the communication button to the button of the ten keys, the display control section displays the button indicating "0" of the ten keys in focused state and wherein when the telephone number is not memorized in the telephone number memory unit and when the button displayed in focused state is changed by the display control section from the communication button to the button of the ten keys, the display control section displays the button memorized in the button memory unit in focused state.

35. The display control device according to claim 34, wherein the display control section displays the button stored in the ten key memory unit in focused state as the predetermined button.

36. The display control device as claimed in claim 33, further comprising:

a button determining section adapted to determine the button displayed in focused state, wherein the display control section comprises:

a processing unit adapted to execute software application programs for realizing a telephone communication;

a telephone number memory unit adapted to memorize the number of the button of the ten keys determined by the button determining section, as the telephone number and to erase the memorized telephone number when the communication button is determined by the button determining section; and a determined button memory unit adapted to store the button of the ten keys determined by the button determining section immediately before the button displayed in focused state is changed by the button change section from the button of the ten keys to the communication button, wherein when the telephone number is not memorized in the telephone number memory unit and when the button displayed in focused state is changed by the display control section from the communication button to the button of the ten keys, the display control section displays the button indicating "0" of the ten keys in focused state, and wherein when the telephone number is not memorized in the telephone number memory unit and when the button displayed in focused state is changed by the display control section from the communication button to the button of the ten keys, the display control section displays the button memorized in the button memory unit in focused state.

37. The display control device as claimed in claim 33, wherein the display control section applies a button indicating "0" of the ten keys to the specific button.

38. The display control device as claimed in claim 33, wherein the display control section applies a button of the ten keys indicating the numeral of the telephone number to be normally dialed firstly.

39. The display control device as claimed in claim 33, wherein the display control section displays the button selected by the button change section in focused state by displaying highlighted.

40. The display control device as claimed in claim 33, wherein the display control section displays the button selected by the button change section in focused state by displaying enlarged.

41. The display control device as claimed in claim 33, wherein the display control section displays the button selected by the button changes section in focused state by changing the display color of the focused button.

* * * * *